(12) United States Patent
Togashi et al.

(10) Patent No.: US 7,088,569 B1
(45) Date of Patent: Aug. 8, 2006

(54) MULTILAYER CAPACITOR

(75) Inventors: Masaaki Togashi, Nikaho (JP); Chris T. Burket, Huntington Beach, CA (US)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/313,614

(22) Filed: Dec. 22, 2005

(51) Int. Cl.
   *H01G 4/005* (2006.01)
   *H01G 4/06* (2006.01)
   *H01G 4/228* (2006.01)

(52) U.S. Cl. ............ 361/303; 361/311; 361/306.3

(58) Field of Classification Search ........ 361/303–305, 361/306.1, 306.3, 310–313
   See application file for complete search history.

(56) References Cited

U.S. PATENT DOCUMENTS

| | | | |
|---|---|---|---|
| 5,880,925 | A | 3/1999 | DuPré et al. |
| 6,038,121 | A * | 3/2000 | Naito et al. ............ 361/303 |
| 6,215,647 | B1 * | 4/2001 | Naito et al. ............ 361/303 |
| 6,243,253 | B1 | 6/2001 | DuPré et al. |
| 6,430,025 | B1 * | 8/2002 | Naito et al. ............ 361/303 |
| 6,765,781 | B1 * | 7/2004 | Togashi ............ 361/306.3 |
| 6,914,767 | B1 * | 7/2005 | Togashi et al. ............ 361/303 |
| 6,940,710 | B1 * | 9/2005 | Lee et al. ............ 361/321.2 |

FOREIGN PATENT DOCUMENTS

JP   A 2004-047983   2/2004

* cited by examiner

*Primary Examiner*—Eric W. Thomas
(74) *Attorney, Agent, or Firm*—Oliff & Berridge, PLC

(57) ABSTRACT

A multilayer capacitor comprises a multilayer body in which a plurality of dielectric layers and a plurality of first and second inner electrodes are alternately laminated, and a plurality of outer conductors (first and second terminal conductors, and first and second outer connecting conductors) formed on the multilayer body. Each of the outer conductors is formed on one of two side faces of the multilayer body opposing each other. Each of the first and second inner electrodes is electrically connected to the corresponding outer connecting conductor. At least one first inner connecting conductor and at least one second inner connecting conductor are laminated in the multilayer body. Each of the inner connecting conductors is electrically connected to the corresponding terminal and outer connecting conductors. The equivalent series resistance of the multilayer capacitor is set to a desirable value by adjusting the number or position of inner connecting conductors.

14 Claims, 38 Drawing Sheets

MULTILAYER CAPACITOR

BACKGROUND OF THE INVENTION

1. Field of the Invention

The present invention relates to a multilayer capacitor.

2. Related Background Art

Known as this kind of multilayer capacitor is one comprising a multilayer body in which a plurality of dielectric layers and a plurality of inner electrodes are alternately laminated, and a plurality of terminal conductors formed on the multilayer body.

Power supplies for central processing units (CPUs) mounted in digital electronic devices have been increasing their load current and load transients while lowering their voltage. Therefore, it has become very difficult to suppress the fluctuation in power supply voltage under a tolerable level in response to a drastic change in load current, whereby a multilayer capacitor known as decoupling capacitor has come into use so as to be connected to a power supply. At the time when the load current fluctuates transiently, the multilayer capacitor supplies a current to the CPU, thereby suppressing the fluctuation of the power supply voltage.

In recent years, as the CPUs have further been raising their operating frequencies, the load current and load transients have been becoming faster and greater, whereby, the multilayer capacitor used in the decoupling capacitor is demanded to increase its capacity and equivalent series resistance (ESR) and lower its equivalent series inductance (ESL) to help maintain a constant impedance loadline over a broad frequency spectrum. Therefore, a multilayer capacitor whose terminal conductor has a multilayer structure including an inner resistance layer, so as to increase the equivalent series resistance has been under consideration. Traditional means to lower the ESL of a capacitor have also resulted in the lowering of ESR. The CPU system levels of needed impedance (as it relates to ESR) have been met by current products to the point that they need to be raised, while continuing to drive ESL lower.

SUMMARY OF THE INVENTION

However, the following problem exists when adjusting the multilayer capacitor equipped with a terminal conductor having a multilayer structure including an inner resistance layer to a desirable value. Namely, for adjusting the equivalent series resistance to a desirable value in a multilayer capacitor equipped with a terminal conductor having a multilayer structure including an inner resistance layer, the thickness and material composition of the inner resistance layer included in the terminal conductor must be regulated while remaining independent of the capacitor's capacitance and ESL, which makes it very difficult to control the equivalent series resistance.

For overcoming the above-mentioned problem, it is an object of the present invention to provide a multilayer capacitor which can regulate the equivalent series resistance easily with a high precision.

In a typical multilayer capacitor, all the inner electrodes are connected to their corresponding terminal conductors through lead conductors. Consequently, the lead conductors exist by the number of inner electrodes, thereby lowering the equivalent series resistance. As the number of layers of the dielectric layers and inner electrodes is made greater in order to increase the capacity of the multilayer capacitor, the number of lead conductors becomes greater. Since resistance components of lead conductors are connected to the terminal conductors in parallel, the equivalent series resistance of the multilayer capacitor further decreases as the number of lead conductors increases. Thus, the demand for increasing the capacity of the multilayer capacitor and the demand for increasing the equivalent series resistance contradict each other.

Therefore, the inventors diligently conducted studies about multilayer capacitors which can satisfy both of the demands for increasing the capacity and equivalent series resistance. As a result, the inventors have found a new fact that, even when the number of laminated inner electrodes is the same, the equivalent series resistance can be adjusted to a desirable value if the inner electrodes are connected to outer connecting conductors formed on the surface of the multilayer body and inner connecting conductors laminated within the multilayer body while making it possible to change the number of inner connecting conductors connected to the terminal conductors. The inventors have also found a new fact that the equivalent series resistance can be adjusted to a desirable value if the inner electrodes are connected to outer connecting conductors formed on the surface of the multilayer body and inner connecting conductors laminated within the multilayer body while making it possible to change positions of inner connecting conductors in the laminating direction of the multilayer body. When the number of inner connecting conductors connected to the terminal conductors is made smaller than that of inner electrodes in particular, the adjustment can be made such as to increase the equivalent series resistance.

In view of such results of studies, in one aspect, the present invention provides a multilayer capacitor comprising a multilayer body in which a plurality of dielectric layers and a plurality of inner electrodes are alternately laminated, and a plurality of outer conductors formed on the multilayer body; wherein the plurality of inner electrodes include a plurality of first inner electrodes and a plurality of second inner electrodes alternately arranged; wherein the plurality of outer conductors include a first terminal conductor, a second terminal conductor, a first outer connecting conductor electrically connected to the plurality of first inner electrodes, and a second outer connecting conductor electrically connected to the plurality of second inner electrodes; wherein the first terminal conductor is formed on a first side face of the multilayer body; wherein the second terminal conductor is formed on the first side face of the multilayer body or a second side face thereof opposing the first side face; wherein the first outer connecting conductor is formed on the first or second side face of the multilayer body; wherein the second outer connecting conductor is formed on the first or second side face of the multilayer body; wherein each of the first inner electrodes is electrically connected to the first outer connecting conductor through a lead conductor; wherein each of the second inner electrodes is electrically connected to the second outer connecting conductor through a lead conductor; wherein at least one first inner connecting conductor and at least one second inner connecting conductor are laminated in the multilayer body; wherein the first inner connecting conductor is electrically connected to the first terminal conductor and first outer connecting conductor, whereas the second inner connecting conductor is electrically insulated from the first inner connecting conductor but is electrically connected to the second terminal conductor and second outer connecting conductor; wherein the first and second inner connecting conductors are laminated in the multilayer body such that the multilayer body includes at least one set of the first and second inner electrodes neighboring each other with the dielectric layer in between; and wherein an equivalent series resistance is set to a desirable value by adjusting the number of first inner connecting conductors and the number of second inner connecting conductors respectively.

By adjusting the number of first inner connecting conductors and the number of second inner connecting conductors, the multilayer capacitor in accordance with this aspect of the present invention sets the equivalent series resistance to a desirable value, and thus can control the equivalent series resistance easily with a high precision. The outer conductors of the multilayer capacitor are formed on one or both of two side faces of the multilayer body, i.e., the first and second side faces opposing each other. Therefore, the outer conductors can be formed easily.

In another aspect, the present invention provides a multilayer capacitor comprising a multilayer body in which a plurality of dielectric layers and a plurality of inner electrodes are alternately laminated, and a plurality of outer conductors formed on the multilayer body; wherein the plurality of inner electrodes include a plurality of first inner electrodes and a plurality of second inner electrodes alternately arranged; wherein the plurality of outer conductors include a first terminal conductor, a second terminal conductor, a first outer connecting conductor electrically connected to the plurality of first inner electrodes, and a second outer connecting conductor electrically connected to the plurality of second inner electrodes; wherein the first terminal conductor is formed on a first side face of the multilayer body; wherein the second terminal conductor is formed on the first side face of the multilayer body or a second side face thereof opposing the first side face; wherein the first outer connecting conductor is formed on the first or second side face of the multilayer body; wherein the second outer connecting conductor is formed on the first or second side face of the multilayer body; wherein each of the first inner electrodes is electrically connected to the first outer connecting conductor through a lead conductor; wherein each of the second inner electrodes is electrically connected to the second outer connecting conductor through a lead conductor; wherein at least one first inner connecting conductor and at least one second inner connecting conductor are laminated in the multilayer body; wherein the first inner connecting conductor is electrically connected to the first terminal conductor and first outer connecting conductor, whereas the second inner connecting conductor is electrically insulated from the first inner connecting conductor but is electrically connected to the second terminal conductor and second outer connecting conductor; wherein the first and second inner connecting conductors are laminated in the multilayer body such that the multilayer body includes at least one set of the first and second inner electrodes neighboring each other with the dielectric layer in between; and wherein an equivalent series resistance is set to a desirable value by adjusting a position of the first inner connecting conductor in the multilayer body in the laminating direction and a position of the second inner connecting conductor in the multilayer body in the laminating direction respectively.

By adjusting the position and shape of the first inner connecting conductor in the multilayer body in the laminating direction and the position of the second inner connecting conductor in the multilayer body in the laminating direction, the multilayer capacitor in accordance with this aspect of the present invention sets the equivalent series resistance to a desirable value, and thus can control the equivalent series resistance easily with a high precision. The outer conductors of the multilayer capacitor are formed on one or both of two side faces of the multilayer body, i.e., the first and second side faces opposing each other. Therefore, the outer conductors can be formed easily.

Preferably, the first inner connecting conductor includes a region opposing the second inner electrode with the dielectric layer in between. In this case, the first inner connecting conductor also contributes to forming a capacity component, thus making it possible to further increase the capacity of the multilayer capacitor.

Preferably, the second inner connecting conductor includes a region opposing the first inner electrode with the dielectric layer in between. In this case, the second inner connecting conductor also contributes to forming a capacity component, thus making it possible to further increase the capacity of the multilayer capacitor.

Preferably, the first terminal conductor and the first outer connecting conductor are formed adjacent to each other on the same side face of the multilayer body. When this multilayer capacitor is mounted on a substrate or the like such that the first terminal conductor is directly connected to a land pattern while the first outer connecting conductor is kept from being directly connected to a land pattern, a magnetic field caused by a current flowing between the first terminal conductor and the first inner connecting conductor and a magnetic field caused by a current flowing between the first outer connecting conductor and the first inner electrode and first inner connecting conductor cancel each other out. As a result, this multilayer capacitor lowers its equivalent series inductance.

Preferably, the second terminal conductor and the second outer connecting conductor are formed adjacent to each other on the same side face of the multilayer body. When this multilayer capacitor is mounted on a substrate or the like such that the second terminal conductor is directly connected to a land pattern while the second outer connecting conductor is kept from being directly connected to a land pattern, a magnetic field caused by a current flowing between the second terminal conductor and the second inner connecting conductor and a magnetic field caused by a current flowing between the second outer connecting conductor and the second inner electrode and second inner connecting conductor cancel each other out. As a result, this multilayer capacitor lowers its equivalent series inductance.

It will be preferred if a plurality of first terminal conductors and a plurality of first outer connecting conductors are provided by the same number; a plurality of second terminal conductors and a plurality of second outer connecting conductors are provided by the same number; the plurality of first terminal conductors and the plurality of first outer connecting conductors are formed on the first side face of the multilayer body; the plurality of second terminal conductors and the plurality of second outer connecting conductors are formed on the second side face of the multilayer body; at least one of both neighboring sides of each first terminal conductor on the first side face is formed with the first outer connecting conductor; at least one of both neighboring sides of each first outer connecting conductor on the first side face is formed with the first terminal conductor; at least one of both neighboring sides of each second terminal conductor on the second side face is formed with the second outer connecting conductor; and at least one of both neighboring sides of each second outer connecting conductor on the second side face is formed with the second terminal conductor.

When the terminal conductors and outer connecting conductors are thus arranged, a remarkable canceling effect is obtained in a magnetic field caused by a current flowing between the terminal conductor and the inner connecting conductor and a magnetic field caused by a current flowing between the outer connecting conductor and the inner electrode and inner connecting conductor. As a result, this multilayer capacitor remarkably lowers its equivalent series inductance.

It will be preferred if at least one each of the first terminal conductor, second terminal conductor, first outer connecting conductor, and second outer connecting conductor are provided; the first terminal conductor or second terminal conductor is located at a position axisymmetrical to the first terminal conductor about a center axis of the multilayer body passing respective center points of two side faces of the multilayer body orthogonal to the laminating direction of the multilayer body; the first outer connecting conductor or second outer connecting conductor is located at a position axisymmetrical to the first outer connecting conductor about the center axis of the multilayer body; the first terminal conductor or second terminal conductor is located at a position axisymmetrical to the second terminal conductor about the center axis of the multilayer body; the first outer connecting conductor or second outer connecting conductor is located at a position axisymmetrical to the second outer connecting conductor about the center axis of the multilayer body; the first terminal conductor or second terminal conductor is located at a position opposing the first terminal conductor in a direction along which the first and second side faces of the multilayer body oppose each other; the first outer connecting conductor or second outer connecting conductor is located at a position opposing the first outer connecting conductor in the opposing direction of the first and second side faces of the multilayer body; the first terminal conductor or second terminal conductor is located at a position opposing the second terminal conductor in the opposing direction of the first and second side faces of the multilayer body; and the first outer connecting conductor or second outer connecting conductor is located at a position opposing the second outer connecting conductor in the opposing direction of the first and second side faces of the multilayer body. Thus arranging and forming the terminal conductors and outer connecting conductors makes it easier to mount the multilayer capacitor to a substrate or the like.

The present invention can provide a multilayer capacitor which can regulate the equivalent series resistance easily with a high precision.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments of the present invention will be explained in detail with reference to the accompanying drawings. In the explanation, constituents identical to each other or those having functions identical to each other will be referred to with numerals identical to each other without repeating their overlapping descriptions. Words "left" and "right" used in the explanation conform to the lateral direction in each drawing.

First Embodiment

Figure 1:
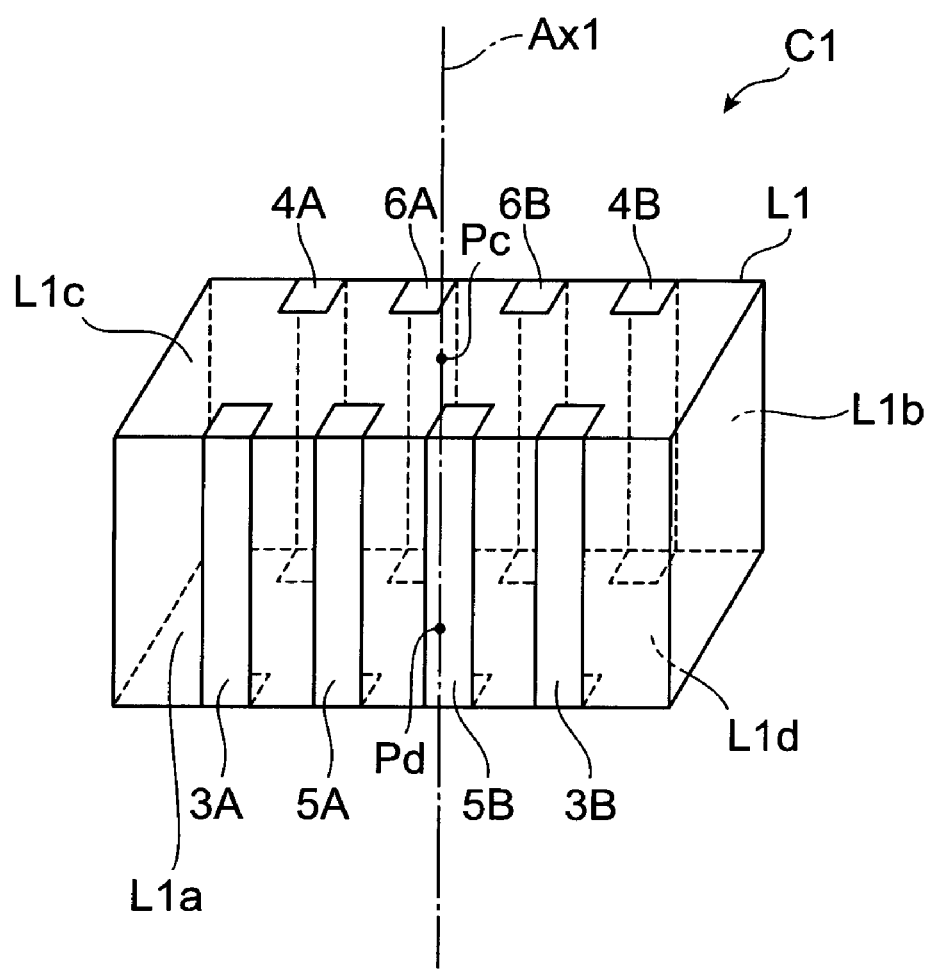
FIG. 1 is a perspective view of the multiplexer capacitor in accordance with a first embodiment.
Figure 2:
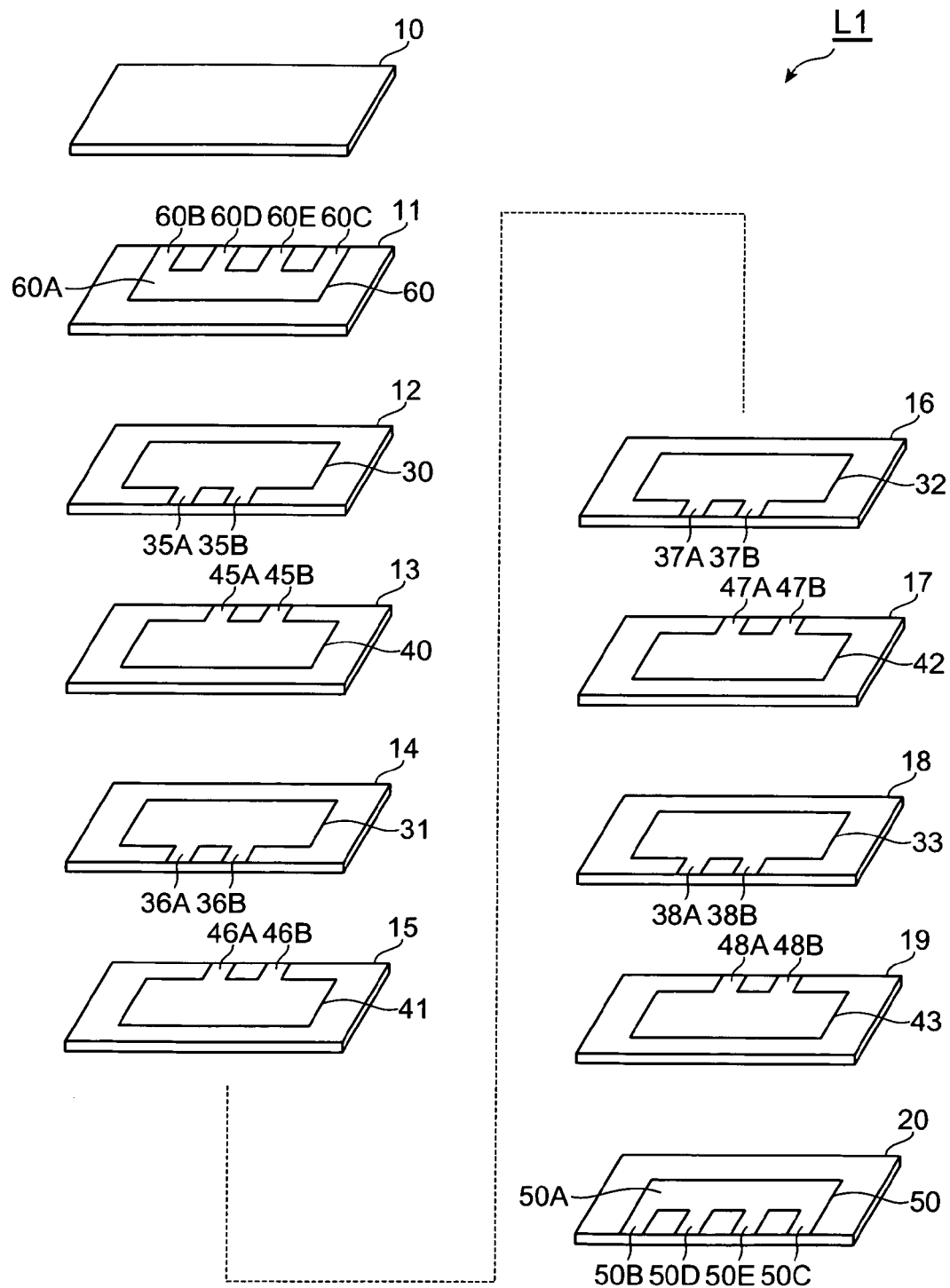
FIG. 2 is an exploded perspective view of the multilayer body included in the multilayer capacitor in accordance with the first embodiment.

With reference to FIGS. 1 and 2, the structure of the multilayer capacitor C1 in accordance with a first embodiment will be explained. FIG. 1 is a perspective view showing the multilayer capacitor in accordance with the first embodiment. FIG. 2 is an exploded perspective view of the multilayer body included in the multilayer capacitor in accordance with the first embodiment.

As shown in FIG. 1, the multilayer capacitor C1 comprises a multilayer body L1 having a substantially rectangular parallelepiped form and a plurality of outer conductors formed on side faces of the multilayer body L1. The plurality of outer conductors include a plurality of (2 in this embodiment) first terminal conductors 3A, 3B, a plurality of (2 in this embodiment) second terminal conductors 4A, 4B, a plurality of (2 in this embodiment) first outer connecting conductors 5A, 5B, and a plurality of (2 in this embodiment) outer connecting conductors 6A, 6B. The plurality of outer conductors are formed so as to be electrically insulated from each other on the surface of the multilayer body L1.

Thus, a plurality of the first terminal conductors 3A, 3B and a plurality of the first outer connecting conductors 5A, 5B are provided by the same number (2 each in this embodiment). Also, a plurality of the second terminal conductors 4A, 4B and a plurality of the second outer connecting conductors 6A, 6B are provided by the same number (2 each in this embodiment).

Each of the first terminal conductors 3A, 3B and first outer connecting conductors 5A, 5B is positioned on a first side face L1*a* in side faces parallel to the laminating direction of the multilayer body L1 which will be explained later, i.e., the first side face L1*a* that is a side face extending along the longitudinal axis of side faces L1*c*, L1*d* orthogonal to the laminating direction of the multilayer body L1. The first terminal conductors 3A, 3B and first outer connecting conductors 5A, 5B are formed such that the first terminal conductor 3A, first outer connecting conductor 5A, first outer connecting conductor 5B, first terminal conductor 3B are successively arranged from the left side to right side of FIG. 1.

Therefore, the first, outer connecting conductor 5A is formed on one (right side in FIG. 1) of both neighboring sides of the first terminal conductor 3A on the first side face L1*a*. The first terminal conductor 3A is formed on one (left side in FIG. 1) of both neighboring sides of the first outer connecting conductor 5A on the first side face L1*a*. Thus, the first terminal conductor 3A and first outer connecting conductor 5A are formed adjacent to each other on the first side face L1*a* that is the same side face of the multilayer body L1.

The first outer connecting conductor 5B is formed on one (left side in FIG. 1) of both neighboring sides of the first terminal conductor 3B on the first side face L1*a*. The first terminal conductor 3B is formed on one (right side in FIG. 1) of both neighboring sides of the first outer connecting conductor 5B on the first side face L1*a*. Thus, the first terminal conductor 3B and first outer connecting conductor 5B are formed adjacent to each other on the first side face L1*a* that is the same side face of the multilayer body L1.

Each of the second terminal conductors 4A, 4B and second outer connecting conductors 6A, 6B is positioned on a second side face L1*b* in side faces parallel to the laminating direction of the multilayer body L1 which will be explained later, i.e., the second side face L1*b* that is a side face extending along the longitudinal axis of side faces L1*c*, L1*d* orthogonal to the laminating direction of the multilayer body L1 while opposing the first side face L1*a*. The second terminal conductors 4A, 4B and second outer connecting conductors 6A, 6B are formed such that the second terminal conductor 4A, second outer connecting conductor 6A, second outer connecting conductor 6B, second terminal conductor 4B are successively arranged from the left side to right side of FIG. 1.

Therefore, the second outer connecting conductor 6A is formed on one (right side in FIG. 1) of both neighboring sides of the second terminal conductor 4A on the second side face L1*b*. The second terminal conductor 4A is formed on one (left side in FIG. 1) of both neighboring sides of the second outer connecting conductor 6A on the second side face L1*b*. Thus, the second terminal conductor 4A and second outer connecting conductor 6A are formed adjacent to each other on the second side face L1*b* that is the same side face of the multilayer body L1.

The second outer connecting conductor 6B is formed on one (left side in FIG. 1) of both neighboring sides of the second terminal conductor 4B on the second side face L1*b*. The second terminal conductor 4B is formed on one (right side in FIG. 1) of both neighboring sides of the second outer connecting conductor 6B on the second side face L1b. Thus, the second terminal conductor 4B and second outer connecting conductor 6B are formed adjacent to each other on the second side face L1b that is the same side face of the multilayer body L1.

The second terminal conductor 4B is located at a position axisymmetrical to the first terminal conductor 3A about a center axis Ax1 passing respective center points Pc, Pd of the two side faces L1c, L1d orthogonal to the laminating direction of the multilayer body L1 among center axes of the multilayer body L1. The second terminal conductor 4A is located at a position axisymmetrical to the first terminal conductor 3B about the center axis Ax1 of the multilayer body L1. On the other hand, the first terminal conductor 3A is located at a position axisymmetrical to the second terminal conductor 4B about the center axis Ax1 of the multilayer body L1. The first terminal conductor 3B is located at a position axisymmetrical to the second terminal conductor 4A about the center axis Ax1 of the multilayer body L1.

The second outer connecting conductor 6B is located at a position axisymmetrical to the first outer connecting conductor 5A about the center axis Ax1 of the multilayer body L1. The second outer connecting conductor 6A is located at a position axisymmetrical to the first outer connecting conductor 5B about the center axis Ax1 of the multilayer body L1. On the other hand, the first outer connecting conductor 5A is located at a position axisymmetrical to the second outer connecting conductor 6B about the center axis Ax1 of the multilayer body L1. The first outer connecting conductor 5B is located at a position axisymmetrical to the second outer connecting conductor 6A about the center axis Ax1 of the multilayer body L1.

The second terminal conductor 4A is located at a position opposing the first terminal conductor 3A in a direction along which the first side face L1a and second side face L1b of the multilayer body L1 oppose each other. The second terminal conductor 4B is located at a position opposing the first terminal conductor 3B in the opposing direction of the first side face L1a and second side face L1b of the multilayer body L1. On the other hand, the first terminal conductor 3A is located at a position opposing the second terminal conductor 4A in the opposing direction of the first side face L1a and second side face L1b of the multilayer body L1. The first terminal conductor 3B is located at a position opposing the second terminal conductor 4B in the opposing direction of the first side face L1a and second side-face L1b of the multilayer body L1.

The second outer connecting conductor 6A is located at a position opposing the first outer connecting conductor 5A in the opposing direction of the first side face L1a and second side face L1b of the multilayer body L1. The second outer connecting conductor 6B is located at a position opposing the first outer connecting conductor 5B in the opposing direction of the first side face L1a and second side face L1b of the multilayer body L1. On the other hand, the first outer connecting conductor 5A is located at a position opposing the second outer connecting conductor 6A in the opposing direction of the first side face L1a and second side face L1b of the multilayer body L1. The first outer connecting conductor 5B is located at a position opposing the second outer connecting conductor 6B in the opposing direction of the first side face L1a and second side face L1b of the multilayer body L1.

As shown in FIG. 2, the multilayer body L1 is constructed by alternately laminating a plurality of (11 in this embodiment) dielectric layers 10 to 20 and a plurality of (4 each in this embodiment) of first and second inner electrodes 30 to 33, 40 to 43. In the actual multilayer capacitor C1, they are integrated to such an extent that no boundaries are discernible between the dielectric layers 10 to 20.

Further, one first inner connecting conductor 50 and one second inner connecting conductor 60 are laminated in the multilayer body L1. In the multilayer body L1, the plurality of first inner electrodes 30 to 33 and the plurality of second inner electrodes 40 to 43 are arranged between the first inner connecting conductor 50, which is a part of the two layers of inner connecting conductors 50, 60, and the second inner connecting conductor 60, which is the remainder.

Each of the first inner electrodes 30 to 33 has a substantially rectangular form. The plurality of first inner electrodes 30 to 33 are formed at respective positions separated by a predetermined distance from a side face parallel to the laminating direction of the dielectric layers 10 to 20 (hereinafter simply referred to as "laminating direction") in the multilayer body L1. The first inner electrodes 30 to 33 are formed with their corresponding lead conductors 35A to 38A, 35B to 38B taken out therefrom so as to extend to the first side face L1a of the multilayer body L1.

Each of the lead conductors 35A and 35B is integrally formed with the first inner electrode 30 so as to extend therefrom and reach the first side face L1a of the multilayer body L1. Each of the lead conductors 36A and 36B is integrally formed with the first inner electrode 31 so as to extend therefrom and reach the first side face L1a of the multilayer body L1. Each of the lead conductors 37A and 37B is integrally formed with the first inner electrode 32 so as to extend therefrom and reach the first side face L1a of the multilayer body L1. Each of the lead conductors 38A and 38B is integrally formed with the first inner electrode 33 so as to extend therefrom and reach the first side face L1a of the multilayer body L1.

The first inner electrode 30 is electrically connected to the first outer connecting conductors 5A and 5B through the lead conductors 35A and 35B, respectively. The first inner electrode 31 is electrically connected to the first outer connecting conductors 5A and 5B through the lead conductors 36A and 36B, respectively. The first inner electrode 32 is electrically connected to the first outer connecting conductors 5A and 5B through the lead conductors 37A and 37B, respectively. The first inner electrode 33 is electrically connected to the first outer connecting conductors 5A and 5B through the lead conductors 38A and 38B, respectively. As a consequence, the plurality of first inner electrodes 30 to 33 are electrically connected to each other through the first outer connecting conductors 5A, 5B.

Each of the second inner electrodes 40 to 43 has a substantially rectangular form. The plurality of second inner electrodes 40 to 43 are formed at respective positions separated by a predetermined distance from a side face parallel to the laminating direction of the multilayer body L1. The second inner electrodes 40 to 43 are formed with their corresponding lead conductors 45A to 48A, 45B to 48B taken out therefrom so as to extend to the second side face L1b of the multilayer body L1.

Each of the lead conductors 45A and 45B is integrally formed with the second inner electrode 40 so as to extend therefrom and reach the second side face L1b of the multilayer body L1. Each of the lead conductors 46A and 46B is integrally formed with the second inner electrode 41 so as to extend therefrom and reach the second side face L1b of the multilayer body L1. Each of the lead conductors 47A and 47B is integrally formed with the second inner electrode 42 so as to extend therefrom and reach the second side face L1b of the multilayer body L1. Each of the lead conductors 48A and 48B is integrally formed with the second inner electrode 43 so as to extend therefrom and reach the second side face L1b of the multilayer body L1.

The second inner electrode 40 is electrically connected to the second outer connecting conductors 6A and 6B through the lead conductors 45A and 45B, respectively. The second inner electrode 41 is electrically connected to the second outer connecting conductors 6A and 6B through the lead conductors 46A and 46B, respectively. The second inner electrode 42 is electrically connected to the second outer connecting conductors 6A and 6B through the lead conductors 47A and 47B, respectively. The second inner electrode 43 is electrically connected to the second outer connecting conductors 6A and 6B through the lead conductors 48A and 48B, respectively. As a consequence, the plurality of second inner electrodes 40 to 43 are electrically connected to each other through the first outer connecting conductors 6A, 6B.

The first inner connecting conductor 50 is positioned so as to be held between the dielectric layers 19 and 20. The second inner connecting conductor 60 is positioned so as to be held between the dielectric layers 10 and 11. The first inner connecting conductor 50 and second inner connecting conductor 60 are electrically insulated from each other.

The first inner connecting conductor 50 includes a first conductor portion 50A having an oblong form and second to fifth conductor portions 50B to 50E extending from the first conductor portion 50A so as to be taken out to the first side face L1a of the multilayer body L1. The first conductor portion 50A is arranged such that its longitudinal axis is parallel to the first and second side faces L1a, L1b of the multilayer body L1. These multiple inner connecting conductors are imperative to form the resistive path to elevate the ESR and are not a means to alter the device's ESL.

The second to fifth conductor portions 50B to 50E of the first inner connecting conductor 50 are positioned such that the second conductor portion 50B, fourth conductor portion 50D, fifth conductor portion 50E, and third conductor portion 50C are arranged successively from the left side to right side in FIG. 2. The second conductor portion 50B is electrically connected to the first terminal conductor 3A. The third conductor portion 50C is electrically connected to the first terminal conductor 3B. The fourth conductor portion 50D is electrically connected to the first outer connecting conductor 5A. The fifth conductor portion 50E is electrically connected to the first outer connecting conductor 5B. Therefore, the first inner connecting conductor 50 is electrically connected to the first terminal conductors 3A, 3B and first outer connecting conductor 5A, 5B.

The second inner connecting conductor 60 includes a first conductor portion 60A having an oblong form and second to fifth conductor portions 60B to 60E extending from the first conductor portion 60A so as to be taken out to the second side face L1b of the multilayer body L1. The first conductor portion 60A is arranged such that its longitudinal axis is parallel to the first and second side faces L1a, L1b of the multilayer body L1.

The second to fifth conductor portions 60B to 60E of the second inner connecting conductor 60 are positioned such that the second conductor portion 60B, fourth conductor portion 60D, fifth conductor portion 60E, and third conductor portion 60C are arranged successively from the left side to right side in FIG. 2. The second conductor portion 60B is electrically connected to the second terminal conductor 4A. The third conductor portion 60C is electrically connected to the second terminal conductor 4B. The fourth conductor portion 60D is electrically connected to the second outer connecting conductor 6A. The fifth conductor portion 60E is electrically connected to the second outer connecting conductor 6B. Therefore, the second inner connecting conductor 60 is electrically connected to the second terminal conductors 4A, 4B and second outer connecting conductor 6A, 6B.

The first conductor portion 50A of the first inner connecting conductor 50 is a region opposing the second inner electrode 43 with the dielectric layer 19 in between. The first conductor portion 60A of the second inner connecting conductor 60 is a region opposing the first inner electrode 30 with the dielectric layer 11 in between.

The first and second inner connecting conductors 50, 60 are laminated in the multilayer body L1 such that the multilayer body L1 includes at least one set (4 sets in this embodiment) of first and second inner electrodes neighboring each other with the dielectric layer in between. Specifically, the first and second inner connecting conductors 50, 60 are laminated in the multilayer body L1 such that the multilayer body L1 includes the first inner electrode 30 and second inner electrode 40 neighboring each other b with the dielectric layer 12 in between, for example. Namely, in the multilayer body L1, both of the first and second inner connecting conductors 50, 60 are arranged on the outside of the one set of first and second inner electrodes 30, 40 in the laminating direction of the multilayer body L1.

Figure 3:
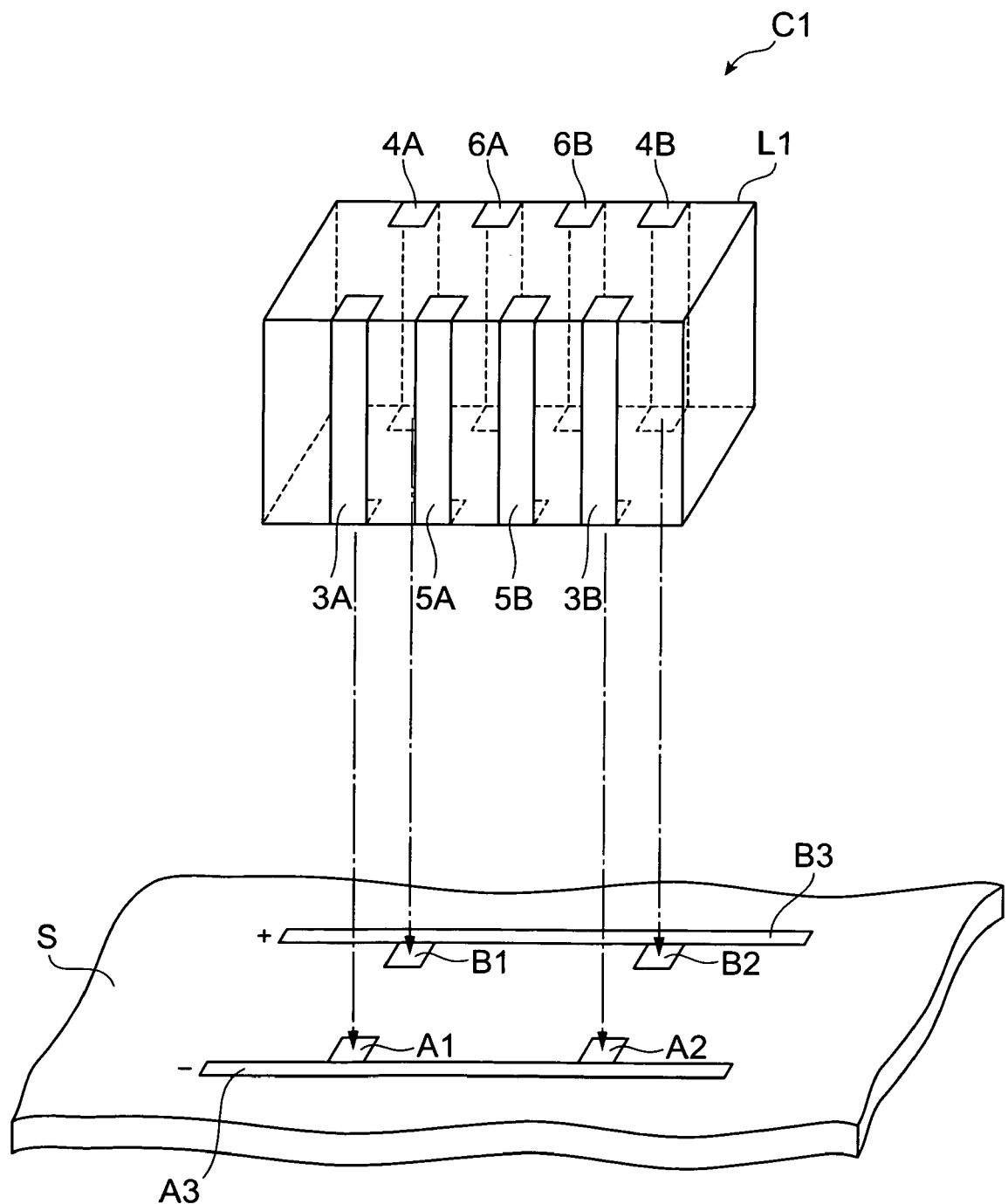
FIG. 3 is a view for explaining a state where the multilayer capacitor in accordance with the first embodiment is mounted to a substrate.

A case where the multilayer capacitor C1 is mounted to a substrate S will be shown by way of an example. FIG. 3 is a view for explaining a state where the multilayer capacitor is mounted to the substrate. FIG. 3 shows a state where the first terminal conductor 3A, first terminal conductor 3B, second terminal conductor 5A, and second terminal conductor 5B are connected to a cathode land pattern A1, a cathode land pattern A2, an anode land pattern B1, and an anode land pattern B2 which are formed on the substrate S, respectively. FIG. 3 also shows a state where the cathode land patterns A1, A2 are connected to a lead A3 while the anode land patterns B1, B2 are connected to a lead B3.

In the multilayer capacitor C1, the first terminal conductors 3A, 3B are connected to the first inner electrodes 30 to 33 not directly, but electrically through the first outer connecting conductors 5A, 5B and first inner connecting conductor 50. Also, in the multilayer capacitor C1, the second terminal conductors 4A, 4B are connected to the second inner electrodes 40 to 43 not directly, but electrically through the second outer connecting conductors 6A, 6B and second inner connecting conductor 60. As a result, the multilayer capacitor C1 yields an equivalent series resistance greater than that of the conventional multilayer capacitor in which all the inner electrodes are connected to their corresponding terminal conductors through lead conductors.

By adjusting the number of first and second inner connecting conductors 50, 60 directly connected to the first terminal conductors 3A, 3B and second terminal conductors 4A, 4B in such a manner, this embodiment sets the equivalent series resistance of the multilayer capacitor C1 to a desirable value, and thus can regulate the equivalent series resistance easily with a high precision. Also, since the equivalent series resistance is controlled by the first and second inner connecting conductors, the multilayer capacitor C1 can regulate the equivalent series resistance while setting its capacitance to a desirable value (e.g., a larger value).

Each of the first terminal conductors 3A, 3B and first outer connecting conductors 5A, 5B which are outer conductors of the multilayer capacitor C1 is formed on the first side face L1a of the multilayer body L1. Each of the second terminal conductors 4A, 4B and second outer connecting conductors 6A, 6B which are outer conductors of the multilayer capacitor C1 is formed on the second side face L1*b* opposing the first side face L1*a* of the multilayer body L1. Thus, all the outer conductors (first terminal conductors 3A, 3B, second terminal conductors 4A, 4B, first outer connecting conductors 5A, 5B, and second outer connecting conductors 6A, 6B) in the multilayer capacitor C1 are formed on the two side faces L1*a*, L1*b* of the multilayer body L1 opposing each other. Therefore, as compared with the case where outer conductors are formed on three or more side faces (e.g., four side faces) of a multilayer body, the multilayer capacitor C1 can reduce steps required for forming the outer conductors. As a consequence, the multilayer capacitor C1 can be made easily.

The first inner connecting conductor 50 has the first conductor portion 50A that is a region opposing the second inner electrode 43 with the dielectric layer 19 in between. Therefore, the first inner connecting conductor 50 can also contribute to forming the capacity component of the multilayer capacitor C1. As a consequence, the multilayer capacitor C1 can further increase its capacitance.

The second inner connecting conductor 60 has the first conductor portion 60A that is a region opposing the first inner electrode 30 with the dielectric layer 11 in between. Therefore, the second inner connecting conductor 60 can also contribute to forming the capacity component of the multilayer capacitor C1. As a consequence, the multilayer capacitor C1 can further increase its capacitance.

In the multilayer body L1 of the multilayer capacitor C1, a plurality of first inner electrodes 30 to 33 and a plurality of second inner electrodes 40 to 43 are arranged between a part of the inner connecting conductors 50, 60 (first inner connecting conductor 50) and the rest (second inner connecting conductor 60). Therefore, the multilayer capacitor C1 can set the equivalent series resistance with a favorable balance.

On the first side face L1*a* of the multilayer body L1 in the multilayer capacitor C1, the first terminal conductor 3A and first outer connecting conductor 5A are formed adjacent to each other, and the first terminal conductor 3B and first outer connecting conductor 5B are formed adjacent to each other. Therefore, the following effects are obtained when the multilayer capacitor C1 is mounted on a substrate or the like such that the first terminal conductors 3A, 3B are directly connected to land patterns whereas the first outer connecting conductors 5A, 5B are kept from being directly connected to land patterns as shown in FIG. 3. Namely, a magnetic field caused by a current flowing between the first terminal conductors 3A, 3B and the first inner connecting conductor 50 (the second and third conductor portions 50B, 50C in the first inner connecting conductor 50) and a magnetic field caused by a current flowing between the first outer connecting conductors 5A, 5B and the first inner electrodes 30 to 33 (the lead conductors 35A to 38A, 35B to 38B) and a current flowing between the first outer connecting conductors 5A, 5B and the first inner connecting conductor 50 (the fourth and fifth conductor portions 50D, 50E in the first inner connecting conductor 50) cancel each other out. As a result, the multilayer capacitor C1 can reduce its equivalent series inductance. When there is at least one pair of first terminal conductor and first outer connecting conductor adjacent to each other, the equivalent series inductance can be reduced.

On the second side face L1*b* of the multilayer body L1 in the multilayer capacitor C1, the second terminal conductor 4A and second outer connecting conductor 6A are formed adjacent to each other, and the second terminal conductor 4B and second outer connecting conductor 6B are formed adjacent to each other. Therefore, the following effects are obtained when the multilayer capacitor C1 is mounted on a substrate or the like such that the second terminal conductors 4A, 4B are directly connected to land patterns whereas the second outer connecting conductors 6A, 6B are kept from being directly connected to land patterns as shown in FIG. 3. Namely, a magnetic field caused by a current flowing between the second terminal conductors 4A, 4B and the second inner connecting conductor 60 (the second and third conductor portions 60B, 60C in the second inner connecting conductor 60) and a magnetic field caused by a current flowing between the second outer connecting conductors 6A, 6B and the second inner electrodes 40 to 43 (the lead conductors 45A to 48A, 45B to 48B) and a current flowing between the second outer connecting conductors 6A, 6B and the second inner connecting conductor 60 (the fourth and fifth conductor portions 60D, 60E in the second inner connecting conductor 60) cancel each other out. As a result, the multilayer capacitor C1 can reduce its equivalent series inductance. When there is at least one pair of second terminal conductor and second outer connecting conductor adjacent to each other, the equivalent series inductance can be reduced.

The first terminal conductors 3A, 3B and first outer connecting conductors 5A, 5B are formed by the same number (2 each) on the first side face L1*a* of the multilayer body L1. Further, on the first side face L1*a* of the multilayer body L1, the first outer connecting conductors 5A and 5B are formed adjacent to the first terminal conductors 3A and 3B, respectively, whereas the first terminal conductors 3A and 3B are formed adjacent to the first outer connecting conductors 5A and 5B, respectively. Therefore, a remarkable canceling effect is obtained in a magnetic field caused by a current flowing between the first terminal conductors 3A, 3B and the first inner connecting conductor 50 and a magnetic field caused by a current flowing between the first outer connecting conductors 5A, 5B and the first inner electrodes 30 to 33 and a current flowing between the first outer connecting conductors 5A, 5B and the first inner connecting conductor 50.

On the other hand, the second terminal conductors 4A, 4B and second outer connecting conductors 6A, 6B are formed by the same number (2 each) on the second side face L1*b* of the multilayer body L1. Further, on the second side face L1*b* of the multilayer body L1, the second outer connecting conductors 6A and 6B are formed adjacent to the second terminal conductors 4A and 4B, respectively, whereas the second terminal conductors 4A and 4B are formed adjacent to the second outer connecting conductors 6A and 6B, respectively. Therefore, a remarkable canceling effect is obtained in a magnetic field caused by a current flowing between the second terminal conductors 4A, 4B and the second inner connecting conductor 60 and a magnetic field caused by a current flowing between the second outer connecting conductors 6A, 6B and the second inner electrodes 40 to 43 and a current flowing between the second outer connecting conductors 6A, 6B and the second inner connecting conductor 60.

As a result, the multilayer capacitor C1 can reduce its equivalent series inductance further remarkably.

In the multilayer capacitor C1, about the center axis Ax1 of the multilayer body L1, the first terminal conductors 3A and 3B are formed at positions axisymmetrical to the second terminal conductors 4A and 4B, respectively, and the first outer connecting conductors 5A and 5B are formed at positions axisymmetrical to the second outer connecting conductors 6A and 6B, respectively. Therefore, even when the multilayer capacitor C1 is rotated by 180 degrees about the center axis Ax1 on the substrate or the like, the state of connection of the land patterns to the terminal conductors and outer connecting conductors is unchanged. Namely, even when the multilayer capacitor C1 is mounted after being rotated by 180 degrees about the center axis Ax1 of the multilayer body L1 from the state where the multilayer capacitor C1 is mounted as shown in FIG. 3, the first terminal conductor 3A, first terminal conductor 3B, second terminal conductor 4A, and second terminal conductor 4B are connected to the land patterns B2, B1, A2, and A1, respectively, so that the outer connecting conductors are kept from being directly connected to the land patterns.

In the multilayer capacitor C1, the first terminal conductor 3A, first terminal conductor 3B, first outer connecting conductor 5A, and first outer connecting conductor 5B oppose the second terminal conductor 4A, second terminal conductor 4B, second outer connecting conductor 6A, and second outer connecting conductor 6B, respectively, in the opposing direction of the first side face L1a and second side face L1b of the multilayer body L1. Therefore, even when the multilayer capacitor C1 is reversed such that it is mounted to a substrate or the like by a side face opposite from the original surface, the relationship of connection of the land patterns to the terminal conductors and outer connecting conductors is unchanged. Namely, even when the multilayer capacitor C1 is reversed about an axis parallel to the side faces L1a to L1d from the state mounted as shown in FIG. 3, the first terminal conductor 3A, first terminal conductor 3B, second terminal conductor 4A, and second terminal conductor 4B are connected to the land patterns B1, B2, A1, and A2, respectively, so that the outer connecting conductors are kept from being directly connected to the land patterns.

Further, even when the multilayer capacitor C1 is reversed about an axis orthogonal to the side faces L1a, L1b from the state mounted as shown in FIG. 3, the first terminal conductor 3A, first terminal conductor 3B, second terminal conductor 4A, and second terminal conductor 4B are connected to the land patterns A2, A1, B2, and B1, respectively, so that the outer connecting conductors are kept from being directly connected to the land patterns.

Since the terminal conductors 3A, 3B, 4A, 4B and outer connecting conductors 5A, 5B, 6A, 6B are arranged as mentioned above, the multilayer capacitor C1 can be mounted in conformity to various mounting directions. Therefore, the multilayer capacitor C1 can be mounted easily.

Second Embodiment

Figure 4:
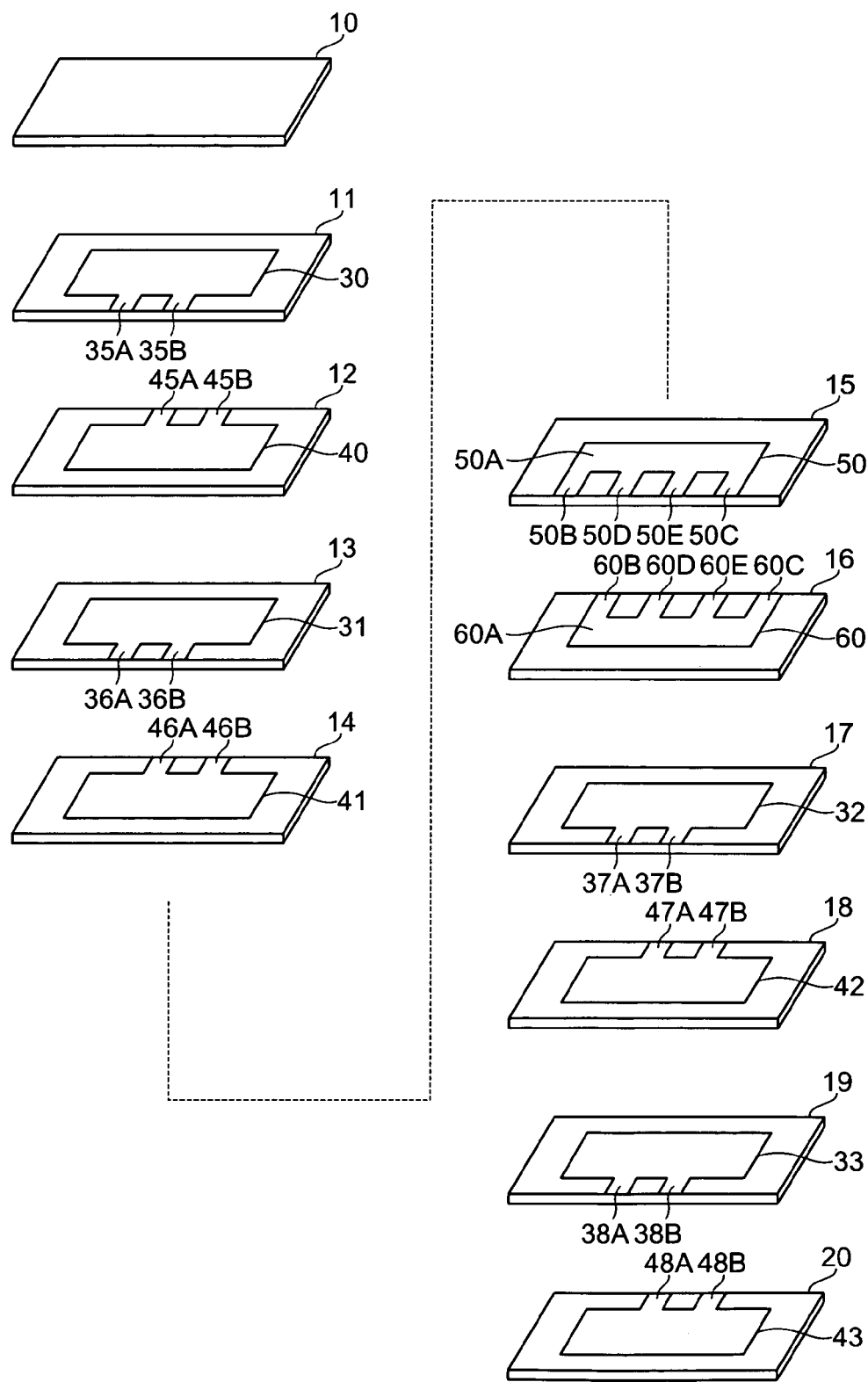
FIG. 4 is an exploded perspective view of the multilayer body included in the multilayer capacitor in accordance with a second embodiment.

With reference to FIG. 4, the configuration of the multilayer capacitor in accordance with a second embodiment will be explained. The multilayer capacitor in accordance with the second embodiment differs from the multilayer capacitor C1 in accordance with the first embodiment in terms of positions of the inner connecting conductors 50, 60 in the laminating direction. FIG. 4 is an exploded perspective view of the multilayer body included in the multilayer capacitor in accordance with the second embodiment.

As with the multilayer capacitor C1, the multilayer capacitor in accordance with the second embodiment comprises a multilayer body, first terminal conductors 3A, 3B formed on the multilayer body, second terminal conductors 4A, 4B similarly formed on the multilayer body, first outer connecting conductors 5A, 5B similarly formed on the multilayer body, and second outer connecting conductors 6A, 6B similarly formed on the multilayer body, though they are not depicted.

In the multilayer capacitor in accordance with the second embodiment, the first and second inner connecting conductors 50, 60, provided one by one, are laminated between two layers each of first and second inner electrodes 30, 31, 40, 41 and two layers each of first and second inner electrodes 32, 33, 42, 43 as shown in FIG. 4. More specifically, the first inner connecting conductor 50 is positioned so as to be held between dielectric layers 14 and 15. The second inner connecting conductor 60 is positioned so as to be held between dielectric layers 15 and 16.

In the multilayer capacitor in accordance with the second embodiment, the first and second inner connecting conductors 50, 60 are laminated in the multilayer body such that the multilayer body includes at least one set (4 sets in this embodiment) of first and second inner electrodes neighboring each other with the dielectric layer in between. Specifically, the first and second inner connecting conductors 50, 60 are laminated in the multilayer body such that the multilayer body includes the first inner electrode 30 and second inner electrode 40 neighboring each other with the dielectric layer 11 in between, for example.

In the multilayer capacitor in accordance with the second embodiment, the first terminal conductors 3A, 3B are connected to the first inner electrodes 30 to 33 not directly, but electrically through the first outer connecting conductors 5A, 5B and first inner connecting conductor 50. Also, in the multilayer capacitor in accordance with the second embodiment, the second terminal conductors 4A, 4B are connected to the second inner electrodes 40 to 43 not directly, but electrically through the second outer connecting conductors 6A, 6B and second inner connecting conductor 60. As a consequence, the multilayer capacitor in accordance with the second embodiment yields an equivalent series resistance greater than that of the conventional multilayer capacitor in which all the inner electrodes are connected to their corresponding terminal conductors through lead conductors.

Meanwhile, when the first terminal conductors 3A, 3B are concerned, the multilayer capacitor in accordance with the second embodiment differs from the multilayer capacitor C1 in accordance with the first embodiment in terms of how the respective resistance components of the first outer connecting conductors 5A, 5B are connected to the first terminal conductors 3A, 3B. In the multilayer capacitor C1 in accordance with the first embodiment, the respective resistance components of the first outer connecting conductors 5A, 5B are connected in series to the first inner connecting conductor 50, so as to be connected to the first terminal conductors 3A, 3B. In the multilayer capacitor in accordance with the second embodiment, on the other hand, each of the resistance components of the first outer connecting conductors 5A, 5B is split at the first inner connecting conductor 50 as a boundary, and the resulting resistance components are connected in parallel to their corresponding first terminal conductors 3A, 3B.

When the second terminal conductors 4A, 4B are concerned, the multilayer capacitor in accordance with the second embodiment differs from the multilayer capacitor C1 in accordance with the first embodiment in terms of how the respective resistance components of the second outer connecting conductors 6A, 6B are connected to the second terminal conductors 4A, 4B. In the multilayer capacitor C1 in accordance with the first embodiment, the respective resistance components of the second outer connecting conductors 6A, 6B are connected in series to the second inner connecting conductor 60, so as to be connected to the second terminal conductors 4A, 4B. In the multilayer capacitor in accordance with the second embodiment, on the other hand, each of the resistance components of the second outer connecting conductors 6A, 6B is split at the second inner connecting conductor 60 as a boundary, and the resulting resistance components are connected in parallel to their corresponding second terminal conductors 4A, 4B.

Therefore, because of the difference in resistance components of the first and second outer connecting conductors 5A, 5B, 6A, 6B, the multilayer capacitor in accordance with the second embodiment yields an equivalent series resistance smaller than that of the multilayer capacitor C1 in accordance with the first embodiment.

As in the foregoing, by adjusting the positions of the first inner connecting conductor 50 directly connected to the first terminal conductors 3A, 3B and the second inner connecting conductor 60 directly connected to the second terminal conductors 4A, 4B in the laminating direction, this embodiment sets the equivalent series resistance of the multilayer capacitor to a desirable value, and thus can regulate the equivalent series resistance easily with a high precision. Also, since the equivalent series resistance is controlled by the first and second inner connecting conductors, the multilayer capacitor in accordance with the second embodiment can regulate the equivalent series resistance while setting its capacitance to a desirable value (e.g., a larger value).

All the outer conductors (first and second terminal conductors 3A, 3B, 4A, 4B and first and second outer connecting conductors 5A, 5B, 6A, 6B) in the multilayer capacitor in accordance with the second embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the second embodiment can be made easily.

The first conductor portion 50A of the first inner connecting conductor 50 opposes the second inner electrode 41 with the dielectric layer 14 in between. The first conductor portion 60A of the second inner connecting conductor 60 opposes the first inner electrode 32 with the dielectric layer 16 in between. Therefore, in the multilayer capacitor in accordance with the second embodiment, the first and second inner connecting conductors 50, 60 can also contribute to forming the capacity component, and thus can further increase the capacitance of the multilayer capacitor.

The first terminal conductors 3A, 3B and the first outer connecting conductors 5A, 5B are formed adjacent to each other, respectively, on the first side face of the multilayer body in the multilayer capacitor in accordance with the second embodiment as in the multilayer capacitor C1. Therefore, the multilayer capacitor in accordance with the second embodiment can lower its equivalent series inductance.

The second terminal conductors 4A, 4B and the second outer connecting conductors 6A, 6B are formed adjacent to each other, respectively, on the second side face of the multilayer body in the multilayer capacitor in accordance with the second embodiment as in the multilayer capacitor C1. Therefore, the multilayer capacitor in accordance with the second embodiment can lower its equivalent series inductance.

In the multilayer capacitor in accordance with the second embodiment, the first terminal conductors 3A, 3B and first outer connecting conductors 5A, 5B are arranged by the same number while forming neighboring pairs on the first side face of the multilayer body. Also, in the multilayer capacitor in accordance with the second embodiment, the second terminal conductors 4A, 4B and second outer connecting conductors 6A, 6B are arranged by the same number while forming neighboring pairs on the second side face of the multilayer body. Therefore, the multilayer capacitor in accordance with the second embodiment can lower its equivalent series inductance further greatly.

In the multilayer capacitor in accordance with the second embodiment, about the center axis of the multilayer body, the first terminal conductors 3A, 3B are formed at positions axisymmetrical to the second terminal conductors 4B, 4A, respectively, and the first outer connecting conductors 5A, 5B are formed at positions axisymmetrical to the second outer connecting conductors 6B, 6A, respectively. Also, in the opposing direction of the first and second side faces of the multilayer body in the multilayer capacitor in accordance with the second embodiment, the first terminal conductors 3A, 3B oppose the second terminal conductors 4A, 4B, respectively, and the first outer connecting conductors 5A, 5B oppose the second outer connecting conductors 6A, 6B, respectively. Therefore, the multilayer capacitor in accordance with the second embodiment can be mounted easily.

Third Embodiment

Figure 5:
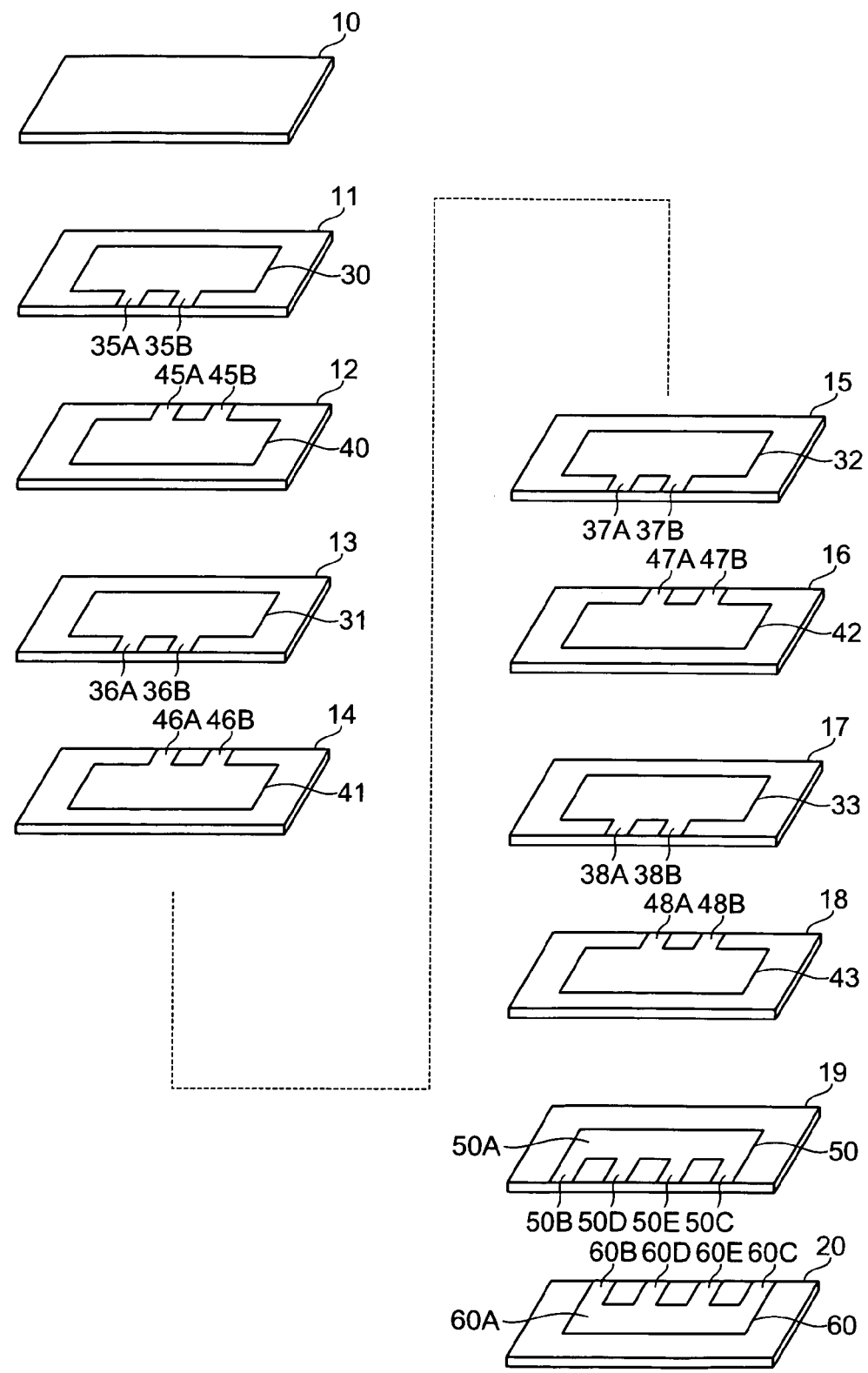
FIG. 5 is an exploded perspective view of the multilayer body included in the multilayer capacitor in accordance with a third embodiment.

The configuration of the multilayer capacitor in accordance with a third embodiment will be explained with reference to FIG. 5. The multilayer capacitor in accordance with the third embodiment differs from the multilayer capacitor C1 in accordance with the first embodiment in terms of positions of the first and second inner connecting conductors 50, 60 in the laminating direction. FIG. 5 is an exploded perspective view of the multilayer body included in the multilayer capacitor in accordance with the third embodiment.

As with the multilayer capacitor C1 in accordance with the first embodiment, the multilayer capacitor in accordance with the third embodiment comprises a multilayer body, first terminal conductors 3A, 3B formed on the multilayer body, second terminal conductors 4A, 4B similarly formed on the multilayer body, first outer connecting conductors 5A, 5B similarly formed on the multilayer body, and second outer connecting conductors 6A, 6B similarly formed on the multilayer body, though they are not depicted.

In the multilayer capacitor in accordance with the third embodiment, the first and second inner connecting conductors 50, 60, provided one by one, are laminated on the outside of a multilayer body of four layers each of first and second inner electrodes 30 to 33, 40 to 43 as shown in FIG. 5. More specifically, the first inner connecting conductor 50 is positioned so as to be held between dielectric layers 18 and 19. The second inner connecting conductor 60 is positioned so as to be held between dielectric layers 19 and 20.

In the multilayer capacitor in accordance with the third embodiment, the first and second inner connecting conductors 50, 60 are laminated in the multilayer body such that the multilayer body includes at least one set (4 sets in this embodiment) of first and second inner electrodes neighboring each other with the dielectric layer in between. Specifically, the first and second inner connecting conductors 50, 60 are laminated in the multilayer body such that the multilayer body includes the first inner electrode 30 and second inner electrode 40 neighboring each other with the dielectric layer 11 in between, for example.

In the multilayer capacitor in accordance with the third embodiment, the first terminal conductors 3A, 3B are connected to the first inner electrodes 30 to 33 not directly, but electrically through the first outer connecting conductors 5A, 5B and first inner connecting conductor 50. Also, in the multilayer capacitor in accordance with the third embodiment, the second terminal conductors 4A, 4B are connected to the second inner electrodes 40 to 43 not directly, but electrically through the second outer connecting conductors 6A, 6B and second inner connecting conductor 60. As a result, the multilayer capacitor in accordance with the third embodiment yields an equivalent series resistance greater than that of the conventional multilayer capacitor in which all the inner electrodes are connected to their corresponding terminal conductors through lead conductors.

Meanwhile, when the first terminal conductors 3A, 3B are concerned, the multilayer capacitor in accordance with the third embodiment differs from the multilayer capacitor C1 in accordance with the first embodiment in terms of how the respective resistance components of the first outer connecting conductors 5A, 5B are connected to the first terminal conductors 3A, 3B. In the multilayer capacitor C1 in accordance with the first embodiment, the respective resistance components of the first outer connecting conductors 5A, 5B are connected in series to the first inner connecting conductor 50, so as to be connected to the first terminal conductors 3A, 3B. In the multilayer capacitor in accordance with the third embodiment, on the other hand, each of the resistance components of the first outer connecting conductors 5A, 5B is split at the first inner connecting conductor 50 as a boundary, and the resulting resistance components are connected in parallel to their corresponding first terminal conductors 3A, 3B.

When the second terminal conductors 4A, 4B are concerned, the multilayer capacitor in accordance with the third embodiment differs from the multilayer capacitor C1 in accordance with the first embodiment in terms of how the respective resistance components of the second outer connecting conductors 6A, 6B are connected to the second terminal conductors 4A, 4B. In the multilayer capacitor C1 in accordance with the first embodiment, the respective resistance components of the second outer connecting conductors 6A, 6B are connected in series to the second inner connecting conductor 60, so as to be connected to the second terminal conductors 4A, 4B. In the multilayer capacitor in accordance with the third embodiment, on the other hand, each of the resistance components of the second outer connecting conductors 6A, 6B is split at the second inner connecting conductor 60 as a boundary, and the resulting resistance components are connected in parallel to their corresponding second terminal conductors 4A, 4B.

Therefore, because of the difference in resistance components of the first and second outer connecting conductors 5A, 5B, 6A, 6B, the multilayer capacitor in accordance with the third embodiment yields an equivalent series resistance smaller than that of the multilayer capacitor C1 in accordance with the first embodiment.

As in the foregoing, by adjusting the positions of the first inner connecting conductor 50 directly connected to the first terminal conductors 3A, 3B and the second inner connecting conductor 60 directly connected to the second terminal conductors 4A, 4B in the laminating direction, this embodiment sets the equivalent series resistance of the multilayer capacitor to a desirable value, and thus can regulate the equivalent series resistance easily with a high precision. Also, since the equivalent series resistance is controlled by the first and second inner connecting conductors, the multilayer capacitor in accordance with the third embodiment can regulate the equivalent series resistance while setting its capacitance to a desirable value (e.g., a larger value).

All the outer conductors (first and second terminal conductors 3A, 3B, 4A, 4B and first and second outer connecting conductors 5A, 5B, 6A, 6B) in the multilayer capacitor in accordance with the third embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the third embodiment can be made easily.

The first conductor portion 50A of the first inner connecting conductor 50 opposes the second inner electrode 43 with the dielectric layer 18 in between. Therefore, in the multilayer capacitor in accordance with the third embodiment, the first inner connecting conductor 50 can also contributes to forming the capacity component, and thus can further increase the capacitance of the multilayer capacitor.

The first terminal conductors 3A, 3B and the first outer connecting conductors 5A, 5B are formed adjacent to each other, respectively, on the first side face of the multilayer body in the multilayer capacitor in accordance with the third embodiment as in the multilayer capacitor C1. Therefore, the multilayer capacitor in accordance with the third embodiment can lower its equivalent series inductance.

The second terminal conductors 4A, 4B and the second outer connecting conductors 6A, 6B are formed adjacent to each other, respectively, on the second side face of the multilayer body in the multilayer capacitor in accordance with the third embodiment as in the multilayer capacitor C1. Therefore, the multilayer capacitor in accordance with the third embodiment can lower its equivalent series inductance.

In the multilayer capacitor in accordance with the third embodiment, the first terminal conductors 3A, 3B and first outer connecting conductors 5A, 5B are arranged by the same number while forming neighboring pairs on the first side face of the multilayer body. Also, in the multilayer capacitor in accordance with the third embodiment, the second terminal conductors 4A, 4B and second outer connecting conductors 6A, 6B are arranged by the same number while forming neighboring pairs on the second side face of the multilayer body. Therefore, the multilayer capacitor in accordance with the third embodiment can lower its equivalent series inductance more greatly.

In the multilayer capacitor in accordance with the third embodiment, about the center axis of the multilayer body, the first terminal conductors 3A, 3B are formed at positions axisymmetrical to the second terminal conductors 4B, 4A, respectively, and the first outer connecting conductors 5A, 5B are formed at positions axisymmetrical to the second outer connecting conductors 6B, 6A, respectively. Also, in the opposing direction of the first and second side faces of the multilayer body in the multilayer capacitor in accordance with the third embodiment, the first terminal conductors 3A, 3B oppose the second terminal conductors 4A, 4B, respectively, and the first outer connecting conductors 5A, 5B oppose the second outer connecting conductors 6A, 6B, respectively. Therefore, the multilayer capacitor in accordance with the third embodiment can be mounted easily.

Fourth Embodiment

Figure 6:
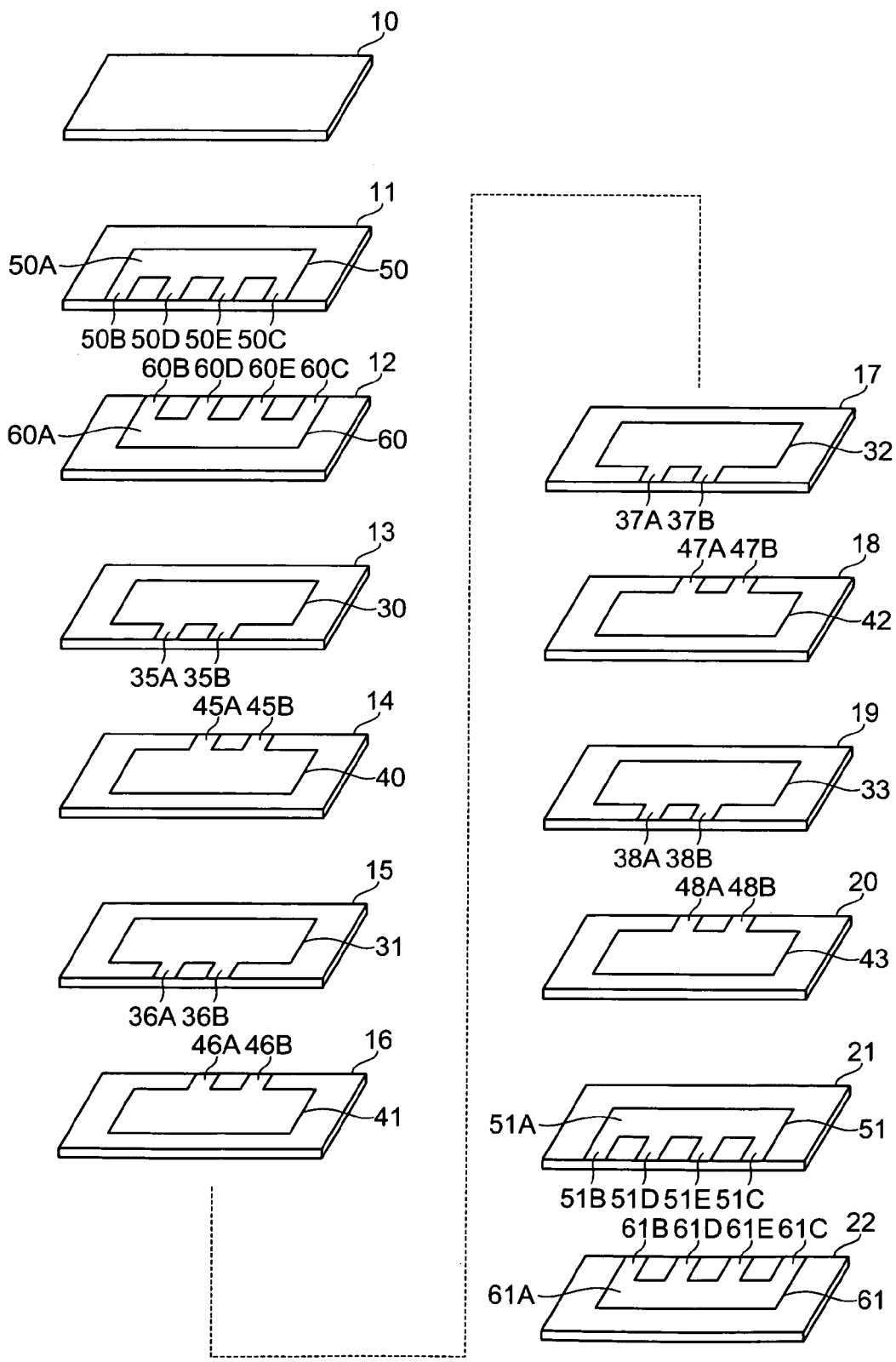
FIG. 6 is an exploded perspective view of the multilayer body included in the multilayer capacitor in accordance with a fourth embodiment.

The configuration of the multilayer capacitor in accordance with a fourth embodiment will be explained with reference to FIG. 6. The multilayer capacitor in accordance with the fourth embodiment differs from the multilayer capacitor C1 in accordance with the first embodiment in terms of the number of first and second inner connecting conductors. FIG. 6 is an exploded perspective view of the multilayer body included in the multilayer capacitor in accordance with the fourth embodiment.

As with the multilayer capacitor C1, the multilayer capacitor in accordance with the fourth embodiment comprises a multilayer body, first terminal conductors 3A, 3B formed on the multilayer body, second terminal conductors 4A, 4B similarly formed on the multilayer body, first outer connecting conductors 5A, 5B similarly formed on the multilayer body, and second outer connecting conductors 6A, 6B similarly formed on the multilayer body, though they are not depicted.

The multilayer capacitor in accordance with the fourth embodiment is constructed by alternately laminating a plurality of (13 in this embodiment) dielectric layers 10 to 22 and a plurality of (4 each in this embodiment) of first and second inner electrodes 30 to 33, 40 to 43 as shown in FIG. 6.

In the multilayer body of the multilayer capacitor in accordance with the fourth embodiment, a plurality of (2 each in this embodiment) of first inner connecting conductors 50, 51 and a plurality of (2 each in this embodiment) of second inner connecting conductors 60, 61 are laminated. In the multilayer body of the multilayer capacitor in accordance with the fourth embodiment, four layers of first inner electrodes 30 to 33 and four layers of second inner electrodes 40 to 43 are arranged between one each of the first and second inner connecting conductors 50, 60 which are a part of the plurality of inner connecting conductors 50, 51, 60, 61 and the remaining first and second inner connecting conductors 51, 61.

In the multilayer capacitor in accordance with the fourth embodiment, the first inner connecting conductor 50 is positioned so as to be held between the dielectric layers 10 and 11. The first inner connecting conductor 51 is positioned so as to be held between the dielectric layers 20 and 21. The second inner connecting conductor 60 is positioned so as to be held between the dielectric layers 11 and 12. The second inner connecting conductor 61 is positioned so as to be held between the dielectric layers 21 and 22.

In the multilayer capacitor in accordance with the fourth embodiment, the first and second inner connecting conductors 50, 51, 60, 61 are laminated in the multilayer body such that the multilayer body includes at least one set (4 sets in this embodiment) of first and second inner electrodes neighboring each other with the dielectric layer in between. Specifically, the first and second inner connecting conductors 50, 51, 60, 61 are laminated in the multilayer body such that the multilayer body includes the first inner electrode 30 and second inner electrode 40 neighboring each other with the dielectric layer 13 in between, for example.

In the multilayer capacitor in accordance with the fourth embodiment, the first terminal conductors 3A, 3B are connected to the first inner electrodes 30 to 33 not directly, but electrically through the first outer connecting conductors 5A, 5B and first inner connecting conductors 50, 51. Also, in the multilayer capacitor in accordance with the fourth embodiment, the second terminal conductors 4A, 4B are connected to the second inner electrodes 40 to 43 not directly, but electrically through the second outer connecting conductors 6A, 6B and second inner connecting conductors 60, 61. As a consequence, the multilayer capacitor in accordance with the fourth embodiment yields an equivalent series resistance greater than that of the conventional multilayer capacitor in which all the inner electrodes are connected to their corresponding terminal conductors through lead conductors.

As compared with the multilayer capacitor C1, the multilayer capacitor in accordance with the fourth embodiment has a greater number of first inner connecting conductors 50, 51, whereas the first inner connecting conductors 50, 51 are connected in parallel to their corresponding first terminal conductors 3A, 3B. As the number of first inner connecting conductors 50, 51 increases, the number of paths of currents flowing between the first terminal conductors 3A, 3B and the first inner electrodes 30 to 33 becomes greater. Also, the multilayer capacitor in accordance with the fourth embodiment has a greater number of second inner connecting conductors 60, 61, whereas the second inner connecting conductors 60, 61 are connected in parallel to their corresponding second terminal conductors 4A, 4B. As the number of second inner connecting conductors 60, 61 increases, the number of paths of currents flowing between the second terminal conductors 4A, 4B and the second inner electrodes 40 to 43 becomes greater. Therefore, the multilayer capacitor in accordance with the fourth embodiment yields an equivalent series resistance smaller than that of the multilayer capacitor C1.

As in the foregoing, by adjusting the number of first inner connecting conductors 50, 51 directly connected to the first terminal conductors 3A, 3B and the number of second inner connecting conductors 60, 61 directly connected to the second terminal conductors 4A, 4B, this embodiment sets the equivalent series resistance of the multilayer capacitor to a desirable value, and thus can regulate the equivalent series resistance easily with a high precision. Also, since the equivalent series resistance is controlled by the first and second inner connecting conductors, the multilayer capacitor in accordance with the fourth embodiment can regulate the equivalent series resistance while setting its capacitance to a desirable value (e.g., a larger value).

All the outer conductors (first and second terminal conductors 3A, 3B, 4A, 4B and first and second outer connecting conductors 5A, 5B, 6A, 6B) in the multilayer capacitor in accordance with the fourth embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the fourth embodiment can be made easily.

The first conductor portion 51A of the first inner connecting conductor 51 opposes the second inner electrode 43 with the dielectric layer 20 in between. The first conductor portion 60A of the second inner connecting conductor 60 opposes the first inner electrode 30 with the dielectric layer 12 in between. Therefore, in the multilayer capacitor in accordance with the fourth embodiment, the first and second inner connecting conductors 51, 60 can also contribute to forming the capacity component, and thus can further increase the capacitance of the multilayer capacitor.

In the multilayer body of the multilayer capacitor in accordance with the fourth embodiment, a plurality of first and second inner electrodes 30 to 33, 40 to 43 are arranged between the first and second inner connecting conductors 50, 60 and the first and second inner connecting conductors 51, 61. Therefore, the multilayer capacitor in accordance with the fourth embodiment can set the equivalent series resistance with a favorable balance.

The first terminal conductors 3A, 3B and the first outer connecting conductors 5A, 5B are formed adjacent to each other, respectively, on the first side face of the multilayer body in the multilayer capacitor in accordance with the fourth embodiment as in the multilayer capacitor C1. Therefore, the multilayer capacitor in accordance with the fourth embodiment can lower its equivalent series inductance.

The second terminal conductors 4A, 4B and the second outer connecting conductors 6A, 6B are formed adjacent to each other, respectively, on the second side face of the multilayer body in the multilayer capacitor in accordance with the fourth embodiment as in the multilayer capacitor C1. Therefore, the multilayer capacitor in accordance with the fourth embodiment can lower its equivalent series inductance.

In the multilayer capacitor in accordance with the fourth embodiment, the first terminal conductors 3A, 3B and first outer connecting conductors 5A, 5B are arranged by the same number while forming neighboring pairs on the first side face of the multilayer body. Also, in the multilayer capacitor in accordance with the fourth embodiment, the second terminal conductors 4A, 4B and second outer connecting conductors 6A, 6B are arranged by the same number while forming neighboring pairs on the second side face of the multilayer body. Therefore, the multilayer capacitor in accordance with the fourth embodiment can lower its equivalent series inductance more greatly.

In the multilayer capacitor in accordance with the fourth embodiment, about the center axis of the multilayer body, the first terminal conductors 3A, 3B are formed at positions axisymmetrical to the second terminal conductors 4B, 4A, respectively, and the first outer connecting conductors 5A, 5B are formed at positions axisymmetrical to the second outer connecting conductors 6B, 6A, respectively. Also, in the opposing direction of the first and second side faces of the multilayer body in the multilayer capacitor in accordance with the fourth embodiment, the first terminal conductors 3A, 3B oppose the second terminal conductors 4A, 4B, respectively, and the first outer connecting conductors 5A, 5B oppose the second outer connecting conductors 6A, 6B, respectively. Therefore, the multilayer capacitor in accordance with the fourth embodiment can be mounted easily.

Fifth Embodiment

Figure 7:
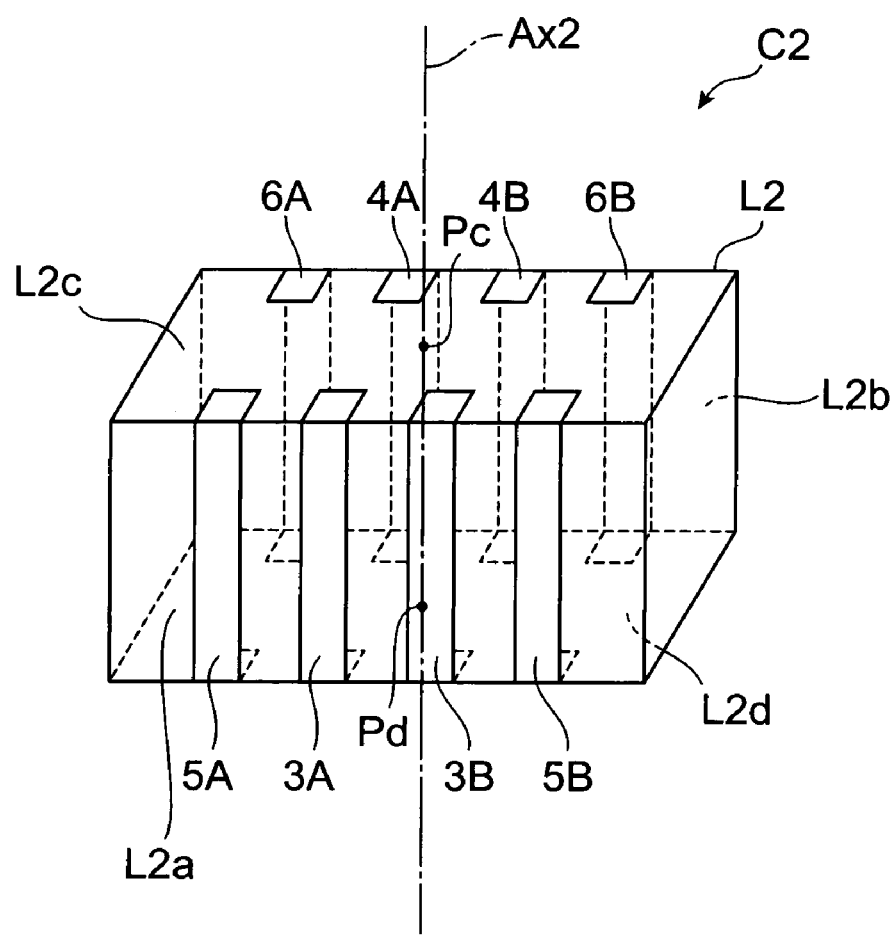
FIG. 7 is a perspective view of the multilayer capacitor in accordance with a fifth embodiment.
Figure 8:
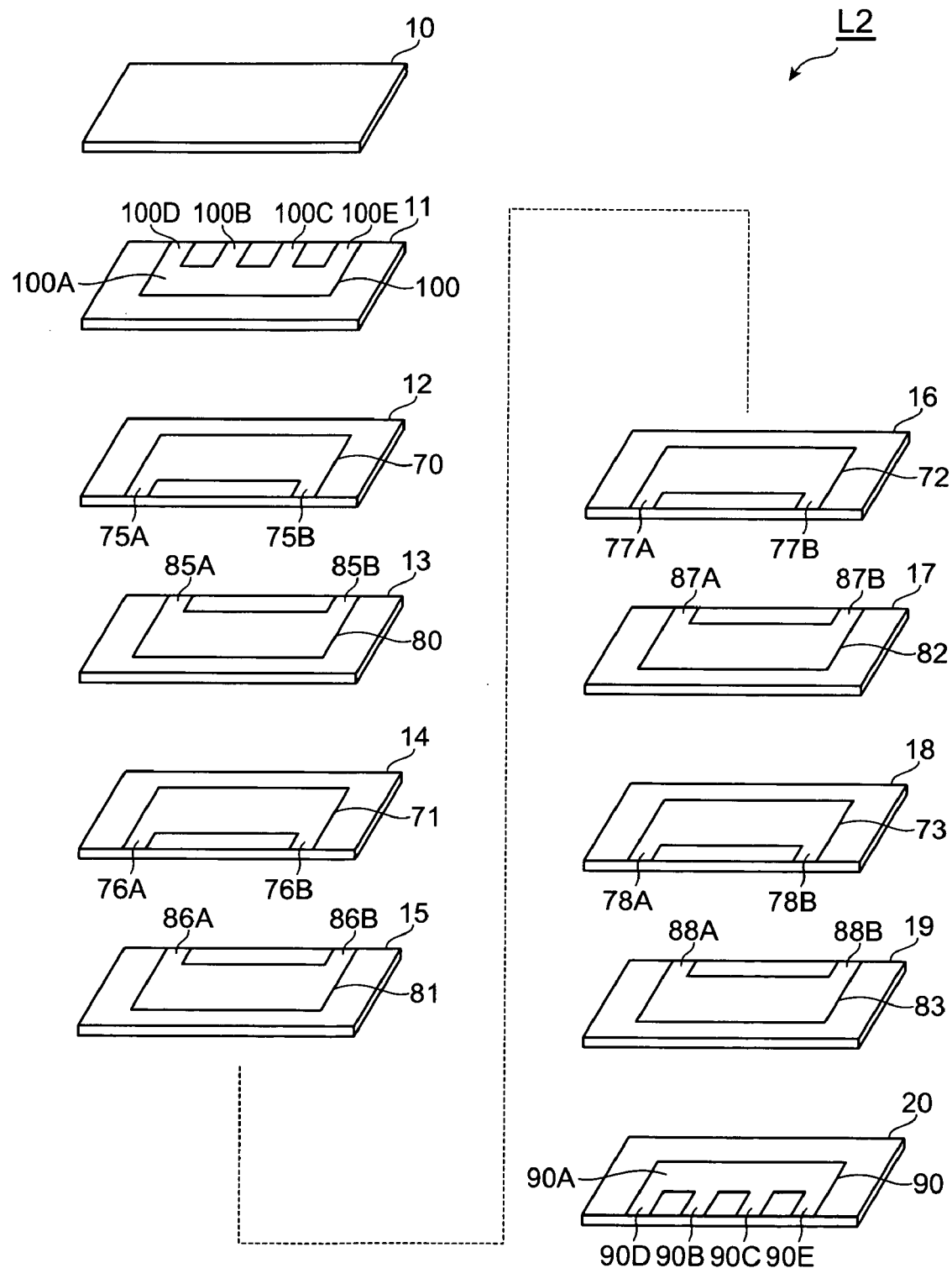
FIG. 8 is an exploded perspective view of the multilayer body included in the multilayer capacitor in accordance with the fifth embodiment.

The configuration of the multilayer capacitor C2 in accordance with a fifth embodiment will be explained with reference to FIGS. 7 and 8. FIG. 7 is a perspective view of the multilayer capacitor in accordance with the fifth embodiment. FIG. 8 is an exploded perspective view of the multilayer body included in the multilayer capacitor in accordance with the fifth embodiment.

As shown in FIG. 7, the multilayer capacitor C2 in accordance with the fifth embodiment comprises a multilayer body L2, first terminal conductors 3A, 3B formed on the multilayer body L2, second terminal conductors 4A, 4B similarly formed on the multilayer body, first outer connecting conductors 5A, 5B similarly formed on the multilayer body, and second outer connecting conductors 6A, 6B similarly formed on the multilayer body.

Each of the first terminal conductors 3A, 3B and first outer connecting conductors 5A, 5B is positioned on a first side face L2a which is a side face extending along the longitudinal axis of faces L2c, L2d orthogonal to the laminating direction of the multilayer body L2 among side faces parallel to the laminating direction of the multilayer body. The first terminal conductors 3A, 3B and first outer connecting conductors 5A, 5B are formed such that the first outer connecting conductor 5A, first terminal conductor 3A, first terminal conductor 3B, and first outer connecting conductor 5B are successively arranged from the left side to right side of FIG. 7.

Therefore, the first terminal conductor 3A and first outer connecting conductor 5A are formed adjacent to each other on the first side face L2a that is the same side face of the multilayer body L2. The first terminal conductor 3B and first outer connecting conductor 5B are formed adjacent to each other on the first side face L2a that is the same side face of the multilayer body L2.

Each of the second terminal conductors 4A, 4B and second outer connecting conductors 6A, 6B is positioned on a second side face L2b which is a side face extending along the longitudinal axis of faces L2c, L2d orthogonal to the laminating direction of the multilayer body L2 among side faces parallel to the laminating direction of the multilayer body while opposing the first side face L2a. The second terminal conductors 4A, 4B and second outer connecting conductors 6A, 6B are formed such that the second outer connecting conductor 6A, second terminal conductor 4A, second terminal conductor 4B, and second outer connecting conductor 6B are successively arranged from the left side to right side of FIG. 7.

Therefore, the second terminal conductor 4A and second outer connecting conductor 6A are formed adjacent to each other on the second side face L2b that is the same side face of the multilayer body L2. The second terminal conductor 4B and second outer connecting conductor 6B are formed adjacent to each other on the second side face L2b that is the same side face of the multilayer body L2.

The first terminal conductor 3A and second terminal conductor 4B are axisymmetrical to each other about a center axis Ax2 passing respective center points Pc, Pd of the two side faces L2c, L2d orthogonal to the laminating direction of the multilayer body L2 among center axes of the multilayer body L2. The first terminal conductor 3B and second terminal conductor 4A are axisymmetrical to each other about the center axis Ax2 of the multilayer body L2. The first outer connecting conductor 5A and second outer connecting conductor 6B are axisymmetrical to each other about the center axis Ax2 of the multilayer body L2. The first outer connecting conductor 5B and second outer connecting conductor 6A are axisymmetrical to each other about the center axis Ax2 of the multilayer body L2.

The first terminal conductor 3A and second terminal conductor 4A oppose each other in a direction along which the first side face L2a and second side face L2b of the multilayer body L2 oppose each other. The first terminal conductor 3B and second terminal conductor 4B oppose each other in the opposing direction of the first side face L2a and second side face L2b of the multilayer body L2. The first outer connecting conductor 5A and second outer connecting conductor 6A oppose each other in the opposing direction of the first side face L2a and second side face L2b of the multilayer body L2. The first outer connecting conductor 5B and second outer connecting conductor 6B oppose each other in the opposing direction of the first side face L2a and second side face L2b of the multilayer body L2.

As shown in FIG. 8, the multilayer body L2 is constructed by alternately laminating a plurality of (11 in this embodiment) dielectric layers 10 to 20 and a plurality of (4 each in this embodiment) of first and second inner electrodes 70 to 73, 80 to 83. In the actual multilayer capacitor C2, they are integrated to such an extent that no boundaries are discernible between the dielectric layers 10 to 20.

Further, one first inner connecting conductor 90 and one second inner connecting conductor 100 are laminated in the multilayer body L2. In the multilayer body L2, the plurality of first inner connecting conductors 70 to 73 and the plurality of second inner connecting conductor 80 to 83 are arranged between the second inner connecting conductor 100 and the first inner connecting conductor 90.

Each of the first inner electrodes 70 to 73 has a substantially rectangular form. The plurality of first inner electrodes 70 to 73 are formed at respective positions separated by a predetermined distance from a side face parallel to the laminating direction of the dielectric layers 10 to 20 (hereinafter simply referred to as "laminating direction") in the multilayer body L2.

Each of lead conductors 75A, 75B is integrally formed with the first inner electrode 70 so as to extend therefrom and reach the first side face L2a of the multilayer body L2. Each of lead conductors 76A, 76B is integrally formed with the first inner electrode 71 so as to extend therefrom and reach the first side face L2a of the multilayer body L2. Each of lead conductors 77A, 77B is integrally formed with the first inner electrode 72 so as to extend therefrom and reach the first side face L2a of the multilayer body L2. Each of lead conductors 78A, 78B is integrally formed with the first inner electrode 73 so as to extend therefrom and reach the first side face L2a of the multilayer body L2.

The first inner electrode 70 is electrically connected to the first outer connecting conductors 5A and 5B through the lead conductors 75A and 75B, respectively. The first inner electrode 71 is electrically connected to the first outer connecting conductors 5A and 5B through the lead conductors 76A and 76B, respectively. The first inner electrode 72 is electrically connected to the first outer connecting conductors 5A and 5B through the lead conductors 77A and 77B, respectively. The first inner electrode 73 is electrically connected to the first outer connecting conductors 5A and 5B through the lead conductors 78A and 78B, respectively. As a consequence, the plurality of first inner electrodes 70 to 73 are electrically connected to each other through the first outer connecting conductors 5A, 5B.

Each of the second inner electrodes 80 to 83 has a substantially rectangular form. The plurality of second inner electrodes 80 to 83 are formed at respective positions separated by a predetermined distance from a side face parallel to the laminating direction of the multilayer body L2.

Each of lead conductors 85A, 85B is integrally formed with the second inner electrode 80 so as to extend therefrom and reach the second side face L2b of the multilayer body L2. Each of lead conductors 86A, 86B is integrally formed with the second inner electrode 81 so as to extend therefrom and reach the second side face L2b of the multilayer body L2. Each of lead conductors 87A, 87B is integrally formed with the second inner electrode 82 so as to extend therefrom and reach the second side face L2b of the multilayer body L2. Each of lead conductors 88A, 88B is integrally formed with the second inner electrode 83 so as to extend therefrom and reach the second side face L2b of the multilayer body L2.

The second inner electrode 80 is electrically connected to the second outer connecting conductors 6A and 6B through the lead conductors 85A and 85B, respectively. The second inner electrode 81 is electrically connected to the second outer connecting conductors 6A and 6B through the lead conductors 86A and 86B, respectively. The second inner electrode 82 is electrically connected to the second outer connecting conductors 6A and 6B through the lead conductors 87A and 87B, respectively. The second inner electrode 83 is electrically connected to the second outer connecting conductors 6A and 6B through the lead conductors 88A and 88B, respectively. As a consequence, the plurality of second inner electrodes 80 to 83 are electrically connected to each other through the first outer connecting conductors 6A, 6B.

The first inner connecting conductor 90 is positioned so as to be held between the dielectric layers 19 and 20. The second inner connecting conductor 100 is positioned so as to be held between the dielectric layers 10 and 11. The first and second inner connecting conductors 90, 100 are electrically insulated from each other.

The first inner connecting conductor 90 includes a first conductor portion 90A having an oblong form and second to fifth conductor portions 90B to 90E extending from the first conductor portion 90A so as to be taken out to the first side face L2a of the multilayer body L2. The first conductor portion 90A is arranged such that its longitudinal axis is parallel to the first and second side faces L2a, L2b of the multilayer body L2.

The second, third, fourth, and fifth conductor portions 90B, 90C, 90D, and 90E are electrically connected to the first terminal conductor 3A, first terminal conductor 3B, first outer connecting conductor 5A, and first outer connecting conductor 5B, respectively. As a consequence, the first inner connecting conductor 90 is electrically connected to the first terminal conductors 3A, 3B and first outer connecting conductors 5A, 5B.

The second inner connecting conductor 100 includes a first conductor portion 100A having an oblong form and second to fifth conductor portions 100B to 100E extending from the first conductor portion 100A so as to be taken out to the second side face L2b of the multilayer body L2. The first conductor portion 100A is arranged such that its longitudinal axis is parallel to the first and second side faces L2a, L2b of the multilayer body L2.

The second, third, fourth, and fifth conductor portions 100B, 100C, 100D, and 100E are electrically connected to the second terminal conductor 4A, second terminal conductor 4B, second outer connecting conductor 6A, and second outer connecting conductor 6B, respectively. As a consequence, the second inner connecting conductor 100 is electrically connected to the second terminal conductors 4A, 4B and second outer connecting conductors 6A, 6B.

The first conductor portion 90A of the first inner connecting conductor 90 is a region opposing the second inner electrode 83 with the dielectric layer 19 in between. The first conductor portion 100A of the second inner connecting conductor 100 is a region opposing the first inner electrode 70 with the dielectric layer 11 in between.

The first and second inner connecting conductors 90, 100 are laminated in the multilayer body L2 such that the multilayer body L2 includes at least one set (4 sets in this embodiment) of first and second inner electrodes neighboring each other with the dielectric layer in between.

In the multilayer capacitor C2, the first terminal conductors 3A, 3B are connected to the first inner electrodes 70 to 73 not directly, but electrically through the first outer connecting conductors 5A, 5B and first inner connecting conductor 90. Also, in the multilayer capacitor C2, the second terminal conductors 4A, 4B are connected to the second inner electrodes 80 to 83 not directly, but electrically through the second outer connecting conductors 6A, 6B and second inner connecting conductor 100. As a result, the multilayer capacitor C2 yields an equivalent series resistance greater than that of the conventional multilayer capacitor in which all the inner electrodes are connected to their corresponding terminal conductors through lead conductors.

By adjusting the number of first inner connecting conductor 90 directly connected to the first terminal conductors 3A, 3B and the number of second inner connecting conductor 100 directly connected to the second terminal conductors 4A, 4B in such a manner, this embodiment sets the equivalent series resistance of the multilayer capacitor C2 to a desirable value, and thus can regulate the equivalent series resistance easily with a high precision. Also, since the equivalent series resistance is controlled by the first and second inner connecting conductors, the multilayer capacitor C2 can regulate the equivalent series resistance while setting its capacitance to a desirable value (e.g., a larger value).

All of the first and second terminal conductors 3A, 3B, 4A, 4B and first and second outer connecting conductors 5A, 5B, 6A, 6B, which are outer conductors of the multilayer capacitor C2, are formed on the first and second side faces L2a, L2b of the multilayer body L2 opposing each other. Therefore, as compared with the case where outer conductors are formed on four side faces of the multilayer body L2, the multilayer capacitor C2 can reduce steps required for forming the outer conductors. As a consequence, the multilayer capacitor C2 can be made easily.

The first conductor portion 90A of the first inner connecting conductor 90 opposes the second inner electrode 83 with the dielectric layer 19 in between. The first conductor portion 100A of the second inner connecting conductor 100 opposes the first inner electrode 70 with the dielectric layer 11 in between. Therefore, the first and second inner connecting conductor 90, 100 can also contribute to forming the capacity component in the multilayer capacitor C2, whereby the multilayer capacitor C2 can further increase its capacitance.

Since a plurality of first and second inner electrodes 70 to 73, 80 to 83 are arranged between the first inner connecting conductor 90 and second inner connecting conductor 100, the multilayer body L2 of the multilayer capacitor C2 can set the equivalent series resistance with a favorable balance.

On the first side face L2a of the multilayer body L2 in the multilayer capacitor C2, the first terminal conductor 3A and first outer connecting conductor 5A are formed adjacent to each other, and the first terminal conductor 3B and first outer connecting conductor 5B are formed adjacent to each other. Therefore, the following effects are obtained when the multilayer capacitor C2 is mounted on a substrate or the like such that the first terminal conductors 3A, 3B are directly connected to land patterns whereas the first outer connecting conductors 5A, 5B are kept from being directly connected to land patterns. Namely, a magnetic field caused by a current flowing between the first terminal conductors 3A, 3B and the first inner connecting conductor 90 (the second and third conductor portions 90B, 90C in the first inner connecting conductor 90) and a magnetic field caused by a current flowing between the first outer connecting conductors 5A, 5B and the first inner electrodes 70 to 73 (the lead conductors 75A to 78A, 75B to 78B) and a current flowing between the first outer connecting conductors 5A, 5B and the first inner connecting conductor 90 (the fourth and fifth conductor portions 90D, 90E in the first inner connecting conductor 90) cancel each other out. As a result, the multilayer capacitor C2 can reduce its equivalent series inductance.

On the second side face L2b of the multilayer body L2 in the multilayer capacitor C2, the second terminal conductor 4A and second outer connecting conductor 6A are formed adjacent to each other, and the second terminal conductor 4B and second outer connecting conductor 6B are formed adjacent to each other. Therefore, the following effects are obtained when the multilayer capacitor C2 is mounted on a substrate or the like such that the second terminal conductors 4A, 4B are directly connected to land patterns whereas the second outer connecting conductors 6A, 6B are kept from being directly connected to land patterns. Namely, a magnetic field caused by a current flowing between the second terminal conductors 4A, 4B and the second inner connecting conductor 100 (the second and third conductor portions 100B, 100C in the second inner connecting conductor 100) and a magnetic field caused by a current flowing between the second outer connecting conductors 6A, 6B and the first inner electrodes 80 to 83 (the lead conductors 85A to 88A, 85B to 88B) and a current flowing between the second outer connecting conductors 6A, 6B and the second inner connecting conductor 100 (the fourth and fifth conductor portions 100D, 100E in the second inner connecting conductor 100) cancel each other out. As a result, the multilayer capacitor C2 can reduce its equivalent series inductance.

In the multilayer capacitor C2, the first terminal conductors 3A, 3B and first outer connecting conductors 5A, 5B are arranged by the same number while forming neighboring pairs on the first side face L2a of the multilayer body L2. Also, in the multilayer capacitor C2, the second terminal conductors 4A, 4B and second outer connecting conductors 6A, 6B are arranged by the same number while forming neighboring pairs on the second side face L2b of the multilayer body L2. Therefore, the multilayer capacitor C2 can lower its equivalent series inductance further greatly.

In the multilayer capacitor C2, about the center axis Ax2 of the multilayer body L2, the first terminal conductors 3A, 3B are formed at positions axisymmetrical to the second terminal conductors 4B, 4A, respectively, and the first outer connecting conductors 5A, 5B are formed at positions axisymmetrical to the second outer connecting conductors 6B, 6A, respectively. Also, in the opposing direction of the first side face L2a and second side face L2b of the multilayer body L2 in the multilayer capacitor C2, the first terminal conductors 3A, 3B oppose the second terminal conductors 4A, 4B, respectively, and the first outer connecting conductors 5A, 5B oppose the second outer connecting conductors 6A, 6B, respectively. Therefore, the multilayer capacitor C2 can be mounted easily.

Sixth Embodiment

Figure 9:
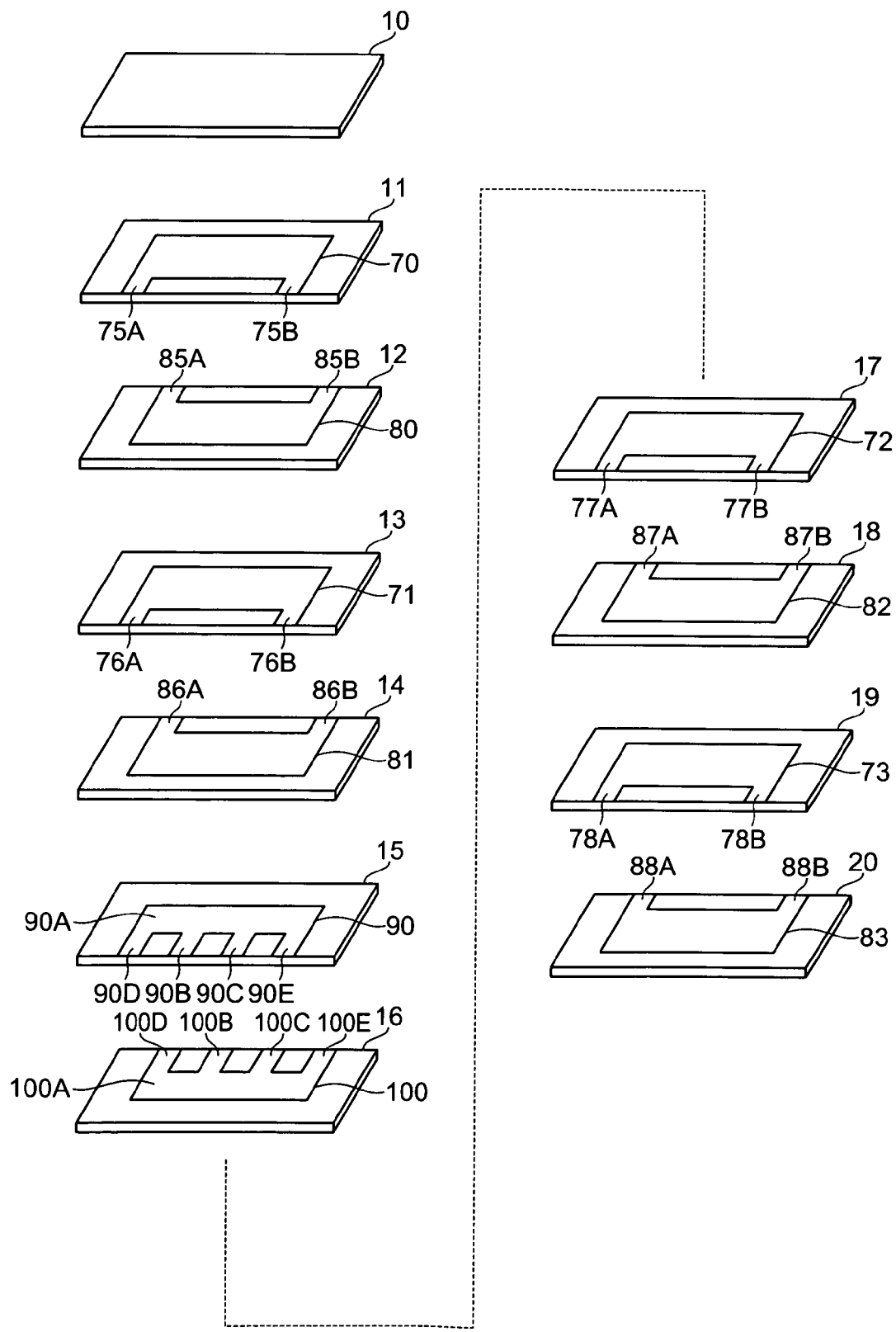
FIG. 9 is an exploded perspective view of the multilayer body included in the multilayer capacitor in accordance with a sixth embodiment.

The configuration of the multilayer capacitor in accordance with a sixth embodiment will be explained with reference to FIG. 9. The multilayer capacitor in accordance with the sixth embodiment differs from the multilayer capacitor C2 in accordance with the fifth embodiment in terms of positions of the first and second inner connecting conductors 90, 100 in the laminating direction. FIG. 9 is an exploded perspective view of the multilayer body included in the multilayer capacitor in accordance with the sixth embodiment.

As with the multilayer capacitor C2 in accordance with the fifth embodiment, the multilayer capacitor in accordance with the sixth embodiment comprises a multilayer body, first terminal conductors 3A, 3B formed on the multilayer body, second terminal conductors 4A, 4B similarly formed on the multilayer body, first outer connecting conductors 5A, 5B similarly formed on the multilayer body, and second outer connecting conductors 6A, 6B similarly formed on the multilayer body, though they are not depicted.

In the multilayer capacitor in accordance with the sixth embodiment, the first and second inner connecting conductors 90, 100, provided one by one, are laminated between two layers each of first and second inner electrodes 70, 71, 80, 81 and two layers each of first and second inner electrodes 72, 73, 82, 83 as shown in FIG. 9. More specifically, the first inner connecting conductor 90 is positioned so as to be held between dielectric layers 14 and 15. The second inner connecting conductor 100 is positioned so as to be held between dielectric layers 15 and 16.

The first and second inner connecting conductors 90, 100 are laminated in the multilayer body such that the multilayer body includes at least one set (4 sets in this embodiment) of first and second inner electrodes neighboring each other with the dielectric layer in between.

In the multilayer capacitor in accordance with the sixth embodiment, the first terminal conductors 3A, 3B are connected to the first inner electrodes 70 to 73 not directly, but electrically through the first outer connecting conductors 5A, 5B and first inner connecting conductor 90. Also, in the multilayer capacitor in accordance with the sixth embodiment, the second terminal conductors 4A, 4B are connected to the second inner electrodes 80 to 83 not directly, but electrically through the second outer connecting conductors 6A, 6B and second inner connecting conductor 100. As a consequence, the multilayer capacitor in accordance with the sixth embodiment yields an equivalent series resistance greater than that of the conventional multilayer capacitor in which all the inner electrodes are connected to their corresponding terminal conductors through lead conductors.

Meanwhile, when the first terminal conductors 3A, 3B are concerned, the multilayer capacitor in accordance with the sixth embodiment differs from the multilayer capacitor C2 in accordance with the fifth embodiment in terms of how the respective resistance components of the first outer connecting conductors 5A, 5B are connected to the first terminal conductors 3A, 3B. In the multilayer capacitor C2 in accordance with the fifth embodiment, the respective resistance components of the first outer connecting conductors 5A, 5B are connected in series to the first inner connecting conductor 90, so as to be connected to the first terminal conductors 3A, 3B. In the multilayer capacitor in accordance with the sixth embodiment, on the other hand, each of the resistance components of the first outer connecting conductors 5A, 5B is split at the first inner connecting conductor 90 as a boundary, and the resulting resistance components are connected in parallel to their corresponding first terminal conductors 3A, 3B.

When the second terminal conductors 4A, 4B are concerned, the multilayer capacitor in accordance with the sixth embodiment differs from the multilayer capacitor C2 in accordance with the fifth embodiment in terms of how the respective resistance components of the second outer connecting conductors 6A, 6B are connected to the second terminal conductors 4A, 4B. In the multilayer capacitor C2 in accordance with the fifth embodiment, the respective resistance components of the second outer connecting conductors 6A, 6B are connected in series to the second inner connecting conductor 100, so as to be connected to the second terminal conductors 4A, 4B. In the multilayer capacitor in accordance with the sixth embodiment, on the other hand, each of the resistance components of the second outer connecting conductors 6A, 6B is split at the second inner connecting conductor 100 as a boundary, and the resulting resistance components are connected in parallel to their corresponding second terminal conductors 4A, 4B. Therefore, because of the difference in resistance components of the first and second outer connecting conductors 5A, 5B, 6A, 6B, the multilayer capacitor in accordance with the sixth embodiment yields an equivalent series resistance smaller than that of the multilayer capacitor C2 in accordance with the fifth embodiment.

As in the foregoing, by adjusting the positions of the first inner connecting conductor 90 directly connected to the first terminal conductors 3A, 3B and the second inner connecting conductor 100 directly connected to the second terminal conductors 4A, 4B in the laminating direction, this embodiment sets the equivalent series resistance of the multilayer capacitor to a desirable value, and thus can regulate the equivalent series resistance easily with a high precision. Also, since the equivalent series resistance is controlled by the first and second inner connecting conductors, the multilayer capacitor in accordance with the sixth embodiment can regulate the equivalent series resistance while setting its capacitance to a desirable value (e.g., a larger value).

All the outer conductors (first and second terminal conductors 3A, 3B, 4A, 4B and first and second outer connecting conductors 5A, 5B, 6A, 6B) in the multilayer capacitor in accordance with the sixth embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the sixth embodiment can be made easily.

The first conductor portion 90A of the first inner connecting conductor 90 opposes the second inner electrode 81 with the dielectric layer 14 in between. The first conductor portion 100A of the second inner connecting conductor 100 opposes the first inner electrode 72 with the dielectric layer 16 in between. Therefore, in the multilayer capacitor in accordance with the sixth embodiment, the first and second inner connecting conductors 90, 100 can also contribute to forming the capacity component, and thus can further increase the capacitance of the multilayer capacitor.

The first terminal conductors 3A, 3B and the first outer connecting conductors 5A, 5B are formed adjacent to each other, respectively, on the first side face of the multilayer body in the multilayer capacitor in accordance with the sixth embodiment as in the multilayer capacitor C2. Therefore, the multilayer capacitor in accordance with the sixth embodiment can lower its equivalent series inductance.

The second terminal conductors 4A, 4B and the second outer connecting conductors 6A, 6B are formed adjacent to each other, respectively, on the second side face of the multilayer body in the multilayer capacitor in accordance with the sixth embodiment as in the multilayer capacitor C2. Therefore, the multilayer capacitor in accordance with the sixth embodiment can lower its equivalent series inductance.

In the multilayer capacitor in accordance with the sixth embodiment, the first terminal conductors 3A, 3B and first outer connecting conductors 5A, 5B are arranged by the same number while forming neighboring pairs on the first side face of the multilayer body. Also, in the multilayer capacitor in accordance with the sixth embodiment, the second terminal conductors 4A, 4B and second outer connecting conductors 6A, 6B are arranged by the same number while forming neighboring pairs on the second side face of the multilayer body. Therefore, the multilayer capacitor in accordance with the sixth embodiment can lower its equivalent series inductance more greatly.

In the multilayer capacitor in accordance with the sixth embodiment, about the center axis of the multilayer body, the first terminal conductors 3A, 3B are formed at positions axisymmetrical to the second terminal conductors 4B, 4A, respectively, and the first outer connecting conductors 5A, 5B are formed at positions axisymmetrical to the second outer connecting conductors 6B, 6A, respectively. Also, in the opposing direction of the first and second side faces of the multilayer body in the multilayer capacitor in accordance with the sixth embodiment, the first terminal conductors 3A, 3B oppose the second terminal conductors 4A, 4B, respectively, and the first outer connecting conductors 5A, 5B oppose the second outer connecting conductors 6A, 6B, respectively. Therefore, the multilayer capacitor in accordance with the sixth embodiment can be mounted easily.

Seventh Embodiment

Figure 10:
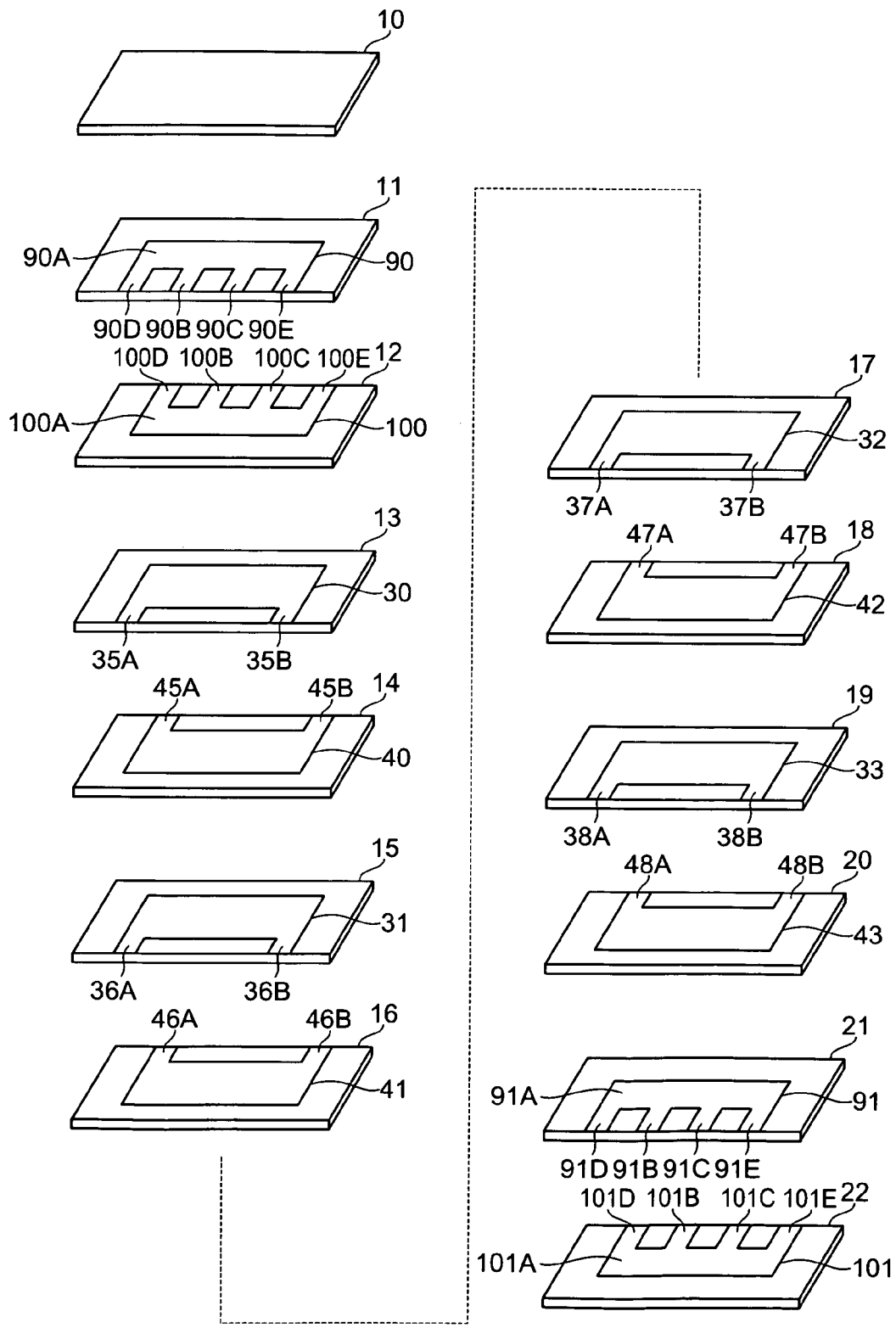
FIG. 10 is an exploded perspective view of the multilayer body included in the multilayer capacitor in accordance with a seventh embodiment.

The configuration of the multilayer capacitor in accordance with a seventh embodiment will be explained with reference to FIG. 10. The multilayer capacitor in accordance with the seventh embodiment differs from the multilayer capacitor C2, in accordance with the fifth embodiment in terms of the number of inner connecting conductors. FIG. 10 is an exploded perspective view of the multilayer body included in the multilayer capacitor in accordance with the seventh embodiment.

As with the multilayer capacitor C2 in accordance with the fifth embodiment, the multilayer capacitor in accordance with the seventh embodiment comprises a multilayer body, first terminal conductors 3A, 3B formed on the multilayer body, second terminal conductors 4A, 4B similarly formed on the multilayer body, first outer connecting conductors 5A, 5B similarly formed on the multilayer body, and second outer connecting conductors 6A, 6B similarly formed on the multilayer body, though they are not depicted.

The multilayer capacitor in accordance with the seventh embodiment is constructed by alternately laminating a plurality of (13 in this embodiment) dielectric layers 10 to 22 and a plurality of (4 each in this embodiment) of first and second inner electrodes 70 to 73, 80 to 83 as shown in FIG. 10.

In the multilayer body of the multilayer capacitor in accordance with the seventh embodiment, a plurality of (2 each in this embodiment) of first inner connecting conductors 90, 91 and a plurality of (2 each in this embodiment) of second inner connecting conductors 100, 101 are laminated. In the multilayer body of the multilayer capacitor in accordance with the seventh embodiment, four layers of first inner electrodes 70 to 73 and four layers of second inner electrodes 80 to 83 are arranged between one each of the first and second inner connecting conductors 90, 100 which are a part of the plurality of inner connecting conductors 90, 91, 100, 101 and the remaining first and second inner connecting conductors 91, 101.

In the multilayer capacitor in accordance with the seventh embodiment, the first inner connecting conductor 90 is positioned so as to be held between the dielectric layers 10 and 11. The first inner connecting conductor 91 is positioned so as to be held between the dielectric layers 20 and 21. The second inner connecting conductor 100 is positioned so as to be held between the dielectric layers 11 and 12. The second inner connecting conductor 101 is positioned so as to be held between the dielectric layers 21 and 22.

The first and second inner connecting conductors 90, 91, 100, 101 are laminated in the multilayer body such that the multilayer body includes at least one set (4 sets in this embodiment) of first and second inner electrodes neighboring each other with the dielectric layer in between.

In the multilayer capacitor in accordance with the seventh embodiment, the first terminal conductors 3A, 3B are connected to the first inner electrodes 70 to 73 not directly, but electrically through the first outer connecting conductors 5A, 5B and first inner connecting conductors 90, 91. Also, in the multilayer capacitor in accordance with the seventh embodiment, the second terminal conductors 4A, 4B are connected to the second inner electrodes 80 to 83 not directly, but electrically through the second outer connecting conductors 6A, 6B and second inner connecting conductors 100, 101. As a consequence, the multilayer capacitor in accordance with the seventh embodiment yields an equivalent series resistance greater than that of the conventional multilayer capacitor in which all the inner electrodes are connected to their corresponding terminal conductors through lead conductors.

As compared with the multilayer capacitor C2, the multilayer capacitor in accordance with the seventh embodiment has a greater number of first inner connecting conductors 90, 91, whereas the first inner connecting conductors 90, 91 are connected in parallel to their corresponding first terminal conductors 3A, 3B. Also, the multilayer capacitor in accordance with the seventh embodiment has a greater number of second inner connecting conductors 100, 101 than that of the multilayer capacitor C2, whereas the second inner connecting conductors 100, 101 are connected in parallel to their corresponding second terminal conductors 4A, 4B. Therefore, the multilayer capacitor in accordance with the seventh embodiment yields an equivalent series resistance smaller than that of the multilayer capacitor C2.

As in the foregoing, by adjusting the number of first inner connecting conductors 90, 91 directly connected to the first terminal conductors 3A, 3B and the second inner connecting conductors 100, 101 directly connected to the second terminal conductors 4A, 4B, this embodiment sets the equivalent series resistance of the multilayer capacitor to a desirable value, and thus can regulate the equivalent series resistance easily with a high precision. Also, since the equivalent series resistance is controlled by the first and second inner connecting conductors, the multilayer capacitor in accordance with the seventh embodiment can regulate the equivalent series resistance while setting its capacitance to a desirable value (e.g., a larger value).

All the outer conductors (first and second terminal conductors 3A, 3B, 4A, 4B and first and second outer connecting conductors 5A, 5B, 6A, 6B) in the multilayer capacitor in accordance with the seventh embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the seventh embodiment can be made easily.

The first conductor portion 91A of the first inner connecting conductor 91 opposes the second inner electrode 83 with the dielectric layer 20 in between. The first conductor portion 100A of the second inner connecting conductor 100 opposes the first inner electrode 70 with the dielectric layer 12 in between. Therefore, in the multilayer capacitor in accordance with the seventh embodiment, the first and second inner connecting conductors 91, 100 can also contribute to forming the capacity component, and thus can further increase the capacitance of the multilayer capacitor.

In the multilayer body of the multilayer capacitor in accordance with the seventh embodiment, a plurality of first and second inner electrodes 70 to 73, 80 to 83 are arranged between the first and second inner connecting conductors 90, 100 and the first and second inner connecting conductors 91, 101. Therefore, the multilayer capacitor in accordance with the seventh embodiment can set the equivalent series resistance with a favorable balance.

The first terminal conductors 3A, 3B and the first outer connecting conductors 5A, 5B are formed adjacent to each other, respectively, on the first side face of the multilayer body in the multilayer capacitor in accordance with the seventh embodiment as in the multilayer capacitor C2. Therefore, the multilayer capacitor in accordance with the seventh embodiment can lower its equivalent series inductance.

The second terminal conductors 4A, 4B and the second outer connecting conductors 6A, 6B are formed adjacent to each other, respectively, on the second side face of the multilayer body in the multilayer capacitor in accordance with the seventh embodiment as in the multilayer capacitor C2. Therefore, the multilayer capacitor in accordance with the seventh embodiment can lower its equivalent series inductance.

In the multilayer capacitor in accordance with the seventh embodiment, the first terminal conductors 3A, 3B and first outer connecting conductors 5A, 5B are arranged by the same number while forming neighboring pairs on the first side face of the multilayer body. Also, in the multilayer capacitor in accordance with the seventh embodiment, the second terminal conductors 4A, 4B and second outer connecting conductors 6A, 6B are arranged by the same number while forming neighboring pairs on the second side face of the multilayer body. Therefore, the multilayer capacitor in accordance with the seventh embodiment can lower its equivalent series inductance more greatly.

In the multilayer capacitor in accordance with the seventh embodiment, about the center axis of the multilayer body, the first terminal conductors 3A, 3B are formed at positions axisymmetrical to the second terminal conductors 4B, 4A, respectively, and the first outer connecting conductors 5A, 5B are formed at positions axisymmetrical to the second outer connecting conductors 6B, 6A, respectively. Also, in the opposing direction of the first and second side faces of the multilayer body in the multilayer capacitor in accordance with the seventh embodiment, the first terminal conductors 3A, 3B oppose the second terminal conductors 4A, 4B, respectively, and the first outer connecting conductors 5A, 5B oppose the second outer connecting conductors 6A, 6B, respectively. Therefore, the multilayer capacitor in accordance with the seventh embodiment can be mounted easily.

Eighth Embodiment

Figure 11:
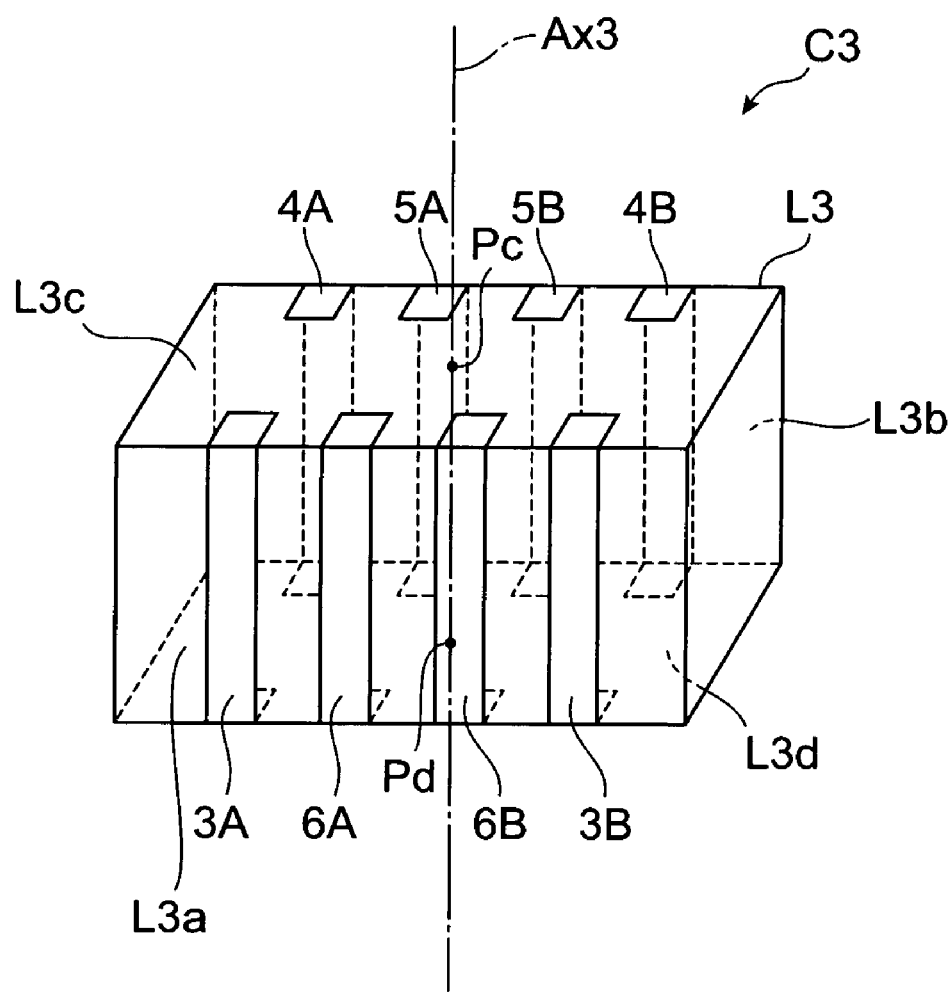
FIG. 11 is a perspective view of the multilayer capacitor in accordance with an eighth embodiment.
Figure 12:
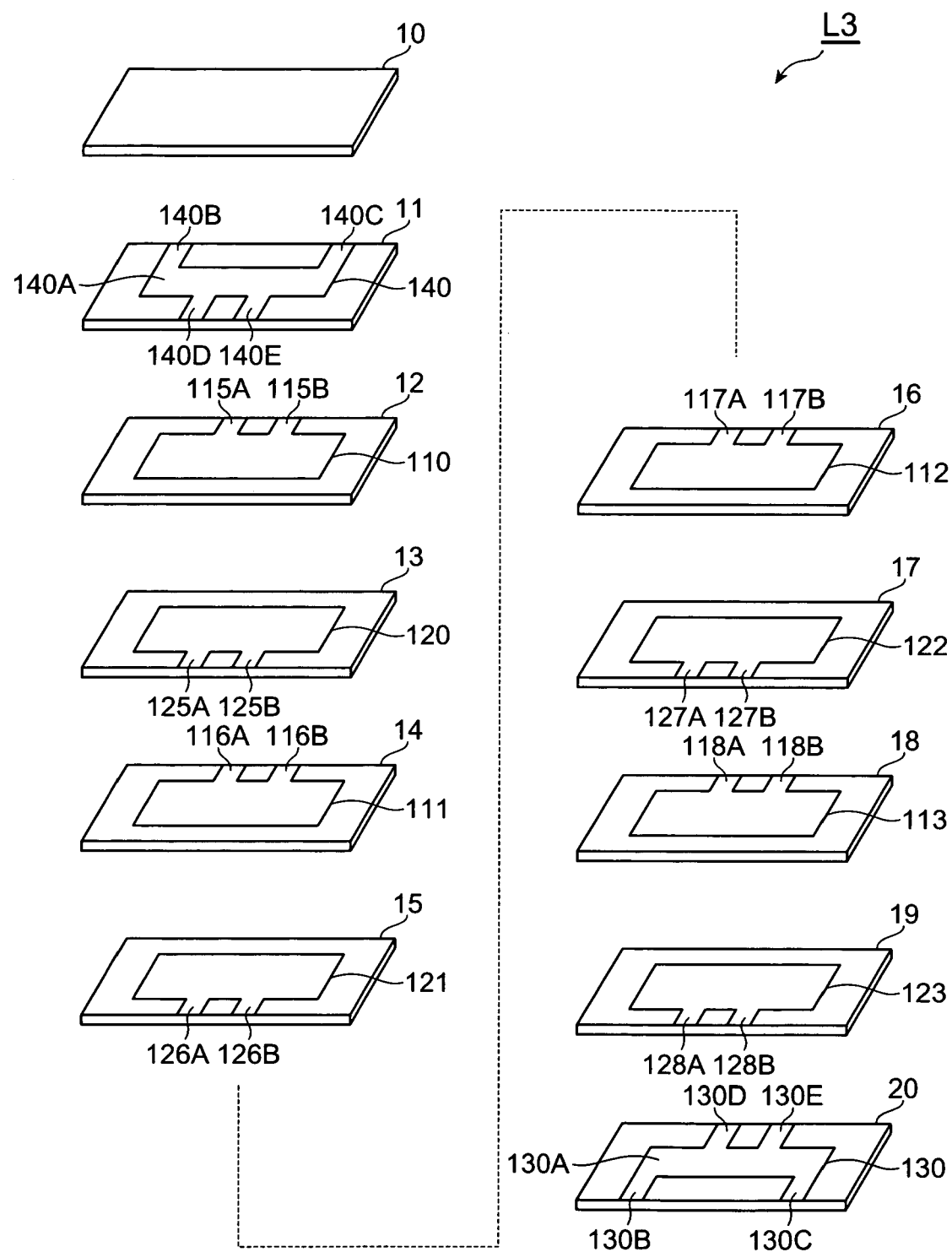
FIG. 12 is an exploded perspective view of the multilayer body included in the multilayer capacitor in accordance with the eighth embodiment.

The configuration of the multilayer capacitor C3 in accordance with an eighth embodiment will be explained with reference to FIGS. 11 and 12. The multilayer capacitor in accordance with the eighth embodiment differs from the multilayer capacitor C1 in accordance with the first embodiment in terms of arrangement of outer conductors formed on the first and second side faces of the multilayer body. FIG. 11 is a perspective view of the multilayer capacitor in accordance with the eighth embodiment. FIG. 12 is an exploded perspective view of the multilayer body included in the multilayer capacitor in accordance with the eighth embodiment.

As shown in FIG. 11, the multilayer capacitor C3 in accordance with the eighth embodiment comprises a multilayer body L3, first terminal conductors 3A, 3B formed on the multilayer body L3, second terminal conductors 4A, 4B similarly formed on the multilayer body, first outer connecting conductors 5A, 5B similarly formed on the multilayer body, and second outer connecting conductors 6A, 6B similarly formed on the multilayer body.

Each of the first terminal conductors 3A, 3B and second outer connecting conductors 6A, 6B is positioned on a first side face L3a which is a side face extending along the longitudinal axis of faces L3c, L3d orthogonal to the laminating direction of the multilayer body L3 among side faces parallel to the laminating direction of the multilayer body. The first terminal conductors 3A, 3B and second outer connecting conductors 6A, 6B are formed such that the first terminal conductor 3A, second outer connecting conductor 6A, second outer connecting conductor 6B, and first terminal conductor 3B are successively arranged from the left side to right side of FIG. 11.

Each of the second terminal conductors 4A, 4B and first outer connecting conductors 5A, 5B is positioned on a second side face L3b which is a side face extending along the longitudinal axis of faces L3c, L3d orthogonal to the laminating direction of the multilayer body L3 among side faces parallel to the laminating direction of the multilayer body L3 while opposing the first side face L3a. The second terminal conductors 4A, 4B and first outer connecting conductors 5A, 5B are formed such that the second terminal conductor 4A, first outer connecting conductor 5A, first outer connecting conductor 5B, and, second terminal conductor 4B are successively arranged from the left side to right side of FIG. 11.

The first terminal conductor 3A and second terminal conductor 4B are axisymmetrical to each other about a center axis Ax3 passing respective center points Pc, Pd of the two side faces L3c, L3d orthogonal to the laminating direction of the multilayer body L3 among center axes of the multilayer body L3. The first terminal conductor 3B and second terminal conductor 4A are axisymmetrical to each other about the center axis Ax3 of the multilayer body L3. The first outer connecting conductor 5A and second outer connecting conductor 6B are axisymmetrical to each other about the center axis Ax3 of the multilayer body L3. The first outer connecting conductor 5B and second outer connecting conductor 6A are axisymmetrical to each other about the center axis Ax3 of the multilayer body L3.

The first terminal conductor 3A and second terminal conductor 4A oppose each other in a direction along which the first side face L3a and second side face L3b of the multilayer body L3 oppose each other. The first terminal conductor 3B and second terminal conductor 4B oppose each other in the opposing direction of the first side face L3a and second side face L3b of the multilayer body L3. The first outer connecting conductor 5A and second outer connecting conductor 6A oppose each other in the opposing direction of the first side face L3a and second side face L3b of the multilayer body L3. The first outer connecting conductor 5B and second outer connecting conductor 6B oppose each other in the opposing direction of the first side face L3a and second side face L3b of the multilayer body L3.

As shown in FIG. 12, the multilayer body L3 is constructed by alternately laminating a plurality of (11 in this embodiment) dielectric layers 10 to 20 and a plurality of (4 each in this embodiment) of first and second inner electrodes 110 to 113, 120 to 123. In the actual multilayer capacitor C3, they are integrated to such an extent that no boundaries are discernible between the dielectric layers 10 to 20.

Further, one first inner connecting conductor 130 and one second inner connecting conductor 140 are laminated in the multilayer body L3. In the multilayer body L3, the plurality of first inner connecting conductors 110 to 113 and the plurality of second inner connecting conductor 120 to 123 are arranged between the second inner connecting conductor 140 and the first inner connecting conductor 130.

Each of the first inner electrodes 110 to 113 has a substantially rectangular form. The plurality of first inner electrodes 110 to 113 are formed at respective positions separated by a predetermined distance from a side face parallel to the laminating direction of the dielectric layers 10 to 20 (hereinafter simply referred to as "laminating direction") in the multilayer body L3.

Each of lead conductors 115A, 115B is integrally formed with the first inner electrode 110 so as to extend therefrom and reach the second side face L3b of the multilayer body L3. Each of lead conductors 116A, 116B is integrally formed with the first inner electrode 111 so as to extend therefrom and reach the second side face L3b of the multilayer body L3. Each of lead conductors 117A, 117B is integrally formed with the first inner electrode 112 so as to extend therefrom and reach the second side face L3b of the multilayer body L3. Each of the lead conductors 118A, 118B is integrally formed with the first inner electrode 113 so as to extend therefrom and reach the second side face L3b of the multilayer body L3.

The first inner electrode 110 is electrically connected to the first outer connecting conductors 5A and 5B through the lead conductors 115A and 115B, respectively. The first inner electrode 111 is electrically connected to the first outer connecting conductors 5A and 5B through the lead conductors 116A and 116B, respectively. The first inner electrode 112 is electrically connected to the first outer connecting conductors 5A and 5B through the lead conductors 117A and 117B, respectively. The first inner electrode 113 is electrically connected to the first outer connecting conductors 5A and 5B through the lead conductors 118A and 118B, respectively. As a consequence, the plurality of first inner electrodes 110 to 113 are electrically connected to each other through the first outer connecting conductors 5A, 5B.

Each of the second inner electrodes 120 to 123 has a substantially rectangular form. The plurality of second inner electrodes 120 to 123 are formed at respective positions separated by a predetermined distance from a side face parallel to the laminating direction of the multilayer body L3.

Each of lead conductors 125A, 125B is integrally formed with the second inner electrode 120 so as to extend therefrom and reach the first side face L3a of the multilayer body L3. Each of lead conductors 126A, 126B is integrally formed with the second inner electrode 121 so as to extend therefrom and reach the first side face L3a of the multilayer body L3. Each of lead conductors 127A, 127B is integrally formed with the second inner electrode 122 so as to extend therefrom and reach the first side face L3a of the multilayer body L3. Each of lead conductors 128A, 128B is integrally formed with the second inner electrode 123 so as to extend therefrom and reach the first side face L3a of the multilayer body L3.

The second inner electrode 120 is electrically connected to the second outer connecting conductors 6A and 6B through the lead conductors 125A and 125B, respectively. The second inner electrode 121 is electrically connected to the second outer connecting conductors 6A and 6B through the lead conductors 126A and 126B, respectively. The second inner electrode 122 is electrically connected to the second outer connecting conductors 6A and 6B through the lead conductors 127A and 127B, respectively. The second inner electrode 123 is electrically connected to the second outer connecting conductors 6A and 6B through the lead conductors 128A and 128B, respectively. As a consequence, the plurality of second inner electrodes 120 to 123 are electrically connected to each other through the first outer connecting conductors 6A, 6B.

The first inner connecting conductor 130 is positioned so as to be held between the dielectric layers 19 and 20. The second inner connecting conductor 140 is positioned so as to be held between the dielectric layers 10 and 11. The first and second inner connecting conductors 130, 140 are electrically insulated from each other.

The first inner connecting conductor 130 includes a first conductor portion 130A having an oblong form, second and third conductor portions 130B, 130C extending from the first conductor portion 130A so as to be taken out to the first side face L3a of the multilayer body L3, and fourth and fifth conductor portions 130D, 130E extending from the first conductor portion 130A so as to be taken out to the second side face L3b of the multilayer body L3. The first conductor portion 130A is arranged such that its longitudinal axis is parallel to the first and second side faces L3a, L3b of the multilayer body L3.

The second inner connecting conductor 140 includes a first conductor portion 140A having an oblong form, second and third conductor portions 140B, 140C extending from the first conductor portion 140A so as to be taken out to the second side face L3b of the multilayer body L3, and fourth and fifth conductor portions 140D, 140E extending from the first conductor portion 140A so as to be taken out to the first side face L3a of the multilayer body L3. The first conductor portion 140A is arranged such that its longitudinal axis is parallel to the first and second side faces L3a, L3b of the multilayer body L3.

In the first inner connecting conductor 130, the second, third, fourth, and fifth conductor portions 130B, 130C, 130D, and 130E are electrically connected to the first terminal conductor 3A, first terminal conductor 3B, first outer connecting conductor 5A, and first outer connecting conductor 5B, respectively. As a consequence, the first inner connecting conductor 130 is electrically connected to the first terminal conductors 3A, 3B and first outer connecting conductors 5A, 5B.

In the second inner connecting conductor 140, the second, third, fourth, and fifth conductor portions 140B, 140C, 140D, and 140E are electrically connected to the second terminal conductor 4A, second terminal conductor 4B, second outer connecting conductor 6A, and second outer connecting conductor 6B, respectively. As a consequence, the second inner connecting conductor 140 is electrically connected to the second terminal conductors 4A, 4B and second outer connecting conductors 6A, 6B.

The first conductor portion 130A of the first inner connecting conductor 130 is a region opposing the second inner electrode 123 with the dielectric layer 19 in between. The second conductor portion 140A of the second inner connecting conductor 140 is a region opposing the first inner electrode 110 with the dielectric layer 11 in between.

The first and second inner connecting conductors 110, 120 are laminated in the multilayer body L3 such that the multilayer body L3 includes at least one set (4 sets in this embodiment) of first and second inner electrodes neighboring each other with the dielectric layer in between.

In the multilayer capacitor C3, the first terminal conductors 3A, 3B are connected to the first inner electrodes 110 to 113 not directly, but electrically through the first outer connecting conductors 5A, 5B and first inner connecting conductor 130. Also, in the multilayer capacitor C3, the second terminal conductors 4A, 4B are connected to the second inner electrodes 120 to 123 not directly, but electrically through the second outer connecting conductors 6A, 6B and second inner connecting conductor 140. As a consequence, the multilayer capacitor C3 yields an equivalent series resistance greater than that of the conventional multilayer capacitor in which all the inner electrodes are connected to their corresponding terminal conductors through lead conductors.

By adjusting the number of first inner connecting conductor 130 directly connected to the first terminal conductors 3A, 3B and the number of second inner connecting conductor 140 directly connected to the second terminal conductors 4A, 4B in such a manner, this embodiment sets the equivalent series resistance of the multilayer capacitor C3 to a desirable value, and thus can regulate the equivalent series resistance easily with a high precision. Also, since the equivalent series resistance is controlled by the first and second inner connecting conductors, the multilayer capacitor C3 can regulate the equivalent series resistance while setting its capacitance to a desirable value (e.g., a larger value).

All of the first and second terminal conductors 3A, 3B, 4A, 4B and first and second outer connecting conductors 5A, 5B, 6A, 6B, which are outer conductors of the multilayer capacitor C3, are formed on the first and second side faces L3a, L3b of the multilayer body L3 opposing each other. Therefore, as compared with the case where outer conductors are formed on four side faces of the multilayer body L2, the multilayer capacitor C3 can reduce steps required for forming the outer conductors. As a consequence, the multilayer capacitor C3 can be made easily.

The first conductor portion 130A of the first inner connecting conductor 130 opposes the second inner electrode 123 with the dielectric layer 19 in between. The first conductor portion 140A of the second inner connecting conductor 140 opposes the first inner electrode 110 with the dielectric layer 11 in between. Therefore, the first and second inner connecting conductor 130, 140 can also contribute to forming the capacity component in the multilayer capacitor C3, whereby the multilayer capacitor C3 can further increase its capacitance.

Since a plurality of first and second inner electrodes 110 to 113, 120 to 123 are arranged between the first inner connecting conductor 130 and second inner connecting conductor 140, the multilayer body L3 of the multilayer capacitor C3 can set the equivalent series resistance with a favorable balance.

In the multilayer capacitor C3, about the center axis Ax3 of the multilayer body L3, the first terminal conductors 3A, 3B are formed at positions axisymmetrical to the second terminal conductors 4B, 4A, respectively, and the first outer connecting conductors 5A, 5B are formed at positions axisymmetrical to the second outer connecting conductors 6B, 6A, respectively. Also, in the opposing direction of the first side face L3a and second side face L3b of the multilayer body L3 in the multilayer capacitor C3, the first terminal conductors 3A, 3B oppose the second terminal conductors 4A, 4B, respectively, and the first outer connecting conductors 5A, 5B oppose the second outer connecting conductors 6A, 6B, respectively. Therefore, the multilayer capacitor C3 can be mounted easily.

Ninth Embodiment

Figure 13:
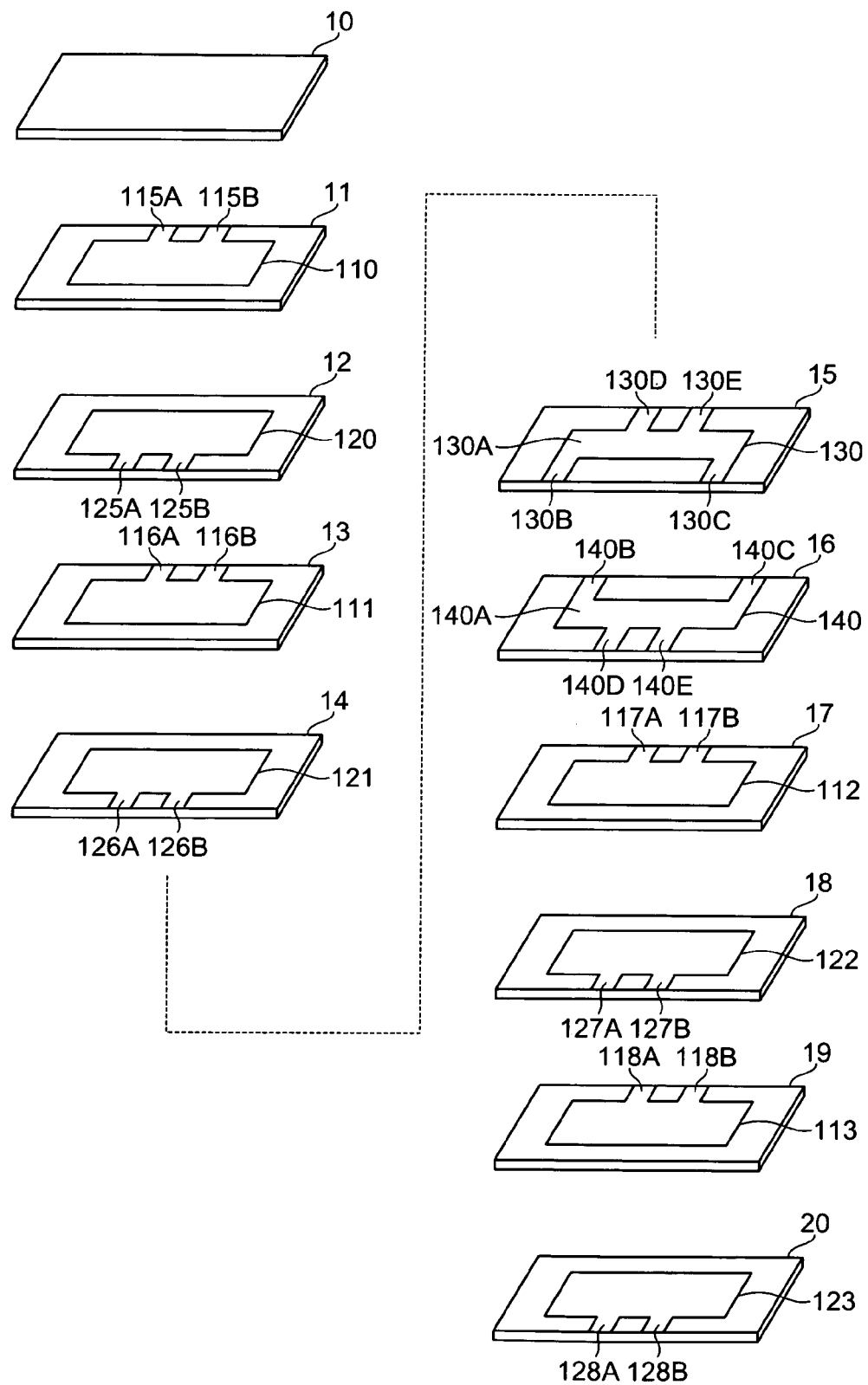
FIG. 13 is an exploded perspective view of the multilayer body included in the multilayer capacitor in accordance with a ninth embodiment.

The configuration of the multilayer capacitor in accordance with a ninth embodiment will be explained with reference to FIG. 13. The multilayer capacitor in accordance with the ninth embodiment differs from the multilayer capacitor C3 in accordance with the eighth embodiment in terms of positions of the first and second inner connecting conductors 130, 140 in the laminating direction. FIG. 13 is an exploded perspective view of the multilayer body included in the multilayer capacitor in accordance with the ninth embodiment.

As with the multilayer capacitor C3 in accordance with the eighth embodiment, the multilayer capacitor in accordance with the ninth embodiment comprises a multilayer body, first terminal conductors 3A, 3B formed on the multilayer body, second terminal conductors 4A, 4B similarly formed on the multilayer body, first outer connecting conductors 5A, 5B similarly formed on the multilayer body, and second outer connecting conductors 6A, 6B similarly formed on the multilayer body, though they are not depicted.

In the multilayer capacitor in accordance with the ninth embodiment, the first and second inner connecting conductors 130, 140, provided one by one, are laminated between two layers each of first and second inner electrodes 110, 111, 120, 121 and two layers each of first and second inner electrodes 112, 113, 122, 123 as shown in FIG. 13. More specifically, the first inner connecting conductor 130 is positioned so as to be held between dielectric layers 14 and 15. The second inner connecting conductor 140 is positioned so as to be held between dielectric layers 15 and 16.

The first and second inner connecting conductors 130, 140 are laminated in the multilayer body such that the multilayer body includes at least one set (4 sets in this embodiment) of first and second inner electrodes neighboring each other with the dielectric layer in between.

In the multilayer capacitor in accordance with the ninth embodiment, the first terminal conductors 3A, 3B are connected to the first inner electrodes 110 to 113 not directly, but electrically through the first outer connecting conductors 5A, 5B and first inner connecting conductor 130. Also, in the multilayer capacitor in accordance with the ninth embodiment, the second terminal conductors 4A, 4B are connected to the second inner electrodes 120 to 123 not directly, but electrically through the second outer connecting conductors 6A, 6B and second inner connecting conductor 140. As a consequence, the multilayer capacitor in accordance with the ninth embodiment yields an equivalent series resistance greater than that of the conventional multilayer capacitor in which all the inner electrodes are connected to their corresponding terminal conductors through lead conductors.

Meanwhile, when the first terminal conductors 3A, 3B are concerned, the multilayer capacitor in accordance with the ninth embodiment differs from the multilayer capacitor C3 in accordance with the eighth embodiment in terms of how the respective resistance components of the first outer connecting conductors 5A, 5B are connected to the first terminal conductors 3A, 3B. In the multilayer capacitor C3 in accordance with the eighth embodiment, the respective resistance components of the first outer connecting conductors 5A, 5B are connected in series to the first inner connecting conductor 130, so as to be connected to the first terminal conductors 3A, 3B. In the multilayer capacitor in accordance with the ninth embodiment, on the other hand, each of the resistance components of the first outer connecting conductors 5A, 5B is split at the first inner connecting conductor 130 as a boundary, and the resulting resistance components are connected in parallel to their corresponding first terminal conductors 3A, 3B.

When the second terminal conductors 4A, 4B are concerned, the multilayer capacitor in accordance with the ninth embodiment differs from the multilayer capacitor C3 in accordance with the eighth embodiment in terms of how the respective resistance components of the second outer connecting conductors 6A, 6B are connected to the second terminal conductors 4A, 4B. In the multilayer capacitor C3 in accordance with the eighth embodiment, the respective resistance components of the second outer connecting conductors 6A, 6B are connected in series to the second inner connecting conductor 140, so as to be connected to the second terminal conductors 4A, 4B. In the multilayer capacitor in accordance with the ninth embodiment, on the other hand, each of the resistance components of the second outer connecting conductors 6A, 6B is split at the second inner connecting conductor 140 as a boundary, and the resulting resistance components are connected in parallel to their corresponding second terminal conductors 4A, 4B. Therefore, because of the difference in resistance components of the first and second outer connecting conductors 5A, 5B, 6A, 6B, the multilayer capacitor in accordance with the ninth embodiment yields an equivalent series resistance smaller than that of the multilayer capacitor C3 in accordance with the eighth embodiment.

As in the foregoing, by adjusting the positions of the first inner connecting conductor 130 directly connected to the first terminal conductors 3A, 3B and the second inner connecting conductor 140 directly connected to the second terminal conductors 4A, 4B in the laminating direction, this embodiment sets the equivalent series resistance of the multilayer capacitor to a desirable value, and thus can regulate the equivalent series resistance easily with a high precision. Also, since the equivalent series resistance is controlled by the first and second inner connecting conductors, the multilayer capacitor in accordance with the ninth embodiment can regulate the equivalent series resistance while setting its capacitance to a desirable value (e.g., a larger value).

All the outer conductors (first and second terminal conductors 3A, 3B, 4A, 4B and first and second outer connecting conductors 5A, 5B, 6A, 6B) in the multilayer capacitor in accordance with the ninth embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the ninth embodiment can be made easily.

The first conductor portion 130A of the first inner connecting conductor 130 opposes the second inner electrode 121 with the dielectric layer 14 in between. The first conductor portion 140A of the second inner connecting conductor 140 opposes the first inner electrode 112 with the dielectric layer 16 in between. Therefore, in the multilayer capacitor in accordance with the ninth embodiment, the first and second inner connecting conductors 130, 140 can also contribute to forming the capacity component, and thus can further increase the capacitance of the multilayer capacitor.

In the multilayer capacitor in accordance with the ninth embodiment, about the center axis of the multilayer body, the first terminal conductors 3A, 3B are formed at positions axisymmetrical to the second terminal conductors 4B, 4A, respectively, and the first outer connecting conductors 5A, 5B are formed at positions axisymmetrical to the second outer connecting conductors 6B, 6A, respectively. Also, in the opposing direction of the first and second side faces of the multilayer body in the multilayer capacitor in accordance with the ninth embodiment, the first terminal conductors 3A, 3B oppose the second terminal conductors 4A, 4B, respectively, and the first outer connecting conductors 5A, 5B oppose the second outer connecting conductors 6A, 6B, respectively. Therefore, the multilayer capacitor in accordance with the ninth embodiment can be mounted easily.

Tenth Embodiment

Figure 14:
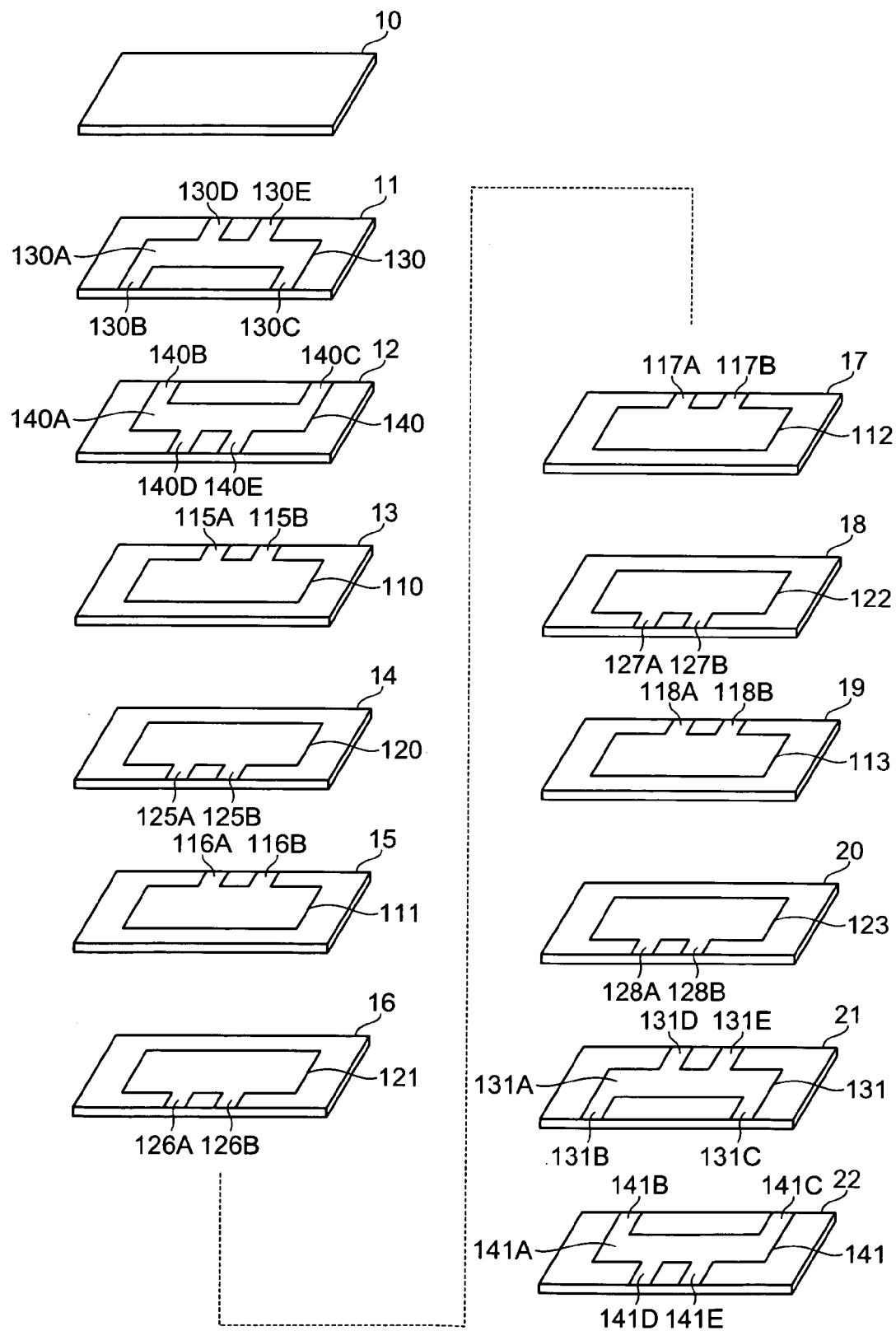
FIG. 14 is an exploded perspective view of the multilayer body included in the multilayer capacitor in accordance with a tenth embodiment.

The configuration of the multilayer capacitor in accordance with a tenth embodiment will be explained with reference to FIG. 14. The multilayer capacitor in accordance with the tenth embodiment differs from the multilayer capacitor C3 in accordance with the eighth embodiment in terms of the number of inner connecting conductors. FIG. 14 is an exploded perspective view of the multilayer body included in the multilayer capacitor in accordance with the tenth embodiment.

As with the multilayer capacitor C3 in accordance with the eighth embodiment, the multilayer capacitor in accordance with the tenth embodiment comprises a multilayer body, first terminal conductors 3A, 3B formed on the multilayer body, second terminal conductors 4A, 4B similarly formed on the multilayer body, first outer connecting conductors 5A, 5B similarly formed on the multilayer body, and second outer connecting conductors 6A, 6B similarly formed on the multilayer body, though they are not depicted.

The multilayer capacitor in accordance with the tenth embodiment is constructed by alternately laminating a plurality of (13 in this embodiment) dielectric layers 10 to 22 and a plurality of (4 each in this embodiment) of first and second inner electrodes 110 to 113, 120 to 123 as shown in FIG. 14.

In the multilayer body of the multilayer capacitor in accordance with the tenth embodiment, a plurality of (2 each in this embodiment) of first inner connecting conductors 130, 131 and a plurality of (2 each in this embodiment) of second inner connecting conductors 140, 141 are laminated. In the multilayer body of the multilayer capacitor in accordance with the tenth embodiment, four layers of first inner electrodes 110 to 113 and four layers of second inner electrodes 120 to 123 are arranged between one each of the first and second inner connecting conductors 130, 140 which are a part of the plurality of inner connecting conductors 130, 131, 140, 141 and the remaining first and second inner connecting conductors 131, 141.

In the multilayer capacitor in accordance with the tenth embodiment, the first inner connecting conductor 130 is positioned so as to be held between the dielectric layers 10 and 11. The first inner connecting conductor 131 is positioned so as to be held between the dielectric layers 20 and 21. The second inner connecting conductor 140 is positioned so as to be held between the dielectric layers 11 and 12. The second inner connecting conductor 141 is positioned so as to be held between the dielectric layers 21 and 22.

The first and second inner connecting conductors 130, 131, 140, 141 are laminated in the multilayer body such that the multilayer body includes at least one set (4 sets in this embodiment) of first and second inner electrodes neighboring each other with the dielectric layer in between.

In the multilayer capacitor in accordance with the tenth embodiment, the first terminal conductors 3A, 3B are connected to the first inner electrodes 110 to 113 not directly, but electrically through the first outer connecting conductors 5A, 5B and first inner connecting conductors 130, 131. Also, in the multilayer capacitor in accordance with the tenth embodiment, the second terminal conductors 4A, 4B are connected to the second inner electrodes 120 to 123 not directly, but electrically through the second outer connecting conductors 6A, 6B and second inner connecting conductors 140, 141. As a consequence, the multilayer capacitor in accordance with the tenth embodiment yields an equivalent series resistance greater than that of the conventional multilayer capacitor in which all the inner electrodes are connected to their corresponding terminal conductors through lead conductors.

As compared with the multilayer capacitor C3, the multilayer capacitor in accordance with the tenth embodiment has a greater number of first inner connecting conductors 130, 131, whereas the first inner connecting conductors 130, 131 are connected in parallel to their corresponding first terminal conductors 3A, 3B. Also, the multilayer capacitor in accordance with the tenth embodiment has a greater number of second inner connecting conductors 140, 141 than that in the multilayer capacitor C3, whereas the second inner connecting conductors 140, 141 are connected in parallel to their corresponding second terminal conductors 4A, 4B. Therefore, the multilayer capacitor in accordance with the tenth embodiment yields an equivalent series resistance smaller than that of the multilayer capacitor C3.

As in the foregoing, by adjusting the number of first inner connecting conductors 130, 131 directly connected to the first terminal conductors 3A, 3B and the second inner connecting conductors 140, 141 directly connected to the second terminal conductors 4A, 4B, this embodiment sets the equivalent series resistance of the multilayer capacitor to a desirable value, and thus can regulate the equivalent series resistance easily with a high precision. Also, since the equivalent series resistance is controlled by the first and second inner connecting conductors, the multilayer capacitor in accordance with the tenth embodiment can regulate the equivalent series resistance while setting its capacitance to a desirable value (e.g., a larger value).

All the outer conductors (first and second terminal conductors 3A, 3B, 4A, 4B and first and second outer connecting conductors 5A, 5B, 6A, 6B) in the multilayer capacitor in accordance with the tenth embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the tenth embodiment can be made easily.

The first conductor portion 131A of the first inner connecting conductor 131 opposes the second inner electrode 123 with the dielectric layer 20 in between. The first conductor portion 140A of the second inner connecting conductor 140 opposes the first inner electrode 110 with the dielectric layer 12 in between. Therefore, in the multilayer capacitor in accordance with the tenth embodiment, the first and second inner connecting conductors 131, 140 can also contribute to forming the capacity component, and thus can further increase the capacitance of the multilayer capacitor.

In the multilayer body of the multilayer capacitor in accordance with the tenth embodiment, a plurality of first and second inner electrodes 110 to 113, 120 to 123 are arranged between the first and second inner connecting conductors 130, 140 and the first and second inner connecting conductors 131, 141. Therefore, the multilayer capacitor in accordance with the tenth embodiment can set the equivalent series resistance with a favorable balance.

In the multilayer capacitor in accordance with the tenth embodiment, about the center axis of the multilayer body, the first terminal conductors 3A, 3B are formed at positions axisymmetrical to the second terminal conductors 4B, 4A, respectively, and the first outer connecting conductors 5A, 5B are formed at positions axisymmetrical to the second outer connecting conductors 6B, 6A, respectively. Also, in the opposing direction of the first and second side faces of the multilayer body in the multilayer capacitor in accordance with the tenth embodiment, the first terminal conductors 3A, 3B oppose the second terminal conductors 4A, 4B, respectively, and the first outer connecting conductors 5A, 5B oppose the second outer connecting conductors 6A, 6B, respectively. Therefore, the multilayer capacitor in accordance with the tenth embodiment can be mounted easily.

Eleventh Embodiment

Figure 15:
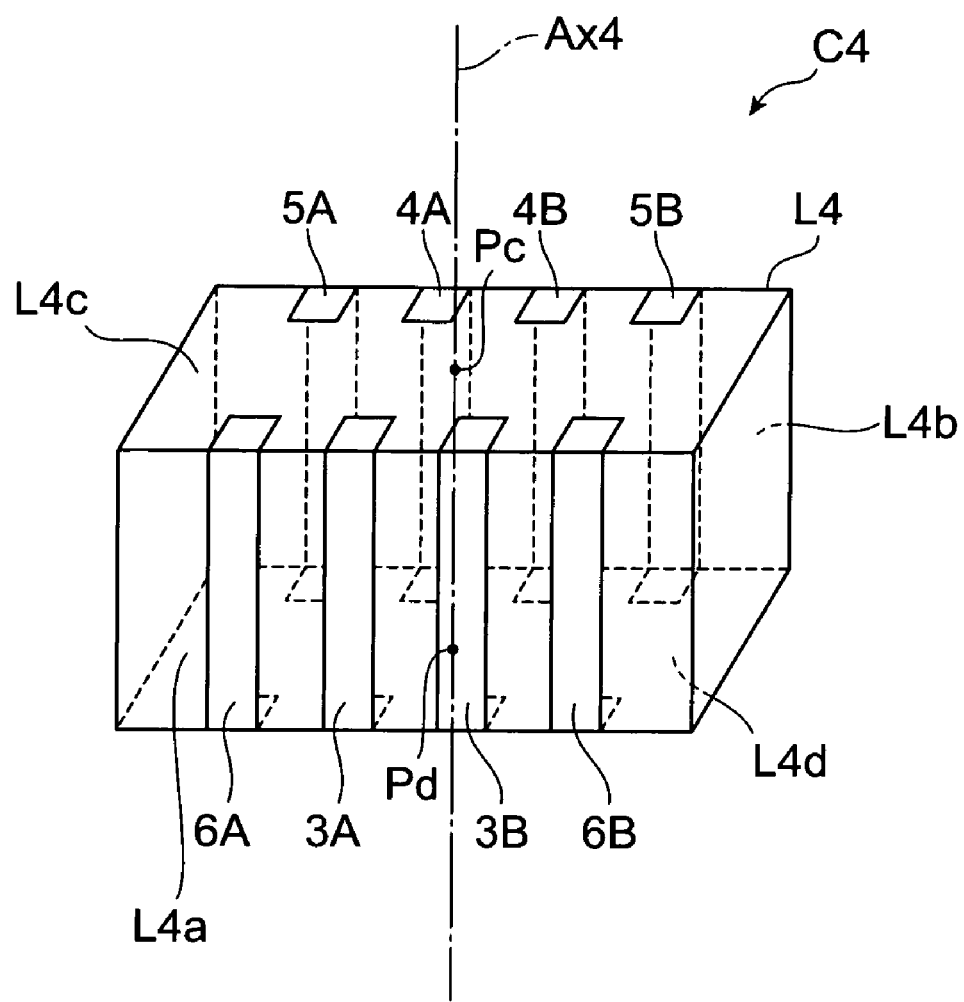
FIG. 15 is a perspective view of the multilayer capacitor in accordance with an eleventh embodiment.
Figure 16:
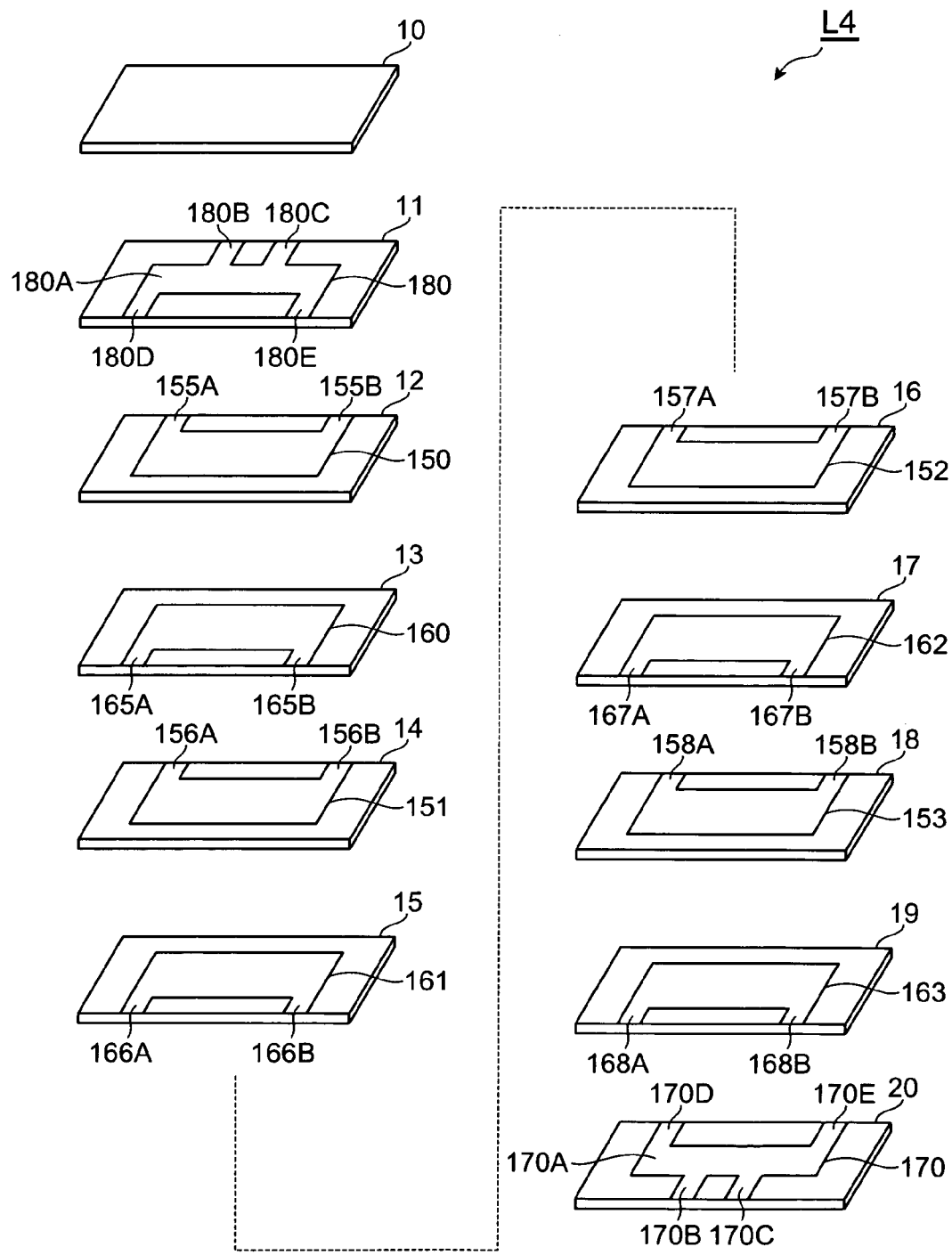
FIG. 16 is an exploded perspective view of the multilayer body included in the multilayer capacitor in accordance with the eleventh embodiment.

The configuration of the multilayer capacitor C4 in accordance with an eleventh embodiment will be explained with reference to FIGS. 15 and 16. The multilayer capacitor in accordance with the eleventh embodiment differs from the multilayer capacitor C1 in accordance with the first embodiment in terms of arrangement of outer conductors formed on the first and second side faces of the multilayer body. FIG. 15 is a perspective view of the multilayer capacitor in accordance with the eleventh embodiment. FIG. 16 is an exploded perspective view of the multilayer body included in the multilayer capacitor in accordance with the eleventh embodiment.

As shown in FIG. 15, the multilayer capacitor C4 in accordance with the eleventh embodiment comprises a multilayer body L4, first terminal conductors 3A, 3B formed on the multilayer body L4, second terminal conductors 4A, 4B similarly formed on the multilayer body, first outer connecting conductors 5A, 5B similarly formed on the multilayer body, and second outer connecting conductors 6A, 6B similarly formed on the multilayer body.

Each of the first terminal conductors 3A, 3B and second outer connecting conductors 6A, 6B is positioned on a first side face L4$a$ which is a side face extending along the longitudinal axis of faces L4$c$, L4$d$ orthogonal to the laminating direction of the multilayer body L4 among side faces parallel to the laminating direction of the multilayer body. The first terminal conductors 3A, 3B and second outer connecting conductors 6A, 6B are formed such that the second outer connecting conductor 6A, first terminal conductor 3A, first terminal conductor 3B, and second outer connecting conductor 6B are successively arranged from the left side to right side of FIG. 15.

Each of the second terminal conductors 4A, 4B and first outer connecting conductors 5A, 5B is positioned on a second side face L4$b$ which is a side face extending along the longitudinal axis of faces L4$c$, L4$d$ orthogonal to the laminating direction of the multilayer body L4 among side faces parallel to the laminating direction of the multilayer body L4 while opposing the first side face L4$a$. The second terminal conductors 4A, 4B and first outer connecting conductors 5A, 5B are formed such that the first outer connecting conductor 5A, second terminal conductor 4A, second terminal conductor 4B, and first outer connecting conductor 5B are successively arranged from the left side to right side of FIG. 15.

The first terminal conductor 3A and second terminal conductor 4B are positioned axisymmetrical to each other about a center axis Ax4 passing respective center points Pc, Pd of the two side faces L4$c$, L4$d$ orthogonal to the laminating direction of the multilayer body L4 among center axes of the multilayer body L4. The first terminal conductor 3B and second terminal conductor 4A are positioned axisymmetrical to each other about the center axis Ax4 of the multilayer body L4. The first outer connecting conductor 5A and second outer connecting conductor 6B are positioned axisymmetrical to each other about the center axis Ax4 of the multilayer body L4. The first outer connecting conductor 5B and second outer connecting conductor 6A are positioned axisymmetrical to each other about the center axis Ax4 of the multilayer body L4.

The first terminal conductor 3A and second terminal conductor 4A oppose each other in a direction along which the first side face L4a and second side face L4b of the multilayer body L4 oppose each other. The first terminal conductor 3B and second terminal conductor 4B oppose each other in the opposing direction of the first side face L4a and second side face L4b of the multilayer body L4. The first outer connecting conductor 5A and second outer connecting conductor 6A oppose each other in the opposing direction of the first side face L4a and second side face L4b of the multilayer body L4. The first outer connecting conductor 5B and second outer connecting conductor 6B oppose each other in the opposing direction of the first side face L4a and second side face L4b of the multilayer body L4.

As shown in FIG. 16, the multilayer body L4 is constructed by alternately laminating a plurality of (11 in this embodiment) dielectric layers 10 to 20 and a plurality of (4 each in this embodiment) of first and second inner electrodes 150 to 153, 160 to 163. In the actual multilayer capacitor C4, they are integrated to such an extent that no boundaries are discernible between the dielectric layers 10 to 20.

Further, one first inner connecting conductor 170 and one second inner connecting conductor 180 are laminated in the multilayer body L4. In the multilayer body L4, the plurality of first inner connecting conductors 150 to 153 and the plurality of second inner connecting conductor 160 to 163 are arranged between the second inner connecting conductor 180 and the first inner connecting conductor 170.

Each of the first inner electrodes 150 to 153 has a substantially rectangular form. The plurality of first inner electrodes 150 to 153 are formed at respective positions separated by a predetermined distance from a side face parallel to the laminating direction of the dielectric layers 10 to 20 (hereinafter simply referred to as "laminating direction") in the multilayer body L4.

Each of lead conductors 155A, 155B is integrally formed with the first inner electrode 150 so as to extend therefrom and reach the second side face L4b of the multilayer body L4. Each of lead conductors 156A, 156B is integrally formed with the first inner electrode 151 so as to extend therefrom and reach the second side face L4b of the multilayer body L4. Each of lead conductors 157A, 157B is integrally formed with the first inner electrode 152 so as to extend therefrom and reach the second side face L4b of the multilayer body L4. Each of lead conductors 158A, 158B is integrally formed with the first inner electrode 153 so as to extend therefrom and reach the second side face L4b of the multilayer body L4.

The first inner electrode 150 is electrically connected to the first outer connecting conductors 5A and 5B through the lead conductors 155A and 155B, respectively. The first inner electrode 151 is electrically connected to the first outer connecting conductors 5A and 5B through the lead conductors 156A and 156B, respectively. The first inner electrode 152 is electrically connected to the first outer connecting conductors 5A and 5B through the lead conductors 157A and 157B, respectively. The first inner electrode 153 is electrically connected to the first outer connecting conductors 5A and 5B through the lead conductors 158A and 158B, respectively. As a consequence, the plurality of first inner electrodes 150 to 153 are electrically connected to each other through the first outer connecting conductors 5A, 5B.

Each of the second inner electrodes 160 to 163 has a substantially rectangular form. The plurality of second inner electrodes 160 to 163 are formed at respective positions separated by a predetermined distance from a side face parallel to the laminating direction of the multilayer body L4.

Each of lead conductors 165A, 165B is integrally formed with the second inner electrode 160 so as to extend therefrom and reach the first side face L4a of the multilayer body L4. Each of lead conductors 166A, 166B is integrally formed with the second inner electrode 161 so as to extend therefrom and reach the first side face L4a of the multilayer body L4. Each of lead conductors 167A, 167B is integrally formed with the second inner electrode 162 so as to extend therefrom and reach the first side face L4a of the multilayer body L4. Each of lead conductors 168A, 168B is integrally formed with the second inner electrode 163 so as to extend therefrom and reach the first side face L4a of the multilayer body L4.

The second inner electrode 160 is electrically connected to the second outer connecting conductors 6A and 6B through the lead conductors 165A and 165B, respectively. The second inner electrode 161 is electrically connected to the second outer connecting conductors 6A and 6B through the lead conductors 166A and 166B, respectively. The second inner electrode 162 is electrically connected to the second outer connecting conductors 6A and 6B through the lead conductors 167A and 167B, respectively. The second inner electrode 163 is electrically connected to the second outer connecting conductors 6A and 6B through the lead conductors 168A and 168B, respectively. As a consequence, the plurality of second inner electrodes 160 to 163 are electrically connected to each other through the first outer connecting conductors 6A, 6B.

The first inner connecting conductor 170 is positioned so as to be held between the dielectric layers 19 and 20. The second inner connecting conductor 180 is positioned so as to be held between the dielectric layers 10 and 11. The first and second inner connecting conductors 170, 180 are electrically insulated from each other.

The first inner connecting conductor 170 includes a first conductor portion 170A having an oblong form, second and third conductor portions 170B, 170C extending from the first conductor portion 170A so as to be taken out to the first side face L4a of the multilayer body L4, and fourth and fifth conductor portions 170D, 170E extending from the first conductor portion 170A so as to be taken out to the second side face L4b of the multilayer body L4. The first conductor portion 170A is arranged such that its longitudinal axis is parallel to the first and second side faces L4a, L4b of the multilayer body L4.

The second inner connecting conductor 180 includes a first conductor portion 180A having an oblong form, second and third conductor portions 180B, 180C extending from the first conductor portion 180A so as to be taken out to the second side face L4b of the multilayer body L4, and fourth and fifth conductor portions 180D, 180E extending from the first conductor portion 180A so as to be taken out to the first side face L4a of the multilayer body L4. The first conductor portion 180A is arranged such that its longitudinal axis is parallel to the first and second side faces L4a, L4b of the multilayer body L4.

In the first inner connecting conductor 170, the second, third, fourth, and fifth conductor portions 170B, 170C, 170D, and 170E are electrically connected to the first terminal conductor 3A, first terminal conductor 3B, first outer connecting conductor 5A, and first outer connecting conductor 5B, respectively. As a consequence, the first inner connecting conductor 170 is electrically connected to the first terminal conductors 3A, 3B and first outer connecting conductors 5A, 5B.

In the second inner connecting conductor 180, the second, third, fourth, and fifth conductor portions 180B, 180C, 180D, and 180E are electrically connected to the second terminal conductor 4A, second terminal conductor 4B, second outer connecting conductor 6A, and second outer connecting conductor 6B, respectively. As a consequence, the second inner connecting conductor 180 is electrically connected to the second terminal conductors 4A, 4B and second outer connecting conductors 6A, 6B.

The first conductor portion 170A of the first inner connecting conductor 170 is a region opposing the second inner electrode 163 with the dielectric layer 19 in between. The second conductor portion 180A of the second inner connecting conductor 180 is a region opposing the first inner electrode 150 with the dielectric layer 11 in between.

The first and second inner connecting conductors 150, 160 are laminated in the multilayer body L4 such that the multilayer body L4 includes at least one set (4 sets in this embodiment) of first and second inner electrodes neighboring each other with the dielectric layer in between.

In the multilayer capacitor C4, the first terminal conductors 3A, 3B are connected to the first inner electrodes 150 to 153 not directly, but electrically through the first outer connecting conductors 5A, 5B and first inner connecting conductor 170. Also, in the multilayer capacitor C4, the second terminal conductors 4A, 4B are connected to the second inner electrodes 160 to 163 not directly, but electrically through the second outer connecting conductors 6A, 6B and second inner connecting conductor 180. As a consequence, the multilayer capacitor C4 yields an equivalent series resistance greater than that of the conventional multilayer capacitor in which all the inner electrodes are connected to their corresponding terminal conductors through lead conductors.

By adjusting the number of first inner connecting conductor 170 directly connected to the first terminal conductors 3A, 3B and the number of second inner connecting conductor 180 directly connected to the second terminal conductors 4A, 4B in such a manner, this embodiment sets the equivalent series resistance of the multilayer capacitor C4 to a desirable value, and thus can regulate the equivalent series resistance easily with a high precision. Also, since the equivalent series resistance is controlled by the first and second inner connecting conductors, the multilayer capacitor C4 can regulate the equivalent series resistance while setting its capacitance to a desirable value (e.g., a larger value).

All of the first and second terminal conductors 3A, 3B, 4A, 4B and first and second outer connecting conductors 5A, 5B, 6A, 6B, which are outer conductors of the multilayer capacitor C4, are formed on the first and second side faces L4a, L4b of the multilayer body L4 opposing each other. Therefore, as compared with the case where outer conductors are formed on four side faces of the multilayer body L4, for example, the multilayer capacitor C4 can reduce steps required for forming the outer conductors. As a consequence, the multilayer capacitor C4 can be made easily.

The first conductor portion 170A of the first inner connecting conductor 170 opposes the second inner electrode 163 with the dielectric layer 19 in between. The first conductor portion 180A of the second inner connecting conductor 180 opposes the first inner electrode 150 with the dielectric layer 11 in between. Therefore, the first and second inner connecting conductor 170, 180 can also contribute to forming the capacity component in the multilayer capacitor C4, whereby the multilayer capacitor C4 can further increase its capacitance.

Since a plurality of first and second inner electrodes 150 to 153, 160 to 163 are arranged between the first inner connecting conductor 170 and second inner connecting conductor 180, the multilayer body L4 of the multilayer capacitor C4 can set the equivalent series resistance with a favorable balance.

In the multilayer capacitor C4, about the center axis Ax4 of the multilayer body L4, the first terminal conductors 3A, 3B are formed at positions axisymmetrical to the second terminal conductors 4B, 4A, respectively, and the first outer connecting conductors 5A, 5B are formed at positions axisymmetrical to the second outer connecting conductors 6B, 6A, respectively. Also, in the opposing direction of the first side face L4a and second side face L4b of the multilayer body L4 in the multilayer capacitor C4, the first terminal conductors 3A, 3B oppose the second terminal conductors 4A, 4B, respectively, and the first outer connecting conductors 5A, 5B oppose the second outer connecting conductors 6A, 6B, respectively. Therefore, the multilayer capacitor C4 can be mounted easily.

Twelfth Embodiment

Figure 17:
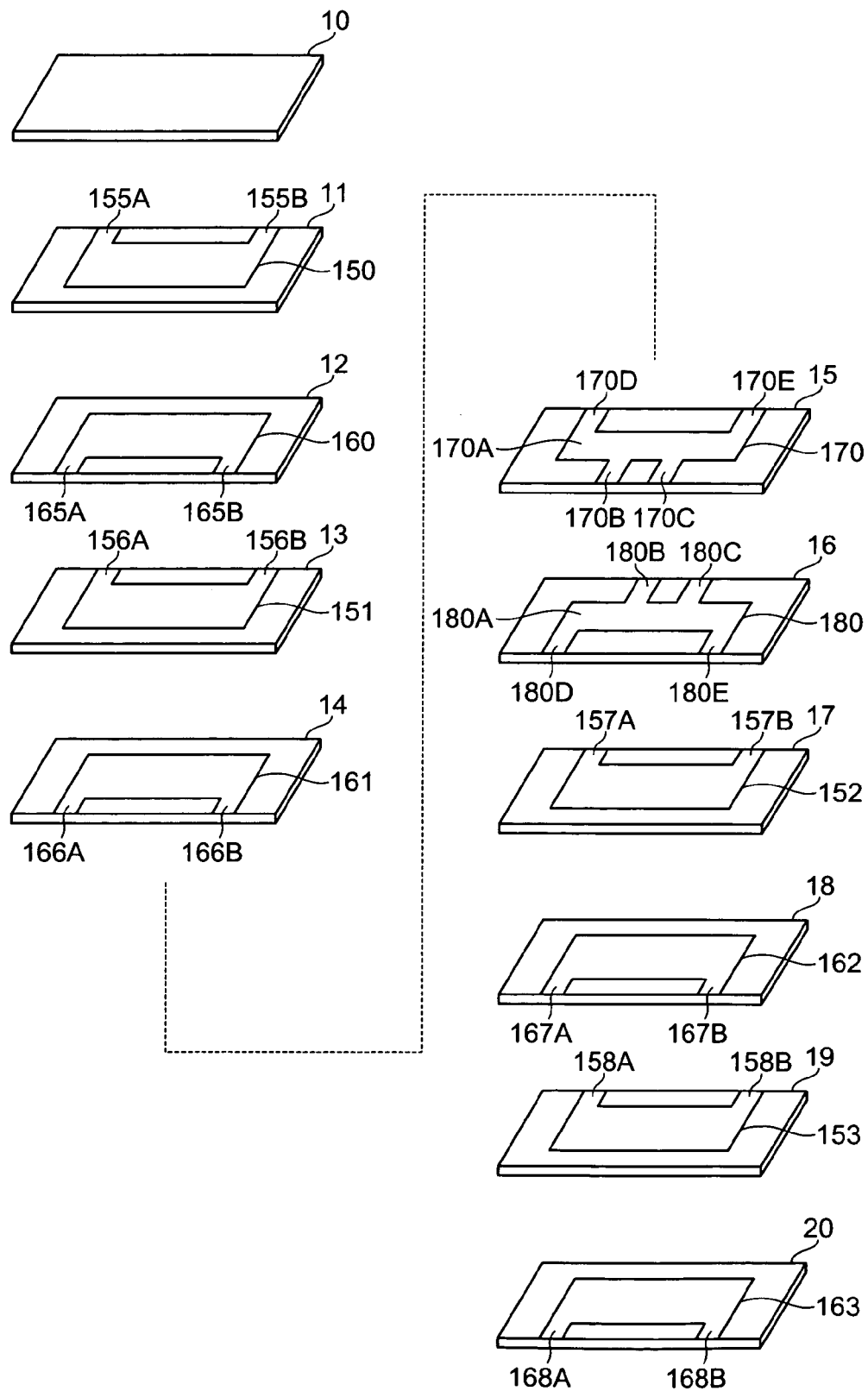
FIG. 17 is an exploded perspective view of the multilayer body included in the multilayer capacitor in accordance with a twelfth embodiment.

The configuration of the multilayer capacitor in accordance with a twelfth embodiment will be explained with reference to FIG. 17. The multilayer capacitor in accordance with the twelfth embodiment differs from the multilayer capacitor C4 in accordance with the eleventh embodiment in terms of positions of the first and second inner connecting conductors 170, 180 in the laminating direction. FIG. 17 is an exploded perspective view of the multilayer body included in the multilayer capacitor in accordance with the twelfth embodiment.

As with the multilayer capacitor C4 in accordance with the eleventh embodiment, the multilayer capacitor in accordance with the twelfth embodiment comprises a multilayer body, first terminal conductors 3A, 3B formed on the multilayer body, second terminal conductors 4A, 4B similarly formed on the multilayer body, first outer connecting conductors 5A, 5B similarly formed on the multilayer body, and second outer connecting conductors 6A, 6B similarly formed on the multilayer body, though they are not depicted.

In the multilayer capacitor in accordance with the twelfth embodiment, the first and second inner connecting conductors 170, 180, provided one by one, are laminated between two layers each of first and second inner electrodes 150, 151, 160, 161 and two layers each of first and second inner electrodes 152, 153, 162, 163 as shown in FIG. 17. More specifically, the first inner connecting conductor 170 is positioned so as to be held between dielectric layers 14 and 15. The second inner connecting conductor 180 is positioned so as to be held between dielectric layers 15 and 16.

The first and second inner connecting conductors 170, 180 are laminated in the multilayer body such that the multilayer body includes at least one set (4 sets in this embodiment) of first and second inner electrodes neighboring each other with the dielectric layer in between.

In the multilayer capacitor in accordance with the twelfth embodiment, the first terminal conductors 3A, 3B are connected to the first inner electrodes 150 to 153 not directly, but electrically through the first outer connecting conductors 5A, 5B and first inner connecting conductor 170. Also, in the multilayer capacitor in accordance with the twelfth embodiment, the second terminal conductors 4A, 4B are connected to the second inner electrodes 160 to 163 not directly, but electrically through the second outer connecting conductors 6A, 6B and second inner connecting conductor 180. As a consequence, the multilayer capacitor in accordance with the twelfth embodiment yields an equivalent series resistance greater than that of the conventional multilayer capacitor in which all the inner electrodes are connected to their corresponding terminal conductors through lead conductors.

Meanwhile, when the first terminal conductors 3A, 3B are concerned, the multilayer capacitor in accordance with the twelfth embodiment differs from the multilayer capacitor C4 in accordance with the eleventh embodiment in terms of how the respective resistance components of the first outer connecting conductors 5A, 5B are connected to the first terminal conductors 3A, 3B. In the multilayer capacitor C4 in accordance with the eleventh embodiment, the respective resistance components of the first outer connecting conductors 5A, 5B are connected in series to the first inner connecting conductor 170, so as to be connected to the first terminal conductors 3A, 3B. In the multilayer capacitor in accordance with the twelfth embodiment, on the other hand, each of the resistance components of the first outer connecting conductors 5A, 5B is split at the first inner connecting conductor 170 as a boundary, and the resulting resistance components are connected in parallel to their corresponding first terminal conductors 3A, 3B.

When the second terminal conductors 4A, 4B are concerned, the multilayer capacitor in accordance with the twelfth embodiment differs from the multilayer capacitor C4 in accordance with the eleventh embodiment in terms of how the respective resistance components of the second outer connecting conductors 6A, 6B are connected to the second terminal conductors 4A, 4B. In the multilayer capacitor C4 in accordance with the eleventh embodiment, the respective resistance components of the second outer connecting conductors 6A, 6B are connected in series to the second inner connecting conductor 180, so as to be connected to the second terminal conductors 4A, 4B. In the multilayer capacitor in accordance with the twelfth embodiment, on the other hand, each of the resistance components of the second outer connecting conductors 6A, 6B is split at the second inner connecting conductor 180 as a boundary, and the resulting resistance components are connected in parallel to their corresponding second terminal conductors 4A, 4B. Therefore, because of the difference in resistance components of the first and second outer connecting conductors 5A, 5B, 6A, 6B, the multilayer capacitor in accordance with the twelfth embodiment yields an equivalent series resistance smaller than that of the multilayer capacitor C4 in accordance with the eleventh embodiment.

As in the foregoing, by adjusting the positions of the first inner connecting conductor 170 directly connected to the first terminal conductors 3A, 3B and the second inner connecting conductor 180 directly connected to the second terminal conductors 4A, 4B in the laminating direction, this embodiment sets the equivalent series resistance of the multilayer capacitor to a desirable value, and thus can regulate the equivalent series resistance easily with a high precision. Also, since the equivalent series resistance is controlled by the first and second inner connecting conductors, the multilayer capacitor in accordance with the twelfth embodiment can regulate the equivalent series resistance while setting its capacitance to a desirable value (e.g., a larger value).

All the outer conductors (first and second terminal conductors 3A, 3B, 4A, 4B and first and second outer connecting conductors 5A, 5B, 6A, 6B) in the multilayer capacitor in accordance with the twelfth embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the twelfth embodiment can be made easily.

The first conductor portion 170A of the first inner connecting conductor 170 opposes the second inner electrode 161 with the dielectric layer 14 in between. The first conductor portion 180A of the second inner connecting conductor 180 opposes the first inner electrode 152 with the dielectric layer 16 in between. Therefore, in the multilayer capacitor in accordance with the twelfth embodiment, the first and second inner connecting conductors 170, 180 can also contribute to forming the capacity component, and thus can further increase the capacitance of the multilayer capacitor.

In the multilayer capacitor in accordance with the twelfth embodiment, about the center axis of the multilayer body, the first terminal conductors 3A, 3B are formed at positions axisymmetrical to the second terminal conductors 4B, 4A, respectively, and the first outer connecting conductors 5A, 5B are formed at positions axisymmetrical to the second outer connecting conductors 6B, 6A, respectively. Also, in the opposing direction of the first and second side faces of the multilayer body in the multilayer capacitor in accordance with the ninth embodiment, the first terminal conductors 3A, 3B oppose the second terminal conductors 4A, 4B, respectively, and the first outer connecting conductors 5A, 5B oppose the second outer connecting conductors 6A, 6B, respectively. Therefore, the multilayer capacitor in accordance with the twelfth embodiment can be mounted easily.

Thirteenth Embodiment

Figure 18:
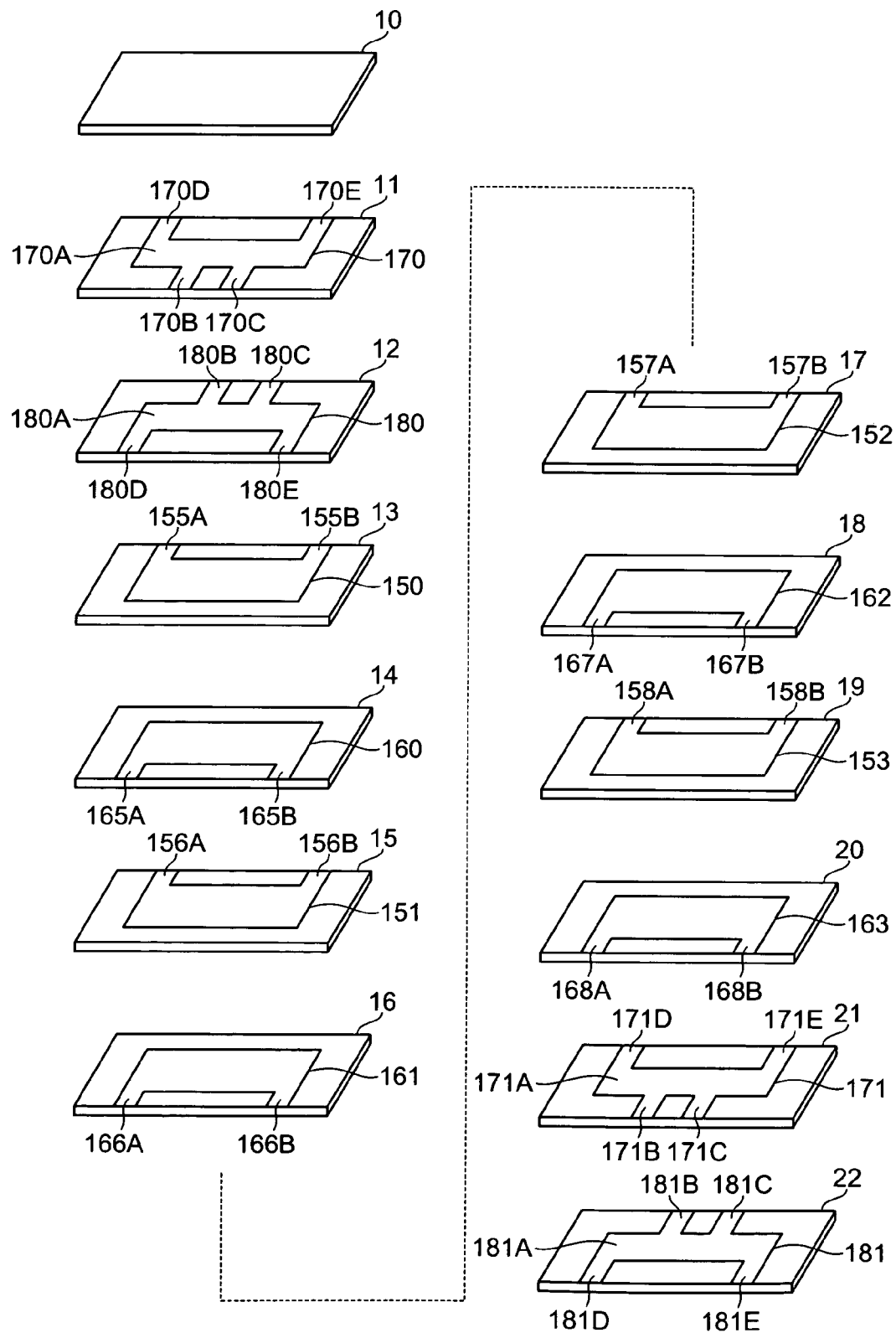
FIG. 18 is an exploded perspective view of the multilayer body included in the multilayer capacitor in accordance with a thirteenth embodiment.

The configuration of the multilayer capacitor in accordance with a thirteenth embodiment will be explained with reference to FIG. 18. The multilayer capacitor in accordance with the thirteenth embodiment differs from the multilayer capacitor C4 in accordance with the eleventh embodiment in terms of the number of inner connecting conductors. FIG. 18 is an exploded perspective view of the multilayer body included in the multilayer capacitor in accordance with the thirteenth embodiment.

As with the multilayer capacitor C4 in accordance with the eleventh embodiment, the multilayer capacitor in accordance with the twelfth embodiment comprises a multilayer body, first terminal conductors 3A, 3B formed on the multilayer body, second terminal conductors 4A, 4B similarly formed on the multilayer body, first outer connecting conductors 5A, 5B similarly formed on the multilayer body, and second outer connecting conductors 6A, 6B similarly formed on the multilayer body, though they are not depicted.

The multilayer capacitor in accordance with the thirteenth embodiment is constructed by alternately laminating a plurality of (13 in this embodiment) dielectric layers 10 to 22 and a plurality of (4 each in this embodiment) of first and second inner electrodes 150 to 153, 160 to 163 as shown in FIG. 18.

In the multilayer body of the multilayer capacitor in accordance with the thirteenth embodiment, a plurality of (2 each in this embodiment) of first inner connecting conductors 170, 171 and a plurality of (2 each in this embodiment) of second inner connecting conductors 180, 181 are laminated. In the multilayer body of the multilayer capacitor in accordance with the thirteenth embodiment, four layers of first inner electrodes 150 to 153 and four layers of second inner electrodes 160 to 163 are arranged between one each of the first and second inner connecting conductors 170, 180 which are a part of the plurality of inner connecting conductors 170, 171, 180, 181 and the remaining first and second inner connecting conductors 171, 181.

The first inner connecting conductor 170 is positioned so as to be held between the dielectric layers 10 and 11. The first inner connecting conductor 171 is positioned so as to be held between the dielectric layers 20 and 21. The second inner connecting conductor 180 is positioned so as to be held between the dielectric layers 11 and 12. The second inner connecting conductor 181 is positioned so as to be held between the dielectric layers 21 and 22.

The first and second inner connecting conductors 170, 171, 180, 181 are laminated in the multilayer body such that the multilayer body includes at least one set (4 sets in this embodiment) of first and second inner electrodes neighboring each other with the dielectric layer in between.

In the multilayer capacitor in accordance with the thirteenth embodiment, the first terminal conductors 3A, 3B are connected to the first inner electrodes 150 to 153 not directly, but electrically through the first outer connecting conductors 5A, 5B and first inner connecting conductors 170, 171. Also, in the multilayer capacitor in accordance with the thirteenth embodiment, the second terminal conductors 4A, 4B are connected to the second inner electrodes 160 to 163 not directly, but electrically through the second outer connecting conductors 6A, 6B and second inner connecting conductors 180, 181. As a consequence, the multilayer capacitor in accordance with the thirteenth embodiment yields an equivalent series resistance greater than that of the conventional multilayer capacitor in which all the inner electrodes are connected to their corresponding terminal conductors through lead conductors.

As compared with the multilayer capacitor C4, the multilayer capacitor in accordance with the thirteenth embodiment has a greater number of first inner connecting conductors 170, 171, whereas the first inner connecting conductors 170, 171 are connected in parallel to their corresponding first terminal conductors 3A, 3B. Also, the multilayer capacitor in accordance with the thirteenth embodiment has a greater number of second inner connecting conductors 180, 181 than that in the multilayer capacitor C4, whereas the second inner connecting conductors 180, 181 are connected in parallel to their corresponding second terminal conductors 4A, 4B. Therefore, the multilayer capacitor in accordance with the thirteenth embodiment yields an equivalent series resistance smaller than that of the multilayer capacitor C4.

As in the foregoing, by adjusting the number of first inner connecting conductors 170, 171 directly connected to the first terminal conductors 3A, 3B and the number of second inner connecting conductors 180, 181 directly connected to the second terminal conductors 4A, 4B, this embodiment sets the equivalent series resistance of the multilayer capacitor to a desirable value, and thus can regulate the equivalent series resistance easily with a high precision.

All the outer conductors (first and second terminal conductors 3A, 3B, 4A, 4B and first and second outer connecting conductors 5A, 5B, 6A, 6B) in the multilayer capacitor in accordance with the thirteenth embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the thirteenth embodiment can be made easily.

The first conductor portion 171A of the first inner connecting conductor 171 opposes the second inner electrode 163 with the dielectric layer 20 in between. The first conductor portion 180A of the second inner connecting conductor 180 opposes the first inner electrode 150 with the dielectric layer 12 in between. Therefore, in the multilayer capacitor in accordance with the thirteenth embodiment, the first and second inner connecting conductors 171, 180 can also contribute to forming the capacity component, and thus can further increase the capacitance of the multilayer capacitor.

In the multilayer body of the multilayer capacitor in accordance with the thirteenth embodiment, a plurality of first and second inner electrodes 150 to 153, 160 to 163 are arranged between the first and second inner connecting conductors 170, 180 and the first and second inner connecting conductors 171, 181. Therefore, the multilayer capacitor in accordance with the thirteenth embodiment can set the equivalent series resistance with a favorable balance.

In the multilayer capacitor in accordance with the thirteenth embodiment, about the center axis of the multilayer body, the first terminal conductors 3A, 3B are formed at positions axisymmetrical to the second terminal conductors 4B, 4A, respectively, and the first outer connecting conductors 5A, 5B are formed at positions axisymmetrical to the second outer connecting conductors 6B, 6A, respectively. Also, in the opposing direction of the first and second side faces of the multilayer body in the multilayer capacitor in accordance with the thirteenth embodiment, the first terminal conductors 3A, 3B oppose the second terminal conductors 4A, 4B, respectively, and the first outer connecting conductors 5A, 5B oppose the second outer connecting conductors 6A, 6B, respectively. Therefore, the multilayer capacitor in accordance with the thirteenth embodiment can be mounted easily.

Fourteenth Embodiment

Figure 19:
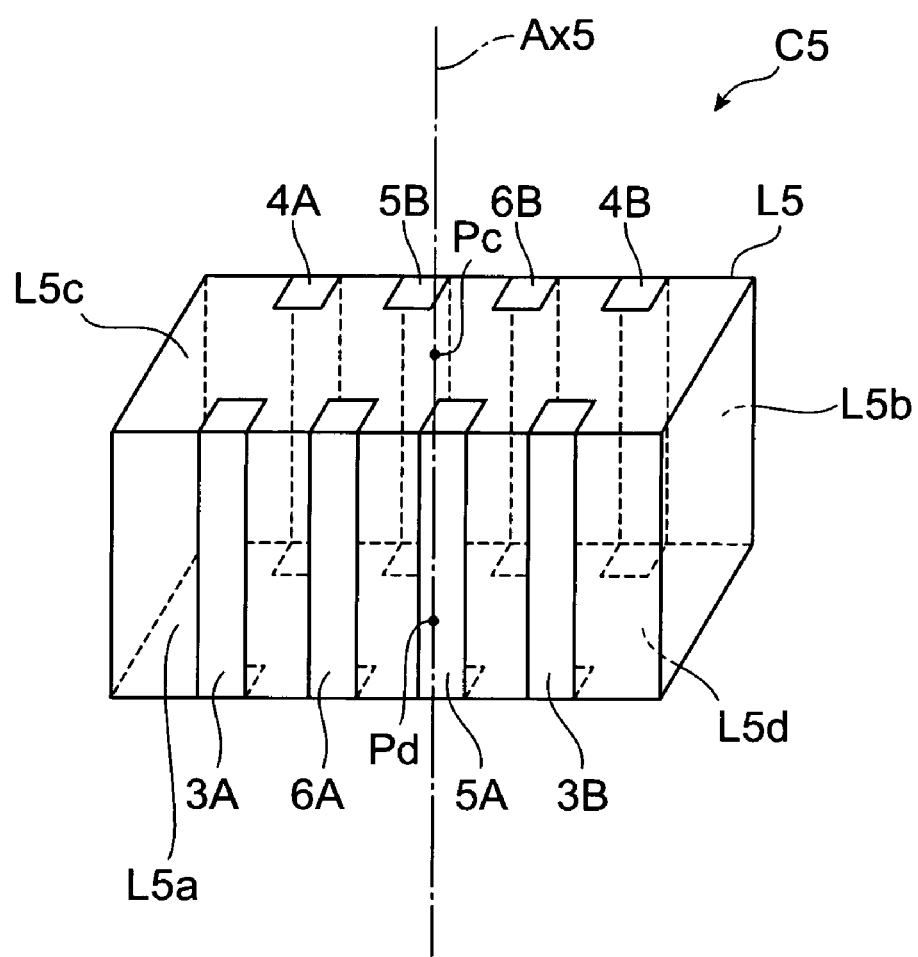
FIG. 19 is a perspective view of the multilayer capacitor in accordance with a fourteenth embodiment.
Figure 20:
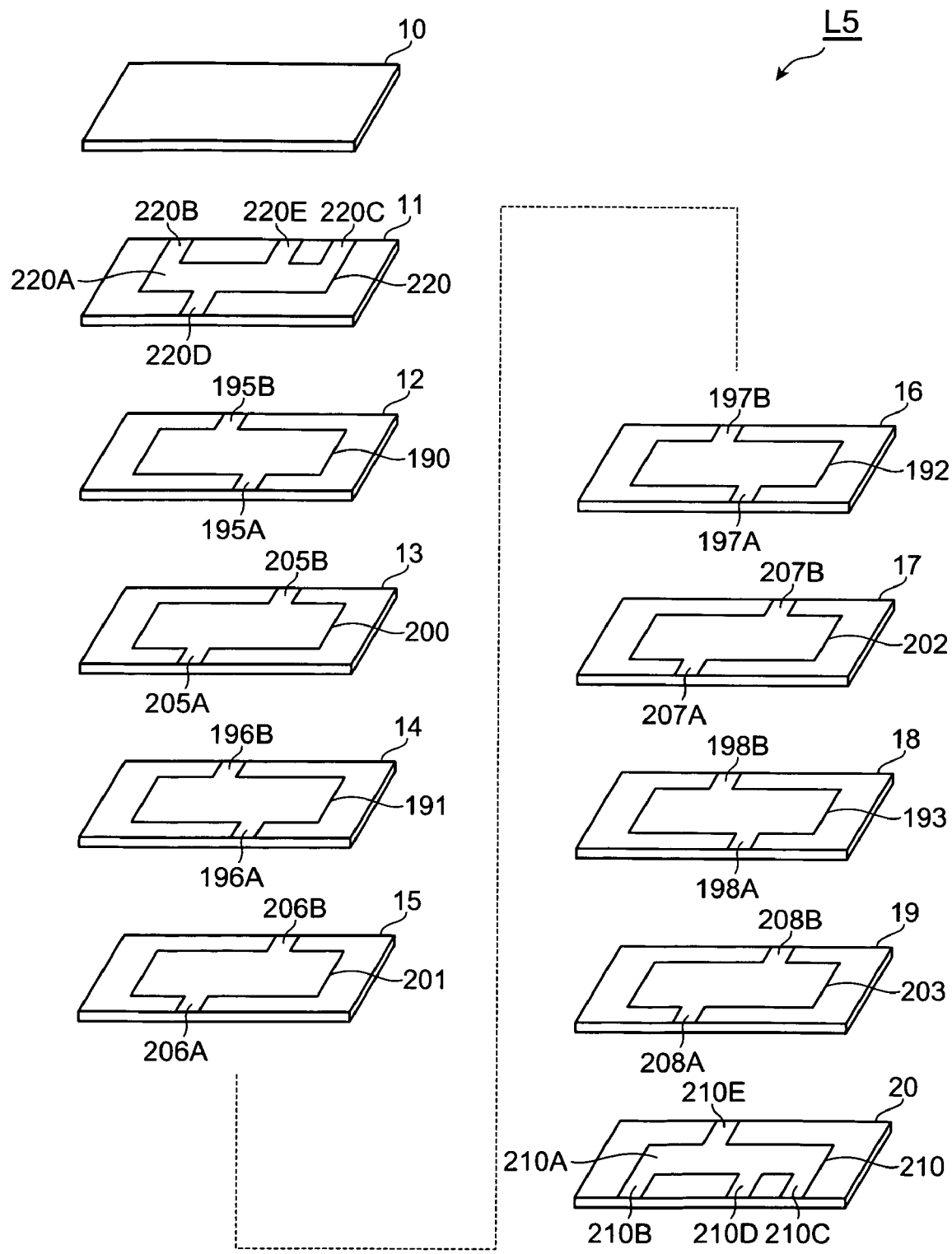
FIG. 20 is an exploded perspective view of the multilayer body included in the multilayer capacitor in accordance with the fourteenth embodiment.

The configuration of the multilayer capacitor C5 in accordance with a fourteenth embodiment will be explained with reference to FIGS. 19 and 20. FIG. 19 is a perspective view of the multilayer capacitor in accordance with the fourteenth embodiment. FIG. 20 is an exploded perspective view of the multilayer body included in the multilayer capacitor in accordance with the fourteenth embodiment.

As shown in FIG. 19, the multilayer capacitor C5 in accordance with the fourteenth embodiment comprises a multilayer body L5, first terminal conductors 3A, 3B formed on the multilayer body L5, second terminal conductors 4A, 4B similarly formed on the multilayer body, first outer connecting conductors 5A, 5B similarly formed on the multilayer body, and second outer connecting conductors 6A, 6B similarly formed on the multilayer body.

Each of the first terminal conductors 3A, 3B, first outer connecting conductor 5A, and second outer connecting conductors 6A is positioned on a first side face L5a which is a side face extending along the longitudinal axis of faces L5c, L5d orthogonal to the laminating direction of the multilayer body L5 among side faces parallel to the laminating direction of the multilayer body. The first terminal conductors 3A, 3B, first outer connecting conductor 5A, and second outer connecting conductors 6A are formed such that the first terminal conductor 3A, second outer connecting conductor 6A, first outer connecting conductor 5A, and first terminal conductor 3B are successively arranged from the left side to right side of FIG. 19.

Each of the second terminal conductors 4A, 4B, first outer connecting conductor 5B, and second outer connecting conductor 6B is positioned on a second side face L5$b$ which is a side face extending along the longitudinal axis of faces L5$c$, L5$d$ orthogonal to the laminating direction of the multilayer body L5 among side faces parallel to the laminating direction of the multilayer body L5 while opposing the first side face L5$a$. The second terminal conductors 4A, 4B, first outer connecting conductor 5B, and second outer connecting conductor 6B are formed such that the second terminal conductor 4A, first outer connecting conductor 5B, second outer connecting conductor 6B, and second terminal conductor 4B are successively arranged from the left side to right side of FIG. 19.

The first terminal conductor 3A and second terminal conductor 4B are positioned axisymmetrical to each other about a center axis Ax5 passing respective center points Pc, Pd of the two side faces L5$c$, L5$d$ orthogonal to the laminating direction of the multilayer body L5 among center axes of the multilayer body L5. The first terminal conductor 3B and second terminal conductor 4A are positioned axisymmetrical to each other about the center axis Ax5 of the multilayer body L5. The first outer connecting conductors 5A and 5B are positioned axisymmetrical to each other about the center axis Ax5 of the multilayer body L5. The second outer connecting conductors 6A and 6B are positioned axisymmetrical to each other about the center axis Ax5 of the multilayer body L5.

The first terminal conductor 3A and second terminal conductor 4A oppose each other in a direction along which the first side face L5$a$ and second side face L5$b$ of the multilayer body L5 oppose each other. The first terminal conductor 3B and second terminal conductor 4B oppose each other in the opposing direction of the first side face L5$a$ and second side face L5$b$ of the multilayer body L5. The first outer connecting conductor 5A and second outer connecting conductor 6B oppose each other in the opposing direction of the first side face L5$a$ and second side face L5$b$ of the multilayer body L5. The first outer connecting conductor 5B and second outer connecting conductor 6A oppose each other in the opposing direction of the first side face L5$a$ and second side face L5$b$ of the multilayer body L5.

As shown in FIG. 20, the multilayer body L5 is constructed by alternately laminating a plurality of (11 in this embodiment) dielectric layers 10 to 20 and a plurality of (4 each in this embodiment) of first and second inner electrodes 190 to 193, 200 to 203. In the actual multilayer capacitor C5, they are integrated to such an extent that no boundaries are discernible between the dielectric layers 10 to 20.

Further, one first inner connecting conductor 210 and one second inner connecting conductor 220 are laminated in the multilayer body L5. In the multilayer body L5, the plurality of first inner connecting conductors 190 to 193 and the plurality of second inner connecting conductor 200 to 203 are arranged between the second inner connecting conductor 220 and the first inner connecting conductor 210.

Each of the first inner electrodes 190 to 193 has a substantially rectangular form. The plurality of first inner electrodes 190 to 193 are formed at respective positions separated by a predetermined distance from a side face parallel to the laminating direction of the dielectric layers 10 to 20 (hereinafter simply referred to as "laminating direction") in the multilayer body L5.

Each of lead conductors 195A, 195B is integrally formed with the first inner electrode 190. Each of lead conductors 196A, 196B is integrally formed with the first inner electrode 191. Each of lead conductors 197A, 197B is integrally formed with the first inner electrode 192. Each of lead conductors 198A, 198B is integrally formed with the first inner electrode 193.

The lead conductor 195A extends from the first inner electrode 190 so as to reach the first side face L5$a$ of the multilayer body L5. The lead conductor 195B extends from the first inner electrode 190 so as to reach the second side face L5$b$ of the multilayer body L5. The lead conductor 196A extends from the first inner electrode 191 so as to reach the first side face L5$a$ of the multilayer body L5. The lead conductor 196B extends from the first inner electrode 191 so as to reach the second side face L5$b$ of the multilayer body L5. The lead conductor 197A extends from the first inner electrode 192 so as to reach the first side face L5$a$ of the multilayer body L5. The lead conductor 197B extends from the first inner electrode 192 so as to reach the second side face L5$b$ of the multilayer body L5. The lead conductor 198A extends from the first inner electrode 193 so as to reach the first side face L5$a$ of the multilayer body L5. The lead conductor 198B extends from the first inner electrode 193 so as to reach the second side face L5$b$ of the multilayer body L5.

The first inner electrode 190 is electrically connected to the first outer connecting conductors 5A and 5B through the lead conductors 195A and 195B, respectively. The first inner electrode 191 is electrically connected to the first outer connecting conductors 5A and 5B through the lead conductors 196A and 196B, respectively. The first inner electrode 192 is electrically connected to the first outer connecting conductors 5A and 5B through the lead conductors 197A and 197B, respectively. The first inner electrode 193 is electrically connected to the first outer connecting conductors 5A and 5B through the lead conductors 198A and 198B, respectively. As a consequence, the plurality of first inner electrodes 190 to 193 are electrically connected to each other through the first outer connecting conductors 5A, 5B.

Each of the second inner electrodes 200 to 203 has a substantially rectangular form. The plurality of first inner electrodes 200 to 203 are formed at respective positions separated by a predetermined distance from a side face parallel to the laminating direction of the multilayer body L5.

Each of lead conductors 205A, 205B is integrally formed with the second inner electrode 200. Each of lead conductors 206A, 206B is integrally formed with the second inner electrode 201. Each of lead conductors 207A, 207B is integrally formed with the second inner electrode 202. Each of lead conductors 208A, 208B is integrally formed with the second inner electrode 203.

The lead conductor 205A extends from the second inner electrode 200 so as to reach the first side face L5$a$ of the multilayer body L5. The lead conductor 205B extends from the second inner electrode 200 so as to reach the second side face L5$b$ of the multilayer body L5. The lead conductor 206A extends from the second inner electrode 201 so as to reach the first side face L5$a$ of the multilayer body L5. The lead conductor 206B extends from the second inner electrode 201 so as to reach the second side face L5$b$ of the multilayer body L5. The lead conductor 207A extends from the second inner electrode 202 so as to reach the first side face L5a of the multilayer body L5. The lead conductor 207B extends from the second inner electrode 202 so as to reach the second side face L5b of the multilayer body L5. The lead conductor 208A extends from the second inner electrode 203 so as to reach the first side face L5a of the multilayer body L5. The lead conductor 208B extends from the second inner electrode 203 so as to reach the second side face L5b of the multilayer body L5.

The second inner electrode 200 is electrically connected to the second outer connecting conductors 6A and 6B through the lead conductors 205A and 205B, respectively. The second inner electrode 201 is electrically connected to the second outer connecting conductors 6A and 6B through the lead conductors 206A and 206B, respectively. The second inner electrode 202 is electrically connected to the second outer connecting conductors 6A and 6B through the lead conductors 207A and 207B, respectively. The second inner electrode 203 is electrically connected to the second outer connecting conductors 6A and 6B through the lead conductors 208A and 208B, respectively. As a consequence, the plurality of second inner electrodes 200 to 203 are electrically connected to each other through the second outer connecting conductors 6A, 6B.

The first inner connecting conductor 210 is positioned so as to be held between the dielectric layers 19 and 20. The second inner connecting conductor 220 is positioned so as to be held between the dielectric layers 10 and 11. The first and second inner connecting conductors 210, 220 are electrically insulated from each other.

The first inner connecting conductor 210 includes a first conductor portion 210A having an oblong form, second, third, and fourth conductor portions 210B, 210C, 210D extending from the first conductor portion 210A so as to be taken out to the first side face L5a of the multilayer body L5, and a fifth conductor portion 210E extending from the first conductor portion 210A so as to be taken out to the second side face L5b of the multilayer body L5. The first conductor portion 210A is arranged such that its longitudinal axis is parallel to the first and second side faces L5a, L5b of the multilayer body L5.

The second inner connecting conductor 220 includes a first conductor portion 220A having an oblong form, second, third, and fifth conductor portions 220B, 220C, 220E extending from the first conductor portion 220A so as to be taken out to the second side face L5b of the multilayer body L5, and fourth conductor, portion 220D extending from the first conductor portion 220A so as to be taken out to the first side face L5a of the multilayer body L5. The first conductor portion 220A is arranged such that its longitudinal axis is parallel to the first and second side faces L5a, L5b of the multilayer body L5.

In the first inner connecting conductor 210, the second, third, fourth, and fifth conductor portions 210B, 210C, 210D, and 210E are electrically connected to the first terminal conductor 3A, first terminal conductor 3B, first outer connecting conductor 5A, and first outer connecting conductor 5B, respectively. As a consequence, the first inner connecting conductor 210 is electrically connected to the first terminal conductors 3A, 3B and first outer connecting conductors 5A, 5B.

In the second inner connecting conductor 220, the second, third, fourth, and fifth conductor portions 220B, 220C, 220D, and 220E are electrically connected to the second terminal conductor 4A, second terminal conductor 4B, second outer connecting conductor 6A, and second outer connecting conductor 6B, respectively. As a consequence, the second inner connecting conductor 220 is electrically connected to the second terminal conductors 4A, 4B and second outer connecting conductors 6A, 6B.

The first conductor portion 210A of the first inner connecting conductor 210 is a region opposing the second inner electrode 203 with the dielectric layer 19 in between. The second conductor portion 220A of the second inner connecting conductor 220 is a region opposing the first inner electrode 190 with the dielectric layer 11 in between.

The first and second inner connecting conductors 190, 200 are laminated in the multilayer body L5 such that the multilayer body L5 includes at least one set (4 sets in this embodiment) of first and second inner electrodes neighboring each other with the dielectric layer in between.

In the multilayer capacitor C5, the first terminal conductors 3A, 3B are connected to the first inner electrodes 190 to 193 not directly, but electrically through the first outer connecting conductors 5A, 5B and first inner connecting conductor 210. Also, in the multilayer capacitor C5, the second terminal conductors 4A, 4B are connected to the second inner electrodes 200 to 203 not directly, but electrically through the second outer connecting conductors 6A, 6B and second inner connecting conductor 220. As a consequence, the multilayer capacitor C5 yields an equivalent series resistance greater than that of the conventional multilayer capacitor in which all the inner electrodes are connected to their corresponding terminal conductors through lead conductors.

By adjusting the number of first inner connecting conductor 210 directly connected to the first terminal conductors 3A, 3B and the number of second inner connecting conductor 220 directly connected to the second terminal conductors 4A, 4B in such a manner, this embodiment sets the equivalent series resistance of the multilayer capacitor C5 to a desirable value, and thus can regulate the equivalent series resistance easily with a high precision. Also, since the equivalent series resistance is controlled by the first and second inner connecting conductors, the multilayer capacitor C5 can regulate the equivalent series resistance while setting its capacitance to a desirable value (e.g., a larger value).

All of the first and second terminal conductors 3A, 3B, 4A, 4B and first and second outer connecting conductors 5A, 5B, 6A, 6B, which are outer conductors of the multilayer capacitor C5, are formed on the first and second side faces L5a, L5b of the multilayer body L5 opposing each other. Therefore, as compared with the case where outer conductors are formed on four side faces of the multilayer body L5, for example, the multilayer capacitor C5 can reduce steps required for forming the outer conductors. As a consequence, the multilayer capacitor C5 can be made easily.

The first conductor portion 210A of the first inner connecting conductor 210 opposes the second inner electrode 203 with the dielectric layer 19 in between. The first conductor portion 220A of the second inner connecting conductor 220 opposes the first inner electrode 190 with the dielectric layer 11 in between. Therefore, the first and second inner connecting conductor 210, 220 can also contribute to forming the capacity component in the multilayer capacitor C5, whereby the multilayer capacitor C5 can further increase its capacitance.

Since a plurality of first and second inner electrodes 190 to 193, 200 to 203 are arranged between the first inner connecting conductor 210 and second inner connecting conductor 220, the multilayer capacitor C5 can set the equivalent series resistance with a favorable balance.

On the first side face L5a of the multilayer body L5 in the multilayer capacitor C5, the first terminal conductor 3B and first outer connecting conductor 5A are formed adjacent to each other. Therefore, the following effects are obtained when the multilayer capacitor C5 is mounted on a substrate or the like such that the first terminal conductor 3B is directly connected to a land pattern whereas the first outer connecting conductor 5A is kept from being directly connected to a land pattern. Namely, a magnetic field caused by a current flowing between the first terminal conductor 3B and the first inner connecting conductor 210 (the third conductor portion 210C in the first inner connecting conductor 210) and a magnetic field caused by a current flowing between the first outer connecting conductor 5A and the first inner electrodes 190 to 193 (the lead conductors 195A to 198A) and a current flowing between the first outer connecting conductor 5A and the first inner connecting conductor 210 (the fourth conductor portion 210D in the first inner connecting conductor 210) cancel each other out. As a result, the multilayer capacitor C5 can reduce its equivalent series inductance.

On the second side face L5b of the multilayer body L5 in the multilayer capacitor C5, the second terminal conductor 4B and second outer connecting conductor 6B are formed adjacent to each other. Therefore, the following effects are obtained when the multilayer capacitor C5 is mounted on a substrate or the like such that the second terminal conductor 4B is directly connected to a land pattern whereas the second outer connecting conductor 6B is kept from being directly connected to a land pattern. Namely, a magnetic field caused by a current flowing between the second terminal conductor 4B and the second inner connecting conductor 220 (the third conductor portion 220C in the second inner connecting conductor 220) and a magnetic field caused by a current flowing between the second outer connecting conductor 6B and the second inner electrodes 200 to 203 (the lead conductors 205B to 208B) and a current flowing between the second outer connecting conductor 6B and the second inner connecting conductor 220 (the fifth conductor portion 220E in the second inner connecting conductor 220) cancel each other out. As a result, the multilayer capacitor C5 can reduce, its equivalent series inductance.

In the multilayer capacitor C5, about the center axis Ax5 of the multilayer body L5, the first terminal conductors 3A, 3B, first outer connecting conductor A, and second outer connecting conductor 6A are formed at positions axisymmetrical to the second terminal conductors 4B, 4A, first outer connecting conductor 5B, and second outer connecting conductor 6B, respectively. Also, in the opposing direction of the first side face L5a and second side face L5b of the multilayer body L5 in the multilayer capacitor C5, the first terminal conductors 3A, 3B and first outer connecting conductors 5A, 5B oppose the second terminal conductors 4A and 4B and second outer connecting conductors 6B, 6A, respectively. Therefore, the multilayer capacitor C5 can be mounted easily.

Fifteenth Embodiment

Figure 21:
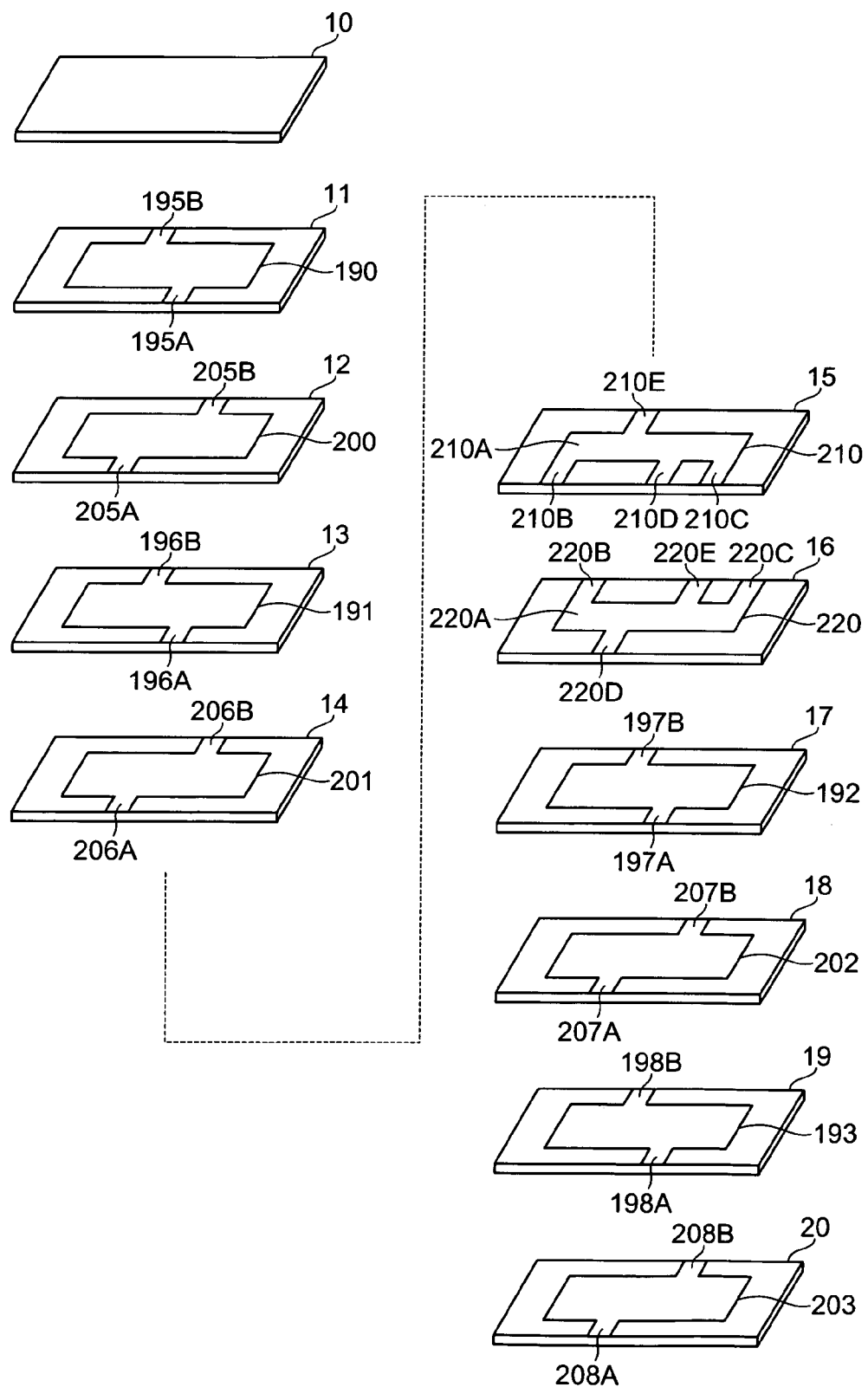
FIG. 21 is an exploded perspective view of the multilayer body included in the multilayer capacitor in accordance with a fifteenth embodiment.

The configuration of the multilayer capacitor in accordance with a fifteenth embodiment will be explained with reference to FIG. 21. The multilayer capacitor in accordance with the fifteenth embodiment differs from the multilayer capacitor C5 in accordance with the fourteenth embodiment in terms of the positions of first and second inner connecting conductors 210, 220 in the laminating direction. FIG. 21 is an exploded perspective view of the multilayer body included in the multilayer capacitor in accordance with the fifteenth embodiment.

As with the multilayer capacitor C5 in accordance with the fourteenth embodiment, the multilayer capacitor in accordance with the fifteenth embodiment comprises a multilayer body, first terminal conductors 3A, 3B formed on the multilayer body, second terminal conductors 4A, 4B similarly formed on the multilayer body, first outer connecting conductors 5A, 5B similarly formed on the multilayer body, and second outer connecting conductors 6A, 6B similarly formed on the multilayer body, though they are not depicted.

In the multilayer capacitor in accordance with the fifteenth embodiment, the first and second inner connecting conductors 210, 220, provided one by one, are laminated between two layers each of first and second inner electrodes 190, 191, 200, 201 and two layers each of first and second inner electrodes 192, 193, 202, 203 as shown in FIG. 21. More specifically, the first inner connecting conductor 210 is positioned so as to be held between dielectric layers 14 and 15. The second inner connecting conductor 220 is positioned so as to be held between dielectric layers 15 and 16.

The first and second inner connecting conductors 210, 220 are laminated in the multilayer body such that the multilayer body includes at least one set (4 sets in this embodiment) of first and second inner electrodes neighboring each other with the dielectric layer in between.

In the multilayer capacitor in accordance with the fifteenth embodiment, the first terminal conductors 3A, 3B are connected to the first inner electrodes 190 to 193 not directly, but electrically through the first outer connecting conductors 5A, 5B and first inner connecting conductor 210. Also, in the multilayer capacitor in accordance with the fifteenth embodiment, the second terminal conductors 4A, 4B are connected to the second inner electrodes 200 to 203 not directly, but electrically through the second outer connecting conductors 6A, 6B and second inner connecting conductor 220. As a consequence, the multilayer capacitor in accordance with the fifteenth embodiment yields an equivalent series resistance greater than that of the conventional multilayer capacitor in which all the inner electrodes are connected to their corresponding terminal conductors through lead conductors.

Meanwhile, when the first terminal conductors 3A, 3B are concerned, the multilayer capacitor in accordance with the fifteenth embodiment differs from the multilayer capacitor C5 in accordance with the fourteenth embodiment in terms of how the respective resistance components of the first outer connecting conductors 5A, 5B are connected to the first terminal conductors 3A, 3B. In the multilayer capacitor C5 in accordance with the fourteenth embodiment, the respective resistance components of the first outer connecting conductors 5A, 5B are connected in series to the first inner connecting conductor 210, so as to be connected to the first terminal conductors 3A, 3B. In the multilayer capacitor in accordance with the fifteenth embodiment, on the other hand, each of the resistance components of the first outer connecting conductors 5A, 5B is split at the first inner connecting conductor 210 as a boundary, and the resulting resistance components are connected in parallel to their corresponding first terminal conductors 3A, 3B.

When the second terminal conductors 4A, 4B are concerned, the multilayer capacitor in accordance with the fifteenth embodiment differs from the multilayer capacitor C5 in accordance with the fourteenth embodiment in terms of how the respective resistance components of the second outer connecting conductors 6A, 6B are connected to the second terminal conductors 4A, 4B. In the multilayer capacitor C5 in accordance with the fourteenth embodiment, the respective resistance components of the second outer connecting conductors 6A, 6B are connected in series to the second inner connecting conductor 220, so as to be connected to the second terminal conductors 4A, 4B. In the multilayer capacitor in accordance with the fifteenth embodiment, on the other hand, each of the resistance components of the second outer connecting conductors 6A, 6B is split at the second inner connecting conductor 220 as a boundary, and the resulting resistance components are connected in parallel to their corresponding second terminal conductors 4A, 4B. Therefore, because of the difference in resistance components of the first and second outer connecting conductors 5A, 5B, 6A, 6B, the multilayer capacitor in accordance with the fourteenth embodiment yields an equivalent series resistance smaller than that of the multilayer capacitor C5 in accordance with the fourteenth embodiment.

As in the foregoing, by adjusting the positions of the first inner connecting conductor 210 directly connected to the first terminal conductors 3A, 3B and the second inner connecting conductor 220 directly connected to the second terminal conductors 4A, 4B in the laminating direction, this embodiment sets the equivalent series resistance of the multilayer capacitor to a desirable value, and thus can regulate the equivalent series resistance easily with a high precision. Also, since the equivalent series resistance is controlled by the first and second inner connecting conductors, the multilayer capacitor in accordance with the fifteenth embodiment can regulate the equivalent series resistance while setting its capacitance to a desirable value (e.g., a larger value).

All the outer conductors (first and second terminal conductors 3A, 3B, 4A, 4B and first and second outer connecting conductors 5A, 5B, 6A, 6B) in the multilayer capacitor in accordance with the fifteenth embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the fifteenth embodiment can be made easily.

The first conductor portion 210A of the first inner connecting conductor 210 opposes the second inner electrode 201 with the dielectric layer 14 in between. The first conductor portion 220A of the second inner connecting conductor 220 opposes the first inner electrode 192 with the dielectric layer 16 in between. Therefore, in the multilayer capacitor in accordance with the fifteenth embodiment, the first and second inner connecting conductors 210, 220 can also contribute to forming the capacity component, and thus can further increase the capacitance of the multilayer capacitor.

The first terminal conductor 3B and the first outer connecting conductor 5B are formed adjacent to each other on the first side face of the multilayer body in the multilayer capacitor in accordance with the fifteenth embodiment as in the multilayer capacitor C5. Therefore, the multilayer capacitor in accordance with the fifteenth embodiment can lower its equivalent series inductance.

The second terminal conductor 4B and the second outer connecting conductor 6B are formed adjacent to each other on the second side face of the multilayer body in the multilayer capacitor in accordance with the fifteenth embodiment as in the multilayer capacitor C5. Therefore, the multilayer capacitor in accordance with the fifteenth embodiment can lower its equivalent series inductance.

In the multilayer capacitor in accordance with the fifteenth embodiment, about the center axis of the multilayer body, the first terminal conductors 3A, 3B, first outer connecting conductor 5A, and second outer connecting conductor 6A are formed at positions axisymmetrical to the second terminal conductors 4B, 4A, first outer connecting conductor 5B, and second outer connecting conductor 6B, respectively. Also, in the opposing direction of the first side face L5$a$ and second side face L5$b$ of the multilayer body L5 in the multilayer capacitor in accordance with the fifteenth embodiment, the first terminal conductors 3A, 3B and first outer connecting conductors 5A, 5B oppose the second terminal conductors 4A, 4B and second outer connecting conductors 6B, 6A, respectively. Therefore, the multilayer capacitor in accordance with the fifteenth embodiment can be mounted easily.

Sixteenth Embodiment

Figure 22:
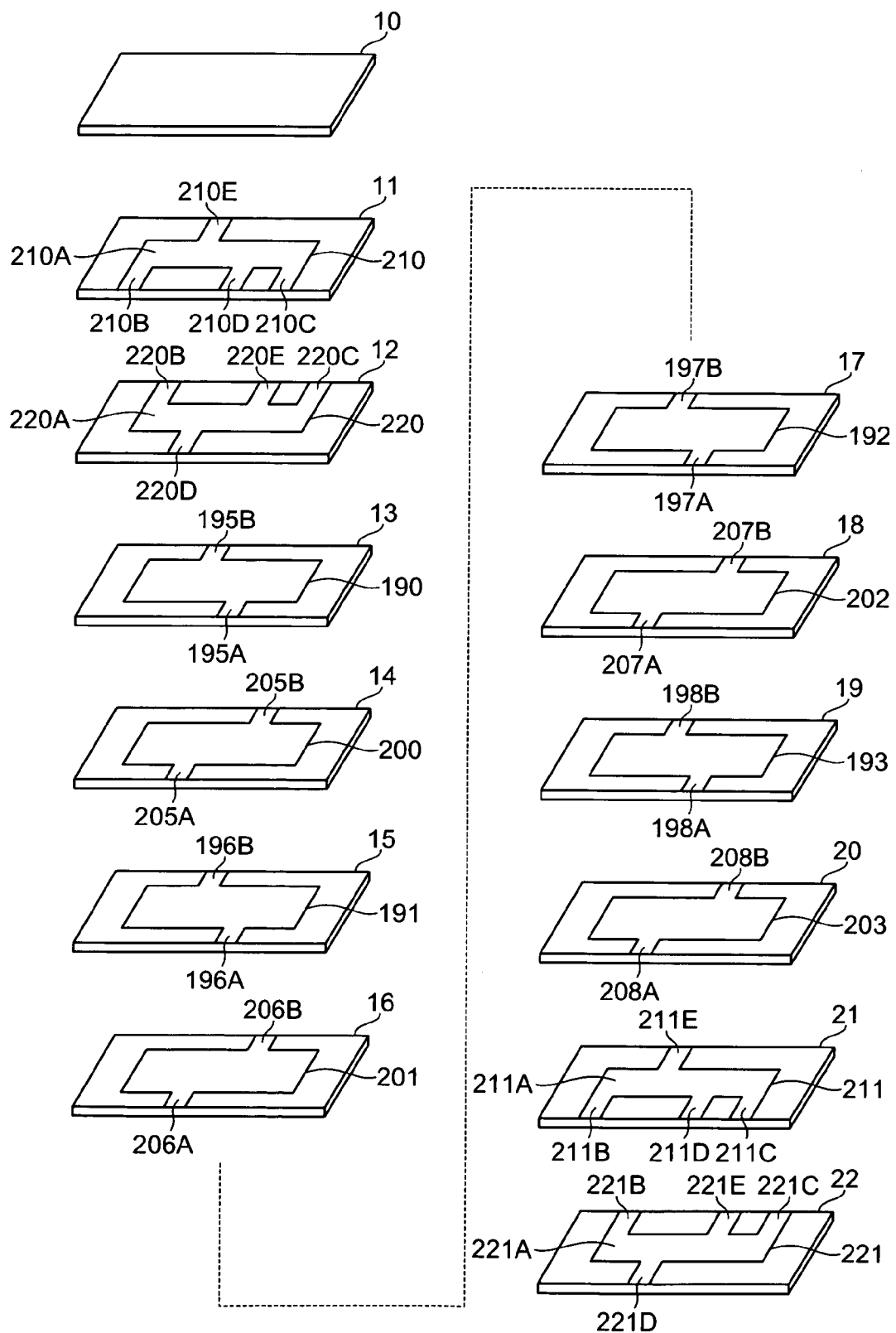
FIG. 22 is an exploded perspective view of the multilayer body included in the multilayer capacitor in accordance with a sixteenth embodiment.

The configuration of the multilayer capacitor in accordance with a sixteenth embodiment will be explained with reference to FIG. 22. The multilayer capacitor in accordance with the sixteenth embodiment differs from the multilayer capacitor C5 in accordance with the fourteenth embodiment in terms of the number of inner connecting conductors. FIG. 22 is an exploded perspective view of the multilayer body included in the multilayer capacitor in accordance with the sixteenth embodiment.

As with the multilayer capacitor C5 in accordance with the fourteenth embodiment, the multilayer capacitor in accordance with the sixteenth embodiment comprises a multilayer body, first terminal conductors 3A, 3B formed on the multilayer body, second terminal conductors 4A, 4B similarly formed on the multilayer body, first outer connecting conductors 5A, 5B similarly formed on the multilayer body, and second outer connecting conductors 6A, 6B similarly formed on the multilayer body, though they are not depicted.

The multilayer capacitor in accordance with the sixteenth embodiment is constructed by alternately laminating a plurality of (13 in this embodiment) dielectric layers 10 to 22 and a plurality of (4 each in this embodiment) of first and second inner electrodes 190 to 193, 200 to 203 as shown in FIG. 22.

In the multilayer body of the multilayer capacitor in accordance with the sixteenth embodiment, a plurality of (2 each in this embodiment) of first inner connecting conductors 210, 211 and a plurality of (2 each in this embodiment) of second inner connecting conductors 220, 221 are laminated. In the multilayer body of the multilayer capacitor in accordance with the sixteenth embodiment, four layers of first inner electrodes 190 to 193 and four layers of second inner electrodes 200 to 203 are arranged between one each of the first and second inner connecting conductors 210, 220 which are a part of the plurality of inner connecting conductors 210, 211, 220, 221 and the remaining first and second inner connecting conductors 211, 221.

The first inner connecting conductor 210 is positioned so as to be held between the dielectric layers 10 and 11. The first inner connecting conductor 211 is positioned so as to be held between the dielectric layers 20 and 21. The second inner connecting conductor 220 is positioned so as to be held between the dielectric layers 11 and 12. The second inner connecting conductor 221 is positioned so as to be held between the dielectric layers 21 and 22.

The first and second inner connecting conductors 210, 211, 220, 221 are laminated in the multilayer body such that the multilayer body includes at least one set (4 sets in this embodiment) of first and second inner electrodes neighboring each other with the dielectric layer in between.

In the multilayer capacitor in accordance with the sixteenth embodiment, the first terminal conductors 3A, 3B are connected to the first inner electrodes 190 to 193 not directly, but electrically through the first outer connecting conductors 5A, 5B and first inner connecting conductors 210, 211. Also, in the multilayer capacitor in accordance with the sixteenth embodiment, the second terminal conductors 4A, 4B are connected to the second inner electrodes 200 to 203 not directly, but electrically through the second outer connecting conductors 6A, 6B and second inner connecting conductors 220, 221. As a consequence, the multilayer capacitor in accordance with the sixteenth embodiment yields an equivalent series resistance greater than that of the conventional multilayer capacitor in which all the inner electrodes are connected to their corresponding terminal conductors through lead conductors.

As compared with the multilayer capacitor C5, the multilayer capacitor in accordance with the sixteenth embodiment has a greater number of first inner connecting conductors 210, 211, whereas the first inner connecting conductors 210, 211 are connected in parallel to their corresponding first terminal conductors 3A, 3B. Also, the multilayer capacitor in accordance with the sixteenth embodiment has a greater number of second inner connecting conductors 220, 221 than that in the multilayer capacitor C5, whereas the second inner connecting conductors 220, 221 are connected in parallel to their corresponding second terminal conductors 4A, 4B. Therefore, the multilayer capacitor in accordance with the sixteenth embodiment yields an equivalent series resistance smaller than that of the multilayer capacitor C5.

As in the foregoing, by adjusting the number of first inner connecting conductors 210, 211 directly connected to the first terminal conductors 3A, 3B and the number of second inner connecting conductors 220, 221 directly connected to the second terminal conductors 4A, 4B, this embodiment sets the equivalent series resistance of the multilayer capacitor to a desirable value, and thus can regulate the equivalent series resistance easily with a high precision. Also, since the equivalent series resistance is controlled by the first and second inner connecting conductors, the multilayer capacitor in accordance with the sixteenth embodiment can regulate the equivalent series resistance while setting its capacitance to a desirable value (e.g., a larger value).

All the outer conductors (first and second terminal conductors 3A, 3B, 4A, 4B and first and second outer connecting conductors 5A, 5B, 6A, 6B) in the multilayer capacitor in accordance with the sixteenth embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the sixteenth embodiment can be made easily.

The first conductor portion 211A of the first inner connecting conductor 211 opposes the second inner electrode 203 with the dielectric layer 20 in between. The first conductor portion 220A of the second inner connecting conductor 220 opposes the first inner electrode 190 with the dielectric layer 12 in between. Therefore, in the multilayer capacitor in accordance with the sixteenth embodiment, the first and second inner connecting conductors 211, 220 can also contribute to forming the capacity component, and thus can further increase the capacitance of the multilayer capacitor.

In the multilayer body of the multilayer capacitor in accordance with the sixteenth embodiment, a plurality of first and second inner electrodes 190 to 193, 200 to 203 are arranged between the first and second inner connecting conductors 210, 220 and the first and second inner connecting conductors 211, 221. Therefore, the multilayer capacitor in accordance with the sixteenth embodiment can set the equivalent series resistance with a favorable balance.

The first terminal conductor 3B and the first outer connecting conductor 5B are formed adjacent to each other on the first side face of the multilayer body in the multilayer capacitor in accordance with the sixteenth embodiment as in the multilayer capacitor C5. Therefore, the multilayer capacitor in accordance with the sixteenth embodiment can lower its equivalent series inductance.

The second terminal conductor 4B and the second outer connecting conductor 6B are formed adjacent to each other on the second side face of the multilayer body in the multilayer capacitor in accordance with the sixteenth embodiment as in the multilayer capacitor C5. Therefore, the multilayer capacitor in accordance with the sixteenth embodiment can lower its equivalent series inductance.

In the multilayer capacitor in accordance with the sixteenth embodiment, about the center axis of the multilayer body, the first terminal conductors 3A, 3B, first outer connecting conductor 5A, and second outer connecting conductor 6A are formed at positions axisymmetrical to the second terminal conductors 4B, 4A, first outer connecting conductor 5B, and second outer connecting conductor 6B, respectively. Also, in the opposing direction of the first side face L5a and second side face L5b of the multilayer body L5, the first terminal conductors 3A, 3B and first outer connecting conductors 5A, 5B oppose the second terminal conductors 4A, 4B and second outer connecting conductors 6B, 6A, respectively. Therefore, the multilayer capacitor in accordance with the sixteenth embodiment can be mounted easily.

Seventeenth Embodiment

Figure 23:
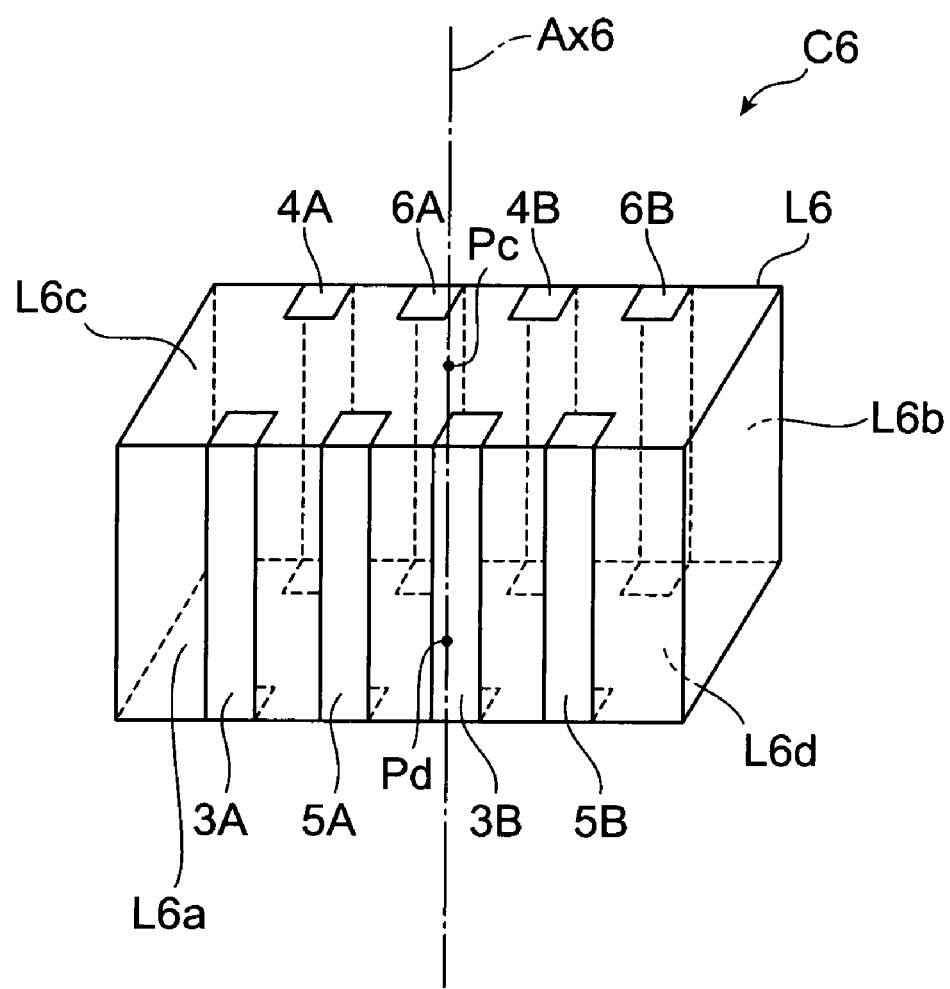
FIG. 23 is a perspective view of the multilayer capacitor in accordance with a seventeenth embodiment.
Figure 24:
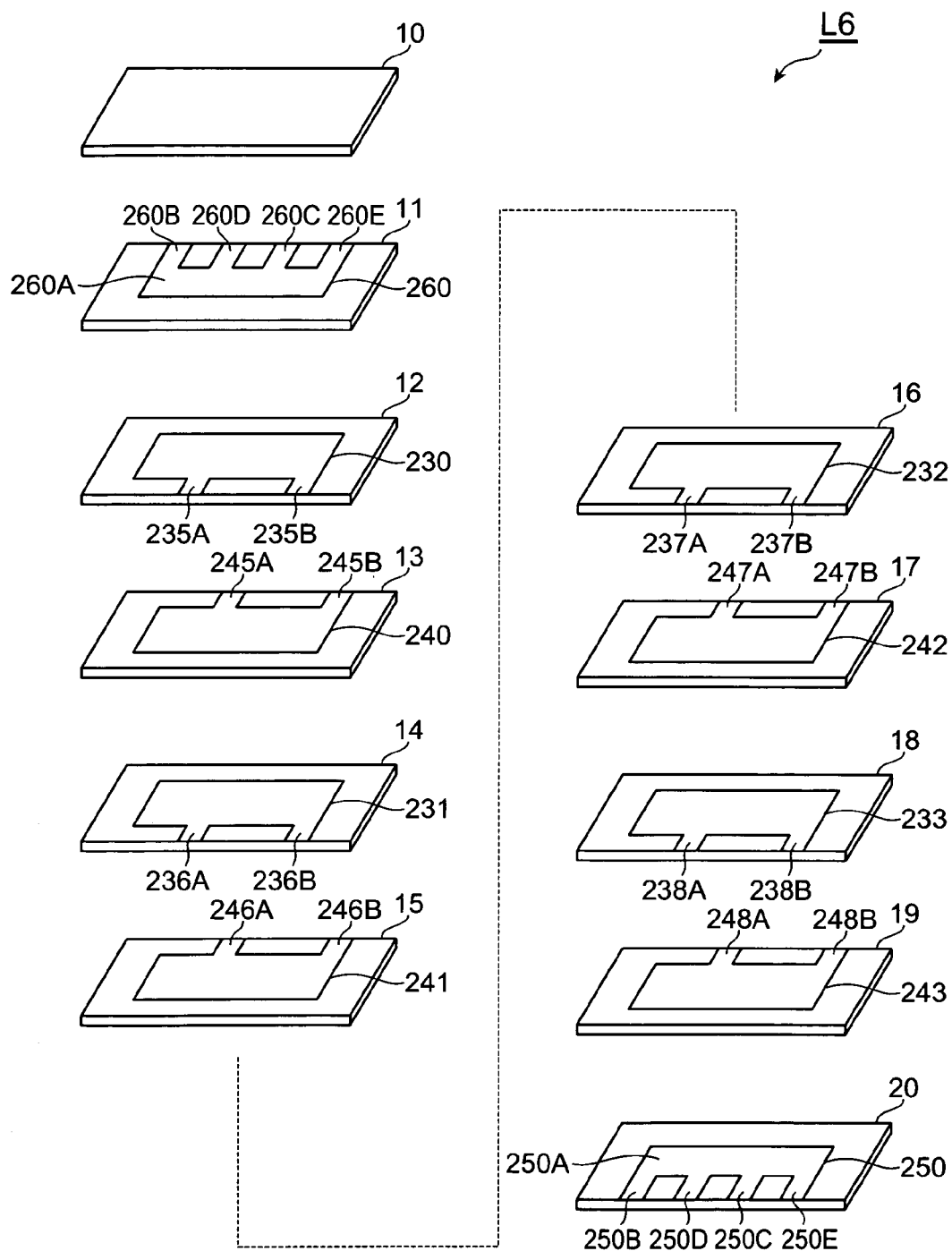
FIG. 24 is an exploded perspective view of the multilayer body included in the multilayer capacitor in accordance with the seventeenth embodiment.

The configuration of the multilayer capacitor C6 in accordance with a seventeenth embodiment will be explained with reference to FIGS. 23 and 24. FIG. 23 is a perspective view of the multilayer capacitor in accordance with the seventeenth embodiment. FIG. 24 is an exploded perspective view of the multilayer body included in the multilayer capacitor in accordance with the seventeenth embodiment.

As shown in FIG. 23, the multilayer capacitor C6 in accordance with the seventeenth embodiment comprises a multilayer body L6, first terminal conductors 3A, 3B formed on the multilayer body L6, second terminal conductors 4A, 4B similarly formed on the multilayer body, first outer connecting conductors 5A, 5B similarly formed on the multilayer body, and second outer connecting conductors 6A, 6B similarly formed on the multilayer body.

Each of the first terminal conductors 3A, 3B and first outer connecting conductors 5A, 5B is positioned on a first side face L6a which is a side face extending along the longitudinal axis of faces L6c, L6d orthogonal to the laminating direction of the multilayer body L6 among side faces parallel to the laminating direction of the multilayer body. The first terminal conductors 3A, 3B and first outer connecting conductor 5A, 5B are formed such that the first terminal conductor 3A, first outer connecting conductor 5A, first terminal conductor 3B, and first outer connecting conductor 5B are successively arranged from the left side to right side of FIG. 23.

Therefore, the first terminal conductor 3A and first outer connecting conductor 5A are formed adjacent to each other on the first side face L6a that is the same side face of the multilayer body L6. The first terminal conductor 3B and first outer connecting conductor 5B are formed adjacent to each other on the first side face L6a that is the same side face of the multilayer body L6.

Each of the second terminal conductors 4A, 4B and second outer connecting conductors 6A, 6B is positioned on a second side face L6b which is a side face extending along the longitudinal axis of faces L6c, L6d orthogonal to the laminating direction of the multilayer body L6 among side faces parallel to the laminating direction of the multilayer body. The second terminal conductors 4A, 4B and second outer connecting conductor 6A, 6B are formed such that the second terminal conductor 4A, second outer connecting conductor 6A, second terminal conductor 4B, and second outer connecting conductor 6B are successively arranged from the left side to right side of FIG. 23.

Therefore, the second terminal conductor 4A and second outer connecting conductor 6A are formed adjacent to each other on the second side face L6b that is the same side face of the multilayer body L6. The second terminal conductor 4B and second outer connecting conductor 6B are formed adjacent to each other on the second side face L6b that is the same side face of the multilayer body L6.

As shown in FIG. 24, the multilayer body L6 is constructed by alternately laminating a plurality of (11 in this embodiment) dielectric layers 10 to 20 and a plurality of (4 each in this embodiment) of first and second inner electrodes 230 to 233, 240 to 243.

Further, one first inner connecting conductor 250 and one second inner connecting conductor 260 are laminated in the multilayer body L6. In the multilayer body L6, the plurality of first inner connecting conductors 240 to 243 and the plurality of second inner connecting conductor 230 to 233 are arranged between the second inner connecting conductor 260 and the first inner connecting conductor 250.

Each of the first inner electrodes 230 to 233 has a substantially rectangular form. The plurality of first inner electrodes 230 to 233 are formed at respective positions separated by a predetermined distance from a side face parallel to the laminating direction of the dielectric layers 10 to 20 (hereinafter simply referred to as "laminating direction") in the multilayer body L6.

Each of lead conductors 235A, 235B is integrally formed with the first inner electrode 230 so as to extend therefrom and reach the first side face L6a of the multilayer body L6. Each of lead conductors 236A, 236B is integrally formed with the first inner electrode 231 so as to extend therefrom and reach the first side face L6a of the multilayer body L6. Each of lead conductors 237A, 237B is integrally formed with the first inner electrode 232 so as to extend therefrom and reach the first side face L6a of the multilayer body L6. Each of lead conductors 238A, 238B is integrally formed with the first inner electrode 233 so as to extend therefrom and reach the first side face L6a of the multilayer body L6.

The first inner electrode 230 is electrically connected to the first outer connecting conductors 5A and 5B through the lead conductors 235A and 235B, respectively. The first inner electrode 231 is electrically connected to the first outer connecting conductors 5A and 5B through the lead conductors 236A and 236B, respectively. The first inner electrode 232 is electrically connected to the first outer connecting conductors 5A and 5B through the lead conductors 237A and 237B, respectively. The first inner electrode 233 is electrically connected to the first outer connecting conductors 5A and 5B through the lead conductors 238A and 238B, respectively. As a consequence, the plurality of first inner electrodes 230 to 233 are electrically connected to each other through the first outer connecting conductors 5A, 5B.

Each of the first inner electrodes 240 to 243 has a substantially rectangular form. The plurality of first inner electrodes 240 to 243 are formed at respective positions separated by a predetermined distance from a side face parallel to the laminating direction of the multilayer body L6.

Each of lead conductors 245A, 245B is integrally formed with the first inner electrode 240 so as to extend therefrom and reach the second side face L6b of the multilayer body L6. Each of lead conductors 246A, 246B is integrally formed with the first inner electrode 241 so as to extend therefrom and reach the second side face L6b of the multilayer body L6. Each of lead conductors 247A, 247B is integrally formed with the second inner electrode 242 so as to extend therefrom and reach the second side face L6b of the multilayer body L6. Each of lead conductors 248A, 248B is integrally formed with the second inner electrode 243 so as to extend therefrom and reach the second side face L6b of the multilayer body L6.

The second inner electrode 240 is electrically connected to the second outer connecting conductors 6A and 6B through the lead conductors 245A and 245B, respectively. The second inner electrode 241 is electrically connected to the second outer connecting conductors 6A and 6B through the lead conductors 246A and 246B, respectively. The second inner electrode 242 is electrically connected to the second outer connecting conductors 6A and 6B through the lead conductors 247A and 247B, respectively. The second inner electrode 243 is electrically connected to the second outer connecting conductors 6A and 6B through the lead conductors 248A and 248B, respectively. As a consequence, the plurality of second inner electrodes 240 to 243 are electrically connected to each other through the second outer connecting conductors 6A, 6B.

The first inner connecting conductor 250 is positioned so as to be held between the dielectric layers 19 and 20. The second inner connecting conductor 260 is positioned so as to be held between the dielectric layers 10 and 11. The first and second inner connecting conductors 250, 260 are electrically insulated from each other.

The first inner connecting conductor 250 includes a first conductor portion 250A having an oblong form, and second, third, fourth, and fifth conductor portions 250B to 250E extending from the first conductor portion 250A so as to be taken out to the first side face L6a of the multilayer body L6. The first conductor portion 250A is arranged such that its longitudinal axis is parallel to the first and second side faces L6a, L6b of the multilayer body L6.

The second inner connecting conductor 260 includes a first conductor portion 260A having an oblong form, and second, third, fourth, and fifth conductor portions 260B to 260E extending from the first conductor portion 260A so as to be taken out to the second side face L6b of the multilayer body L6. The first conductor portion 260A is arranged such that its longitudinal axis is parallel to the first and second side faces L6a, L6b of the multilayer body L6.

In the first inner connecting conductor 250, the second, third, fourth, and fifth conductor portions 250B, 250C, 250D, and 250E are electrically connected to the first terminal conductor 3A, first terminal conductor 3B, first outer connecting conductor 5A, and first outer connecting conductor 5B, respectively. As a consequence, the first inner connecting conductor 250 is electrically connected to the first terminal conductors 3A, 3B and first outer connecting conductors 5A, 5B.

In the second inner connecting conductor 260, the second, third, fourth, and fifth conductor portions 260B, 260C, 260D, and 260E are electrically connected to the second terminal conductor 4A, second terminal conductor 4B, second outer connecting conductor 6A, and second outer connecting conductor 6B, respectively. As a consequence, the second inner connecting conductor 260 is electrically connected to the second terminal conductors 4A, 4B and second outer connecting conductors 6A, 6B.

The first conductor portion 250A of the first inner connecting conductor 250 is a region opposing the second inner electrode 243 with the dielectric layer 19 in between. The second conductor portion 260A of the second inner connecting conductor 260 is a region opposing the first inner electrode 230 with the dielectric layer 11 in between.

The first and second inner connecting conductors 250, 260 are laminated in the multilayer body L6 such that the multilayer body L6 includes at least one set (4 sets in this embodiment) of first and second inner electrodes neighboring each other with the dielectric layer in between.

In the multilayer capacitor C6, the first terminal conductors 3A, 3B are connected to the first inner electrodes 230 to 233 not directly, but electrically through the first outer connecting conductors 5A, 5B and first inner connecting conductor 250. Also, in the multilayer capacitor C6, the second terminal conductors 4A, 4B are connected to the second inner electrodes 240 to 243 not directly, but electrically through the second outer connecting conductors 6A, 6B and second inner connecting conductor 260. As a consequence, the multilayer capacitor C6 yields an equivalent series resistance greater than that of the conventional multilayer capacitor in which all the inner electrodes are connected to their corresponding terminal conductors through lead conductors.

By adjusting the number of first inner connecting conductor 250 directly connected to the first terminal conductors 3A, 3B and the number of second inner connecting conductor 260 directly connected to the second terminal conductors 4A, 4B in such a manner, this embodiment sets the equivalent series resistance of the multilayer capacitor C6 to a desirable value, and thus can regulate the equivalent series resistance easily with a high precision. Also, since the equivalent series resistance is controlled by the first and second inner connecting conductors, the multilayer capacitor C6 can regulate the equivalent series resistance while setting its capacitance to a desirable value (e.g., a larger value).

All of the first and second terminal conductors 3A, 3B, 4A, 4B and first and second outer connecting conductors 5A, 5B, 6A, 6B, which are outer conductors of the multilayer capacitor C6, are formed on the first and second side faces L6a, L6b of the multilayer body L6 opposing each other. Therefore, as compared with the case where outer conductors are formed on four side faces of the multilayer body L6, for example, the multilayer capacitor C6 can reduce steps required for forming the outer conductors. As a consequence, the multilayer capacitor C6 can be made easily.

The first inner connecting conductor 250 has the first conductor portion 250A that is a region opposing the second inner electrode 243 with the dielectric layer 19 in between. The second inner connecting conductor 260 has the first conductor portion 260A that is a region opposing the first inner electrode 230 with the dielectric layer 11 in between. As a consequence, both the first and second inner connecting conductors 250, 260 can contribute to forming the capacity component of the multilayer capacitor C6. Therefore, the multilayer capacitor C6 can further increase its capacitance.

Since a plurality of first and second inner electrodes 230 to 233, 240 to 243 are arranged between the first inner connecting conductor 250 and second inner connecting conductor 260, the multilayer capacitor C6 can set the equivalent series resistance with a favorable balance.

On the first side face L6a of the multilayer body 6 in the multilayer capacitor C6, the first terminal conductors 3A and 3B are formed adjacent to the first outer connecting conductors 5A and 5B, respectively. Therefore, a remarkable canceling effect is obtained when the multilayer capacitor C6 is mounted on a substrate or the like such that the first terminal conductors 3A, 3B are directly connected to land patterns whereas the first outer connecting conductors 5A, 5B are kept from being directly connected to land patterns. Namely, a magnetic field caused by a current flowing between the first terminal conductors 3A, 3B and the first inner connecting conductor 250 (the second and third conductor portions 250B, 250C in the first inner connecting conductor 250) and a magnetic field caused by a current flowing between the first outer connecting conductors 5A, 5B and the first inner electrodes 230 to 233 (the lead conductors 235A to 238A, 235B to 238B) and a current flowing between the first outer connecting conductors 5A, 5B and the first inner connecting conductor 250 (the fourth and fifth conductor portions 250D, 250E in the first inner connecting conductor 250) cancel each other out. As a result, the multilayer capacitor C6 can reduce its equivalent series inductance.

On the second side face L6b of the multilayer body 6 in the multilayer capacitor C6, the second terminal conductors 4A and 4B are formed adjacent to the second outer connecting conductors 6A and 6B, respectively. Therefore, a remarkable canceling effect is obtained when the multilayer capacitor C6 is mounted on a substrate or the like such that the second terminal conductors 4A, 4B are directly connected to land patterns whereas the second outer connecting conductors 6A, 6B are kept from being directly connected to land patterns. Namely, a magnetic field caused by a current flowing between the second terminal conductors 4A, 4B and the second inner connecting conductor 260 (the second and third conductor portions 260B, 260C in the second inner connecting conductor 260) and a magnetic field caused by a current flowing between the second outer connecting conductors 6A, 6B and the second inner electrodes 240 to 243 (the lead conductors 245A to 248A, 245B to 248B) and a current flowing between the second outer connecting conductors 6A, 6B and the second inner connecting conductor 250 (the fourth and fifth conductor portions 260D, 260E in the second inner connecting conductor 260) cancel each other out. As a result, the multilayer capacitor C6 can reduce its equivalent series inductance.

In the multilayer capacitor C6, the first terminal conductors 3A, 3B and first outer connecting conductors 5A, 5B are arranged by the same number while forming neighboring pairs on the first side face L6a of the multilayer body L6. Also, in the multilayer capacitor in accordance with the second embodiment, the second terminal conductors 4A, 4B and second outer connecting conductors 6A, 6B are arranged by the same number while forming neighboring pairs on the second side face L6b of the multilayer body L6. Therefore, a remarkable canceling effect is obtained in a magnetic field caused by a current flowing through the multilayer capacitor C6. As a result, the multilayer capacitor C6 can lower its equivalent series inductance further greatly.

Eighteenth Embodiment

Figure 25:
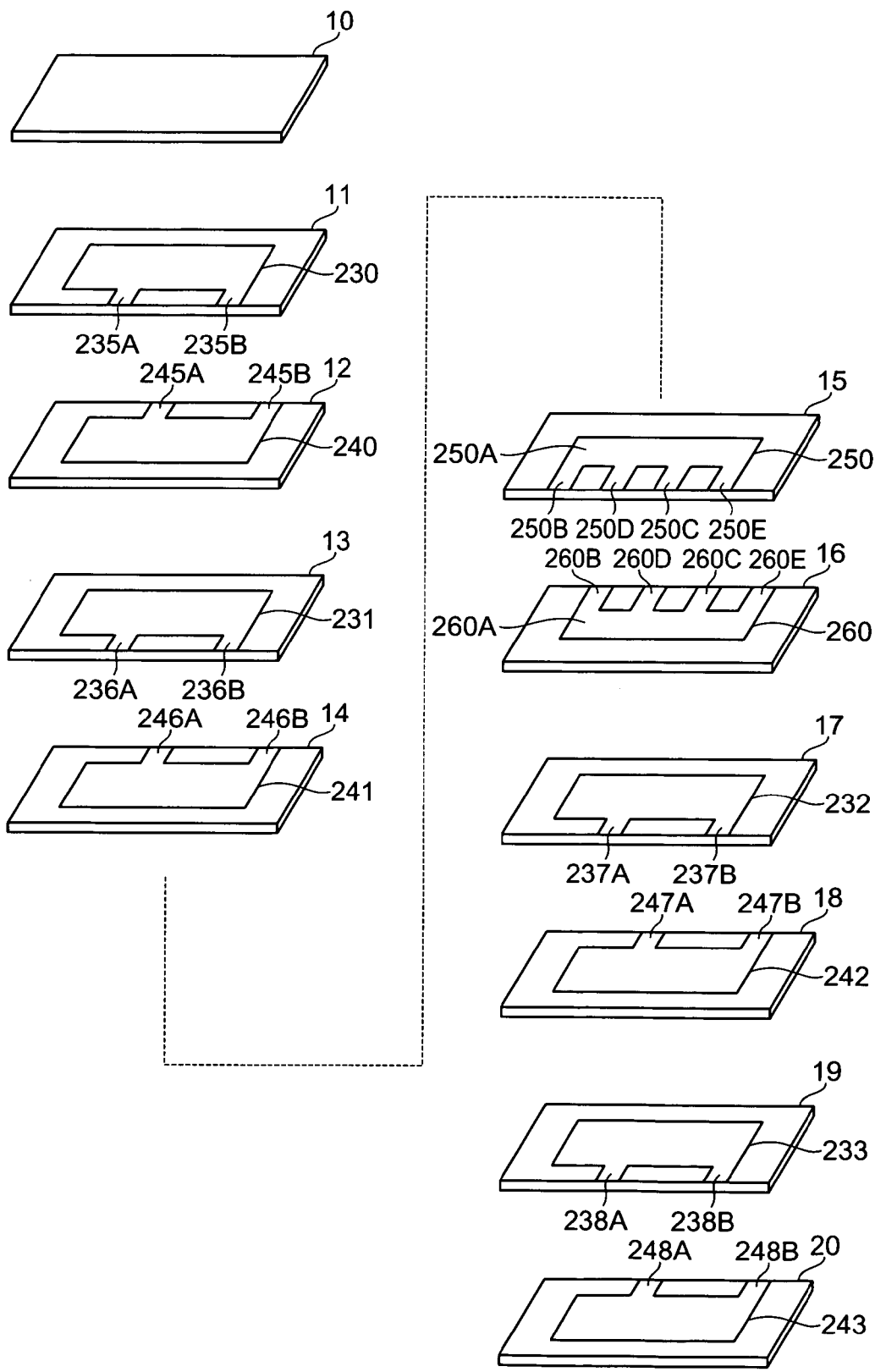
FIG. 25 is an exploded perspective view of the multilayer body included in the multilayer capacitor in accordance with an eighteenth embodiment.

With reference to FIG. 25, the configuration of the multilayer capacitor in accordance with an eighteenth embodiment will be explained. The multilayer capacitor in accordance with the eighteenth embodiment differs from the multilayer capacitor C6 in accordance with the seventeenth embodiment in terms of positions of the inner connecting conductors 250, 260 in the laminating direction. FIG. 25 is an exploded perspective view of the multilayer body included in the multilayer capacitor in accordance with the eighteenth embodiment.

As with the multilayer capacitor C6 in accordance with the seventeenth embodiment, the multilayer capacitor in accordance with the eighteenth embodiment comprises a multilayer body, first terminal conductors 3A, 3B formed on the multilayer body, second terminal conductors 4A, 4B similarly formed on the multilayer body, first outer connecting conductors 5A, 5B similarly formed on the multilayer body, and second outer connecting conductors 6A, 6B similarly formed on the multilayer body, though they are not depicted.

In the multilayer capacitor in accordance with the eighteenth embodiment, the first inner connecting conductor 250 and second inner connecting conductor 260, provided one by one, are laminated. In the multilayer capacitor in accordance with the eighteenth embodiment, the first and second inner connecting conductors 250, 260, provided one by one, are laminated between two layers each of first and second inner electrodes 230, 231, 240, 241 and two layers each of first and second inner electrodes 232, 233, 242, 243 as shown in FIG. 25. More specifically, the first inner connecting conductor 250 is positioned so as to be held between dielectric layers 14 and 15. The second inner connecting conductor 260 is positioned so as to be held between dielectric layers 15 and 16.

The first and second inner connecting conductors 250, 260 are laminated in the multilayer body such that the multilayer body includes at least one set (4 sets in this embodiment) of first and second inner electrodes neighboring each other with the dielectric layer in between.

In the multilayer capacitor in accordance with the eighteenth embodiment, the first terminal conductors 3A, 3B are connected to the first inner electrodes 230 to 233 not directly, but electrically through the first outer connecting conductors 5A, 5B and first inner connecting conductor 250. Also, in the multilayer capacitor in accordance with the eighteenth embodiment, the second terminal conductors 4A, 4B are connected to the second inner electrodes 240 to 243 not directly, but electrically through the second outer connecting conductors 6A, 6B and second inner connecting conductor 260. As a consequence, the multilayer capacitor in accordance with the eighteenth embodiment yields an equivalent series resistance greater than that of the conventional multilayer capacitor in which all the inner electrodes are connected to their corresponding terminal conductors through lead conductors.

Meanwhile, when the first terminal conductors 3A, 3B are concerned, the multilayer capacitor in accordance with the eighteenth embodiment differs from the multilayer capacitor C6 in accordance with the seventeenth embodiment in terms of how the respective resistance components of the first outer connecting conductors 5A, 5B are connected to the first terminal conductors 3A, 3B. In the multilayer capacitor C6 in accordance with the seventeenth embodiment, the respective resistance components of the first outer connecting conductors 5A, 5B are connected in series to the first inner connecting conductor 250, so as to be connected to the first terminal conductors 3A, 3B. In the multilayer capacitor in accordance with the eighteenth embodiment, on the other hand, each of the resistance components of the first outer connecting conductors 5A, 5B is split at the first inner connecting conductor 250 as a boundary, and the resulting resistance components are connected in parallel to their corresponding first terminal conductors 3A, 3B.

When the second terminal conductors 4A, 4B are concerned, the multilayer capacitor in accordance with the eighteenth embodiment differs from the multilayer capacitor C6 in accordance with the seventeenth embodiment in terms of how the respective resistance components of the second outer connecting conductors 6A, 6B are connected to the second terminal conductors 4A, 4B. In the multilayer capacitor in accordance with the seventeenth embodiment, the respective resistance components of the second outer connecting conductors 6A, 6B are connected in series to the second inner connecting conductor 260, so as to be connected to the second terminal conductors 4A, 4B. In the multilayer capacitor in accordance with the eighteenth embodiment, on the other hand, each of the resistance components of the second outer connecting conductors 6A, 6B is split at the second inner connecting conductor 260 as a boundary, and the resulting resistance components are connected in parallel to their corresponding second terminal conductors 4A, 4B. Therefore, because of the difference in resistance components of the first and second outer connecting conductors 5A, 5B, 6A, 6B, the multilayer capacitor in accordance with the eighteenth embodiment yields an equivalent series resistance smaller than that of the multilayer capacitor C6 in accordance with the seventeenth embodiment.

As in the foregoing, by adjusting the positions of the first inner connecting conductor 250 directly connected to the first terminal conductors 3A, 3B and the second inner connecting conductor 260 directly connected to the second terminal conductors 4A, 4B in the laminating direction, this embodiment sets the equivalent series resistance of the multilayer capacitor to a desirable value, and thus can regulate the equivalent series resistance easily with a high precision. Also, since the equivalent series resistance is controlled by the first and second inner connecting conductors, the multilayer capacitor in accordance with the eighteenth embodiment can regulate the equivalent series resistance while setting its capacitance to a desirable value (e.g., a larger value).

All the outer conductors (first and second terminal conductors 3A, 3B, 4A, 4B and first and second outer connecting conductors 5A, 5B, 6A, 6B) in the multilayer capacitor in accordance with the eighteenth embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the eighteenth embodiment can be made easily.

The first conductor portion 250A of the first inner connecting conductor 250 opposes the second inner electrode 241 with the dielectric layer 14 in between. The first conductor portion 260A of the second inner connecting conductor 260 opposes the first inner electrode 232 with the dielectric layer 16 in between. Therefore, in the multilayer capacitor in accordance with the eighteenth embodiment, the first and second inner connecting conductors 250, 260 can also contribute to forming the capacity component, and thus can further increase the capacitance of the multilayer capacitor.

The first terminal conductors 3A, 3B and the first outer connecting conductors 5A, 5B are formed adjacent to each other, respectively, on the first side face of the multilayer body in the multilayer capacitor in accordance with the eighteenth embodiment as in the multilayer capacitor C6. Therefore, the multilayer capacitor in accordance with the eighteenth embodiment can lower its equivalent series inductance.

The second terminal conductors 4A, 4B and the second outer connecting conductors 6A, 6B are formed adjacent to each other, respectively, on the second side face of the multilayer body in the multilayer capacitor in accordance with the eighteenth embodiment as in the multilayer capacitor C6. Therefore, the multilayer capacitor in accordance with the eighteenth embodiment can lower its equivalent series inductance.

In the multilayer capacitor in accordance with the eighteenth embodiment, the first terminal conductors 3A, 3B and first outer connecting conductors 5A, 5B are arranged by the same number while forming neighboring pairs on the first side face L6a of the multilayer body L6. Also, the second terminal conductors 4A, 4B and second outer connecting conductors 6A, 6B are arranged by the same number while forming neighboring pairs on the second side face of the multilayer body. Therefore, the multilayer capacitor in accordance with the eighteenth embodiment can lower its equivalent series inductance further greatly.

Nineteenth Embodiment

Figure 26:
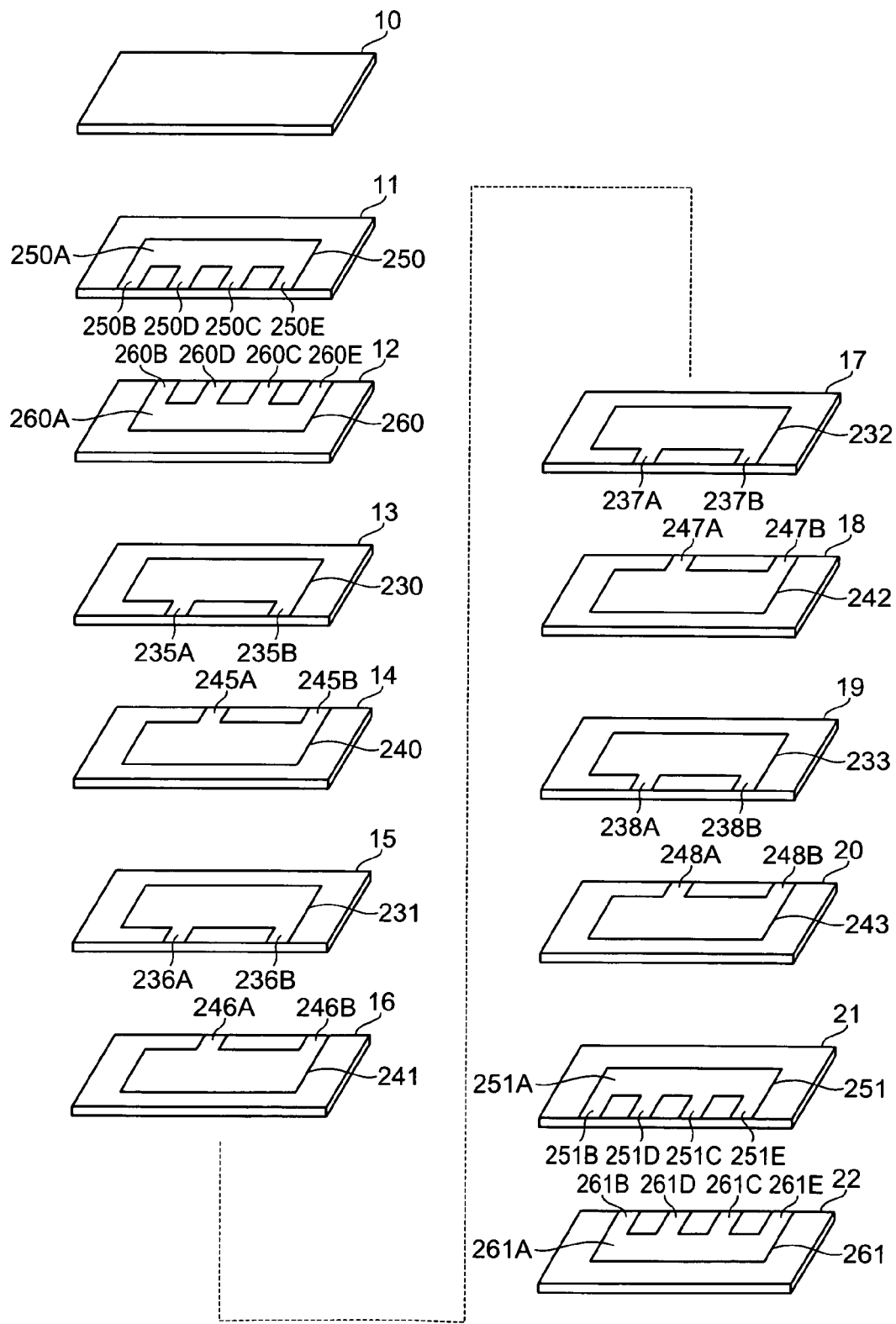
FIG. 26 is an exploded perspective view of the multilayer body included in the multilayer capacitor in accordance with a nineteenth embodiment.

The configuration of the multilayer capacitor in accordance with a nineteenth embodiment will be explained with reference to FIG. 26. The multilayer capacitor in accordance with the nineteenth embodiment differs from the multilayer capacitor C6 in accordance with the seventeenth embodiment in terms of the number of inner connecting conductors. FIG. 26 is an exploded perspective view of the multilayer body included in the multilayer capacitor in accordance with the nineteenth embodiment.

As with the multilayer capacitor C6 in accordance with the seventeenth embodiment, the multilayer capacitor in accordance with the nineteenth embodiment comprises a multilayer body, first terminal conductors 3A, 3B formed on the multilayer body, second terminal conductors 4A, 4B similarly formed on the multilayer body, first outer connecting conductors 5A, 5B similarly formed on the multilayer body, and second outer connecting conductors 6A, 6B similarly formed on the multilayer body, though they are not depicted.

The multilayer capacitor in accordance with the nineteenth embodiment is constructed by alternately laminating a plurality of (13 in this embodiment) dielectric layers 10 to 22 and a plurality of (4 each in this embodiment) of first and second inner electrodes 230 to 233, 240 to 243 as shown in FIG. 26.

In the multilayer body of the multilayer capacitor in accordance with the nineteenth embodiment, a plurality of (2 each in this embodiment) of first inner connecting conductors 250, 251 and a plurality of (2 each in this embodiment) of second inner connecting conductors 260, 261 are laminated. In the multilayer body of the multilayer capacitor in accordance with the nineteenth embodiment, four layers of first inner electrodes 230 to 233 and four layers of second inner electrodes 240 to 243 are arranged between one each of the first and second inner connecting conductors 250, 260 and one each of the first and second inner connecting conductors 251, 261.

The first inner connecting conductor 250 is positioned so as to be held between the dielectric layers 10 and 11. The first inner connecting conductor 251 is positioned so as to be held between the dielectric layers 20 and 21. The second inner connecting conductor 260 is positioned so as to be held between the dielectric layers 11 and 12. The second inner connecting conductor 261 is positioned so as to be held between the dielectric layers 21 and 22.

The first and second inner connecting conductors 250, 251, 260, 261 are laminated in the multilayer body such that the multilayer body includes at least one set (4 sets in this embodiment) of first and second inner electrodes neighboring each other with the dielectric layer in between.

In the multilayer capacitor in accordance with the nineteenth embodiment, the first terminal conductors 3A, 3B are connected to the first inner electrodes 230 to 233 not directly, but electrically through the first outer connecting conductors 5A, 5B and first inner connecting conductors 250, 251. Also, in the multilayer capacitor in accordance with the nineteenth embodiment, the second terminal conductors 4A, 4B are connected to the second inner electrodes 240 to 243 not directly, but electrically through the second outer connecting conductors 6A, 6B and second inner connecting conductors 260, 261. As a consequence, the multilayer capacitor in accordance with the nineteenth embodiment yields an equivalent series resistance greater than that of the conventional multilayer capacitor in which all the inner electrodes are connected to their corresponding terminal conductors through lead conductors.

As compared with the multilayer capacitor C6, the multilayer capacitor in accordance with the nineteenth embodiment has a greater number of first inner connecting conductors 250, 251, whereas the first inner connecting conductors 250, 251 are connected in parallel to their corresponding first terminal conductors 3A, 3B. Also, the multilayer capacitor in accordance with the nineteenth embodiment has a greater number of second inner connecting conductors 260, 261 than that of the multilayer capacitor C6, whereas the second inner connecting conductors 260, 261 are connected in parallel to their corresponding second terminal conductors 4A, 4B. Therefore, the multilayer capacitor in accordance with the nineteenth embodiment yields an equivalent series resistance smaller than that of the multilayer capacitor C6.

As in the foregoing, by adjusting the number of first inner connecting conductors 250, 251 directly connected to the first terminal conductors 3A, 3B and the second inner connecting conductors 260, 261 directly connected to the second terminal conductors 4A, 4B, this embodiment sets the equivalent series resistance of the multilayer capacitor to a desirable value, and thus can regulate the equivalent series resistance easily with a high precision.

All the outer conductors (first and second terminal conductors 3A, 3B, 4A, 4B and first and second outer connecting conductors 5A, 5B, 6A, 6B) in the multilayer capacitor in accordance with the nineteenth embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the nineteenth embodiment can be made easily.

The first conductor portion 251A of the first inner connecting conductor 251 opposes the second inner electrode 243 with the dielectric layer 20 in between. The first conductor portion 260A of the second inner connecting conductor 260 opposes the first inner electrode 230 with the dielectric layer 12 in between. Therefore, in the multilayer capacitor in accordance with the nineteenth embodiment, the first and second inner connecting conductors 251, 260 can also contribute to forming the capacity component, and thus can further increase the capacitance of the multilayer capacitor.

In the multilayer body of the multilayer capacitor in accordance with the nineteenth embodiment, a plurality of first and second inner electrodes 230 to 233, 240 to 243 are arranged between the first and second inner connecting conductors 250, 260 and the first and second inner connecting conductors 251, 261. Therefore, the multilayer capacitor in accordance with the nineteenth embodiment can set the equivalent series resistance with a favorable balance.

The first terminal conductors 3A, 3B and the first outer connecting conductors 5A, 5B are formed adjacent to each other, respectively, on the first side face of the multilayer body in the multilayer capacitor in accordance with the nineteenth embodiment as in the multilayer capacitor C6. Therefore, the multilayer capacitor in accordance with the nineteenth embodiment can lower its equivalent series inductance.

The second terminal conductors 4A, 4B and the second outer connecting conductors 6A, 6B are formed adjacent to each other, respectively, on the second side face of the multilayer body in the multilayer capacitor in accordance with the nineteenth embodiment as in the multilayer capacitor C6. Therefore, the multilayer capacitor in accordance with the nineteenth embodiment can lower its equivalent series inductance.

In the multilayer capacitor in accordance with the nineteenth embodiment, the first terminal conductors 3A, 3B and first outer connecting conductors 5A, 5B are arranged by the same number while forming neighboring pairs on the first side face L6a of the multilayer body L6. Also, the second terminal conductors 4A, 4B and second outer connecting conductors 6A, 6B are arranged by the same number while forming neighboring pairs on the second side face L6b of the multilayer body L6. Therefore, the multilayer capacitor in accordance with the nineteenth embodiment can lower its equivalent series inductance more greatly.

Twentieth Embodiment

Figure 27:
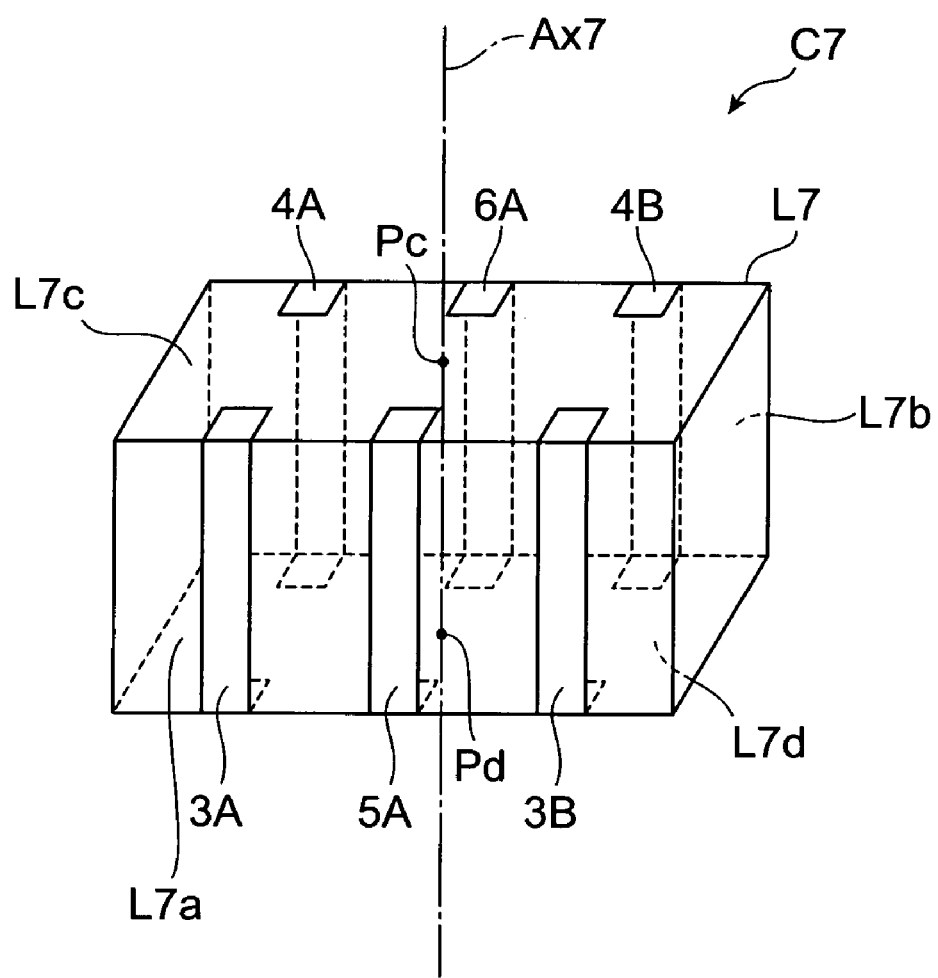
FIG. 27 is a perspective view of the multilayer capacitor in accordance with a twentieth embodiment.
Figure 28:
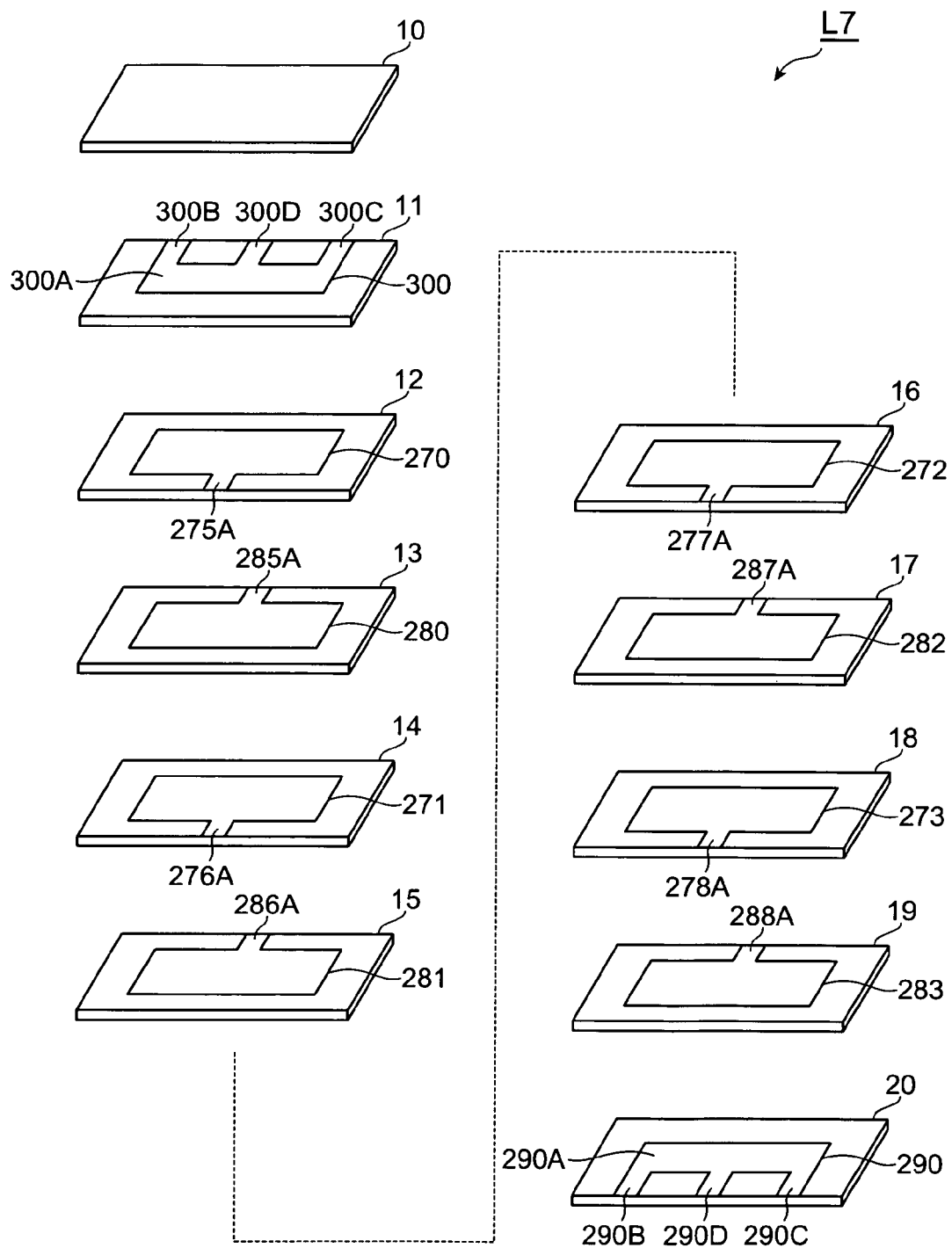
FIG. 28 is an exploded perspective view of the multilayer body included in the multilayer capacitor in accordance with the twentieth embodiment.

The configuration of the multilayer capacitor C7 in accordance with a twentieth embodiment will be explained with reference to FIGS. 27 and 28. FIG. 27 is a perspective view of the multilayer capacitor in accordance with the twentieth embodiment. FIG. 28 is an exploded perspective view of the multilayer body included in the multilayer capacitor in accordance with the twentieth embodiment.

As shown in FIG. 27, the multilayer capacitor C7 in accordance with the twentieth embodiment comprises a multilayer body L7, first terminal conductors 3A, 3B formed on the multilayer body L7, second terminal conductors 4A, 4B similarly formed on the multilayer body, a first outer connecting conductor 5A similarly formed on the multilayer body, and a second outer connecting conductor 6A similarly formed on the multilayer body.

Each of the first terminal conductors 3A, 3B and first outer connecting conductor 5A is positioned on a first side face L7a which is a side face extending along the longitudinal axis of faces L7c, L7d orthogonal to the laminating direction of the multilayer body L7 among side faces parallel to the laminating direction of the multilayer body. The first terminal conductors 3A, 3B and first outer connecting conductor 5A are formed such that the first terminal conductor 3A, first outer connecting conductor 5A, and first terminal conductor 3B are successively arranged from the left side to right side of FIG. 27.

Therefore, the first terminal conductor 3A and first outer connecting conductor 5A are formed adjacent to each other on the first side face L7a that is the same side face of the multilayer body L7. The first terminal conductor 3B and first outer connecting conductor 5A are formed adjacent to each other on the first side face L7a that is the same side face of the multilayer body L7.

Each of the second terminal conductors 4A, 4B and second outer connecting conductor 6A is positioned on a second side face L7b which is a side face extending along the longitudinal axis of faces L7c, L7d orthogonal to the laminating direction of the multilayer body L7 among side faces parallel to the laminating direction of the multilayer body. The second terminal conductors 4A, 4B and second outer connecting conductor 6A are formed such that the second terminal conductor 4A, second outer connecting conductor 6A, and second terminal conductor 4B are successively arranged from the left side to right side of FIG. 27.

Therefore, the second terminal conductor 4A and second outer connecting conductor 6A are formed adjacent to each other on the second side face L7b that is the same side face of the multilayer body L7. The second terminal conductor 4B and second outer connecting conductor 6A are formed adjacent to each other on the second side face L7b that is the same side face of the multilayer body L7.

The first terminal conductor 3A and second terminal conductor 4B are axisymmetrical to each other about a center axis Ax7 passing respective center points Pc, Pd of the two side faces L7c, L7d orthogonal to the laminating direction of the multilayer body L7 among center axes of the multilayer body L7. The first terminal conductor 3B and second-terminal conductor 4A are axisymmetrical to each other about the center axis Ax7 of the multilayer body L7. The first outer connecting conductor 5A and second outer connecting conductor 6A are axisymmetrical to each other about the center axis Ax7 of the multilayer body L7.

The first terminal conductor 3A and second terminal conductor 4A oppose each other in a direction along which the first side face L7a and second side face L7b of the multilayer body L7 oppose each other. The first terminal conductor 3B and second terminal conductor 4B oppose each other in the opposing direction of the first side face L7a and second side face L7b of the multilayer body L7. The first outer connecting conductor 5A and second outer connecting conductor 6A oppose each other in the opposing direction of the first side face L7a and second side face L7b of the multilayer body L7.

As shown in FIG. 28, the multilayer body L7 is constructed by alternately laminating a plurality of (11 in this embodiment) dielectric layers 10 to 20 and a plurality of (4 each in this embodiment) of first and second inner electrodes 270 to 273, 280 to 283.

Further, one first inner connecting conductor 290 and one second inner connecting conductor 300 are laminated in the multilayer body L7. In the multilayer body L7, the plurality of first inner connecting conductors 270 to 273 and the plurality of second inner connecting conductor 280 to 283 are arranged between the second inner connecting conductor 300 and the first inner connecting conductor 290.

Each of the first inner electrodes 270 to 273 has a substantially rectangular form. The plurality of first inner electrodes 270 to 273 are formed at respective positions separated by a predetermined distance from a side face parallel to the laminating direction of the dielectric layers 10 to 20 (hereinafter simply referred to as "laminating direction") in the multilayer body L7.

A lead conductor 275A is integrally formed with the first inner electrode 270 so as to extend therefrom and reach the first side face L7a of the multilayer body L7. A lead conductor 276A is integrally formed with the first inner electrode 271 so as to extend therefrom and reach the first side face L7a of the multilayer body L7. A lead conductor 277A is integrally formed with the first inner electrode 272 so as to extend therefrom and reach the first side face L7a of the multilayer body L7. A lead conductor 278A is integrally formed with the first inner electrode 273 so as to extend therefrom and reach the first side face L7a of the multilayer body L7.

The first inner electrode 270 is electrically connected to the first outer connecting conductor 5A through the lead conductor 275A. The first inner electrode 271 is electrically connected to the first outer connecting conductor 5A through the lead conductor 276A. The first inner electrode 272 is electrically connected to the first outer connecting conductor 5A through the lead conductor 277A. The first inner electrode 273 is electrically connected to the first outer connecting conductor 5A through the lead conductor 278A. As a consequence, the plurality of first inner electrodes 270 to 273 are electrically connected to each other through the first outer connecting conductor 5A.

Each of the second inner electrodes 280 to 283 has a substantially rectangular form. The plurality of second inner electrodes 280 to 283 are formed at respective positions separated by a predetermined distance from a side face parallel to the laminating direction of the multilayer body L7.

A lead conductor 285A is integrally formed with the second inner electrode 280 so as to extend therefrom and reach the second side face L7b of the multilayer body L7. A lead conductor 286A is integrally formed with the second inner electrode 281 so as to extend therefrom and reach the second side face L7b of the multilayer body L7. A lead conductor 287A is integrally formed with the second inner electrode 282 so as to extend therefrom and reach the second side face L7b of the multilayer body L7. A lead conductor 288A is integrally formed with the second inner electrode 283 so as to extend therefrom and reach the second side face L7b of the multilayer body L7.

The second inner electrode 280 is electrically connected to the second outer connecting conductor 6A through the lead conductor 285A. The second inner electrode 281 is electrically connected to the second outer connecting conductor 6A through the lead conductor 286A. The second inner electrode 282 is electrically connected to the second outer connecting conductor 6A through the lead conductor 287A. The second inner electrode 283 is electrically connected to the second outer connecting conductor 6A through the lead conductor 288A. As a consequence, the plurality of second inner electrodes 280 to 283 are electrically connected to each other through the second outer connecting conductor 6A.

The first inner connecting conductor 290 is positioned so as to be held between the dielectric layers 19 and 20. The second inner connecting conductor 300 is positioned so as to be held between the dielectric layers 10 and 11. The first and second inner connecting conductors 290, 300 are electrically insulated from each other.

The first inner connecting conductor 290 includes a first conductor portion 290A having an oblong form and second, third, and fourth conductor portions 290B to 290D extending from the first conductor portion 290A so as to be taken out to the first side face L7a of the multilayer body L7. The first conductor portion 290A is arranged such that its longitudinal axis is parallel to the first and second side faces L7a, L7b of the multilayer body L7.

The second inner connecting conductor 300 includes a first conductor portion 300A having an oblong form and second, third, and fourth conductor portions 300B to 300D extending from the first conductor portion 300A so as to be taken out to the second side face L7b of the multilayer body L7. The first conductor portion 300A is arranged such that its longitudinal axis is parallel to the first and second side faces L7a, L7b of the multilayer body L7.

In the first inner connecting conductor 290, the second, third, and fourth conductor portions 290B, 290C, and 290D are electrically connected to the first terminal conductor 3A, first terminal conductor 3B, and first outer connecting conductor 5A, respectively. As a consequence, the first inner connecting conductor 290 is electrically connected to the first terminal conductors 3A, 3B and first outer connecting conductor 5A.

In the second inner connecting conductor 300, the second, third, and fourth conductor portions 300B, 300C, and 300D are electrically connected to the second terminal conductor 4A, second terminal conductor 4B, and second outer connecting conductor 6A, respectively. As a consequence, the second inner connecting conductor 300 is electrically connected to the second terminal conductors 4A, 4B and second outer connecting conductor 6A.

The first conductor portion 290A of the first inner connecting conductor 290 is a region opposing the second inner electrode 283 with the dielectric layer 19 in between. The first conductor portion 300A of the second inner connecting conductor 300 is a region opposing the first inner electrode 270 with the dielectric layer 11 in between.

The first and second inner connecting conductors 290, 300 are laminated in the multilayer body L7 such that the multilayer body L7 includes at least one set (4 sets in this embodiment) of first and second inner electrodes neighboring each other with the dielectric layer in between.

In the multilayer capacitor C7, the first terminal conductors 3A, 3B are connected to the first inner electrodes 270 to 273 not directly, but electrically through the first outer connecting conductor 5A and first inner connecting conductor 290. Also, in the multilayer capacitor C7, the second terminal conductors 4A, 4B are connected to the second inner electrodes 280 to 283 not directly, but electrically through the second outer connecting conductor 6A and second inner connecting conductor 300. As a result, the multilayer capacitor C7 yields an equivalent series resistance greater than that of the conventional multilayer capacitor in which all the inner electrodes are connected to their corresponding terminal conductors through lead conductors.

By adjusting the number of first inner connecting conductor 290 directly connected to the first terminal conductors 3A, 3B and the number of second inner connecting conductor 300 directly connected to the second terminal conductors 4A, 4B in such a manner, this embodiment sets the equivalent series resistance of the multilayer capacitor C7 to a desirable value, and thus can regulate the equivalent series resistance easily with a high precision. Also, since the equivalent series resistance is controlled by the first and second inner connecting conductors, the multilayer capacitor C7 can regulate the equivalent series resistance while setting its capacitance to a desirable value (e.g., a larger value).

All of the first and second terminal conductors 3A, 3B, 4A, 4B and first and second outer connecting conductors 5A, 6A, which are outer conductors of the multilayer capacitor C7, are formed on the first and second side faces L7a, L7b of the multilayer body L7 opposing each other. Therefore, as compared with the case where outer conductors are formed on three or more side faces (e.g., four side faces) of the multilayer body L7, the multilayer capacitor C7 can reduce steps required for forming the outer conductors. As a consequence, the multilayer capacitor C7 can be made easily.

The first inner connecting conductor 290 has the first conductor portion 290A that is a region opposing the second inner electrode 283 with the dielectric layer 19 in between. The second inner connecting conductor 300 has the second conductor portion 300A that is a region opposing the first inner electrode 270 with the dielectric layer 11 in between. Therefore, both of the first and second inner connecting conductors 290, 300 can contribute to forming the capacity component of the multilayer capacitor C7. As a consequence, the multilayer capacitor C7 can further increase its capacitance.

Since a plurality of first and second inner electrodes 270 to 273, 280 to 283 are arranged between the first inner connecting conductor 290 and second inner connecting conductor 300, the multilayer capacitor C7 can set the equivalent series resistance with a favorable balance.

On the first side face L7a of the multilayer body L7 in the multilayer capacitor C7, both of the first terminal conductors 3A, 3B are formed adjacent to the first outer connecting conductor 5A. Therefore, the following effects are obtained when the multilayer capacitor C7 is mounted on a substrate or the like such that the first terminal conductors 3A, 3B are directly connected to land patterns whereas the first outer connecting conductor 5A is kept from being directly connected to a land pattern. Namely, a magnetic field caused by a current flowing between the first terminal conductors 3A, 3B and the first inner connecting conductor 290 (the second and third conductor portions 290B, 290C in the first inner connecting conductor 290) and a magnetic field caused by a current flowing between the first outer connecting conductor 5A and the first inner electrodes 270 to 273 (the lead conductors 275A to 278A) and a current flowing between the first outer connecting conductor 5A and the first inner connecting conductor 290 (the fourth conductor portion 290D in the first inner connecting conductor 290) cancel each other out. As a result, the multilayer capacitor C7 can reduce its equivalent series inductance.

On the second side face L7b of the multilayer body L7 in the multilayer capacitor C7, both of the second terminal conductors 4A, 4B are formed adjacent to the second outer connecting conductor 6A. Therefore, the following effects are obtained when the multilayer capacitor C7 is mounted on a substrate or the like such that the second terminal conductors 4A, 4B are directly connected to land patterns whereas the second outer connecting conductor 6A is kept from being directly connected to a land pattern. Namely, a magnetic field caused by a current flowing between the second terminal conductors 4A, 4B and the second inner connecting conductor 300 (the second and third conductor portions 300B, 300C in the second inner connecting conductor 300) and a magnetic field caused by a current flowing between the second outer connecting conductor 6A and the second inner electrodes 280 to 283 (the lead conductors 285A to 288A) and a current flowing between the second outer connecting conductor 6A and the second inner connecting conductor 300 (the fourth conductor portion 300D in the first inner connecting conductor 300) cancel each other out. As a result, the multilayer capacitor C7 can reduce its equivalent series inductance.

In the multilayer capacitor C7, about the center axis Ax7 of the multilayer body L7, the first terminal conductors 3A, 3B are formed at positions axisymmetrical to the second terminal conductors 4A, 4B, respectively, and the first outer connecting conductor 5A and second outer connecting conductor 6A are formed at positions axisymmetrical to each other. Also, in the opposing direction of the first side face L7a and second side face L7b of the multilayer body L7 in the multilayer capacitor C7, the first-terminal conductors 3A, 3B oppose the second terminal conductors 4A, 4B, respectively, and the first outer connecting conductor 5A and second outer connecting conductor 6A oppose each other. Therefore, the multilayer capacitor C7 can be mounted easily.

Twenty-First Embodiment

Figure 29:
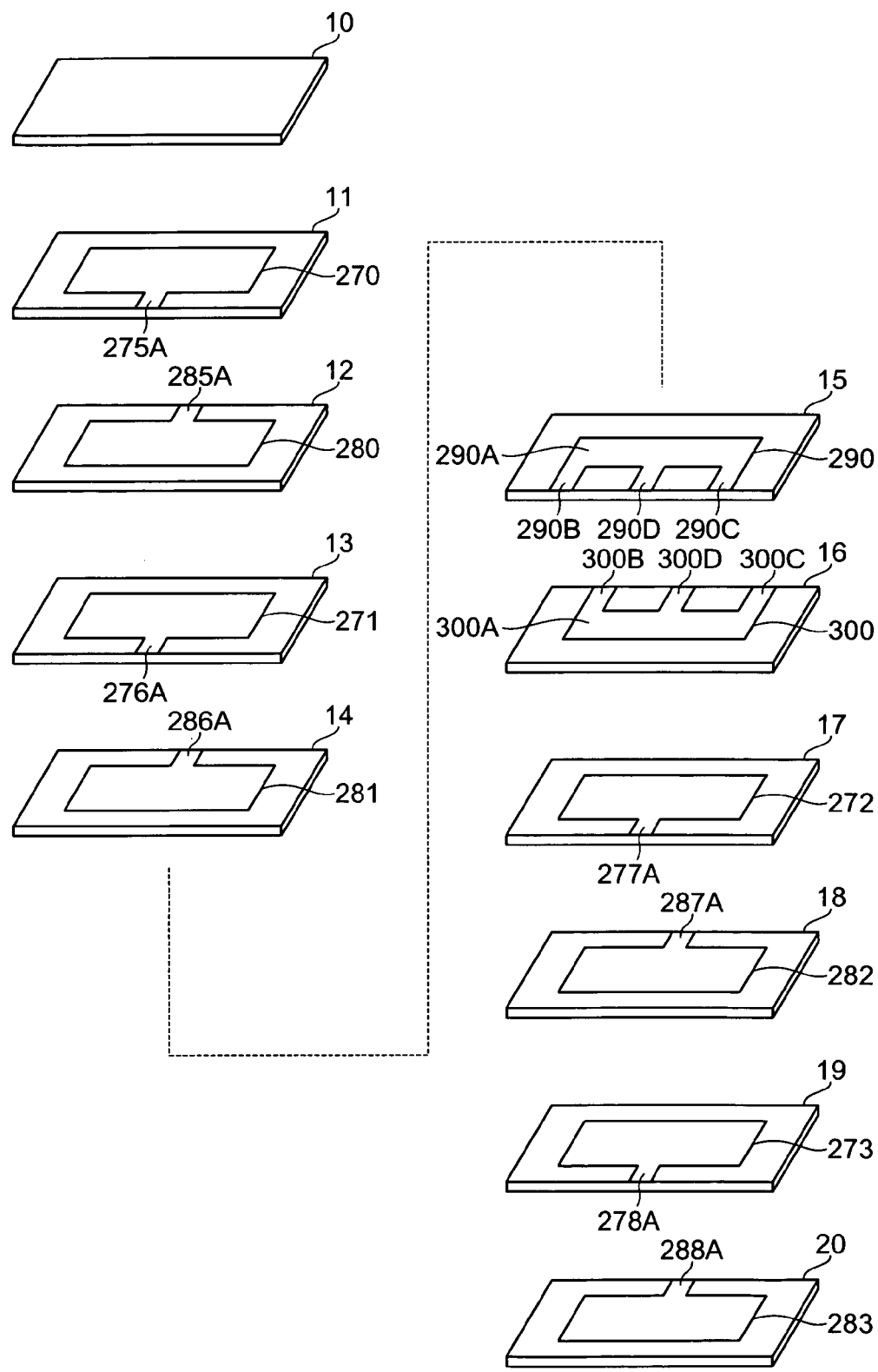
FIG. 29 is an exploded perspective view of the multilayer body included in the multilayer capacitor in accordance with a twenty-first embodiment.

With reference to FIG. 29, the configuration of the multilayer capacitor in accordance with a twenty-first embodiment will be explained. The multilayer capacitor in accordance with the twenty-first embodiment differs from the multilayer capacitor C7 in accordance with the twentieth embodiment in terms of positions of the inner connecting conductors 290, 300 in the laminating direction. FIG. 29 is an exploded perspective view of the multilayer body included in the multilayer capacitor in accordance with the twenty-first embodiment.

As with the multilayer capacitor C7 in accordance with the twentieth embodiment, the multilayer capacitor in accordance with the twenty-first embodiment comprises a multilayer body, first terminal conductors 3A, 3B formed on the multilayer body, second terminal conductors 4A, 4B similarly formed on the multilayer body, a first outer connecting conductor 5A similarly formed on the multilayer body, and a second outer connecting conductor 6A similarly formed on the multilayer body, though they are not depicted.

The first and second inner connecting conductors 290, 300, provided one by one, are laminated in the multilayer body of the multilayer capacitor in accordance with the twenty-first embodiment. In the multilayer capacitor in accordance with the twenty-first embodiment, the first and second inner connecting conductors 290, 300, provided one by one, are laminated between two layers each of first and second inner electrodes 270, 271, 280, 281 and two layers each of first and second inner electrodes 272, 273, 282, 283 as shown in FIG. 29. More specifically, the first inner connecting conductor 290 is positioned so as to be held between dielectric layers 14 and 15. The second inner connecting conductor 300 is positioned so as to be held between dielectric layers 15 and 16.

The first and second inner connecting conductors 290, 300 are laminated in the multilayer body such that the multilayer body includes at least one set (4 sets in this embodiment) of first and second inner electrodes neighboring each other with the dielectric layer in between.

In the multilayer capacitor in accordance with the twenty-first embodiment, the first terminal conductors 3A, 3B are connected to the first inner electrodes 270 to 273 not directly, but electrically through the first outer connecting conductor 5A and first inner connecting conductor 290.

Also, in the multilayer capacitor in accordance with the twenty-first embodiment, the second terminal conductors 4A, 4B are connected to the second inner electrodes 280 to 283 not electrically directly, but electrically through the second outer connecting conductor 6A and second inner connecting conductor 300. As a consequence, the multilayer capacitor in accordance with the twenty-first embodiment yields an equivalent series resistance greater than that of the conventional multilayer capacitor in which all the inner electrodes are connected to their corresponding terminal conductors through lead conductors.

Meanwhile, when the first terminal conductors 3A, 3B are concerned, the multilayer capacitor in accordance with the twenty-first embodiment differs from the multilayer capacitor C7 in accordance with the twentieth embodiment in terms of how the resistance component of the first outer connecting conductor 5A is connected to the first terminal conductors 3A, 3B. In the multilayer capacitor C7 in accordance with the twentieth embodiment, the resistance component of the first outer connecting conductor 5A is connected in series to the first inner connecting conductor 290, so as to be connected to each of the first terminal conductors 3A, 3B. In the multilayer capacitor in accordance with the twenty-first embodiment, on the other hand, the resistance component of the first outer connecting conductor 5A is split at the first inner connecting conductor 290 as a boundary, and the resulting resistance components are connected in parallel to each of the first terminal conductors 3A, 3B.

When the second terminal conductors 4A, 4B are concerned, the multilayer capacitor in accordance with the twenty-first embodiment differs from the multilayer capacitor C7 in accordance with the twentieth embodiment in terms of how the resistance component of the second outer connecting conductor 6A is connected to the second terminal conductors 4A, 4B. In the multilayer capacitor C7 in accordance with the twentieth embodiment, the resistance component of the second outer connecting conductor 6A is connected in series to the second inner connecting conductor 300, so as to be connected to each of the second terminal conductors 4A, 4B. In the multilayer capacitor in accordance with the twenty-first embodiment, on the other hand, the resistance component of the second outer connecting conductor 6A is split at the second inner connecting conductor 300 as a boundary, and the resulting resistance components are connected in parallel to each of the second terminal conductors 4A, 4B. Therefore, because of the difference in resistance components of the first and second outer connecting conductors 5A, 6A, the multilayer capacitor in accordance with the twenty-first embodiment yields an equivalent series resistance smaller than that of the multilayer capacitor C7 in accordance with the twentieth embodiment.

As in the foregoing, by adjusting the positions of the first inner connecting conductor 290 directly connected to the first terminal conductors 3A, 3B and the second inner connecting conductor 300 directly connected to the second terminal conductors 4A, 4B in the laminating direction, this embodiment sets the equivalent series resistance of the multilayer capacitor to a desirable value, and thus can regulate the equivalent series resistance easily with a high precision. Also, since the equivalent series resistance is controlled by the first and second inner connecting conductors, the multilayer capacitor in accordance with the twenty-first embodiment can regulate the equivalent series resistance while setting its capacitance to a desirable value (e.g., a larger value).

All the outer conductors (first and second terminal conductors 3A, 3B, 4A, 4B and first and second outer connecting conductors 5A, 6A) in the multilayer capacitor in accordance with the twenty-first embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the twenty-first embodiment can be made easily.

The first conductor portion 290A of the first inner connecting conductor 290 opposes the second inner electrode 281 with the dielectric layer 14 in between. The first conductor portion 300A of the second inner connecting conductor 300 opposes the first inner electrode 272 with the dielectric layer 16 in between. Therefore, in the multilayer capacitor in accordance with the twenty-first embodiment, the first and second inner connecting conductors 290, 300 can also contribute to forming the capacity component, and thus can further increase the capacitance of the multilayer capacitor.

The first terminal conductors 3A, 3B are formed adjacent to the first outer connecting conductor 5A on the first side face of the multilayer body in the multilayer capacitor in accordance with the twenty-first embodiment as in the multilayer capacitor C7. Therefore, the multilayer capacitor in accordance with the twenty-first embodiment can lower its equivalent series inductance.

The second terminal conductors 4A, 4B are formed adjacent to the second outer connecting conductor 6A on the second side face of the multilayer body in the multilayer capacitor in accordance with the twenty-first embodiment as in the multilayer capacitor C7. Therefore, the multilayer capacitor in accordance with the twenty-first embodiment can lower its equivalent series inductance.

In the multilayer capacitor in accordance with the twenty-first embodiment, about the center axis of the multilayer body, the first terminal conductors 3A, 3B are formed at positions axisymmetrical to the second terminal conductors 4A, 4B, respectively, and the first outer connecting conductor 5A and second outer connecting conductor 6A are formed at positions axisymmetrical to each other. Also, in the opposing direction of the first and second side faces of the multilayer body in the multilayer capacitor in accordance with the twenty-first embodiment, the first terminal conductors 3A, 3B oppose the second terminal conductors 4A, 4B, respectively, and the first outer connecting conductor 5A and second outer connecting conductor 6A oppose each other. Therefore, the multilayer capacitor in accordance with the twenty-first embodiment can be mounted easily.

Twenty-Second Embodiment

Figure 30:
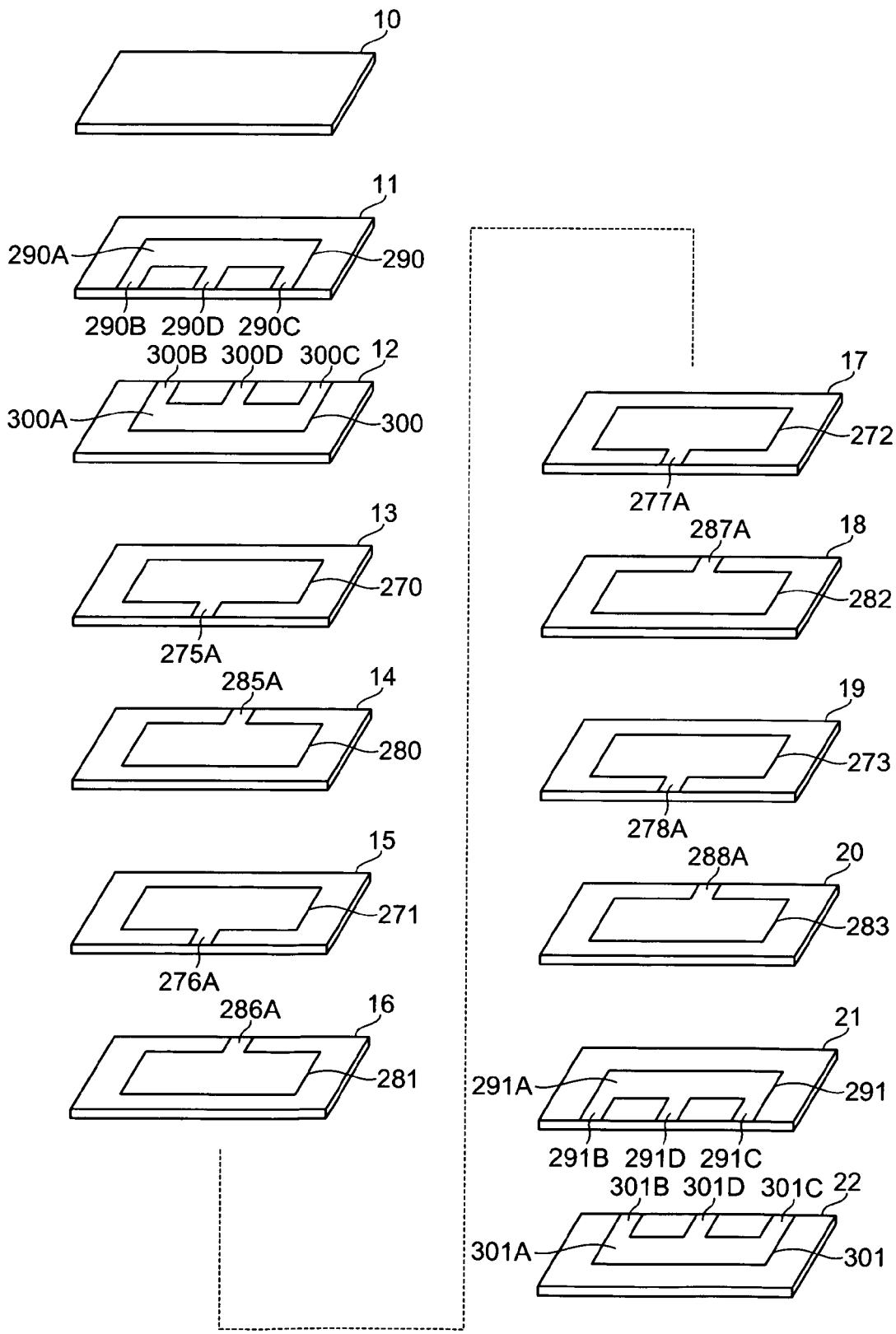
FIG. 30 is an exploded perspective view of the multilayer body included in the multilayer capacitor in accordance with a twenty-second embodiment.

The configuration of the multilayer capacitor in accordance with a twenty-second embodiment will be explained with reference to FIG. 30. The multilayer capacitor in accordance with the twenty-second embodiment differs from the multilayer capacitor C7 in accordance with the twentieth embodiment in terms of the number of inner connecting conductors. FIG. 30 is an exploded perspective view of the multilayer body included in the multilayer capacitor in accordance with the twenty-second embodiment.

As with the multilayer capacitor C7 in accordance with the twentieth embodiment, the multilayer capacitor in accordance with the twenty-second embodiment comprises a multilayer body, first terminal conductors 3A, 3B formed on the multilayer body, second terminal conductors 4A, 4B similarly formed on the multilayer body, a first outer connecting conductor 5A similarly formed on the multilayer body, and a second outer connecting conductor 6A similarly formed on the multilayer body, though they are not depicted.

The multilayer capacitor in accordance with the twenty-second embodiment is constructed by alternately laminating a plurality of (13 in this embodiment) dielectric layers 10 to 22 and a plurality of (4 each in this embodiment) of first and second inner electrodes 270 to 273, 280 to 283 as shown in FIG. 30.

In the multilayer body of the multilayer capacitor in accordance with the twenty-second embodiment, a plurality of (2 each in this embodiment) of first inner connecting conductors 290, 291 and a plurality of (2 each in this embodiment) of second inner connecting conductors 300, 301 are laminated. In the multilayer body of the multilayer capacitor in accordance with the twenty-second embodiment, four layers of first inner electrodes 270 to 273 and four layers of second inner electrodes 280 to 283 are arranged between one each of the first and second inner connecting conductors 290, 300 and one each of the first and second inner connecting conductors 291, 301.

The first inner connecting conductor 290 is positioned so as to be held between the dielectric layers 10 and 11. The first inner connecting conductor 291 is positioned so as to be held between the dielectric layers 20 and 21. The second inner connecting conductor 300 is positioned so as to be held between the dielectric layers 11 and 12. The second inner connecting conductor 301 is positioned so as to be held between the dielectric layers 21 and 22.

The first and second inner connecting conductors 290, 291, 300, 301 are laminated in the multilayer body such that the multilayer body includes at least one set (4 sets in this embodiment) of first and second inner electrodes neighboring each other with the dielectric layer in between.

In the multilayer capacitor in accordance with the twenty-second embodiment, the first terminal conductors 3A, 3B are connected to the first inner electrodes 270 to 273 not directly, but electrically through the first outer connecting conductor 5A and first inner connecting conductors 290, 291. Also, in the multilayer capacitor in accordance with the twenty-second embodiment, the second terminal conductors 4A, 4B are connected to the second inner electrodes 280 to 283 not directly, but electrically through the second outer connecting conductor 6A and second inner connecting conductors 300, 301. As a consequence, the multilayer capacitor in accordance with the twenty-second embodiment yields an equivalent series resistance greater than that of the conventional multilayer capacitor in which all the inner electrodes are connected to their corresponding terminal conductors through lead conductors.

As compared with the multilayer capacitor C7, the multilayer capacitor in accordance with the twenty-second embodiment has a greater number of first inner connecting conductors 290, 291, whereas the first inner connecting conductors 290, 291 are connected in parallel to their corresponding first terminal conductors 3A, 3B. Also, the multilayer capacitor in accordance with the twenty-second embodiment has a greater number of second inner connecting conductors 300, 301 than that of the multilayer capacitor C7, whereas the second inner connecting conductors 300, 301 are connected in parallel to their corresponding second terminal conductors 4A, 4B. Therefore, the multilayer capacitor in accordance with the twenty-second embodiment yields an equivalent series resistance smaller than that of the multilayer capacitor C7.

As in the foregoing, by adjusting the number of first inner connecting conductors 290, 291 directly connected to the first terminal conductors 3A, 3B and the second inner connecting conductors 300, 301 directly connected to the second terminal conductors 4A, 4B, this embodiment sets the equivalent series resistance of the multilayer capacitor to a desirable value, and thus can regulate the equivalent series resistance easily with a high precision.

All the outer conductors (first and second terminal conductors 3A, 3B, 4A, 4B and first and second outer connecting conductors 5A, 6A) in the multilayer capacitor in accordance with the twenty-second embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the twenty-second embodiment can be made easily.

The first conductor portion 291A of the first inner connecting conductor 291 opposes the second inner electrode 283 with the dielectric layer 20 in between. The first conductor portion 300A of the second inner connecting conductor 300 opposes the first inner electrode 270 with the dielectric layer 12 in between. Therefore, in the multilayer capacitor in accordance with the twenty-second embodiment, the first and second inner connecting conductors 291, 300 can also contribute to forming the capacity component, and thus can further increase the capacitance of the multilayer capacitor.

In the multilayer body of the multilayer capacitor in accordance with the twenty-second embodiment, a plurality of first and second inner electrodes 270 to 273, 280 to 283 are arranged between the first and second inner connecting conductors 290, 300 and the first and second inner connecting conductors 291, 301. Therefore, the multilayer capacitor in accordance with the twenty-second embodiment can set the equivalent series resistance with a favorable balance.

The first terminal conductors 3A, 3B and the first outer connecting conductor 5A are formed adjacent to each other on the first side face of the multilayer body in the multilayer capacitor in accordance with the twenty-second embodiment as in the multilayer capacitor C7. Therefore, the multilayer capacitor in accordance with the twenty-second embodiment can lower its equivalent series inductance.

The second terminal conductors 4A, 4B and the second outer connecting conductor 6A are formed adjacent to each other on the second side face of the multilayer body in the multilayer capacitor in accordance with the twenty-second embodiment as in the multilayer capacitor C7. Therefore, the multilayer capacitor in accordance with the twenty-second embodiment can lower its equivalent series inductance.

In the multilayer capacitor in accordance with the twenty-second embodiment, about the center axis of the multilayer body, the first terminal conductors 3A, 3B are formed at positions axisymmetrical to the second terminal conductors 4A, 4B, respectively, and the first outer connecting conductor 5A and second outer connecting conductor 6A are formed at positions axisymmetrical to each other. Also, in the opposing direction of the first and second side faces of the multilayer body in the multilayer capacitor in accordance with the twenty-second embodiment, the first terminal conductors 3A, 3B oppose the second terminal conductors 4A, 4B, respectively, and the first outer connecting conductor 5A and second outer connecting conductor 6A oppose each other. Therefore, the multilayer capacitor in accordance with the twenty-second embodiment can be mounted easily.

Twenty-Third Embodiment

Figure 31:
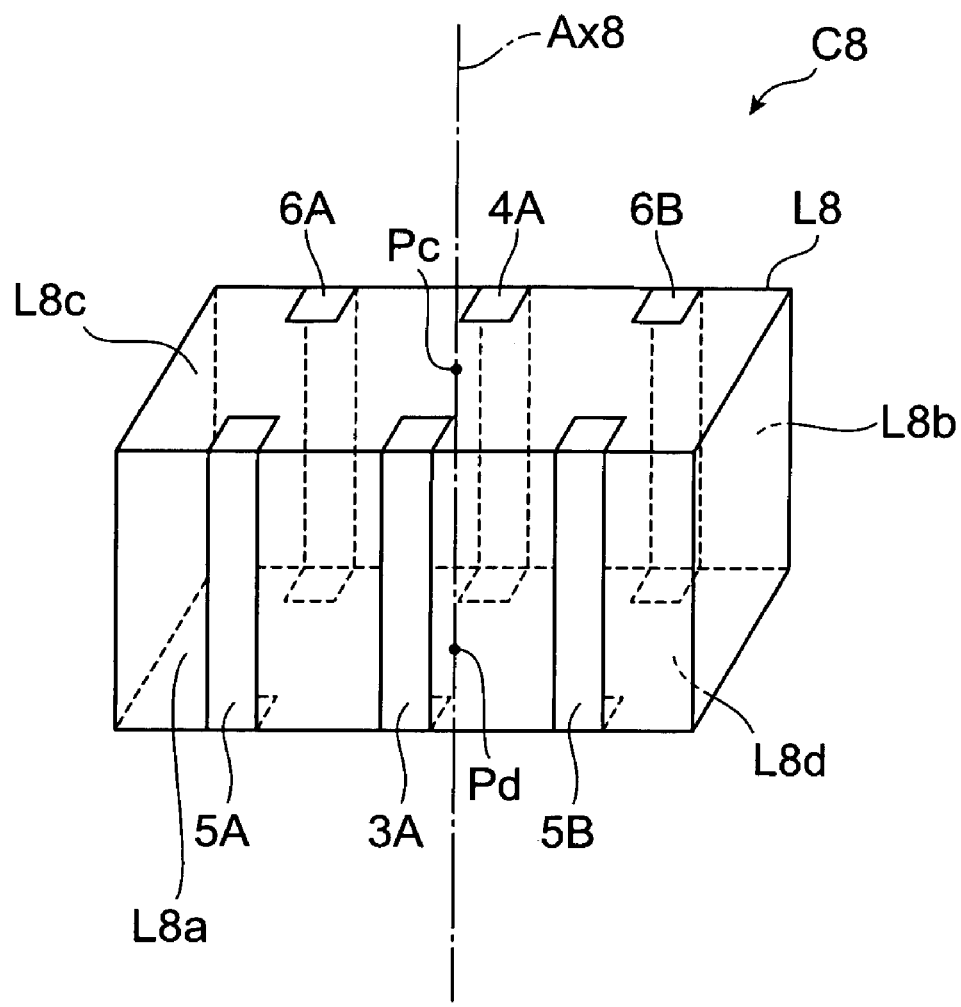
FIG. 31 is a perspective view of the multilayer capacitor in accordance with a twenty-third embodiment.
Figure 32:
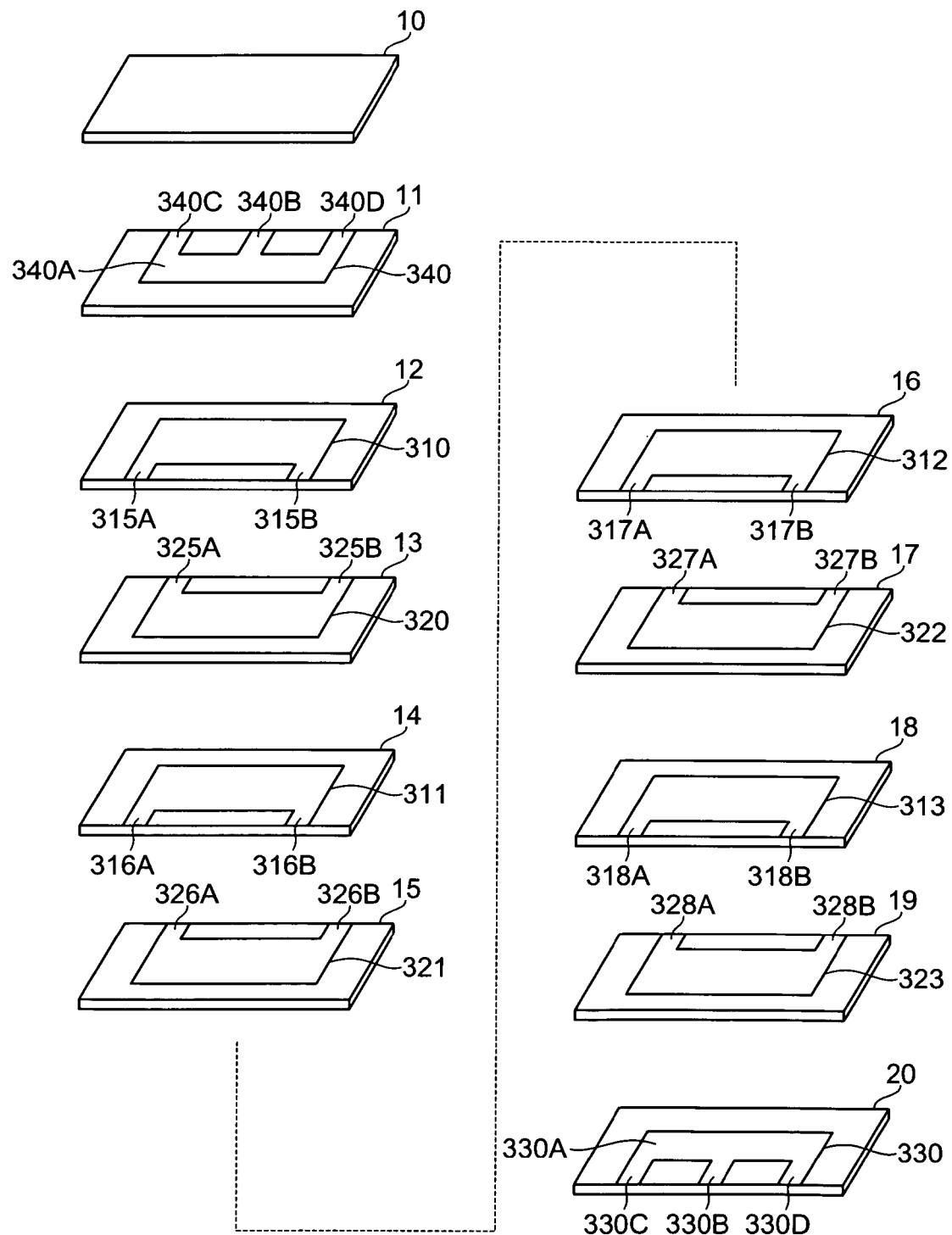
FIG. 32 is an exploded perspective view of the multilayer body included in the multilayer capacitor in accordance with the twenty-third embodiment.

The configuration of the multilayer capacitor C8 in accordance with a twenty-third embodiment will be explained with reference to FIGS. 31 and 32. FIG. 31 is a perspective view of the multilayer capacitor in accordance with the twenty-third embodiment. FIG. 32 is an exploded perspective view of the multilayer body included in the multilayer capacitor in accordance with the twenty-third embodiment.

As shown in FIG. 31, the multilayer capacitor C8 in accordance with the twenty-third embodiment comprises a multilayer body L8, a first terminal conductor 3A formed on the multilayer body L8, a second terminal conductor 4A similarly formed on the multilayer body, first outer connecting conductors 5A, 5B similarly formed on the multilayer body, and second outer connecting conductors 6A, 6B similarly formed on the multilayer body.

Each of the first terminal conductor 3A and first outer connecting conductors 5A, 5B is positioned on a first side face L8a which is a side face extending along the longitudinal axis of faces L8c, L8d orthogonal to the laminating direction of the multilayer body L8 among side faces parallel to the laminating direction of the multilayer body. The first terminal conductor 3A and first outer connecting conductors 5A, 5B are formed such that the first outer connecting conductor 5A, first terminal conductor 3A, and first outer connecting conductor 5B are successively arranged from the left side to right side of FIG. 31.

Therefore, the first terminal conductor 3A and first outer connecting conductor 5A are formed adjacent to each other on the first side face L8a that is the same side face of the multilayer body L8. The first terminal conductor 3A and first outer connecting conductor 5B are formed adjacent to each other on the first side face L8a that is the same side face of the multilayer body L8.

Each of the second terminal conductor 4A and second outer connecting conductors 6A, 6B is positioned on a second side face L8b which is a side face extending along the longitudinal axis of faces L8c, L8d orthogonal to the laminating direction of the multilayer body L8 among side faces parallel to the laminating direction of the multilayer body. The second terminal conductor 4A and second outer connecting conductors 6A, 6B are formed such that the second outer connecting conductor 6A, second terminal conductor 4A, and second outer connecting conductor 6B are successively arranged from the left side to right side of FIG. 31.

Therefore, the second terminal conductor 4A and second outer connecting conductor 6A are formed adjacent to each other on the second side face L8b that is the same side face of the multilayer body L8. The second terminal conductor 3B and second outer connecting conductor 6B are formed adjacent to each other on the second side face L8b that is the same side face of the multilayer body L8.

The first terminal conductor 3A and second terminal conductor 4A are axisymmetrical to each other about a center axis Ax8 passing respective center points Pc, Pd of the two side faces L8c, L8d orthogonal to the laminating direction of the multilayer body L8 among center axes of the multilayer body L8. The first outer connecting conductor 5A and second outer connecting conductor 6B are axisymmetrical to each other about the center axis Ax8 of the multilayer body L8. The first outer connecting conductor 5B and second outer connecting conductor 6A are axisymmetrical to each other about the center axis Ax8 of the multilayer body L8.

The first terminal conductor 3A and second terminal conductor 4A oppose each other in a direction along which the first side face L8a and second side face L8b of the multilayer body L8 oppose each other. The first outer connecting conductor 5A and second outer connecting conductor 6A oppose each other in the opposing direction of the first side face L8a and second side face L8b of the multilayer body L8. The first outer connecting conductor 5B and second outer connecting conductor 6B oppose each other in the opposing direction of the first side face L8a and second side face L8b of the multilayer body L8.

As shown in FIG. 32, the multilayer body L8 is constructed by alternately laminating a plurality of (11 in this embodiment) dielectric layers 10 to 20 and a plurality of (4 each in this embodiment) of first and second inner electrodes 310 to 313, 320 to 323.

Further, one first inner connecting conductor 330 and one second inner connecting conductor 340 are laminated in the multilayer body L8. In the multilayer body L8, the plurality of first inner connecting conductors 310 to 313 and the plurality of second inner connecting conductor 320 to 323 are arranged between the second inner connecting conductor 340 and the first inner connecting conductor 330.

Each of the first inner electrodes 310 to 313 has a substantially rectangular form. The plurality of first inner electrodes 310 to 313 are formed at respective positions separated by a predetermined distance from a side face parallel to the laminating direction of the dielectric layers 10 to 20 (hereinafter simply referred to as "laminating direction") in the multilayer body L8.

Each of lead conductors 315A, 315B is integrally formed with the first inner electrode 310 so as to extend therefrom and reach the first side face L8a of the multilayer body L8. Each of lead conductors 316A, 316B is integrally formed with the first inner electrode 311 so as to extend therefrom and reach the first side face L8a of the multilayer body L8. Each of lead conductors 317A, 317B is integrally formed with the first inner electrode 312 so as to extend therefrom and reach the first side face L8a of the multilayer body L8. Each of lead conductors 318A, 318B is integrally formed with the first inner electrode 313 so as to extend therefrom and reach the first side face L8a of the multilayer body L8.

The first inner electrode 310 is electrically connected to the first outer connecting conductors 5A and 5B through the lead conductors 315A and 315B, respectively. The first inner electrode 311 is electrically connected to the first outer connecting conductors 5A and 5B through the lead conductors 316A and 316B, respectively. The first inner electrode 312 is electrically connected to the first outer connecting conductors 5A and 5B through the lead conductors 317A and 317B, respectively. The first inner electrode 313 is electrically connected to the first outer connecting conductors 5A and 5B through the lead conductors 318A and 318B, respectively. As a consequence, the plurality of first inner electrodes 310 to 313 are electrically connected to each other through the first outer connecting conductors 5A, 5B.

Each of the second inner electrodes 320 to 323 has a substantially rectangular form. The plurality of second inner electrodes 320 to 323 are formed at respective positions separated by a predetermined distance from a side face parallel to the laminating direction of the multilayer body L8.

Each of lead conductors 325A, 325B is integrally formed with the second inner electrode 320 so as to extend therefrom and reach the second side face L8*b* of the multilayer body L8. Each of lead conductors 326A, 326B is integrally formed with the second inner electrode 321 so as to extend therefrom and reach the second side face L8*b* of the multilayer body L8. Each of lead conductors 327A, 327B is integrally formed with the second inner electrode 322 so as to extend therefrom and reach the second side face L8*b* of the multilayer body L8. Each of lead conductors 328A, 328B is integrally formed with the first inner electrode 323 so as to extend therefrom and reach the second side face L8*b* of the multilayer body L8.

The second inner electrode 320 is electrically connected to the second outer connecting conductors 6A and 6B through the lead conductors 325A and 325B, respectively. The second inner electrode 321 is electrically connected to the second outer connecting conductors 6A and 6B through the lead conductors 326A and 326B, respectively. The second inner electrode 322 is electrically connected to the second outer connecting conductors 6A and 6B through the lead conductors 327A and 327B, respectively. The second inner electrode 323 is electrically connected to the second outer connecting conductors 6A and 6B through the lead conductors 328A and 328B, respectively. As a consequence, the plurality of first inner electrodes 320 to 323 are electrically connected to each other through the second outer connecting conductors 6A, 6B.

The first inner connecting conductor 330 is positioned so as to be held between the dielectric layers 19 and 20. The second inner connecting conductor 340 is positioned so as to be held between the dielectric layers 10 and 11. The first and second inner connecting conductors 330, 340 are electrically insulated from each other.

The first inner connecting conductor 330 includes a first conductor portion 330A having an oblong form and second, third, and fourth conductor portions 330B to 330D extending from the first conductor portion 330A so as to be taken out to the first side face L8*a* of the multilayer body L8. The first conductor portion 330A is arranged such that its longitudinal axis is parallel to the first and second side faces L8*a*, L8*b* of the multilayer body L8.

The second inner connecting conductor 340 includes a first conductor portion 340A having an oblong form and second, third, and fourth conductor portions 340B to 340D extending from the first conductor portion 340A so as to be taken out to the second side face L8*b* of the multilayer body L8. The first conductor portion 340A is arranged such that its longitudinal axis is parallel to the first and second side faces L8*a*, L8*b* of the multilayer body L8.

In the first inner connecting conductor 330, the second, third, and fourth conductor portions 330B, 330C, and 330D are electrically connected to the first terminal conductor 3A, first outer connecting conductor 5A, and first outer connecting conductor 5B, respectively. As a consequence, the first inner connecting conductor 330 is electrically connected to the first terminal conductors 3A and first outer connecting conductors 5A, 5B.

In the second inner connecting conductor 340, the second, third, and fourth conductor portions 340B, 340C, and 340D are electrically connected to the second terminal conductor 4A, second outer connecting conductor 6A, and second outer connecting conductor 6B, respectively. As a consequence, the second inner connecting conductor 340 is electrically connected to the second terminal conductor 4A and second outer connecting conductors 6A, 6B.

The first conductor portion 330A of the first inner connecting conductor 330 is a region opposing the second inner electrode 323 with the dielectric layer 19 in between. The first conductor portion 340A of the second inner connecting conductor 340 is a region opposing the first inner electrode 310 with the dielectric layer 11 in between.

The first and second inner connecting conductors 330, 340 are laminated in the multilayer body L8 such that the multilayer body L8 includes at least one set (4 sets in this embodiment) of first and second inner electrodes neighboring each other with the dielectric layer in between.

In the multilayer capacitor C8, the first terminal conductor 3A is connected to the first inner electrodes 310 to 313 not directly, but electrically through the first outer connecting conductors 5A, 5B and first inner connecting conductor 330. Also, in the multilayer capacitor C8, the second terminal conductor 4A is connected to the second inner electrodes 320 to 323 not directly, but electrically through the second outer connecting conductors 6A, 6B and second inner connecting conductor 340. As a result, the multilayer capacitor C8 yields an equivalent series resistance greater than that of the conventional multilayer capacitor in which all the inner electrodes are connected to their corresponding terminal conductors through lead conductors.

By adjusting the number of first inner connecting conductor 330 directly connected to the first terminal conductor 3A and the number of second inner connecting conductor 340 directly connected to the second terminal conductor 4A in such a manner, this embodiment sets the equivalent series resistance of the multilayer capacitor C8 to a desirable value, and thus can regulate the equivalent series resistance easily with a high precision. Also, since the equivalent series resistance is controlled by the first and second inner connecting conductors, the multilayer capacitor C8 can regulate the equivalent series resistance while setting its capacitance to a desirable value (e.g., a larger value).

All of the first and second terminal conductors 3A, 4A and first and second outer connecting conductors 5A, 5B, 6A, 6B, which are outer conductors of the multilayer capacitor C8, are formed on the first and second side faces L8*a*, L8*b* of the multilayer body L8 opposing each other. Therefore, as compared with the case where outer conductors are formed on three or more side faces (e.g., four side faces) of the multilayer body L8, the multilayer capacitor C8 can reduce steps required for forming the outer conductors. As a consequence, the multilayer capacitor C8 can be made easily.

The first inner connecting conductor 330 has the first conductor portion 330A that is a region opposing the second inner electrode 323 with the dielectric layer 19 in between in the laminating direction of the multilayer body L8. The second inner connecting conductor 340 has the second conductor portion 340A that is a region opposing the first inner electrode 310 with the dielectric layer 11 in between. Therefore, both of the first and second inner connecting conductors 330, 340 can contribute to forming the capacity component of the multilayer capacitor C8. As a consequence, the multilayer capacitor C8 can further increase its capacitance.

Since a plurality of first and second inner electrodes 310 to 313, 320 to 323 are arranged between the first inner connecting conductor 330 and second inner connecting conductor 340, the multilayer capacitor C8 can set the equivalent series resistance with a favorable balance.

On the first side face L8*a* of the multilayer body L8 in the multilayer capacitor C8, the first terminal conductors 3A is formed adjacent to both of the first outer connecting conductors 5A and 5B. Therefore, the following effects are obtained when the multilayer capacitor C8 is mounted on a substrate or the like such that the first terminal conductor 3A is directly connected to a land pattern whereas the first outer connecting conductors 5A, 5B are kept from being directly connected to land patterns. Namely, a magnetic field caused by a current flowing between the first terminal conductor 3A and the first inner connecting conductor 330 (the second conductor portion 330B in the first inner connecting conductor 330) and a magnetic field caused by a current flowing between the first outer connecting conductors 5A, 5B and the first inner electrodes 310 to 313 (the lead conductors 315A to 318A, 315B to 318B) and a current flowing between the first outer connecting conductors 5A, 5B and the first inner connecting conductor 330 (the third and fourth conductor portions 330C, 330D in the first inner connecting conductor 330) cancel each other out. As a result, the multilayer capacitor C8 can reduce its equivalent series inductance.

On the second side face L8b of the multilayer body L8 in the multilayer capacitor C8, the second terminal conductors 4A is formed adjacent to both of the second outer connecting conductors 6A and 6B. Therefore, the following effects are obtained when the multilayer capacitor C8 is mounted on a substrate or the like such that the second terminal conductor 4A is directly connected to a land pattern whereas the second outer connecting conductors 6A, 6B are kept from being directly connected to land patterns. Namely, a magnetic field caused by a current flowing between the second terminal conductor 4A and the second inner connecting conductor 340 (the second conductor portion 340B in the second inner connecting conductor 340) and a magnetic field caused by a current flowing between the second outer connecting conductors 6A, 6B and the second inner electrodes 320 to 323 (the lead conductors 325A to 328A, 325B to 328B) and a current flowing between the second outer connecting conductors 6A, 6B and the second inner connecting conductor 340 (the third and fourth conductor portions 340C, 340D in the second inner connecting conductor 340) cancel each other out. As a result, the multilayer capacitor C8 can reduce its equivalent series inductance.

In the multilayer capacitor C8, about the center axis Ax8 of the multilayer body L8, the first terminal conductor 3A and second terminal conductor 4A are formed at positions axisymmetrical to each other, and the first outer connecting conductors 5A, 5B are formed at positions axisymmetrical to the second outer connecting conductors 6B, 6A, respectively. Also, in the opposing direction of the first side face L8a and second side face L8b of the multilayer body L8 in the multilayer capacitor C8, the first terminal conductor 3A and second terminal conductor 4A oppose each other, and the first outer connecting conductors 5A, 5B oppose the second outer connecting conductors 6A, 6B, respectively. Therefore, the multilayer capacitor C8 can be mounted easily.

Twenty-Fourth Embodiment

Figure 33:
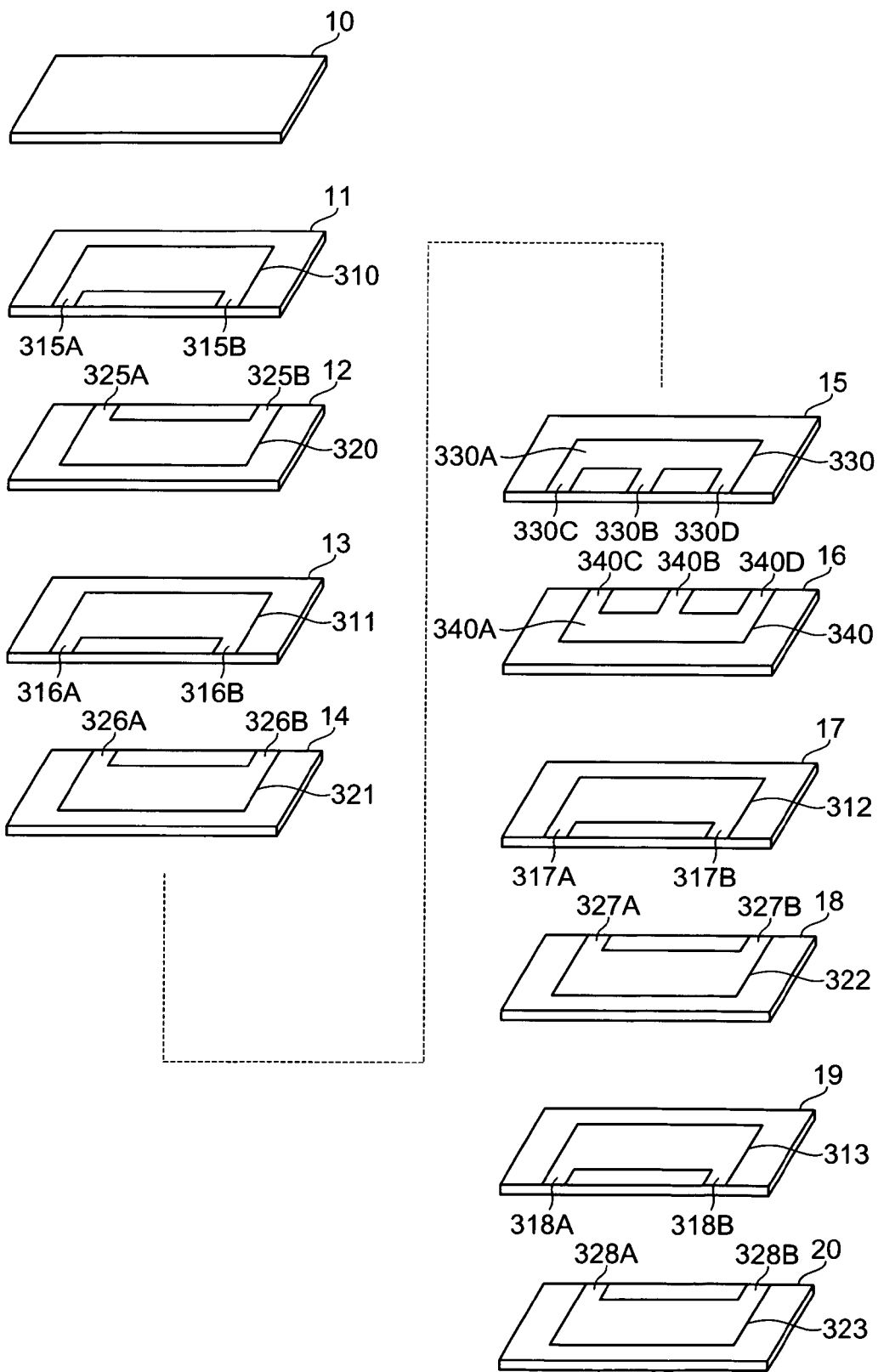
FIG. 33 is an exploded perspective view of the multilayer body included in the multilayer capacitor in accordance with a twenty-fourth embodiment.

With reference to FIG. 33, the configuration of the multilayer capacitor in accordance with a twenty-fourth embodiment will be explained. The multilayer capacitor in accordance with the twenty-fourth embodiment differs from the multilayer capacitor C8 in accordance with the twenty-third embodiment in terms of positions of the inner connecting conductors 330, 340 in the laminating direction. FIG. 33 is an exploded perspective view of the multilayer body included in the multilayer capacitor in accordance with the twenty-fourth embodiment.

As with the multilayer capacitor C8 in accordance with the twenty-third embodiment, the multilayer capacitor in accordance with the twenty-fourth embodiment comprises a multilayer body, first terminal conductors 3A, 3B formed on the multilayer body, second terminal conductors 4A, 4B similarly formed on the multilayer body, a first outer connecting conductor 5A similarly formed on the multilayer body, and a second outer connecting conductor 6A similarly formed on the multilayer body, though they are not depicted.

The first and second inner connecting conductors 330, 340, provided one by one, are laminated in the multilayer body of the multilayer capacitor in accordance with the twenty-fourth embodiment. In the multilayer capacitor in accordance with the twenty-fourth embodiment, the first and second inner connecting conductors 330, 340, provided one by one, are laminated between two layers each of first and second inner electrodes 310, 311, 320, 321 and two layers each of first and second inner electrodes 312, 323, 322, 323 as shown in FIG. 33. More specifically, the first inner connecting conductor 330 is positioned so as to be held between dielectric layers 14 and 15. The second inner connecting conductor 340 is positioned so as to be held between dielectric layers 15 and 16.

The first and second inner connecting conductors 330, 340 are laminated in the multilayer body such that the multilayer body includes at least one set (4 sets in this embodiment) of first and second inner electrodes neighboring each other with the dielectric layer in between.

In the multilayer capacitor in accordance with the twenty-fourth embodiment, the first terminal conductor 3A is connected to the first inner electrodes 310 to 313 not directly, but electrically through the first outer connecting conductors 5A, 5B and first inner connecting conductor 330. Also, in the multilayer capacitor in accordance with the twenty-fourth embodiment, the second terminal conductor 4A is connected to the second inner electrodes 320 to 323 not directly, but electrically through the second outer connecting conductors 6A, 6B and second inner connecting conductor 340. As a consequence, the multilayer capacitor in accordance with the twenty-fourth embodiment yields an equivalent series resistance greater than that of the conventional multilayer capacitor in which all the inner electrodes are connected to their corresponding terminal conductors through lead conductors.

Meanwhile, when the first terminal conductor 3A is concerned, the multilayer capacitor in accordance with the twenty-fourth embodiment differs from the multilayer capacitor C8 in accordance with the twenty-third embodiment in terms of how the resistance components of the first outer connecting conductors 5A, 5B are connected to the first terminal conductor 3A. In the multilayer capacitor C8 in accordance with the twenty-third embodiment, the respective resistance components of the first outer connecting conductors 5A, 5B are connected in series to the first inner connecting conductor 330, so as to be connected to the first terminal conductor 3A. In the multilayer capacitor in accordance with the twenty-fourth embodiment, on the other hand, each of the respective resistance components of the first outer connecting conductors 5A, 5B is split at the first inner connecting conductor 330 as a boundary, and the resulting resistance components are connected in parallel to the first terminal conductor 3A.

When the second terminal conductor 4A is concerned, the multilayer capacitor in accordance with the twenty-fourth embodiment differs from the multilayer capacitor C8 in accordance with the twenty-third embodiment in terms of how the resistance components of the second outer connecting conductors 6A, 6B are connected to the second terminal conductor 4A. In the multilayer capacitor C8 in accordance with the twenty-third embodiment, the respective resistance components of the second outer connecting conductors 6A, 6B are connected in series to the second inner connecting conductor 340, so as to be connected to the second terminal conductor 4A. In the multilayer capacitor in accordance with the twenty-fourth embodiment, on the other hand, each of the respective resistance components of the second outer connecting conductors 6A, 6B is split at the second inner connecting conductor 340 as a boundary, and the resulting resistance components are connected in parallel to the second terminal conductor 4A. Therefore, because of the difference in resistance components of the first and second outer connecting conductors 5A, 5B, 6A, 6B, the multilayer capacitor in accordance with the twenty-fourth embodiment yields an equivalent series resistance smaller than that of the multilayer capacitor C8 in accordance with the twenty-third embodiment.

As in the foregoing, by adjusting the positions of the first inner connecting conductor 330 directly connected to the first terminal conductor 3A and the second inner connecting conductor 340 directly connected to the second terminal conductor 4A in the laminating direction, this embodiment sets the equivalent series resistance of the multilayer capacitor to a desirable value, and thus can regulate the equivalent series resistance easily with a high precision. Also, since the equivalent series resistance is controlled by the first and second inner connecting conductors, the multilayer capacitor in accordance with the twenty-fourth embodiment can regulate the equivalent series resistance while setting its capacitance to a desirable value (e.g., a larger value).

All the outer conductors (first and second terminal conductors 3A, 4A and first and second outer connecting conductors 5A, 5B, 6A, 6B) in the multilayer capacitor in accordance with the twenty-fourth embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the twenty-fourth embodiment can be made easily.

The first conductor portion 330A of the first inner connecting conductor 330 opposes the second inner electrode 321 with the dielectric layer 14 in between. The first conductor portion 340A of the second inner connecting conductor 340 opposes the first inner electrode 312 with the dielectric layer 16 in between. Therefore, in the multilayer capacitor in accordance with the twenty-fourth embodiment, the first and second inner connecting conductors 330, 340 can also contribute to forming the capacity component, and thus can further increase the capacitance of the multilayer capacitor.

The first terminal conductor 3A is formed adjacent to both of the first outer connecting conductors 5A, 5B on the first side face of the multilayer body in the multilayer capacitor in accordance with the twenty-fourth embodiment as in the multilayer capacitor C8. Therefore, the multilayer capacitor in accordance with the twenty-fourth embodiment can lower its equivalent series inductance.

The second terminal conductor 4A is formed adjacent to both of the second outer connecting conductors 6A, 6B on the second side face of the multilayer body in the multilayer capacitor in accordance with the twenty-fourth embodiment as in the multilayer capacitor C8. Therefore, the multilayer capacitor in accordance with the twenty-fourth embodiment can lower its equivalent series inductance.

In the multilayer capacitor in accordance with the twenty-fourth embodiment, about the center axis of the multilayer body, the first terminal conductor 3A and second terminal conductor 4A are formed at positions axisymmetrical to each other, and the first outer connecting conductors 5A, 5B are formed at positions axisymmetrical to the second outer connecting conductors 6B, 6A, respectively. Also, in the opposing direction of the first and second side faces of the multilayer body in the multilayer capacitor in accordance with the twenty-fourth embodiment, the first terminal conductor 3A and second terminal conductor 4A oppose each other, and the first outer connecting conductors 5A, 5B oppose the second outer connecting conductors 6A, 6B, respectively. Therefore, the multilayer capacitor in accordance with the twenty-fourth embodiment can be mounted easily.

Twenty-Fifth Embodiment

Figure 34:
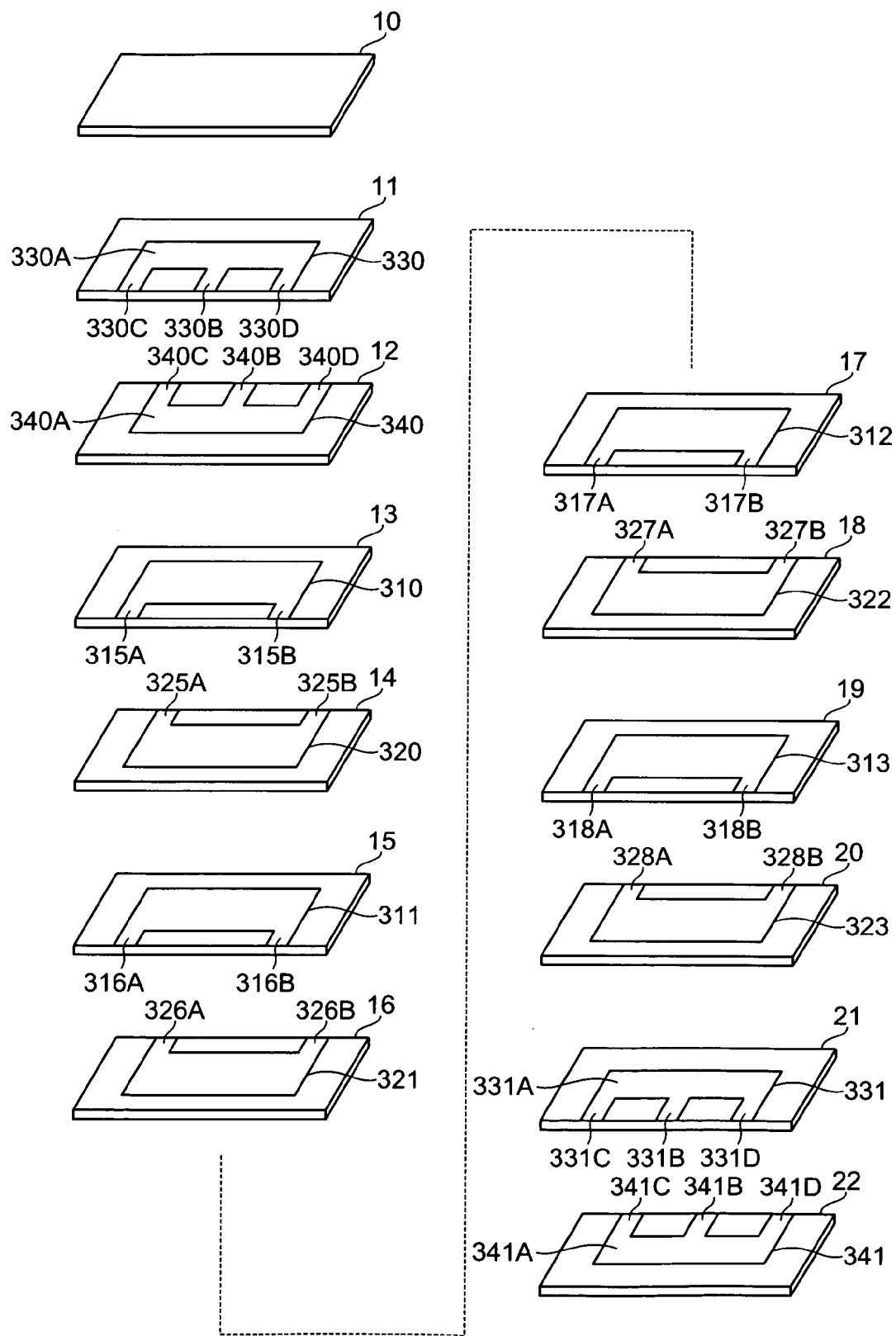
FIG. 34 is an exploded perspective view of the multilayer body included in the multilayer capacitor in accordance with a twenty-fifth embodiment.

The configuration of the multilayer capacitor in accordance with a twenty-fifth embodiment will be explained with reference to FIG. 34. The multilayer capacitor in accordance with the twenty-fifth embodiment differs from the multilayer capacitor C8 in accordance with the twenty-third embodiment in terms of the number of inner connecting conductors. FIG. 34 is an exploded perspective view of the multilayer body included in the multilayer capacitor in accordance with the twenty-fifth embodiment.

As with the multilayer capacitor C8 in accordance with the twenty-third embodiment, the multilayer capacitor in accordance with the twenty-fifth embodiment comprises a multilayer body, first terminal conductors 3A, 3B formed on the multilayer body, second terminal conductors 4A, 4B similarly formed on the multilayer body, a first outer connecting conductor 5A similarly formed on the multilayer body, and a second outer connecting conductor 6A similarly formed on the multilayer body, though they are not depicted.

The multilayer capacitor in accordance with the twenty-fifth embodiment is constructed by alternately laminating a plurality of (13 in this embodiment) dielectric layers 10 to 22 and a plurality of (4 each in this embodiment) of first and second inner electrodes 310 to 313, 320 to 323 as shown in FIG. 34.

In the multilayer body of the multilayer capacitor in accordance with the twenty-fifth embodiment, a plurality of (2 each in this embodiment) of first inner connecting conductors 330, 331 and a plurality of (2 each in this embodiment) of second inner connecting conductors 340, 341 are laminated. In the multilayer body of the multilayer capacitor in accordance with the twenty-fifth embodiment, four layers of first inner electrodes 310 to 313 and four layers of second inner electrodes 320 to 323 are arranged between one each of the first and second inner connecting conductors 330, 340 and one each of the first and second inner connecting conductors 331, 341.

The first inner connecting conductor 330 is positioned so as to be held between the dielectric layers 10 and 11. The first inner connecting conductor 331 is positioned so as to be held between the dielectric layers 20 and 21. The second inner connecting conductor 340 is positioned so as to be held between the dielectric layers 11 and 12. The second inner connecting conductor 341 is positioned so as to be held between the dielectric layers 21 and 22.

The first and second inner connecting conductors 330, 331, 340, 341 are laminated in the multilayer body such that the multilayer body includes at least one set (4 sets in this embodiment) of first and second inner electrodes neighboring each other with the dielectric layer in between.

In the multilayer capacitor in accordance with the twenty-fifth embodiment, the first terminal conductors 3A is connected to the first inner electrodes 310 to 313 not directly, but electrically through the first outer connecting conductors 5A, 5B and first inner connecting conductors 330, 331. Also, in the multilayer capacitor in accordance with the twenty-fifth embodiment, the second terminal conductor 4A is connected to the second inner electrodes 320 to 323 not directly, but electrically through the second outer connecting conductors 6A, 6B and second inner connecting conductors 340, 341. As a consequence, the multilayer capacitor in accordance with the twenty-fifth embodiment yields an equivalent series resistance greater than that of the conventional multilayer capacitor in which all the inner electrodes are connected to their corresponding terminal conductors through lead conductors.

As compared with the multilayer capacitor C8, the multilayer capacitor in accordance with the twenty-fifth embodiment has a greater number of first inner connecting conductors 330, 331, whereas the first inner connecting conductors 330, 331 are connected in parallel to the first terminal conductor 3A. Also, the multilayer capacitor in accordance with the twenty-fifth embodiment has a greater number of second inner connecting conductors 340, 341 than that of the multilayer capacitor C8, whereas the second inner connecting conductors 340, 341 are connected in parallel to the second terminal conductor 4A. Therefore, the multilayer capacitor in accordance with the twenty-fifth embodiment yields an equivalent series resistance smaller than that of the multilayer capacitor C8.

As in the foregoing, by adjusting the number of first inner connecting conductors 330, 331 directly connected to the first terminal conductor 3A and the number of second inner connecting conductors 340, 341 directly connected to the second terminal conductor 4A, this embodiment sets the equivalent series resistance of the multilayer capacitor to a desirable value, and thus can regulate the equivalent series resistance easily with a high precision.

All the outer conductors (first and second terminal conductors 3A, 4A and first and second outer connecting conductors 5A, 5B, 6A, 6B) in the multilayer capacitor in accordance with the twenty-fifth embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the twenty-fifth embodiment can be made easily.

The first conductor portion 331A of the first inner connecting conductor 331 opposes the second inner electrode 323 with the dielectric layer 20 in between. The first conductor portion 340A of the second inner connecting conductor 340 opposes the first inner electrode 310 with the dielectric layer 12 in between. Therefore, in the multilayer capacitor in accordance with the twenty-fifth embodiment, the first and second inner connecting conductors 331, 340 can also contribute to forming the capacity component, and thus can further increase the capacitance of the multilayer capacitor.

In the multilayer body of the multilayer capacitor in accordance with the twenty-fifth embodiment, a plurality of first and second inner electrodes 310 to 313, 320 to 323 are arranged between the first and second inner connecting conductors 330, 340 and the first and second inner connecting conductors 331, 341. Therefore, the multilayer capacitor in accordance with the twenty-fifth embodiment can set the equivalent series resistance with a favorable balance.

The first terminal conductor 3A is formed adjacent to the first outer connecting conductors 5A, 5B on the first side face of the multilayer body in the multilayer capacitor in accordance with the twenty-fifth embodiment as in the multilayer capacitor C8. Therefore, the multilayer capacitor in accordance with the twenty-fifth embodiment can lower its equivalent series inductance.

The second terminal conductor 4A is formed adjacent to the second outer connecting conductors 6A, 6B on the second side face of the multilayer body in the multilayer capacitor in accordance with the twenty-fifth embodiment as in the multilayer capacitor C8. Therefore, the multilayer capacitor in accordance with the twenty-fifth embodiment can lower its equivalent series inductance.

In the multilayer capacitor in accordance with the twenty-fifth embodiment, about the center axis of the multilayer body, the first terminal conductor 3A and second terminal conductor 4A are formed at positions axisymmetrical to each other, and the first outer connecting conductors 5A, 5B are formed at positions axisymmetrical to the second outer connecting conductors 6B, 6A, respectively. Also, in the opposing direction of the first and second side faces of the multilayer body in the multilayer capacitor in accordance with the twenty-fifth embodiment, the first terminal conductor 3A and second terminal conductor 4A oppose each other, and the first outer connecting conductors 5A, 5B oppose the second outer connecting conductors 6A, 6B, respectively. Therefore, the multilayer capacitor in accordance with the twenty-second embodiment can be mounted easily.

Twenty-Sixth Embodiment

Figure 35:
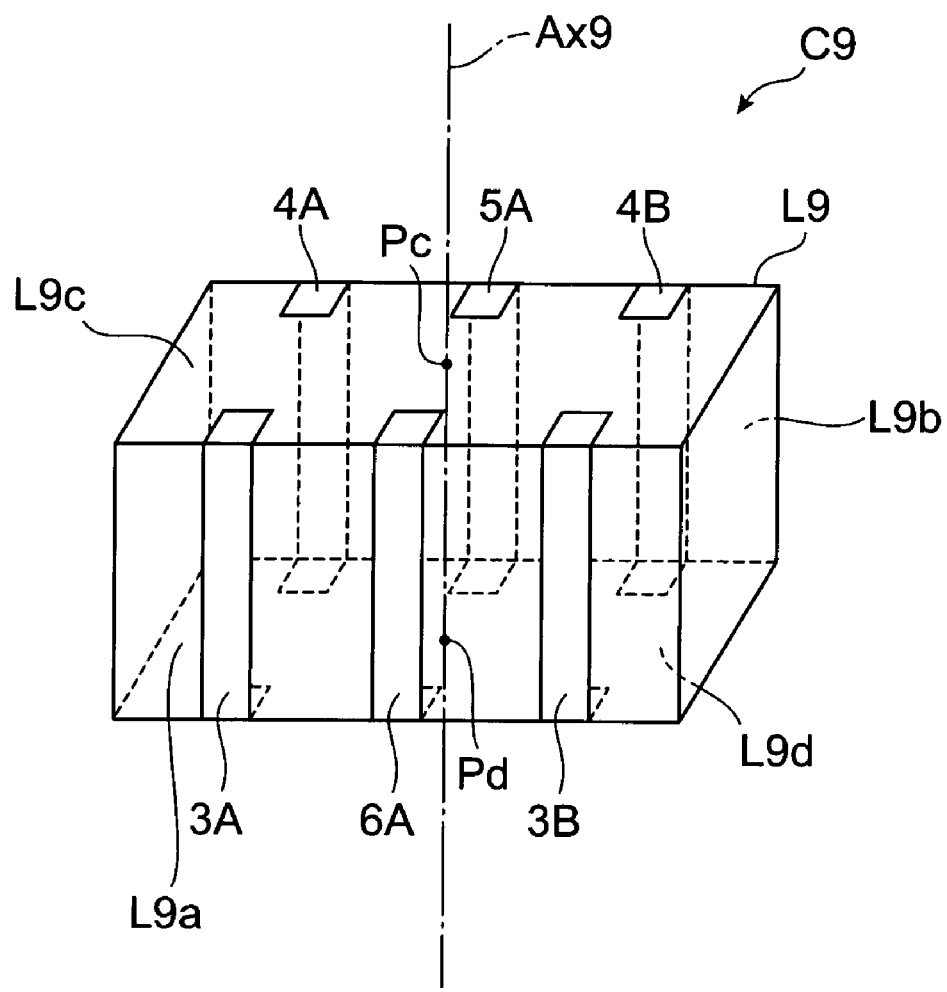
FIG. 35 is a perspective view of the multilayer capacitor in accordance with a twenty-sixth embodiment.
Figure 36:
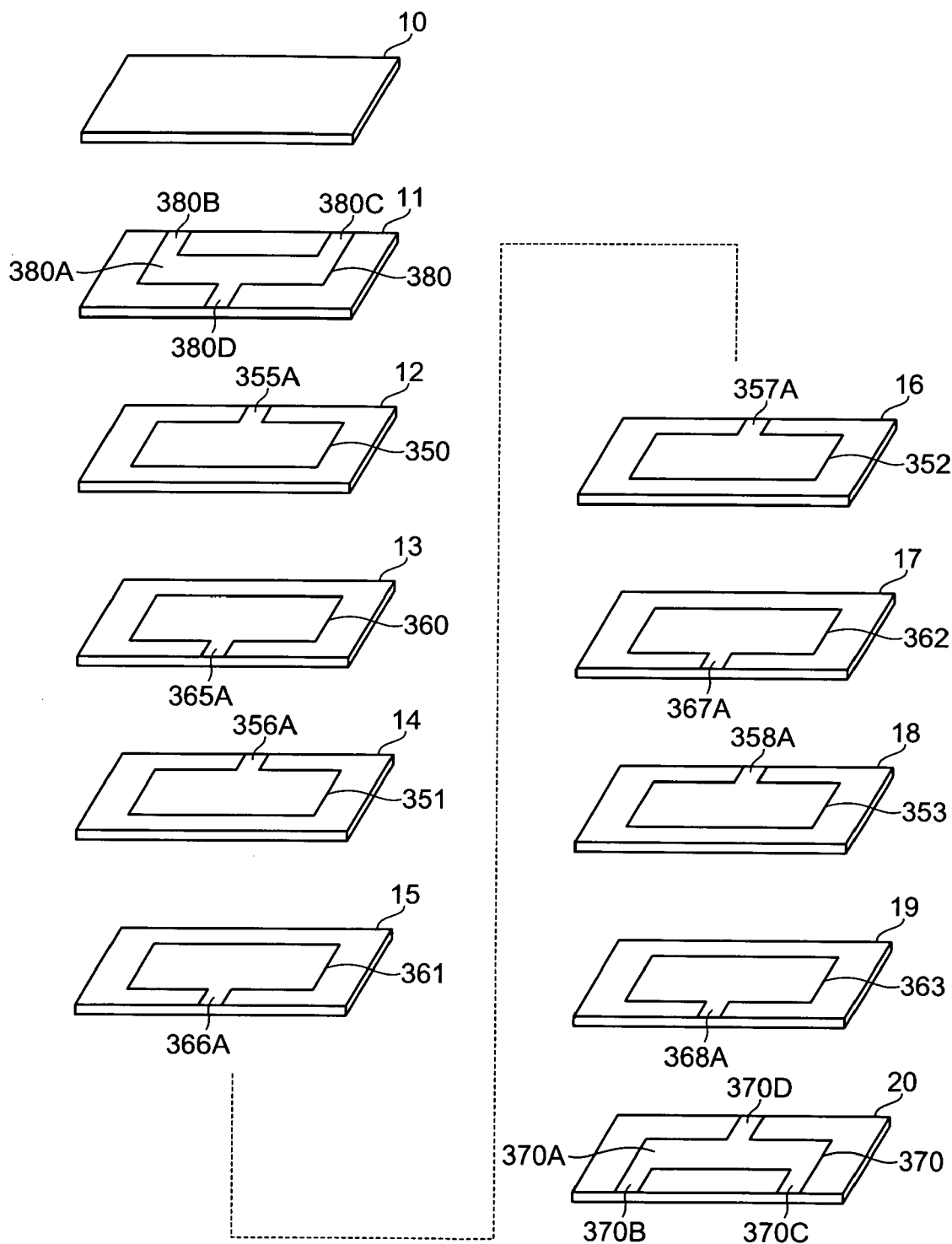
FIG. 36 is an exploded perspective view of the multilayer body included in the multilayer capacitor in accordance with the twenty-sixth embodiment.

The configuration of the multilayer capacitor C9 in accordance with a twenty-sixth, embodiment will be explained with reference to FIGS. 35 and 36. FIG. 35 is a perspective view of the multilayer capacitor in accordance with the twenty-sixth embodiment. FIG. 36 is an exploded perspective view of the multilayer body included in the multilayer capacitor in accordance with the twenty-sixth embodiment.

As shown in FIG. 35, the multilayer capacitor C9 in accordance with the twenty-sixth embodiment comprises a multilayer body L9, first terminal conductors 3A, 3B formed on the multilayer body L9, second terminal conductors 4A, 4B similarly formed on the multilayer body, a first outer connecting conductor 5A similarly formed on the multilayer body, and a second outer connecting conductor 6A similarly formed on the multilayer body.

Each of the first terminal conductors 3A, 3B and second outer connecting conductor 6A is positioned on a first side face L9a which is a side face extending along the longitudinal axis of faces L9c, L9d orthogonal to the laminating direction of the multilayer body L9 among side faces parallel to the laminating direction of the multilayer body. The first terminal conductors 3A, 3B and second outer connecting conductor 6A are formed such that the first terminal conductor 3A, second outer connecting conductor 6A, and first terminal conductor 3B are successively arranged from the left side to right side of FIG. 35.

Each of the second terminal conductors 4A, 4B and first outer connecting conductor 5A is positioned on a second side face L9b which is a side face extending along the longitudinal axis of faces L9c, L9d orthogonal to the laminating direction of the multilayer body L9 among side faces parallel to the laminating direction of the multilayer body. The second terminal conductors 4A, 4B and first outer connecting conductor 5A are formed such that the second terminal conductor 4A, first outer connecting conductor 5A, and second terminal conductor 4B are successively arranged from the left side to right side of FIG. 35.

The first terminal conductor 3A and second terminal conductor 4B are axisymmetrical to each other about a center axis Ax9 passing respective center points Pc, Pd of the two side faces L9c, L9d orthogonal to the laminating direction of the multilayer body L9 among center axes of the multilayer body L9. The first terminal conductor 3B and second terminal conductor 4A are axisymmetrical to each other about the center axis Ax9 of the multilayer body L9. The first outer connecting conductor 5A and second outer connecting conductor 6A are axisymmetrical to each other about the center axis Ax9 of the multilayer body L9.

The first terminal conductor 3A and second terminal conductor 4A oppose each other in a direction along which the first side face L9a and second side face L9b of the multilayer body L9 oppose each other. The first terminal conductor 3B and second terminal conductor 4B oppose each other in the opposing direction of the first side face L9a and second side face L9b of the multilayer body L9. The first outer connecting conductor 5A and second outer connecting conductor 6A oppose each other in the opposing direction of the first side face L9a and second side face L9b of the multilayer body L9.

As shown in FIG. 36, the multilayer body L9 is constructed by alternately laminating a plurality of (11 in this embodiment) dielectric layers 10 to 20 and a plurality of (4 each in this embodiment) of first and second inner electrodes 350 to 353, 360 to 363.

Further, one first inner connecting conductor 370 and one second inner connecting conductor 380 are laminated in the multilayer body L9. In the multilayer body L9, the plurality of first inner connecting conductors 350 to 353 and the plurality of second inner connecting conductor 360 to 363 are arranged between the second inner connecting conductor 380 and the first inner connecting conductor 370.

Each of the first inner electrodes 350 to 353 has a substantially rectangular form. The plurality of first inner electrodes 350 to 353 are formed at respective positions separated by a predetermined distance from a side face parallel to the laminating direction of the dielectric layers 10 to 20 (hereinafter simply referred to as "laminating direction") in the multilayer body L9.

A lead conductor 355A is integrally formed with the first inner electrode 350 so as to extend therefrom and reach the second side face L9b of the multilayer body L9. A lead conductor 356A is integrally formed with the first inner electrode 351 so as to extend therefrom and reach the second side face L9b of the multilayer body L9. A lead conductor 357A is integrally formed with the first inner electrode 352 so as to extend therefrom and reach the second side face L9b of the multilayer body L9. A lead conductor 358A is integrally formed with the first inner electrode 353 so as to extend therefrom and reach the second side face L9b of the multilayer body. L9.

The first inner electrode 350 is electrically connected to the first outer connecting conductor 5A through the lead conductor 355A. The first inner electrode 351 is electrically connected to the first outer connecting conductor 5A through the lead conductor 356A. The first inner electrode 352 is electrically connected to the first outer connecting conductor 5A through the lead conductor 357A. The first inner electrode 353 is electrically connected to the first outer connecting conductor 5A through the lead conductor 358A. As a consequence, the plurality of first inner electrodes 350 to 353 are electrically connected to each other through the first outer connecting conductor 5A.

Each of the second inner electrodes 360 to 363 has a substantially rectangular form. The plurality of second inner electrodes 360 to 363 are formed at respective positions separated by a predetermined distance from a side face parallel to the laminating direction of the multilayer body L9.

A lead conductor 365A is integrally formed with the second inner electrode 360 so as to extend therefrom and reach the first side face L9a of the multilayer body L9. A lead conductor 366A is integrally formed with the second inner electrode 361 so as to extend therefrom and reach the first side face L9a of the multilayer body L9. A lead conductor 367A is integrally formed with the second inner electrode 362 so as to extend therefrom and reach the first side face L9a of the multilayer body L9. A lead conductor 368A is integrally formed with the second inner electrode 363 so as to extend therefrom and reach the first side face L9a of the multilayer body L9.

The second inner electrode 360 is electrically connected to the second outer connecting conductor 6A through the lead conductor 365A. The second inner electrode 361 is electrically connected to the second outer connecting conductor 6A through the lead conductor 366A. The second inner electrode 362 is electrically connected to the second outer connecting conductor 6A through the lead conductor 367A. The second inner electrode 363 is electrically connected to the second outer connecting conductor 6A through the lead conductor 368A. As a consequence, the plurality of second inner electrodes 360 to 363 are electrically connected to each other through the second outer connecting conductor 6A.

The first inner connecting conductor 370 is positioned so as to be held between the dielectric layers 19 and 20. The second inner connecting conductor 380 is positioned so as to be held between the dielectric layers 10 and 11. The first and second inner connecting conductors 370, 380 are electrically insulated from each other.

The first inner connecting conductor 370 includes a first conductor portion 370A having an oblong form and second, third, and fourth conductor portions 370B to 370D extending from the first conductor portion 370A so as to be taken out to the first side face L9a of the multilayer body L9. The first conductor portion 370A is arranged such that its longitudinal axis is parallel to the first and second side faces L9a, L9b of the multilayer body L9.

The second inner connecting conductor 380 includes a first conductor portion 380A having an oblong form and second, third, and fourth conductor portions 380B to 380D extending from the first conductor portion 380A so as to be taken out to the second side face L9b of the multilayer body L9. The first conductor portion 380A is arranged such that its longitudinal axis is parallel to the first and second side faces L9a, L9b of the multilayer body L9.

In the first inner connecting conductor 370, the second, third, and fourth conductor portions 370B, 370C, and 370D are electrically connected to the first terminal conductor 3A, first terminal conductor 3B, and first outer connecting conductor 5A, respectively. As a consequence, the first inner connecting conductor 370 is electrically connected to the first terminal conductors 3A, 3B and first outer connecting conductor 5A.

In the second inner connecting conductor 380, the second, third, and fourth conductor portions 380B, 380C, and 380D are electrically connected to the second terminal conductor 4A, second terminal conductor 4B, and second outer connecting conductor 6A, respectively. As a consequence, the second inner connecting conductor 380 is electrically connected to the second terminal conductors 4A, 4B and second outer connecting conductor 6A.

The first conductor portion 370A of the first inner connecting conductor 370 is a region opposing the second inner electrode 363 with the dielectric layer 19 in between. The first conductor portion 380A of the second inner connecting conductor 380 is a region opposing the first inner electrode 350 with the dielectric layer 11 in between.

The first and second inner connecting conductors 370, 380 are laminated in the multilayer body L9 such that the multilayer body L9 includes at least one set (4 sets in this embodiment) of first and second inner electrodes neighboring each other with the dielectric layer in between.

In the multilayer capacitor C9, the first terminal conductors 3A, 3B are connected to the first inner electrodes 350 to 353 not directly, but electrically through the first outer connecting conductor 5A and first inner connecting conductor 370. Also, in the multilayer capacitor C9, the second terminal conductors 4A, 4B are connected to the second inner electrodes 360 to 363 not directly, but electrically through the second outer connecting conductor 6A and second inner connecting conductor 380. As a result, the multilayer capacitor C9 yields an equivalent series resistance greater than that of the conventional multilayer capacitor in which all the inner electrodes are connected to their corresponding terminal conductors through lead conductors.

By adjusting the number of first inner connecting conductor 370 directly connected to the first terminal conductors 3A, 3B and the number of second inner connecting conductor 380 directly connected to the second terminal conductors 4A, 4B in such a manner, this embodiment sets the equivalent series resistance of the multilayer capacitor C9 to a desirable value, and thus can regulate the equivalent series resistance easily with a high precision. Also, since the equivalent series resistance is controlled by the first and second inner connecting conductors, the multilayer capacitor C9 can regulate the equivalent series resistance while setting its capacitance to a desirable value (e.g., a larger value).

All of the first and second terminal conductors 3A, 3B, 4A, 4B and first and second outer connecting conductors 5A, 6A, which are outer conductors of the multilayer capacitor C9, are formed on the first and second side faces L9a, L9b of the multilayer body L9 opposing each other. Therefore, as compared with the case where outer conductors are formed on three or more side faces (e.g., four side faces) of the multilayer body L9, the multilayer capacitor C9 can reduce steps required for forming the outer conductors. As a consequence, the multilayer capacitor C9 can be made easily.

The first inner connecting conductor 370 has the first conductor portion 370A that is a region opposing the second inner electrode 363 with the dielectric layer 19 in between. The second inner connecting conductor 380 has the second conductor portion 380A that is a region opposing the first inner electrode 350 with the dielectric layer 11 in between. Therefore, both of the first and second inner connecting conductors 370, 380 can contribute to forming the capacity component of the multilayer capacitor C9. As a consequence, the multilayer capacitor C9 can further increase its capacitance.

Since a plurality of first and second inner electrodes 350 to 353, 360 to 363 are arranged between the first inner connecting conductor 370 and second inner connecting conductor 380, the multilayer capacitor C9 can set the equivalent series resistance with a favorable balance.

In the multilayer capacitor C9, about the center axis Ax9 of the multilayer body L9, the first terminal conductors 3A, 3B are formed at positions axisymmetrical to the second terminal conductors 4A, 4B, respectively, and the first outer connecting conductor 5A and second outer connecting conductor 6A are formed at positions axisymmetrical to each other. Also, in the opposing direction of the first side face L9a and second side face L9b of the multilayer body L9 in the multilayer capacitor C9, the first terminal conductors 3A, 3B oppose the second terminal conductors 4A, 4B, respectively, and the first outer connecting conductor 5A and second outer connecting conductor 6A oppose each other. Therefore, the multilayer capacitor C9 can be mounted easily.

Twenty-Seventh Embodiment

Figure 37:
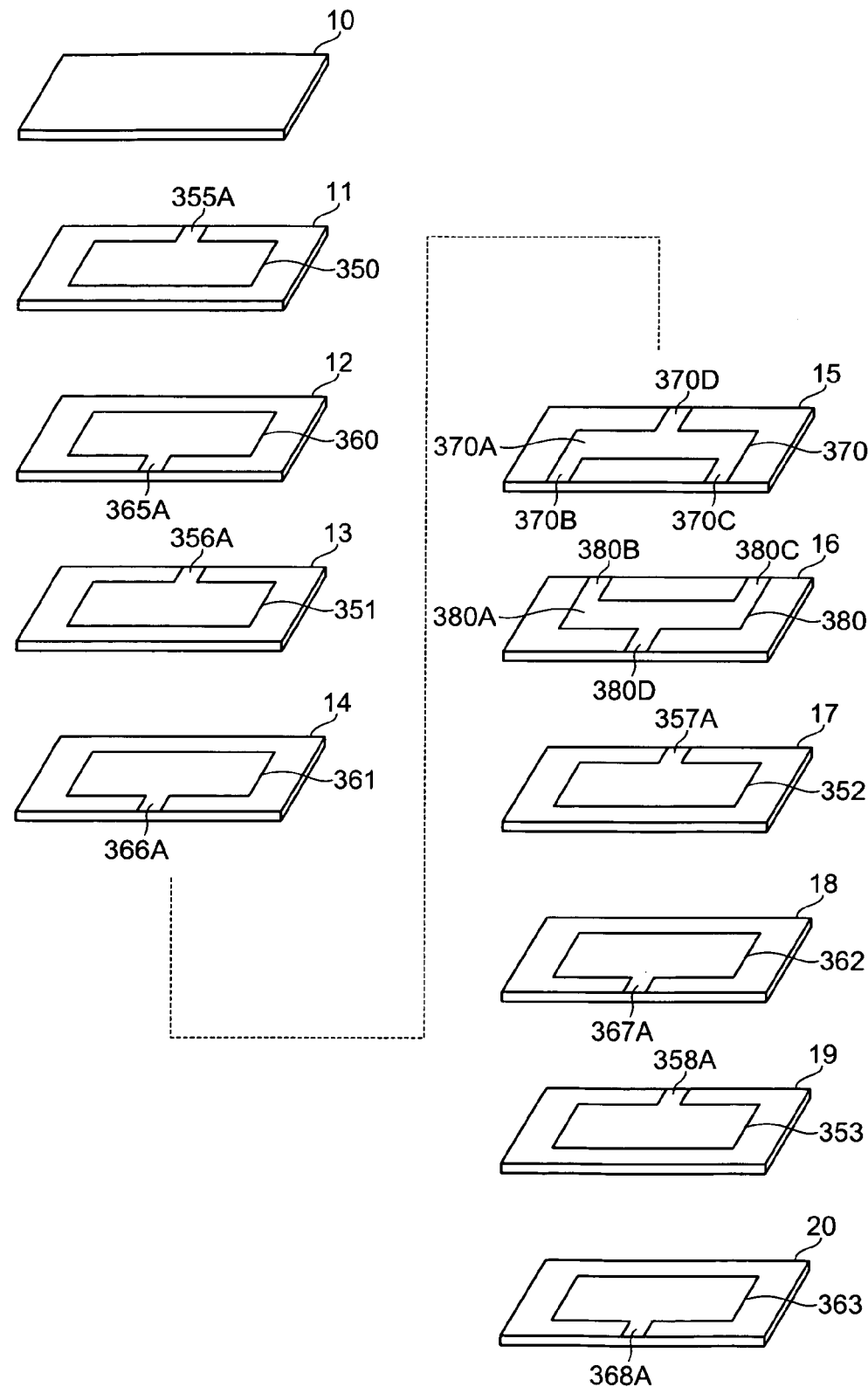
FIG. 37 is an exploded perspective view of the multilayer body included in the multilayer capacitor in accordance with a twenty-seventh embodiment.

With reference to FIG. 37, the configuration of the multilayer capacitor in accordance with a twenty-seventh embodiment will be explained. The multilayer capacitor in accordance with the twenty-seventh embodiment differs from the multilayer capacitor C9 in accordance with the twenty-sixth embodiment in terms of positions of the inner connecting conductors 370, 380 in the laminating direction. FIG. 37 is an exploded perspective view of the multilayer body included in the multilayer capacitor in accordance with the twenty-seventh embodiment.

As with the multilayer capacitor C9 in accordance with the twenty-sixth embodiment, the multilayer capacitor in accordance with the twenty-seventh embodiment comprises a multilayer body, first terminal conductors 3A, 3B formed on the multilayer body, second terminal conductors 4A, 4B similarly formed on the multilayer body, a first outer connecting conductor 5A similarly formed on the multilayer body, and a second outer connecting conductor 6A similarly formed on the multilayer body, though they are not depicted.

The first and second inner connecting conductors 370, 380, provided one by one, are laminated in the multilayer body of the multilayer capacitor in accordance with the twenty-seventh embodiment. In the multilayer capacitor in accordance with the twenty-seventh embodiment, the first and second inner connecting conductors 370, 380, provided one by one, are laminated between two layers each of first and second inner electrodes 350, 351, 360, 361 and two layers each of first and second inner electrodes 352, 353, 362, 363 as shown in FIG. 37. More specifically, the first inner connecting conductor 370 is positioned so as to be held between dielectric layers 14 and 15. The second inner connecting conductor 380 is positioned so as to be held between dielectric layers 15 and 16.

The first and second inner connecting conductors 370, 380 are laminated in the multilayer body such that the multilayer body includes at least one set (4 sets in this embodiment) of first and second inner electrodes neighboring each other with the dielectric layer in between.

In the multilayer capacitor in accordance with the twenty-seventh embodiment, the first terminal conductors 3A, 3B are connected to the first inner electrodes 350 to 353 not directly, but electrically through the first outer connecting conductor 5A and first inner connecting conductor 370. Also, in the multilayer capacitor in accordance with the twenty-seventh embodiment, the second terminal conductors 4A, 4B are connected to the second inner electrodes 360 to 363 not directly, but electrically through the second outer connecting conductor 6A and second inner connecting conductor 380. As a consequence, the multilayer capacitor in accordance with the twenty-seventh embodiment yields an equivalent series resistance greater than that of the conventional multilayer capacitor in which all the inner electrodes are connected to their corresponding terminal conductors through lead conductors.

Meanwhile, when the first terminal conductors 3A, 3B are concerned, the multilayer capacitor in accordance with the twenty-seventh embodiment differs from the multilayer capacitor C9 in accordance with the twenty-sixth embodiment in terms of how the resistance component of the first outer connecting conductor 5A is connected to the first terminal conductors 3A, 3B. In the multilayer capacitor C9 in accordance with the twenty-sixth embodiment, the resistance component of the first outer connecting conductor 5A is connected in series to the first inner connecting conductor 370, so as to be connected to each of the first terminal conductors 3A, 3B. In the multilayer capacitor in accordance with the twenty-seventh embodiment, on the other hand, the resistance component of the first outer connecting conductor 5A is split at the first inner connecting conductor 370 as a boundary, and the resulting resistance components are connected in parallel to each of the first terminal conductors 3A, 3B.

When the second terminal conductors 4A, 4B are concerned, the multilayer capacitor in accordance with the twenty-seventh embodiment differs from the multilayer capacitor C9 in accordance with the twenty-sixth embodiment in terms of how the resistance component of the second outer connecting conductor 6A is connected to the second terminal conductors 4A, 4B. In the multilayer capacitor C9 in accordance with the twenty-sixth embodiment, the resistance component of the second outer connecting conductor 6A is connected in series to the second inner connecting conductor 380, so as to be connected to each of the second terminal conductors 4A, 4B. In the multilayer capacitor in accordance with the twenty-seventh embodiment, on the other hand, the resistance component of the second outer connecting conductor 6A is split at the second inner connecting conductor 380 as a boundary, and the resulting resistance components are connected in parallel to each of the second terminal conductors 4A, 4B. Therefore, because of the difference in resistance components of the first and second outer connecting conductors 5A, 6A, the multilayer capacitor in accordance with the twenty-seventh embodiment yields an equivalent series resistance smaller than that of the multilayer capacitor C9 in accordance with the twenty-sixth embodiment.

As in the foregoing, by adjusting the positions of the first inner connecting conductor 370 directly connected to the first terminal conductors 3A, 3B and the second inner connecting conductor 380 directly connected to the second terminal conductors 4A, 4B in the laminating direction, this embodiment sets the equivalent series resistance of the multilayer capacitor to a desirable value, and thus can regulate the equivalent series resistance easily with a high precision. Also, since the equivalent series resistance is controlled by the first and second inner connecting conductors, the multilayer capacitor in accordance with the twenty-seventh embodiment can regulate the equivalent series resistance while setting its capacitance to a desirable value (e.g., a larger value).

All the outer conductors (first and second terminal conductors 3A, 3B, 4A, 4B and first and second outer connecting conductors 5A, 6A) in the multilayer capacitor in accordance with the twenty-seventh embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the twenty-seventh embodiment can be made easily.

The first conductor portion 370A of the first inner connecting conductor 370 opposes the second inner electrode 361 with the dielectric layer 14 in between. The first conductor portion 380A of the second inner connecting conductor 380 opposes the first inner electrode 352 with the dielectric layer 16 in between. Therefore, in the multilayer capacitor in accordance with the twenty-seventh embodiment, the first and second inner connecting conductors 370, 380 can also contribute to forming the capacity component, and thus can further increase the capacitance of the multilayer capacitor.

In the multilayer capacitor in accordance with the twenty-seventh embodiment, about the center axis of the multilayer body, the first terminal conductors 3A, 3B are formed at positions axisymmetrical to the second terminal conductors 4A, 4B, respectively, and the first outer connecting conductor 5A and second outer connecting conductor 6A are formed at positions axisymmetrical to each other. Also, in the opposing direction of the first and second side faces of the multilayer body in the multilayer capacitor in accordance with the twenty-seventh embodiment, the first terminal conductors 3A, 3B oppose the second terminal conductors 4A, 4B, respectively, and the first outer connecting conductor 5A and second outer connecting conductor 6A oppose each other. Therefore, the multilayer capacitor in accordance with the twenty-seventh embodiment can be mounted easily.

Twenty-Eighth Embodiment

Figure 38:
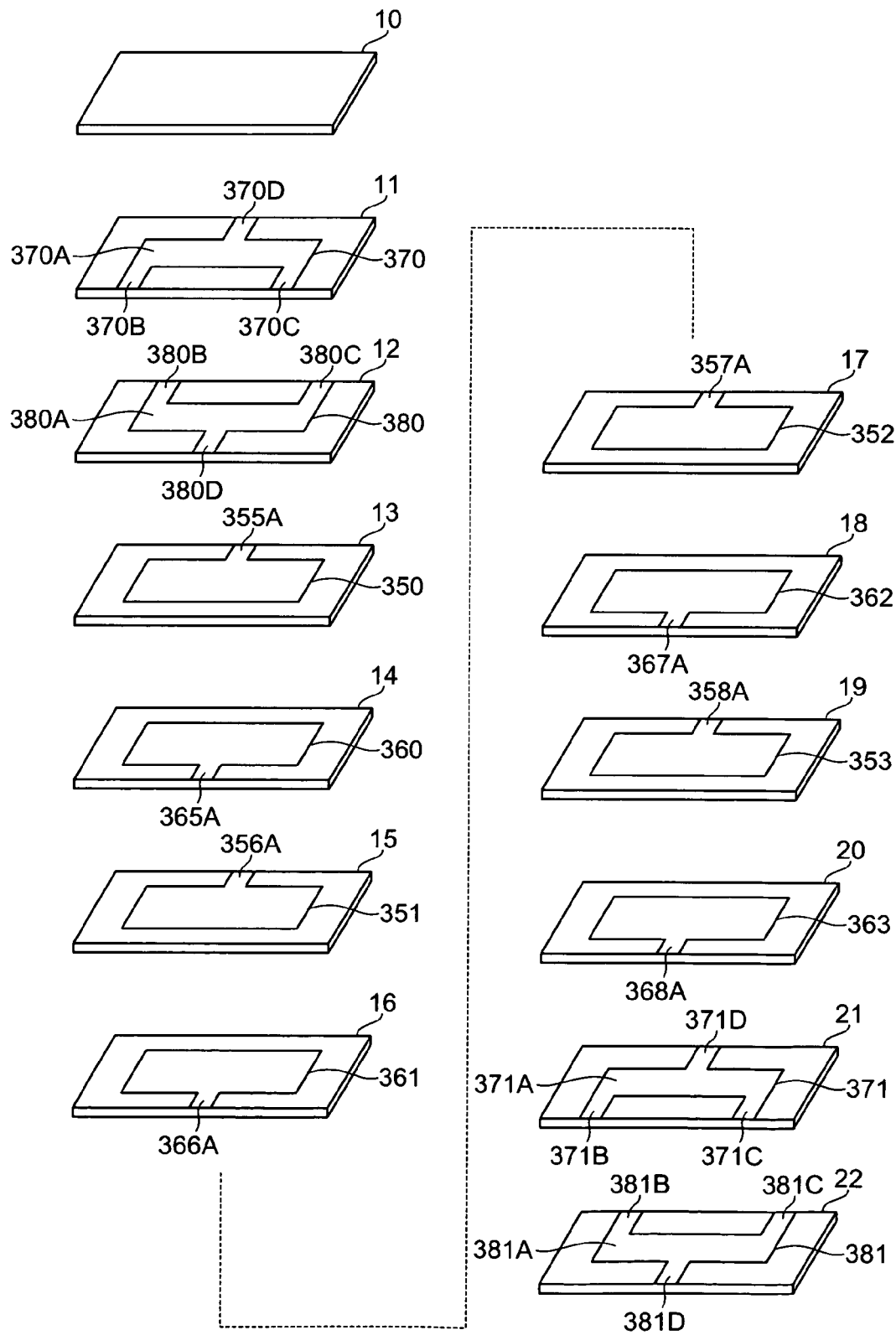
FIG. 38 is an exploded perspective view of the multilayer body included in the multilayer capacitor in accordance with a twenty-eighth embodiment.

The configuration of the multilayer capacitor in accordance with a twenty-eighth embodiment will be explained with reference to FIG. 38. The multilayer capacitor in accordance with the twenty-eighth embodiment differs from the multilayer capacitor C9 in accordance with the twenty-sixth embodiment in terms of the number of inner connecting conductors. FIG. 38 is an exploded perspective view of the multilayer body included in the multilayer capacitor in accordance with the twenty-eighth embodiment.

As with the multilayer capacitor C9 in accordance with the twenty-sixth embodiment, the multilayer capacitor in accordance with the twenty-eighth embodiment comprises a multilayer body, first terminal conductors 3A, 3B formed on the multilayer body, second terminal conductors 4A, 4B similarly formed on the multilayer body, a first outer connecting conductor 5A similarly formed on the multilayer body, and a second outer connecting conductor 6A similarly formed on the multilayer body, though they are not depicted.

The multilayer capacitor in accordance with the twenty-eighth embodiment is constructed by alternately laminating a plurality of (13 in this embodiment) dielectric layers 10 to 22 and a plurality of (4 each in this embodiment) of first and second inner electrodes 350 to 353, 360 to 363 as shown in FIG. 38.

In the multilayer body of the multilayer capacitor in accordance with the twenty-eighth embodiment, a plurality of (2 each in this embodiment) of first inner connecting conductors 370, 371 and a plurality of (2 each in this embodiment) of second inner connecting conductors 380, 381 are laminated. In the multilayer body of the multilayer capacitor in accordance with the twenty-eighth embodiment, four layers of first inner electrodes 350 to 353 and four layers of second inner electrodes 360 to 363 are arranged between one each of the first and second inner connecting conductors 370, 380 and one each of the first and second inner connecting conductors 371, 381.

The first inner connecting conductor 370 is positioned so as to be held between the dielectric layers 10 and 11. The first inner connecting conductor 371 is positioned so as to be held between the dielectric layers 20 and 21. The second inner connecting conductor 380 is positioned so as to be held between the dielectric layers 11 and 12. The second inner connecting conductor 381 is positioned so as to be held between the dielectric layers 21 and 22.

The first and second inner connecting conductors 370, 371, 380, 381 are laminated in the multilayer body such that the multilayer body includes at least one set (4 sets in this embodiment) of first and second inner electrodes neighboring each other with the dielectric layer in between.

In the multilayer capacitor in accordance with the twenty-eighth embodiment, the first terminal conductors 3A, 3B are connected to the first inner electrodes 350 to 352 not directly, but electrically through the first outer connecting conductor 5A and first inner connecting conductors 370, 371. Also, in the multilayer capacitor in accordance with the twenty-eighth embodiment, the second terminal conductors 4A, 4B are connected to the second inner electrodes 360 to 363 not directly, but electrically through the second outer connecting conductor 6A and second inner connecting conductors 380, 381. As a consequence, the multilayer capacitor in accordance with the twenty-eighth embodiment yields an equivalent series resistance greater than that of the conventional multilayer capacitor in which all the inner electrodes are connected to their corresponding terminal conductors through lead conductors.

As compared with the multilayer capacitor C9, the multilayer capacitor in accordance with the twenty-eighth embodiment has a greater number of first inner connecting conductors 370, 371, whereas the first inner connecting conductors 370, 371 are connected in parallel to their corresponding first terminal conductors 3A, 3B. Also, the multilayer capacitor in accordance with the twenty-eighth embodiment has a greater number of second inner connecting conductors 380, 381 than that of the multilayer capacitor C9, whereas the second inner connecting conductors 380, 381 are connected in parallel to their corresponding second terminal conductors 4A, 4B. Therefore, the multilayer capacitor in accordance with the twenty-eighth embodiment yields an equivalent series resistance smaller than that of the multilayer capacitor C9.

As in the foregoing, by adjusting the number of first inner connecting conductors 370, 371 directly connected to the first terminal conductors 3A, 3B and the number of second inner connecting conductors 380, 381 directly connected to the second terminal conductors 4A, 4B, this embodiment sets the equivalent series resistance of the multilayer capacitor to a desirable value, and thus can regulate the equivalent series resistance easily with a high precision.

All the outer conductors (first and second terminal conductors 3A, 3B, 4A, 4B and first and second outer connecting conductors 5A, 6A) in the multilayer capacitor in accordance with the twenty-eighth embodiment are formed on the first and second side faces of the multilayer body opposing each other. Therefore, as compared with the case where outer conductors are formed on three or more side faces (e.g., four side faces) of a multilayer body, steps required for forming the outer conductors can be reduced, whereby the multilayer capacitor in accordance with the twenty-eighth embodiment can be made easily.

The first conductor portion 371A of the first inner connecting conductor 371 opposes the second inner electrode 363 with the dielectric layer 20 in between. The first conductor portion 380A of the second inner connecting conductor 380 opposes the first inner electrode 350 with the dielectric layer 12 in between. Therefore, in the multilayer capacitor in accordance with the twenty-eighth embodiment, the first and second inner connecting conductors 371, 380 can also contribute to forming the capacity component, and thus can further increase the capacitance of the multilayer capacitor.

In the multilayer body of the multilayer capacitor in accordance with the twenty-eighth embodiment, a plurality of first and second inner electrodes 350 to 353, 360 to 363 are arranged between the first and second inner connecting conductors 370, 380 and the first and second inner connecting conductors 371, 381. Therefore, the multilayer capacitor in accordance with the twenty-eighth embodiment can set the equivalent series resistance with a favorable balance.

In the multilayer capacitor in accordance with the twenty-eighth embodiment, about the center axis of the multilayer body, the first terminal conductors 3A, 3B are formed at positions axisymmetrical to the second terminal conductors 4A, 4B, respectively, and the first outer connecting conductor 5A and second outer connecting conductor 6A are formed at positions axisymmetrical to each other. Also, in the opposing direction of the first and second side faces of the multilayer body in the multilayer capacitor in accordance with the twenty-eighth embodiment, the first terminal conductors 3A, 3B oppose the second terminal conductors 4A, 4B, respectively, and the first outer connecting conductor 5A and second outer connecting conductor 6A oppose each other. Therefore, the multilayer capacitor in accordance with the twenty-eighth embodiment can be mounted easily.

Though preferred embodiments of the present invention is explained in detail in the foregoing, the present invention is not limited to the above-mentioned embodiments. For example, the number of laminated dielectric layers 10 to 22 and the numbers of laminated first and second inner electrodes 30 to 33, 70 to 73, 110 to 113, 150 to 153, 190 to 193, 230 to 233, 270 to 273, 310 to 313, 350 to 353, 40 to 43, 80 to 83, 120 to 123, 160 to 163, 200 to 203, 240 to 243, 280 to 283, 320 to 323, and 360 to 363 are not limited to those described in the above-mentioned embodiments.

The numbers of the first inner connecting conductors 50, 51, 90, 91, 130, 131, 170, 171, 210, 211, 250, 251, 290, 291, 330, 331, 370, 371 and their positions in the laminating direction are not limited to those described in the above-mentioned embodiments. The numbers of the second inner connecting conductors 60, 61, 70, 71, 140, 141, 180, 181, 220, 221, 260, 261, 300, 301, 340, 341, 380, 381 and their positions in the laminating direction are not limited to those described in the above-mentioned embodiments.

The forms of the first inner connecting conductors 50, 51, 90, 91, 130, 131, 170, 171, 210, 211, 250, 251, 290, 291, 330, 331, 370, 371 are not limited to those described in the above-mentioned embodiments as long as they are electrically connected to the first terminal conductor and first outer connecting conductor. The forms of the second inner connecting conductors 60, 61, 70, 71, 140, 141, 180, 181, 220, 221, 260, 261, 300, 301, 340, 341, 380, 381 are not limited to those described in the above-mentioned embodiments as long as they are electrically connected to the second terminal conductor and second outer connecting conductor.

It is not necessary for the first inner connecting conductors 50, 51, 90, 91, 130, 131, 170, 171, 210, 211, 250, 251, 290, 291, 330, 331, 370, 371 to have a region opposing the second inner electrode in the laminating direction of the multilayer body. It is not necessary for the second inner connecting conductors 60, 61, 70, 71, 140, 141, 180, 181, 220, 221, 260, 261, 300, 301, 340, 341, 380, 381 to have a region opposing the first inner electrode in the laminating direction of the multilayer body.

The numbers of the first and second terminal conductors 3A, 3B, 4A, 4B are not limited to those described in the above-mentioned embodiments. Therefore, the first and second terminal conductors may be provided one each or three or more each, for example. The first and second terminal conductors 3A, 3B, 4A, 4B may be provided by numbers different from each other. The numbers of the first and second outer connecting conductors 5A, 5B, 6A, 6B are not limited to those described in the above-mentioned embodiments. Therefore, the first and second outer connecting conductors 5A, 5B, 6A, 6B may be provided one each or three or more each, for example. The first and second outer connecting conductors 5A, 5B, 6A, 6B may be provided by numbers different from each other.

The positions of the first and second terminal conductors 3A, 3B, 4A, 4B and first and second outer connecting conductors 5A, 5B, 6A, 6B are not limited to those described in the above-mentioned embodiments as long as they are formed on at least one of the first and second side faces of the multilayer body opposing each other. Therefore, the second terminal conductor may be formed on the first side face of the multilayer body. The first outer connecting conductor may be formed on the second side face of the multilayer body. The second outer connecting conductor may be formed on the first side face of the multilayer body.

When a plurality of first terminal conductors 3A, 3B are provided, it is not necessary for the plurality of first terminal conductors to be formed on the same side face. When a plurality of second terminal conductors 4A, 4B are provided, it is not necessary for the plurality of second terminal conductors to be formed on the same side face. When a plurality of first outer connecting conductors 5A, 5B are provided, it is not necessary for the plurality of first outer connecting conductors to be formed on the same side face. When a plurality of second outer connecting conductors 6A, 6B are provided, it is not necessary for the plurality of second outer connecting conductors to be formed on the same side face.

It is not necessary for the first terminal conductor and first outer connecting conductor to be adjacent to each other on the same side face of the multilayer capacitor. It is not necessary for the second terminal conductor and second outer connecting conductor to be adjacent to each other on the same side face of the multilayer capacitor.

The first terminal conductors may be positioned axisymmetrical to each other about the center axis (e.g., Ax1 to Ax9) of the multilayer body. The second terminal conductors may be positioned axisymmetrical to each other about the center axis (e.g., Ax1 to Ax9) of the multilayer body. The first outer connecting conductors may be positioned axisymmetrical to each other about the center axis (e.g., Ax1 to Ax9) of the multilayer body. The second outer connecting conductors may be positioned axisymmetrical to each other about the center axis (e.g., Ax1 to Ax9) of the multilayer body. It is not necessary for the terminal conductors to be positioned axisymmetrical to each other about the center axis (e.g., Ax1 to Ax9) of the multilayer body. It is not necessary for the outer connecting conductors to be positioned axisymmetrical to each other about the center axis (e.g., Ax1 to Ax9) of the multilayer body.

The first terminal conductors may be located at positions opposing each other in the opposing direction of the first and second side faces of the multilayer body. The second terminal conductors may be located at positions opposing each other in the opposing direction of the first and second side faces of the multilayer body. The first outer connecting conductor may be located at a position opposing the second outer connecting conductor in the opposing direction of the first and second side faces of the multilayer body. It is not necessary for the terminal conductors to be located at positions opposing each other in the opposing direction of the first and second side faces of the multilayer body. It is not necessary for the outer connecting conductors to be located at positions opposing each other in the opposing direction of the first and second side faces of the multilayer body.

In the multilayer body of the multilayer capacitor in accordance with the present invention, dielectric layers may further be laminated, or dielectric layers and inner electrodes may be laminated alternately.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising a multilayer body in which a plurality of dielectric layers and a plurality of inner electrodes are alternately laminated, and a plurality of outer conductors formed on the multilayer body;

wherein the plurality of inner electrodes include a plurality of first inner electrodes and a plurality of second inner electrodes alternately arranged;

wherein the plurality of outer conductors include a first terminal conductor, a second terminal conductor, a first outer connecting conductor electrically connected to the plurality of first inner electrodes, and a second outer connecting conductor electrically connected to the plurality of second inner electrodes;

wherein the first terminal conductor is formed on a first side face of the multilayer body;

wherein the second terminal conductor is formed on the first side face of the multilayer body or a second side face thereof opposing the first side face;

wherein the first outer connecting conductor is formed on the first or second side face of the multilayer body;

wherein the second outer connecting conductor is formed on the first or second side face of the multilayer body;

wherein each of the first inner electrodes is electrically connected to the first outer connecting conductor through a lead conductor;

wherein each of the second inner electrodes is electrically connected to the second outer connecting conductor through a lead conductor;

wherein at least one first inner connecting conductor and at least one second inner connecting conductor are laminated in the multilayer body;

wherein the first inner connecting conductor is electrically connected to the first terminal conductor and the first outer connecting conductor, whereas the second inner connecting conductor is electrically insulated from the first inner connecting conductor but is electrically connected to the second terminal conductor and the second outer connecting conductor;

wherein the first and second inner connecting conductors are laminated in the multilayer body such that the multilayer body includes at least one set of the first and second inner electrodes neighboring each other with the dielectric layer in between; and wherein an equivalent series resistance is set to a desirable value by adjusting the number of first inner connecting conductors and the number of second inner connecting conductors respectively.

2. A multilayer capacitor according to claim 1, wherein the first inner connecting conductor includes a region opposing the second inner electrode with the dielectric layer in between.

3. A multilayer capacitor according to claim 1, wherein the second inner connecting conductor includes a region opposing the first inner electrode with the dielectric layer in between.

4. A multilayer capacitor according to claim 1, wherein the first terminal conductor and the first outer connecting conductor are formed adjacent to each other on the same side face of the multilayer body.

5. A multilayer capacitor according to claim 1, wherein the second terminal conductor and the second outer connecting conductor are formed adjacent to each other on the same side face of the multilayer body.

6. A multilayer capacitor according to claim 1, wherein a plurality of first terminal conductors and a plurality of first outer connecting conductors are provided by the same number;
wherein a plurality of second terminal conductors and a plurality of second outer connecting conductors are provided by the same number;
wherein the plurality of first terminal conductors and the plurality of first outer connecting conductors are formed on the first side face of the multilayer body, whereas the plurality of second terminal conductors and the plurality of second outer connecting conductors are formed on the second side face of the multilayer body;
wherein at least one of both neighboring sides of each first terminal conductor on the first side face is formed with the first outer connecting conductor;
wherein at least one of both neighboring sides of each first outer connecting conductor on the first side face is formed with the first terminal conductor;
wherein at least one of both neighboring sides of each second terminal conductor on the second side face is formed with the second outer connecting conductor; and
wherein at least one of both neighboring sides of each second outer connecting conductor on the second side face is formed with the second terminal conductor.

7. A multilayer capacitor according to claim 1, wherein at least one each of the first terminal conductor, second terminal conductor, first outer connecting conductor, and second outer connecting conductor are provided;
wherein the first terminal conductor or second terminal conductor is located at a position axisymmetrical to the first terminal conductor about a center axis of the multilayer body passing respective center points of two side faces of the multilayer body orthogonal to the laminating direction of the multilayer body;
wherein the first outer connecting conductor or second outer connecting conductor is located at a position axisymmetrical to the first outer connecting conductor about the center axis of the multilayer body;
wherein the first terminal conductor or second terminal conductor is located at a position axisymmetrical to the second terminal conductor about the center axis of the multilayer body;
wherein the first outer connecting conductor or second outer connecting conductor is located at a position axisymmetrical to the second outer connecting conductor about the center axis of the multilayer body;
wherein the first terminal conductor or second terminal conductor is located at a position opposing the first terminal conductor in a direction along which the first and second side faces of the multilayer body oppose each other;
wherein the first outer connecting conductor or second outer connecting conductor is located at a position opposing the first outer connecting conductor in the opposing direction of the first and second side faces of the multilayer body;
wherein the first terminal conductor or second terminal conductor is located at a position opposing the second terminal conductor in the opposing direction of the first and second side faces of the multilayer body; and
wherein the first outer connecting conductor or second outer connecting conductor is located at a position opposing the second outer connecting conductor in the opposing direction of the first and second side faces of the multilayer body.

8. A multilayer capacitor comprising a multilayer body in which a plurality of dielectric layers and a plurality of inner electrodes are alternately laminated, and a plurality of outer conductors formed on the multilayer body;
wherein the plurality of inner electrodes include a plurality of first inner electrodes and a plurality of second inner electrodes alternately arranged;
wherein the plurality of outer conductors include a first terminal conductor, a second terminal conductor, a first outer connecting conductor electrically connected to the plurality of first inner electrodes, and a second outer connecting conductor electrically connected to the plurality of second inner electrodes;
wherein the first terminal conductor is formed on a first side face of the multilayer body;
wherein the second terminal conductor is formed on the first side face of the multilayer body or a second side face thereof opposing the first side face;
wherein the first outer connecting conductor is formed on the first or second side face of the multilayer body;
wherein the second outer connecting conductor is formed on the first or second side face of the multilayer body;
wherein each of the first inner electrodes is electrically connected to the first outer connecting conductor through a lead conductor;
wherein each of the second inner electrodes is electrically connected to the second outer connecting conductor through a lead conductor;
wherein at least one first inner connecting conductor and at least one second inner connecting conductor are laminated in the multilayer body;
wherein the first inner connecting conductor is electrically connected to the first terminal conductor and first outer connecting conductor, whereas the second inner connecting conductor is electrically insulated from the first inner connecting conductor but is electrically connected to the second terminal conductor and second outer connecting conductor;
wherein the first and second inner connecting conductors are laminated in the multilayer body such that the multilayer body includes at least one set of the first and second inner electrodes neighboring each other with the dielectric layer in between; and
wherein an equivalent series resistance is set to a desirable value by adjusting a position of the first inner connecting conductor in the multilayer body in the laminating direction and a position of the second inner connecting conductor in the multilayer body in the laminating direction respectively.

9. A multilayer capacitor according to claim 8, wherein the first inner connecting conductor includes a region opposing the second inner electrode with the dielectric layer in between.

10. A multilayer capacitor according to claim 8, wherein the second inner connecting conductor includes a region opposing the first inner electrode with the dielectric layer in between.

11. A multilayer capacitor according to claim 8, wherein the first terminal conductor and the first outer connecting conductor are formed adjacent to each other on the same side face of the multilayer body.

12. A multilayer capacitor according to claim 8, wherein the second terminal conductor and the second outer connecting conductor are formed adjacent to each other on the same side face of the multilayer body.

13. A multilayer capacitor according to claim 8, wherein a plurality of first terminal conductors and a plurality of first outer connecting conductors are provided by the same number;

wherein a plurality of second terminal conductors and a plurality of second outer connecting conductors are provided by the same number;

wherein the plurality of first terminal conductors and the plurality of first outer connecting conductors are formed on the first side face of the multilayer body, whereas the plurality of second terminal conductors and the plurality of second outer connecting conductors are formed on the second side face of the multilayer body;

wherein at least one of both neighboring sides of each first terminal conductor on the first side face is formed with the first outer connecting conductor;

wherein at least one of both neighboring sides of each first outer connecting conductor on the first side face is formed with the first terminal conductor;

wherein at least one of both neighboring sides of each second terminal conductor on the second side face is formed with the second outer connecting conductor; and wherein at least one of both neighboring sides of each second outer connecting conductor on the second side face is formed with the second terminal conductor.

14. A multilayer capacitor according to claim 8, wherein at least one each of the first terminal conductor, second terminal conductor, first outer connecting conductor, and second outer connecting conductor are provided;

wherein the first terminal conductor or second terminal conductor is located at a position axisymmetrical to the first terminal conductor about a center axis of the multilayer body passing respective center points of two side faces of the multilayer body orthogonal to the laminating direction of the multilayer body;

wherein the first outer connecting conductor or second outer connecting conductor is located at a position axisymmetrical to the first outer connecting conductor about the center axis of the multilayer body;

wherein the first terminal conductor or second terminal conductor is located at a position axisymmetrical to the second terminal conductor about the center axis of the multilayer body;

wherein the first outer connecting conductor or second outer connecting conductor is located at a position axisymmetrical to the second outer connecting conductor about the center axis of the multilayer body;

wherein the first terminal conductor or second terminal conductor is located at a position opposing the first terminal conductor in a direction along which the first and second side faces of the multilayer body oppose each other;

wherein the first outer connecting conductor or second outer connecting conductor is located at a position opposing the first outer connecting conductor in the opposing direction of the first and second side faces of the multilayer body;

wherein the first terminal conductor or second terminal conductor is located at a position opposing the second terminal conductor in the opposing direction of the first and second side faces of the multilayer body; and wherein the first outer connecting conductor or second outer connecting conductor is located at a position opposing the second outer connecting conductor in the opposing direction of the first and second side faces of the multilayer body.

\* \* \* \* \*